US012807817B2

(12) United States Patent
Gianneschi et al.

(10) Patent No.: US 12,807,817 B2
(45) Date of Patent: Nov. 24, 2026

(54) SELENIUM-CONTAINING ANALOGUES OF PHEOMELANIN AND RELATED MATERIALS AND METHODS OF MAKING

(71) Applicant: Northwestern University, Evanston, IL (US)

(72) Inventors: Nathan C. Gianneschi, Evanston, IL (US); Wei Cao, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 19/314,677

(22) Filed: Aug. 29, 2025

(65) Prior Publication Data

US 2026/0062555 A1 Mar. 5, 2026

Related U.S. Application Data

(63) Continuation of application No. 17/770,247, filed as application No. PCT/US2020/057902 on Oct. 29, 2020, now Pat. No. 12,441,890.

(60) Provisional application No. 62/928,129, filed on Oct. 30, 2019.

(51) Int. Cl.
*C09B 69/10* (2006.01)
*B82Y 40/00* (2011.01)
*C07F 11/00* (2006.01)

(52) U.S. Cl.
CPC ............ *C09B 69/104* (2013.01); *B82Y 40/00* (2013.01); *C07F 11/00* (2013.01)

(58) Field of Classification Search
CPC ........ C09B 69/104; B82Y 40/00; C07F 11/00
See application file for complete search history.

(56) References Cited

U.S. PATENT DOCUMENTS

| | | | |
|---|---|---|---|
| 4,861,760 | A | 8/1989 | Mazuel et al. |
| 4,911,920 | A | 3/1990 | Jani et al. |
| 5,212,162 | A | 5/1993 | Missel et al. |
| 5,368,610 | A | 11/1994 | Chan et al. |
| 5,403,841 | A | 4/1995 | Lang et al. |
| 5,441,542 | A | 8/1995 | Prota et al. |
| 5,547,658 | A | 8/1996 | Hansenne et al. |
| 5,628,799 | A | 5/1997 | Wenke et al. |
| 7,776,105 | B2 | 8/2010 | Koike et al. |
| 8,067,044 | B2 | 11/2011 | Henry et al. |
| 8,586,090 | B2 | 11/2013 | Dadachova et al. |
| 11,045,493 | B2 | 6/2021 | Gianneschi et al. |
| 12,441,890 | B2 | 10/2025 | Gianneschi et al. |
| 2008/0052841 | A1 | 3/2008 | Cohen et al. |
| 2009/0178209 | A1 | 7/2009 | Koike et al. |
| 2011/0020252 | A1 | 1/2011 | Shantha et al. |
| 2011/0236325 | A1 | 9/2011 | Mitchell et al. |
| 2013/0078205 | A1 | 3/2013 | Dayan et al. |
| 2013/0177616 | A1 | 7/2013 | de Olivera et al. |
| 2014/0044789 | A1 | 2/2014 | Dadachova et al. |
| 2015/0093342 | A1 | 4/2015 | Domloge et al. |
| 2020/0113934 | A1 | 4/2020 | Gianneschi et al. |
| 2021/0393673 | A1 | 12/2021 | Gianneschi et al. |
| 2022/0332670 | A1 | 10/2022 | Zhou et al. |
| 2023/0404890 | A1 | 12/2023 | Gianneschi et al. |
| 2024/0000694 | A1 | 1/2024 | Gianneschi et al. |

FOREIGN PATENT DOCUMENTS

| | | |
|---|---|---|
| CN | 109260071 | 1/2019 |
| EP | 1301165 | 1/2007 |
| EP | 2873412 | 5/2015 |
| KR | 10-2016-0072590 | 6/2016 |
| WO | WO 1993/005759 | 4/1993 |
| WO | WO 2009/003037 | 12/2008 |
| WO | WO 2017/064672 | 4/2017 |
| WO | WO 2018/013609 | 1/2018 |
| WO | WO 2021/021350 | 2/2021 |
| WO | WO 2021/087076 | 5/2021 |
| WO | WO 2021/096692 | 5/2021 |
| WO | WO 2022/140532 | 6/2022 |
| WO | WO 2022/232356 | 11/2022 |
| WO | WO 2023/150205 | 8/2023 |
| WO | WO 2024/107309 | 5/2024 |

OTHER PUBLICATIONS

Xu et al Selenium-Containing Polymers: Promising Biomaterials for Controlled Release and Enzyme Mimics, Accounts of chemical research, vol. 46, No. 7 2013, pp. 1647-1658, published on Jun. 2013.*

"NanoComposix's Guide to Dynamic Light Scattering Measurement and Analysis" [dated Feb. 2015 (version 1.4), published by nanoComposix of San Diego, CA, and available at nanoComposix_Guidelines_for_DLS_Measurements_and_Analysis (last accessed Jun. 26, 2019), pp. 1-8.

Abcam Flow cytometric analysis of cell cycle with propidium iodide DNA staining. https://www.abcam.com/protocols/flow-cytometric-analysis-of-cell-cycle-with-propidium-iodide-dna-staining.

Akiladevi et al. (2010) "Ethosomes—A noninvasive approach for transdermal drug delivery," Int J Current Pharm Res 2(4): 1-4.

Ali et al. (Oct. 2018) "Aqueous MEA and Ammonia Sorption-Induced Damage in Keratin Fibers," ACS Omega, 3 (10), 14173-14180.

(Continued)

*Primary Examiner* — Gregory Listvoyb
(74) *Attorney, Agent, or Firm* — Leydig, Voit & Mayer, Ltd.

(57) ABSTRACT

In an aspect, an artificial selenomelanin material comprises: one or more selenomelanin polymers; wherein the one or more selenomelanin polymers comprise a plurality of covalently bonded selenomelanin base units; and wherein a chemical formula of each of the one or more selenomelanin base units comprises at least one selenium atom. Optionally, each selenomelanin polymer is a pheomelanin. Preferably, the chemical formula of each of the one or more selenomelanin base units comprises at least one covalent bond with each of the at least one selenium atom.

14 Claims, 74 Drawing Sheets

(56) References Cited

OTHER PUBLICATIONS

Alikhan et al. (2011) "Vitiligo: a comprehensive overview: part I. Introduction, epidemiology, quality of life, diagnosis, differential diagnosis, associations, histopathology, etiology, and work-up," J. Am. Acad. Dermatol. 65(3): 473-491.
Alipour (May 2020) "Comments on: Hair dye and chemical straightener use and breast cancer risk in a large US population of black and white women," International Journal of Cancer, 146 (9), 2651-2651.
Al-Muhammed et al. (1996) "In-vivo studies on dexamethasone sodium phosphate liposomes," J. Microencapsul. 13(3): 293-306.
Ando et al. (2007) "Approaches to identify inhibitors of melanin biosynthesis via the quality control of tyrosinase," J. Invest. Dermatol. 127(4): 751-761.
Ando et al. (2012) "Melanosomes are transferred from melanocytes to keratinocytes through the processes of packaging, release, uptake, and dispersion," J. Invest. Dermatol. 132(4): 1222-1229.
Apte et al. (2013) "Psychrotrophic yeast Yarrowia lipolytica NCYC 789 mediates the synthesis of antimicrobial silver nanoparticles via cell-associated melanin," AMB Express 3:32, pp. 1-8.
Au et al. (2011) "Polypyrrole Nanoparticles: A Potential Optical Coherence Tomography Contrast Agent for Cancer Imaging," Adv Mater, 23 (48), 5792-5795.
Ba et al. (2017) "Recent developments in the use of tyrosinase and laccase in environmental applications," Crit Rev Biotechnol, 37 (7), 819-832.
Bailey et al. (2014) "Comparison of damage to human hair fibers caused by monoethanolamine- and ammonia-based hair colorants," J Cosmet Sci, 65 (1), 1-9.
Bardestani et al. (2019) "Experimental methods in chemical engineering: specific surface area and pore size distribution measurements—BET, BJH, and DFT," The Canadian Journal of Chemical Engineering 97(11): 2781-2791.
Battistella et al. (Apr. 2020) "Mimicking Natural Human Hair Pigmentation with Synthetic Melanin," ACS Cent. Sci. 6(7): 1179-1188.
Beltran-Garcia et al. (2014) "Singlet Molecular Oxygen Generation by Light-Activated DHN-Melanin of the Fungal Pathogen Mycosphaerella fijiensis in Black Sigatoka Disease of Bananas," PLOS One 9(3): e91616, pp. 1-15.
Berge et al. (1977) "Pharmaceutical Salts," Journal of Pharmaceutical Sciences 66(1): 1-19.
Bernard et al. (publicly available 2016) "Consumption of hair dye products by the French women population: Usage pattern and exposure assessment," Food and Chemical Toxicology 88: 123-132.
Bikle et al. (2012) "Calcium Regulation of Keratinocyte Differentiation," Expert Rev. Endocrinol. Metab. 7(4): 461-472.
Borowska et al. (2015) "Metals in cosmetics: implications for human health," J Appl Toxicol 35(6): 551-572.
Boulton et al. (2001) "Retinal Photodamage," J. Photochem. Photobiol. B: Biol. 64(2-3): 144-161.
Brenner et al. (2008) "The protective role of melanin against UV damage in human skin," Photochem Photobiol, 84 (3), 539-549.
Byers et al. (2003) "Role of Cytoplasmic Dynein in Perinuclear Aggregation of Phagocytosed Melanosomes and Supranuclear Melanin Cap Formation in Human Keratinocytes," J. Invest. Dermatol. 121(4): 813-820.
Byers et al. (2007) "Requirement of dynactin p150$^{Glued}$ subunit for the functional integrity of the keratinocyte microparasol," J. Investi. Dermatol. 127(7): 1736-1744.
Cao et al. (2017) "A novel method for non-destructive determination of hair photo-induced damage based on multispectral imaging technology," Sci Rep-Uk, 7.
Cao et al. (Jul. 2020) "Selenomelanin: An Abiotic Selenium Analogue of Pheomelanin," Journal of the American Chemical Society, vol. 142, Issue 29, p. 12802-12810.
Cecchini et al. (May 2017) "Modeling Fungal Melanin Buildup: Biomimetic Polymerization of 1,8-Dihydroxynaphthalene Mapped by Mass Spectrometry," Chem. Eur. J. 23: 8092-8098.
Chen et al. (2014) "Engineering fluorescent poly(dopamine) capsules," Langmuir 30(10): 2921-2925.
Chen et al. (Nov. 2016) "Nanoscale Polydopamine (PDA) Meets π-π Interactions: An Interface-Directed Coassembly Approach for Mesoporous Nanoparticles," Langmuir 32(46): 12119-12128.
Chonn et al. (1995) "Recent advances in liposomal drug-delivery systems," Curr. Opin. Biotechnol. 6(6): 698-708.
Chung (Sep. 2016) "Azo dyes and human health: A review," J Environ Sci Health C Environ Carcinog Ecotoxicol Rev 34: 233-261.
Coenraads et al. (Oct. 2018) "The Allergy Alert Test: Introduction of a Protocol Suitable to Provide an Alert Signal in p-Phenylenediamine-Allergic Hair Dye Users," Dermatitis, 29(5), 231-232.
Cordero et al. (Feb. 2020) "Melanin." Curr Biol 30 (4), R142-R143.
Dadachova et al. (2007) "Ionizing Radiation Changes the Electronic Properties of Melanin and Enhances the Growth of Melanized Fungi," Plos One 2(5): e457, pp. 1-13.
Dadachova et al. (2008) "Ionizing Radiation: How Fungi Cope, Adapt, and Exploit with the Help of Melanin," Curr. Opin. Microbiol. 11(6): 525-531.
Dadachova et al. (2008) "The radioprotective properties of fungal melanin are a function of its chemical composition, stable radical presence and spatial arrangement," Pigment Cell Melanoma Res 21(2): 192-199.
D'Alba et al. (Sep. 2018) " Melanosomes: Biogenesis, Properties, and Evolution of an Ancient Organelle," Physiol. Rev. 99: 1-19.
Dell'Angelica et al. (2000) "Lysosome-related organelles," FASEB J. 14(10): 1265-1278.
D'Ischia et al. (2014) "Polydopamine and eumelanin: from structure-property relationships to a unified tailoring strategy," Acc. Chem. Res. 47, (12), 3541-50.
D'Ischia et al. (2015) "Melanins and Melanogenesis: from Pigment Cells to Human Health and Technological Applications," Pigm. Cell Melanoma Res. 28(5): 520-544.
D'Mello et al. (2016) "Signaling Pathways in Melanogenesis," Int J Mol Sci, 17 (7).
Dolgova et al. (2016) "Distribution of selenium in zebrafish larvae after exposure to organic and inorganic selenium forms," Metallomics, Issue 3, p. 305-312.
Dong et al. (Oct. 2019) "Melanin-mimetic multicolor and low-toxicity hair dye," Rsc Adv, 9 (58), 33617-33624.
Draelos (2006) "Sunscreens and hair photoprotection," Dermatologic Clinics, 24 (1), 81-84.
Durante et al. (2011) Physical basis of radiation protection in space travel. Rev. Mod. Phys. 83, (4), 1245-1281.
Eberle et al. (Dec. 2019) "Hair dye and chemical straightener use and breast cancer risk in a large US population of black and white women," International Journal of Cancer, 147, 383-391.
Eisenman et al. (2005) "Microstructure of Cell Wall-Associated Melanin in the Human Pathogenic Fungus Cryptococcus neoformans," Biochemistry 44(10): 3683-3693.
Etebari et al. (2015) "Evaluation of protective effect of amifostine on dacarbazine induced genotoxicity" Res Pharm Sci 10, (1), 68-74.
Eyles et al. (1997) "Oral Delivery and Fate of Poly(lactic acid) Microsphere-encapsulated Interferon in Rats," J. Pharm. Pharmacol. 49(7): 669-674.
Fan et al. (2014) "Transferring biomarker into molecular probe: melanin nanoparticle as a naturally active platform for multimodality imaging," J. Am. Chem. Soc. 136(43): 15185-15194.
Faria et al. (2007) "The biotechnological potential of mushroom tyrosinases," Food Technol Biotech, 45 (3), 287-294.
Ferguson et al. (Apr. 2019) "Addressing the conundrums of p-phenylenediamine hair dye allergy by applying Friedmann's principles of contact sensitization," Contact Dermatitis, 80 (4), 234-237.
Fernandez-Llamosas et al. (2017) "Speeding up bioproduction of selenium nanoparticles by using Vibrio natriegens as microbial factory," Sci Rep, 7, (1), 16046.
Foote et al. (1996) Active Oxygen in Chemistry.
Gago-Dominguez et al. (2001) "Use of permanent hair dyes and bladder-cancer risk," Int J Cancer 91(4): 575-579.

(56) References Cited

OTHER PUBLICATIONS

Gao (1995) "Controlled Release of a Contraceptive Steroid from Biodegradable and Injectable Gel Formulations: In Vitro Evaluation," Pharm. Res. 12(6): 857-863.
Gao et al. (2013) "Mussel-Inspired Synthesis of Polydopamine-Functionalized Graphene Hydrogel as Reusable Adsorbents for Water Purification," ACS Applied Materials & Interfaces 5(2): 425-432.
Gao et al. (Jun. 2019) "Rapid preparation of polydopamine coating as a multifunctional hair dye," Rsc Adv, 9 (35), 20492-20496.
Ghiani et al. (2008) "Characterization of human hair melanin and its degradation products by means of magnetic resonance techniques," Magn Reson Chem 46(5): 471-479.
Glass et al. (2012) "Direct chemical evidence for eumelanin pigment from the Jurassic period" Proc. Natl. Acad. Sci. U. S. A. 109, (26), 10218-23.
Guerra-Tapia et al. (2014) "Hair cosmetics: dyes," Actas Dermo-Sifiliograficas 105(9): 833-839.
Guo et al. (Mar. 2020) "In vivo photothermal inhibition of methicillin-resistant *Staphylococcus aureus* infection by in situ templated formulation of pathogen-targeting phototheranostics," Nanoscale, 12 (14), 7651-7659.
Haining et al. (Mar. 2017) "Neuromelanin, One of the Most Overlooked Molecules in Modern Medicine, is not a Spectator," Neural Regen. Res. 12(3): 372-375.
Hall et al. (Jul. 2016) "Protection against Radiotherapy-Induced Toxicity," Antioxidants (Basel) 5(3): 22, pp. 1-18.
Han et al. (Apr. 2015) "Dual-Stage-Light-Guided Tumor Inhibition by Mitochondria-Targeted Photodynamic Therapy," Adv. Funct. Mater. 25(20): 2961-2971.
Han et al. (Apr. 2018) "P-Phenylenediamine Hair Dye Allergy and Its Clinical Characteristics," Ann Dermatol, 30 (3), 316-321.
Harrison et al. (2003) "Hair colouring, permanent styling and hair structure," J Cosmet Dermatol 2(3-4): 180-185.
Hasegawa et al. (2015) "Health effects of radiation and other health problems in the aftermath of nuclear accidents, with an emphasis on Fukushima." Lancet 386, (9992), 479-488.
Haveli et al. (2012) "Hair Fiber as a Nanoreactor in Controlled Synthesis of Fluorescent Gold Nanoparticles," Nano Lett 12(12): 6212-6217.
Hennessy et al. (2005) "Eumelanin and Pheomelanin Concentrations in Human Epidermis before and after UVB Irradiation," Pigm. Cell Res. 18(3): 220-223.
Herrling et al. (2008) "The role of melanin as protector against free radicals in skin and its role as free radical indicator in hair," Spectrochim Acta A, 69 (5), 1429-1435.
Hink et al. (2006) "Hair-dye allergy: a coloured case," Eur J Pediatr, 165 (3), 195-6.
Hong et al. (2004) "Binding of Metal Ions to Melanin and Their Effects on the Aerobic Reactivity," Photochem. Photobiol. 80(3): 477-481.
Hong et al. (2007) "Current Understanding of the Binding Sites, Capacity, Affinity, and Biological Significance of Metals in Melanin," J. Phys. Chem. B 111(28): 7938-7947.
Huang et al. (2017) "Mimicking Melanosomes: Polydopamine Nanoparticles as Artificial Microparasols," and Suppl. Info., ACS Cent. Sci. (Jun. 2017) 3(6): 564-569 (22 pp. total).
Huang et al. (2018) "Recent Advances and Progress on Melanin-like Materials and Their Biomedical Applications," Biomacromolecules 19: 1858-1868.
Hunt et al. (1995) "Eumelanin and phaeomelanin contents of human epidermis and cultured melanocytes," Pigment Cell Res. 8(4): 202-208.
Im et al. (2017) "Metal-Chelation-Assisted Deposition of Polydopamine on Human Hair: A Ready-to-Use Eumelanin-Based Hair Dyeing Methodology," Acs Biomater Sci Eng, 3 (4), 628-636.
Inseong et al. (2017) "Polydopamine coating in organic solvent for material-independent immobilization of water-insoluble molecules and avoidance of substrate hydrolysis," Journal of Industrial and Engineering Chemistry, 46.
International Search Report and Written Opinion, dated Jan. 26, 2021, corresponding to International Patent Application No. PCT/US2020/057902, 11 pages.
Ito (1989) "Optimization of conditions for preparing synthetic pheomelanin." Pigment Cell Res 2, (1), 53-6.
Ito et al. (1980) "Co-polymerization of dopa and cysteinyldopa in melanogenesis in vitro," Experientia 36(7): 822-823.
Ito et al. (1985) "Microanalysis of eumelanin and pheomelanin in hair and melanomas by chemical degradation and liquid chromatography," Anal. Biochem. 144(2): 527-536.
Ito et al. (2003) "Quantitative analysis of eumelanin and pheomelanin in humans, mice, and other animals: a comparative review," Pigment Cell Res. 16(5): 523-531.
Ito et al. (2008) "Chemistry of Mixed Melanogenesis—Pivotal Roles of Dopaquinone," Photochem. Photobiol. 84(3): 582-592.
Iwamoto et al. (1999) "Different cell cycle mechanisms between UV-induced and X-ray-induced apoptosis in WiDr colorectal carcinoma cells," Apoptosis 4(1): 59-66.
Jablonski et al. (2010) "Human skin pigmentation as an adaptation to UV radiation," P Natl Acad Sci USA, 107, 8962-8968.
Jeon et al. (2016) "Dihydroxynaphthalene-based mimicry of fungal melanogenesis for multifunctional coatings," Microb Biotechnol, 9 (3), 305-15.
Ji et al. (2013) "The Ethnic Differences of the Damage of Hair and Integral Hair Lipid after Ultra Violet Radiation," Annals of Dermatology, 25 (1), 54-60.
Ji et al. (2014) "Dynamic diselenide bonds: exchange reaction induced by visible light without catalysis," Angew. Chem. Int. Ed. 53, (26), 6781-5.
Jin et al. (2012) "Genome-wide association analyses identify 13 new susceptibility loci for generalized vitiligo," Nat. Genet. 44(6): 676-680.
Johnson (Jul. 2017) Safety Assessment of Ammonia and Ammonium Hydroxide as Used in Cosmetics, Cosmetic Ingredient Review, 42 pages.
Ju et al. (2011) "Bioinspired polymerization of dopamine to generate melanin-like nanoparticles having an excellent free-radical-scavenging property," Biomacromolecules 12(3): 625-632.
Ju et al. (2013) "Bio-Inspired, Melanin-Like Nanoparticles as a Highly Efficient Contrast Agent for $T_1$-Weighted Magnetic Resonance Imaging," Biomacromolecules 14(10): 3491-3497.
Ju et al. (publicly available Sep. 2014) "Bio-inspired Development of a Dual-Mode Nanoprobe for MRI and Raman Imaging," Small (Jan. 2015) 11(1): 84-89.
Kang et al. (2018) "Reverse Engineering to Characterize Redox Properties: Revealing Melanin's Redox Activity through Mediated Electrochemical Probing," Chem. Mater. 30: 5814-5826.
Kasraee et al. (2012) "Ebselen is a new skin depigmenting agent that inhibits melanin biosynthesis and melanosomal transfer," Exp. Dermatol. 21: 19-24.
Kawamura et al. (2016) "Full-Color Biomimetic Photonic Materials with Iridescent and Non-Iridescent Structural Colors." Sci Rep 6, 33984.
Keogh et al. (1965) "Rate of Greying of Human Hair," Nature 207: 877-878.
Kim et al. (2010) "Biomimetic Approach to Confer Redox Activity to Thin Chitosan Films," Adv. Funct. Mater. 20(16): 2683-2694.
Kim et al. (2011) "Development of a high-content screening method for chemicals modulating DNA damage response," J. Biomol. Screen. 16(2): 259-265.
Kim et al. (2016) "The use of personal hair dye and its implications for human health," Environ Int, 89-90, 222-227.
Kim et al. (Jun. 2018) "Enzymatic film formation of nature-derived phenolic amines," Nanoscale, 10 (28), 13351-13355.
Kim et al. (Oct. 2017) "Spectroelectrochemical Reverse Engineering Demonstrates That Melanin's Redox and Radical Scavenging Activities Are Linked," Biomacromolecules 18(12): 4084-4098.
Kobayashi et al. (1993) "Melanin Reduces Ultraviolet-Induced DNA Damage Formation and Killing Rate in Cultured Human Melanoma Cells," J. Invest. Dermatol. 101(5): 685-689.
Kobayashi et al. (1998) "Supranuclear melanin caps reduce ultraviolet induced DNA photoproducts in human epidermis," J. Invest. Dermatol. 110(5): 806-810.

(56) References Cited

OTHER PUBLICATIONS

Korner et al. (1982) "Mammalian tyrosinase catalyzes three reactions in the biosynthesis of melanin," Science 217(4565): 1163-1165.
Kryukov et al. (2003) "Characterization of mammalian selenoproteomes," Science, 300, (5624), 1439-43.
Kumar (2005) "Exploratory analysis of global cosmetic industry: major players, technology and market trends," Technovation 25(11): 1263-1272.
Kunwar et al. (2010) "In vivo radioprotection studies of 3,3'-diselenodipropionic acid, a selenocystine derivative," Free Radic Biol Med 2010, 48 (3), 399-410.
Kunwar et al. (2011) "Anti-apoptotic, anti-inflammatory, and immunomodulatory activities of 3,3'-diselenodipropionic acid in mice exposed to whole body gamma-radiation," Arch Toxicol 2011, 85 (11), 1395-405.
Lai et al. (Jan. 2018) "Structure and Function of Human Tyrosinase and Tyrosinase-Related Proteins," Chem-Eur J, 24 (1), 47-55.
Lakshminarayanan et al. (2018) "Oxidative Polymerization of Dopamine: A High-Defintion Multifunctional Coatings for Electrospun Nanofibers—an Overview," InTech.
Lampel et al. (Jun. 2017) "Polymeric Peptide Pigments with Sequence-Encoded Properties," Science 356(6342): 1064-1068.
Lee (2009) "Photoaggravation of hair aging," Int J Trichology, 1 (2), 94-9.
Lee et al. (2007) "A reversible wet/dry adhesive inspired by mussels and geckos." Nature 448, (7151), 338-41.
Lee et al. (2007) "Mussel-Inspired Surface Chemistry for Multifunctional Coatings," Science 318(5849): 426-430.
Lee et al. (Feb. 2015) "Retinal development in albinism: a prospective study using optical coherence tomography in infants and young children," Lancet. 385(Suppl 1): p. S14.
Lemaster et al. (Jan. 2019) "Gadolinium Doping Enhances the Photoacoustic Signal of Synthetic Melanin Nanoparticles: A Dual Modality Contrast Agent for Stem Cell Imaging," Chem. Mater. 31(1): 251-259.
Lent et al. (2017) "Acute and subacute oral toxicity of periodate salts in rats," Regul Toxicol Pharmacol 83: 23-37.
Li et al. (2016) "Polycatechol Nanoparticle MRI Contrast Agents," Small (Feb. 2016) 12(5): 668-677.
Liebscher et al. (2013) "Structure of polydopamine: a never-ending story?" Langmuir 29(33): 10539-10548.
Lin et al. (publicly available Mar. 2016) "Multimodal-Imaging-Guided Cancer Phototherapy by Versatile Biomimetic Theranostics with UV and γ-Irradiation Protection," Adv Mater (May 2016) 28(17): 3273-3279.
Liu et al. (2003) "Comparison of the Structural and Physical Properties of Human Hair Eumelanin Following Enzymatic or Acid/Base Extraction." Pigment Cell Res. 16, (4), 355-365.
Liu et al. (2004) "Ion-Exchange and Adsorption of Fe(III) by Sepia Melanin," Pigm. Cell Res. 17(3): 262-269.
Liu et al. (2013) "Mussel-Inspired Polydopamine: a Biocompatible and Ultrastable Coating for Nanoparticles in vivo," ACS Nano 7(10): 9384-9395.
Liu et al. (2014) "Polydopamine and its derivative materials: synthesis and promising applications in energy, environmental, and biomedical fields," Chem. Rev. 114(9): 5057-5115.
Liu et al. (2019) "Role of Polydopamine's Redox-activity on Its Pro-oxidant, Radical-scavenging, and Antimicrobial Activities," Acta Biomater. 88: 181-196.
Liu et al. (publicly available Dec. 2016) "Comprehensive Insights into the Multi-Antioxidative Mechanisms of Melanin Nanoparticles and Their Application to Protect Brain from Injury in Ischemic Stroke," J. Am. Chem. Soc. (Jan. 2017) 139(2): 856-862.
Luo et al. (Apr. 2018) "Multifunctional Graphene Hair Dye," Chem-US 4: 784-794.
Lusic et al. (2013) "X-ray-computed tomography contrast agents" Chem. Rev. 113, (3), 1641-1666.
Ma et al. (2010) "Selenium-containing block copolymers and their oxidation-responsive aggregates," Polym. Chem. 1, 1609-1614.
Macleod et al. (2015) "PEGylated N-Heterocyclic Carbene Anchors Designed to Stabilize Gold Nanoparticles in Biologically Relevant Media," J. Am. Chem. Soc. 137(25): 7974-7977.
Maia et al. (2013) "Key ornamental innovations facilitate diversification in an avian radiation." Proc. Natl. Acad. Sci. U. S. A. 110, (26), 10687-10692.
Maia et al. (Jul. 2019) "pavo 2: New tools for the spectral and spatial analysis of colour in r," Methods Ecol Evol, 10 (7), 1097-1107.
Manini et al. (2018) "Characterization and Fate of Hydrogen-Bonded Free-Radical Intermediates and Their Coupling Products from the Hydrogen Atom Transfer Agent 1,8-Naphthalenediol," ACS Omega 3: 3918-3927.
Manini et al. (2019) "A Robust Fungal Allomelanin Mimic: An Antioxidant and Potent pi-Electron Donor with Free-Radical Properties that can be Tuned by Ionic Liquids," Chempluschem 84(9): 1331-1337.
Manini et al. (2020) "Synthetic mycomelanin thin films as emergent bio-inspired interfaces controlling the fate of embryonic stem cells," J Mater Chem B 8(20): 4412-4418.
Mariotti et al. (May 2019) "Utilization of selenocysteine in early-branching fungal phyla," Nat Microbiol, 4, (5), 759-765.
Marks et al. (2001) "The melanosome: membrane dynamics in black and white," Nat. Rev. Mol. Cell Biol. 2: 738-748 (11 pages).
Martinez et al. (Oct. 2019) "Production of Melanins With Recombinant Microorganisms" Front Bioeng Biotechnol 7, 285.
Martyn-Simmons et al. (2006) "Adult T-cell leukaemia/lymphoma masquerading as a hair dye allergy," Br J Dermatol, 154 (1), 196-7.
Mbonyiryivuze et al. (2015) "Fourier Transform Infrared Spectroscopy for Sepia Melanin" Phys. Mater. Chem. 3, (2), 25-29.
Mcfadden et al. (2007) "Allergy to hair dye—Its incidence is rising, as more and younger people dye their hair," Brit Med J 334: 220-220.
Meredith et al. (2006) "The physical and chemical properties of eumelanin," Pigment Cell Res. 19(6): 572-594.
Mironenko et al. (2000) "Intraspecific variation in gamma-radiation resistance and genomic structure in the filamentous fungus Alternaria alternata: a case study of strains inhabiting Chernobyl reactor No. 4," Ecotoxicol Environ Saf 45(2): 177-187.
Montefiori et al. (1990) "Inhibition of Human Immunodeficiency Virus Type 1 Replication and Cytopathicity by Synthetic Soluble Catecholamine Melanins In Vitro," Biochem. And Biophys. Res. Comm. 1990, 168 (1), 200-205.
Montoliu et al. (2014) "Increasing the complexity: new genes and new types of albinism," Pigment Cell Melanoma Res. 27(1): 11-18.
Morel et al. (2011) "Current Trends in the Chemistry of Permanent Hair Dyeing," Chem Rev 111(4): 2537-2561.
Mostert et al. (Mar. 2018) "The photoreactive free radical in eumelanin," Science Advances 4(3).
Mouret et al. (2006) "Cyclobutane pyrimidine dimers are predominant DNA lesions in whole human skin exposed to UVA radiation," Proc. Natl. Acad. Sci. 103(37): 13765-13770.
Mutsaers (2004) "The mesothelial cell," Int. J. Biochem. Cell Biol. 36(1): 9-16.
Nambiar et al. (2012) "Polymer-composite materials for radiation protection," ACS Appl Mater Interfaces 4(11): 5717-5726.
Napolitano et al. (2013) "Red Hair Benzothiazines and Benzothiazoles: Mutation-Inspired Chemistry in the Quest for Functionality," Acc. Chem. Res. 46(2): 519-528.
Ni et al. (Jul. 2020) "Chemoenzymatic elaboration of the Raper-Mason pathway unravels the structural diversity within eumelanin pigments," Chem Sci, 11, 7836-7841.
Nishimura et al. (2005) "Mechanisms of hair graying: Incomplete melanocyte stem cell maintenance in the niche," Science 307(5710): 720-724.
Nogueira et al. (2006) "About photo-damage of human hair," Photoch Photobio Sci, 5 (2), 165-169.
Nogueira et al. (2007) "Photo yellowing of human hair," J Photoch Photobio B, 88 (2-3), 119-125.
Nosanchuk et al. (2003) "The Contribution of Melanin to Microbial Pathogenesis," Cell. Microbiol. 5(4): 203-223.
Nosanchuk et al. (2015) "Fungal Melanin: What do We Know About Structure?" Front. Microbiol. 6, 1463: pp. 1-7.

(56) References Cited

OTHER PUBLICATIONS

Ochs et al. (2011) “Dopamine-mediated continuous assembly of biodegradable capsules,” Chem. Mater. 23(13): 3141-3143.
Orlow (1995) “Melanosomes are specialized members of the lysosomal lineage of organelles,” J. Invest. Dermatol. 105(1): 3-7.
Ostio et al. (1989) “Use of liposomes as injectable-drug delivery systems,” Am. J Hasp. Pharm. 46:1576-1587.
Pacelli et al. (publicly available Jan. 2017) “Melanin is Effective in Protecting Fast and Slow Growing Fungi from Various Types of Ionizing Radiation,” Environ. Microbiol. (Apr. 2017) 19(4): 1612-1624.
Panzella et al. (2013) “Atypical structural and pi-electron features of a melanin polymer that lead to superior free-radical-scavenging properties.” Angew. Chem. Int. Ed. 2013, 52, (48), 12684-7.
Panzella et al. (Jun. 2018) “The Late Stages of Melanogenesis: Exploring the Chemical Facets and the Application Opportunities,” Int J Mol Sci, 19 (6).
Park et al. (publicly available Nov. 2016) “Novel Neuroprotective Effects of Melanin-Concentrating Hormone in Parkinson’s Disease,” Mol. Neurobiol. (Dec. 2017) 54: 7706-7721.
Patel et al. (2013) “Trends in use of hair dye: a cross-sectional study,” Int J Trichology 5(3): 140-143, 9 pages.
Pezzella et al. (1997) “Identification of Partially Degraded Oligomers of 5, 6-Dihydroxyindole-2-carboxylic Acid in Sepia Melanin by Matrix-assisted Laser Desorption/Ionization Mass Spectrometry,” Rapid Commun. Mass Spectrom. 11(4): 368-372.
Pihet et al. (2009) “Melanin is an Essential Component for the Integrity of the Cell Wall of Aspergillus Fumigatus Conidia,” BMC Microbiol. 9: 177, pp. 1-11.
Powell et al. (1974) “Chemistry of aminochromes. Pary XVIII. The effects of pH and substituents on some Aminochrome-Thiol reactions,” Canadian Journal of Chemistry, 52, 6, 1019-1026.
Premi et al. (2015) “Chemiexcitation of melanin derivatives induces DNA photoproducts long after UV exposure” Science 347, (6224), 842-847.
Prota, G. (2000) “Melanins, melanogenesis and melanocytes: looking at their functional significance from the chemist’s viewpoint” Pigment Cell Res 13 (4), 283-93.
Pyo et al. (publicly available Apr. 2016) “Artificial pheomelanin nanoparticles and their photo-sensitization properties,” J Photochem Photobiol B (Jul. 2016) 160: 330-335.
Rao (1995) “Recent developments of collagen-based materials for medical applications and drug delivery systems,” J Biomater Sci. Polym. Ed 7(7): 623-645.
Raposo et al. (2007) “Melanosomes—dark organelles enlighten endosomal membrane transport,” Nat. Rev. Mol. Cell Biol. 8(10): 786-797.
Ren et al. (2013) “High level production of tyrosinase in recombinant *Escherichia coli*” BMC Biotechnol 13, 18.
Ricci et al. (2016) “Drug-induced hair colour changes,” Eur J Dermatol 26(6): 531-536.
Richena et al. (2015) “Effect of photodamage on the outermost cuticle layer of human hair,” J Photoch Photobio B, 153, 296-304.
Richena et al. (2016) “Morphological degradation of human hair cuticle due to simulated sunlight irradiation and washing,” J Photoch Photobio B, 161, 430-440.
Riley (1997) “Melanin,” Int J Biochem Cell B 29(11): 1235-1239.
Robbins (2012) “Bleaching and Oxidation of Human Hair,” In Chemical and Physical Behavior of Human Hair, Springer Berlin Heidelberg: Berlin, Heidelberg, pp. 263-328.
Robertson et al. (2012) “Adaptation of the Black Yeast *Wangiella dermatitidis* to Ionizing Radiation: Molecular and Cellular Mechanisms,” Plos One 7(11): e48674, pp. 1-18.
Rosenfeld et al. (2017) “Selenium (IV,VI) reduction and tolerance by fungi in an oxic environment,” Geobiology, 15, (3), 441-452.
Rouse et al. (2007) “Effects of Mechanical Flexion on the Penetration of Fullerene Amino Acid-Derivatized Peptide Nanoparticles through Skin,” Nano Letters 7(1): 155-160.
Ryu et al. (Mar. 2018) “Polydopamine Surface Chemistry: A Decade of Discovery,” ACS Appl Mater Interfaces 10(9): 7523-7540.
Santos Nogueira et al. (2004) “Hair color changes and protein damage caused by ultraviolet radiation,” J Photochem Photobiol B, 74 (2-3), 109-17.
Schmaler-Ripcke et al. (2009) “Production of Pyomelanin, a Second Type of Melanin, via the Tyrosine Degradation Pathway in Aspergillus fumigatus,” Appl. Environ. Microbiol. 75(2): 493-503.
Schomburg et al. (2004) “Selenium and selenoproteins in mammals: extraordinary, essential, enigmatic,” Cell. Mol. Life Sci. 61, (16), 1988-1995.
Schweitzer et al. (2009) “Physico-Chemical Evaluation of Rationally Designed Melanins as Novel Nature-Inspired Radioprotectors,” PLOS One 4(9): e7229, pp. 1-8.
Schweitzer et al. (2010) “Melanin-Covered Nanoparticles for Protection of Bone Marrow during Radiation Therapy of Cancer,” Int. J. Radiat. Oncol. Biol. Phys. 78(5): 1494-1502.
Scott et al. (2002) “Filopodia are conduits for melanosome transfer to keratinocytes,” J. Cell Sci. 115(7): 1441-1451.
Seagle et al. (2005) “Melanin photoprotection in the human retinal pigment epithelium and its correlation with light-induced cell apoptosis,” Proceedings of the National Academy of Sciences of the United States of America 102(25): 8978-8983.
Seagle et al. (2005) “Time-Resolved Detection of Melanin Free Radicals Quenching Reactive Oxygen Species,” J. Am. Chem. Soc. 127(32): 11220-11221.
Sealy et al. (1982) “Eumelanins and pheomelanins: characterization by electron spin resonance spectroscopy,” Science 217(4559): 545-547.
Seo et al. (2003) “Mushroom tyrosinase: Recent prospects,” J Agr Food Chem, 51 (10), 2837-2853.
Seo et al. (2012) “Hydrogen peroxide and monoethanolamine are the key causative ingredients for hair dye-induced dermatitis and hair loss,” J Dermatol Sci 66(1): 12-19.
Shimazu et al. (1964) “Selenoamino Acids: Decrease of Radiation Damage to Amino Acids and Proteins,” Science, 143 (3604), 369-371.
Shisler et al. (1998) “Ultraviolet-Induced Cell Death Blocked by a Selenoprotein from a Human Dermatotropic Poxvirus,” Science, 279, (5347), 102-105.
Simon et al. (2010) “The Red and the Black,” Acc. Chem. Res. 43(11): 1452-1460.
Sing et al. (1985) “Reporting physisorption data for gas/solid systems with special reference to the determination of surface area and porosity,” Pure Appl. Chem. 57(4): 603-619.
Smyth et al. (1951) “A study of pigments from red, brown, and buff feathers and hair.” Physiol Zool 24, (3), 205-16.
Solano (2014) “Melanins: Skin Pigments and Much More-Types, Structural Models, Biological Functions, and Formation Routes,” New J. Sci. 2014, 498276: 1-28.
Solano (publicly available Apr. 2016) “Photoprotection versus photodamage: updating an old but still unsolved controversy about melanin,” Polym. Int. (Nov. 2016) 65(11): 1276-1287.
Song et al. (2007) “Supramolecular Nanofibers by Self-Organization of Bola-amphiphiles through a Combination of Hydrogen Bonding and π-π Stacking Interactions,” Adv. Mater. 19(3): 416-420.
Søsted et al. (Jul. 2005) “Contact dermatitis to hair dyes in a Danish adult population: an interview-based study,” Brit J Dermatol 153(1): 132-135.
Søsted et al. (Jun. 2005) “Allergy to 3-nitro-p-hydroxyethylaminophenol and 4-amino-3-nitrophenol in a hair dye,” Contact Dermatitis, 52 (6), 317-9.
Steinmann et al. (2010) “Selenium and sulfur in exchange reactions: a comparative study,” J Org Chem 75(19): 6696-6699.
Strube et al. (Mar. 2015) “Site-Specific In Situ Synthesis of Eumelanin Nanoparticles by an Enzymatic Autodeposition-like Process,” Biomacromolecules. 16(5): 1608-1613.
Sun et al. (Aug. 2019) “Melanin-dot-mediated delivery of metallacycle for NIR-II/photoacoustic dual-modal imaging-guided chemo-photothermal synergistic therapy,” Proc Natl Acad Sci USA 116(34): 16729-16735.
Tada et al. (2010) “Scavenging or Quenching Effect of Melanin on Superoxide Anion and Singlet Oxygen,” J. Clin. Biochem. Nutr. 46(3): 224-228.

(56) References Cited

OTHER PUBLICATIONS

Tadokoro et al. (2003) "UV-induced DNA damage and melanin content in human skin differing in racial/ethnic origin," FASEB J. 17(9): 1177-1179.
Taieb et al. (2011) "Melanins and Melanosomes: Biosynthesis, Biogenesis, Physiological, and Pathological Functions," Wiley-VCR Verlag Gmbh & Co., Weinheim.
Takkouche et al. (2005) "Personal use of hair dyes and risk of cancer—A meta-analysis," Jama-J Am Med Assoc 293(20): 2516-2525.
Thomson (1974) "The Pigments of Reddish Hair and Feathers," Angew. Chem., Int. Ed. 13(5): 305-312.
Thureau et al. (2012) "Probing the motional behavior of eumelanin and pheomelanin with solid-state NMR spectroscopy: new insights into the pigment properties." Chem.: Eur. J. 18, (34), 10689-700.
Tokura et al. (2018) "Fabrication of Defined Polydopamine Nanostructures by DNA Origami-Templated Polymerization," Angew. Chem. Int. Ed. Engl. 57: 1587-1591.
Tran et al. (2006) "Chemical and structural disorder in eumelanins: a possible explanation for broadband absorbance," Biophys. J. 90(3): 743-752.
Ursini et al. (1999) "Dual Function of the Selenoprotein PHGPx During Sperm Maturation," Science, 285, (5432), 1393-1396.
Van Neste et al. (2004) "Hair cycle and hair pigmentation: dynamic interactions and changes associated with aging," Micron 35(3): 193-200.
Velasco et al. (2009) "Hair fiber characteristics and methods to evaluate hair physical and mechanical properties," Braz J Pharm Sci 45(1): 153-162.
Vliegenthart et al. (2011) "Compression, crumpling and collapse of spherical shells and capsules," New J. Phys. 13: 045020, pp. 1-24.
Wakamatsu et al. (2003) "The Structure of Neuromelanin as Studied by Chemical Degradative Methods," J. Neurochem. 86(4): 1015-1023.
Walter et al. (2006) "Early use of PbS nanotechnology for an ancient hair dyeing formula," Nano Lett 6(10): 2215-2219.
Wang et al. (Aug. 2018) "Skin Pigmentation-Inspired Polydopamine Sunscreens," Adv. Funct. Mater. 28: 1802127: 1-9.
Wang et al. (Mar. 2020) "Melanin Produced by the Fast-Growing Marine Bacterium Vibrio natriegens through Heterologous Biosynthesis: Characterization and Application." Appl Environ Microbiol DOI: 10.1128/AEM.02749-19.
Wang et al. (publicly available Sep. 2017) "A Novel UV-Shielding and Transparent Polymer Film: When Bioinspired Dopamine-Melanin Hollow Nanoparticles Join Polymers," Acs Appl Mater Inter (Oct. 2017) 9(41): 36281-36289.
Wang et al. (publicly available Sep. 2017) "Tunable, Metal-Loaded Polydopamine Nanoparticles Analyzed by Magnetometry," Chem. Mater. (Oct. 2017) 29(19): 8195-8201.
Watt et al. (2009) "The supramolecular structure of melanin," Soft Matter 5(19): 3754-3760.
Wogelius et al. (2011) "Trace metals as biomarkers for eumelanin pigment in the fossil record," Science 333(6049): 1622-1626.
Wu et al. (2012) "Melanoregulin regulates a shedding mechanism that drives melanosome transfer from melanocytes to keratinocytes," Proc. Natl. Acad. Sci. 109(31): E2101-E2109.
Xia et al. (Oct. 2018) "Selenium-Containing Polymers: Perspectives toward Diverse Applications in Both Adaptive and Biomedical Materials," Macromolecules, 51 (19), 7435-7455.
Xiao et al. (May 2015) "Bio-Inspired Structural Colors Produced via Self-Assembly of Synthetic Melanin Nanoparticles," ACS nano 9(5): 5454-5460.
Xiao et al. (Sep. 2017) "Bioinspired Bright Noniridescent Photonic Melanin Supraballs," Sci. Adv. 3(9): e1701151.
Xu et al. (2013) "Selenium-Containing Polymers: Promising Biomaterials for Controlled Release and Enzyme Mimics," Acc. Chem. Res. 46 (7), 1647-1658.
Yang et al. (Sep. 2018) "NIR-controlled morphology transformation and pulsatile drug delivery based on multifunctional phototheranostic nanoparticles for photoacoustic imaging-guided photothermal-chemotherapy," Biomaterials 176, 1-12.
Yi et al. (Jul. 2017) "Liquid-immune structural colors with angle-independence inspired from hollow melanosomes," Chem Commun 53(66): 9234-9237.
Young et al. (2017) "Ultraviolet radiation and the skin: Photobiology and sunscreen photoprotection," J Am Acad Dermatol, 76 (3), S100-S109.
Yu et al. (2014) "Formation of polydopamine nanofibers with the aid of folic acid," Angew. Chem. Int. Ed. 53(46): 12600-12604.
Zaidi et al. (2014) "Purification and characterization of melanogenic enzyme tyrosinase from button mushroom" Enzyme Res 120739.
Zaidi et al. (May 2014) "Microbial tyrosinases: promising enzymes for pharmaceutical, food bioprocessing, and environmental industry," Biochem Res Int, 854687.
Zanoni et al. (Feb. 2018) "Allergens of permanent hair dyes induces epidermal damage, skin barrier loss and IL-1 alpha increase in epidermal in vitro model," Food Chem Toxicol 112: 265-272.
Zhang et al. (2012) "Biocompatible Polydopamine Fluorescent Organic Nanoparticles: Facile Preparation and Cell Imaging," Nanoscale 4(18): 5581-5584.
Zhang et al. (publicly available 2016) "CuSO4/H2O2-Induced Rapid Deposition of Polydopamine Coatings with High Uniformity and Enhanced Stability," Angew Chem Int Ed Engl 55(9): 3054-3057.
Zhou et al. (2014) "Rapidly-Deposited Polydopamine Coating via High Temperature and Vigorous Stirring: Formation, Characterization and Biofunctional Evaluation," Plos One 9(11): e113087, pp. 1-10.
Zhou et al. (Sep. 2019) "Artificial Allomelanin Nanoparticles," ACS Nano 13(10): 10980-10990.
Zhu et al. (Aug. 2018) "A rapid deposition of polydopamine coatings induced by iron (III) chloride/hydrogen peroxide for loose nanofiltration," J Colloid Interf Sci 523: 86-97.
Zucca et al. (2014) "Neuromelanin of the human substantia nigra: an update," Neurotox. Res. 25: 13-23.

* cited by examiner

Attenuation

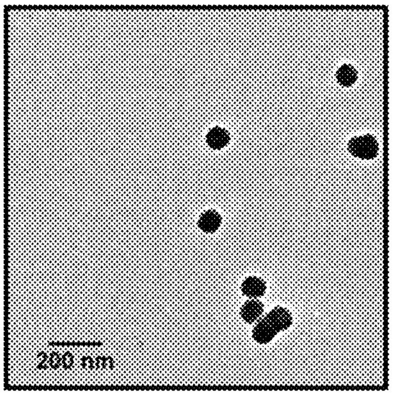
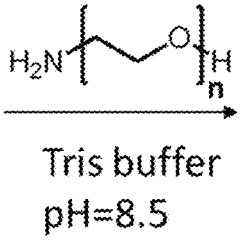
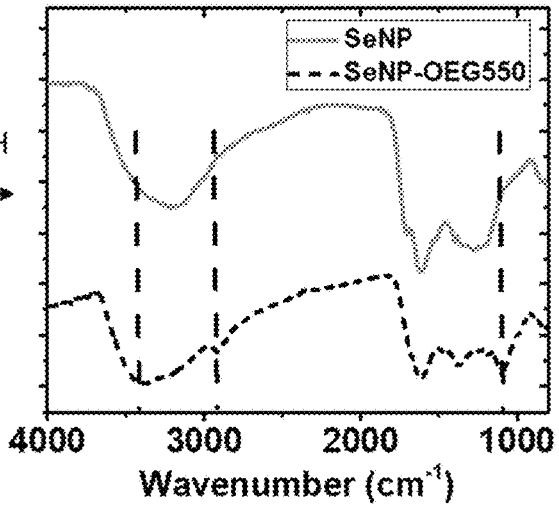
FIG. 27A
FIG. 27B
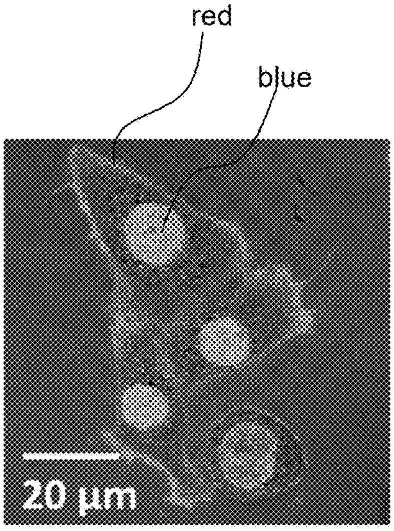
SeNP-OEG
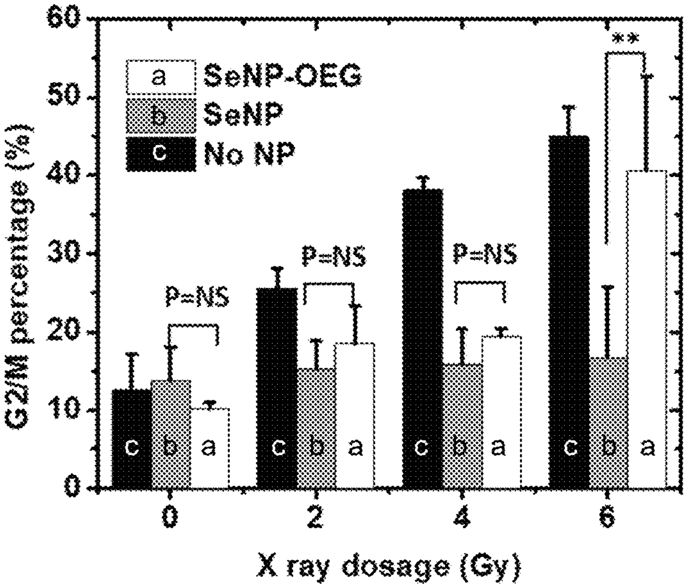
FIG. 27C
FIG. 27D Selenomelanin Ghost loaded NHEK cells Cysteine PNP synthesis

*Vibrio natriegens*
selenomelanin ghost

Selenomelanin ghost loaded NHEK cells

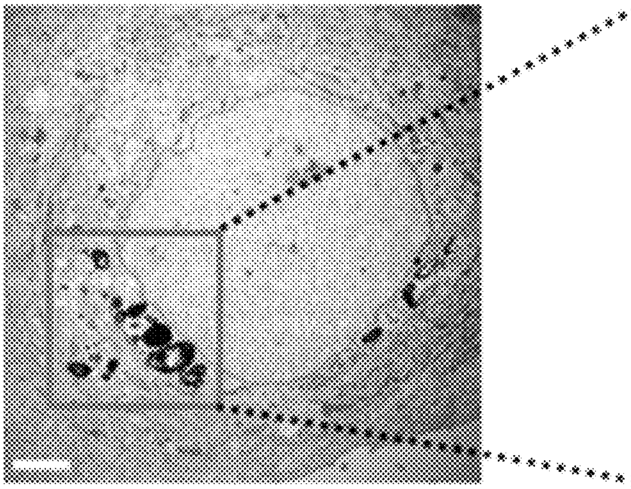
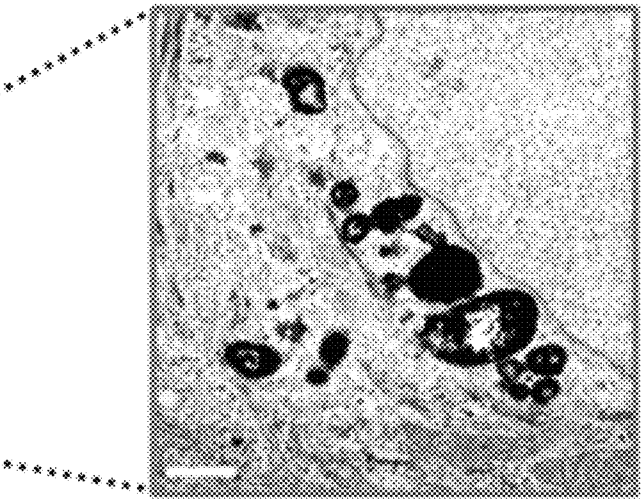
STEM of selenomelanin ghost loaded NHEK cells
FIG. 43E
FIG. 43F
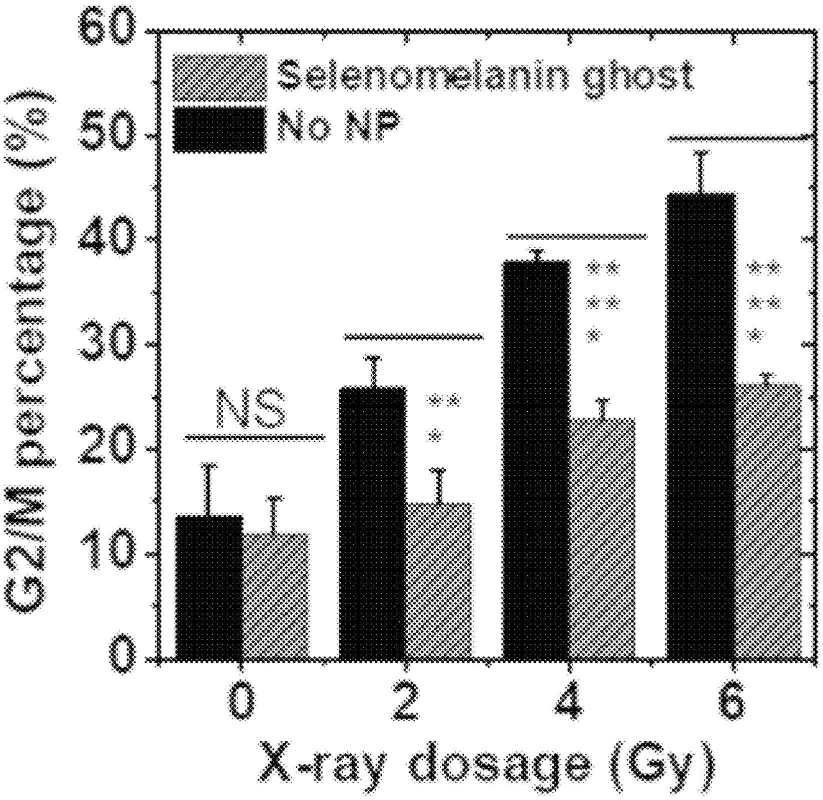
FIG. 43G Selenomelanin formed without the eumelanin seeds

SELENIUM-CONTAINING ANALOGUES OF PHEOMELANIN AND RELATED MATERIALS AND METHODS OF MAKING

CROSS-REFERENCE TO RELATED APPLICATIONS

This application is a continuation of U.S. Patent Application No. 17/770,247, filed Apr. 19, 2022, which is a U.S. National Stage Application filed under 35 U.S.C. § 371 of PCT/US2020/057902, filed Oct. 29, 2020, which claims the benefit of priority to U.S. Provisional Patent Application No. 62/928,129, filed Oct. 30, 2019, each of which is hereby incorporated by reference in its entirety.

STATEMENT REGARDING FEDERALLY SPONSORED RESEARCH OR DEVELOPMENT

This invention was made with government support under Award Number AFOSR FA9550-18-1-0142 awarded by the Air Force Office of Scientific Research. The government has certain rights in the invention.

BACKGROUND OF INVENTION

Melanins are a family of heterogenous polymeric pigments that are found ubiquitously across plant, animal, bacterial and fungal kingdoms where they act variously as pigments and as radiation protection agents. For example, certain melanin species can be taken up by certain types of cells (e.g., human epidermal keratinocytes) to form a supranuclear cap in the cell's perinuclear area, which protects the cell's DNA from photo-induced damage, such as due to ultraviolet light exposure. In organisms with melanins, the melanins often give rise to color through broad absorption and as nanoscale structural coloration elements. There exist five multifunctional, yet structurally and biosynthetically incompletely understood varieties of melanin: eumelanin, neuromelanin, pyomelanin, allomelanin and pheomelanin. Although eumelanin and allomelanin have been the focus of most radiation protection studies to date, some research suggests that pheomelanin has a better absorption coefficient for X-rays than eumelanin. Skin and hair pigmentation by melanin in humans are the melanized structures most well-known to people. The variety of colors found in our hair and skin, arises from two fundamental varieties of melanin: eumelanin and pheomelanin. Eumelanin protects human skin and eyes from UV radiation damage and is mostly associated with black/brown pigmentation, while the sulfur-containing analogue, pheomelanin is suspected to be phototoxic upon UV excitation, and is mostly associated with lighter features including in red hair.

Artificial analogues of eumelanin have been synthesized by numerous methods including oxidative polymerization of myriad monomers under alkaline conditions via chemical or by chemoenzymatic methods. For the most part, these synthetic analogues of eumelanin are based on polydopamine. The resulting synthetic eumelanin materials have been used as free radical scavengers, as multimodal imaging contrast agents, as surface coatings and adhesives, and as biocompatible UV radiation protection agents that mimic some of the morphological and functional characteristics of the naturally occurring melanin organelles, melanosomes, in human skin cells. By contrast, the sulfur-containing melanin, pheomelanin, is less studied, likely because it is structurally more complex than eumelanin, and because pure pheomelanin is a rarity or is nonexistent, meaning it is never found without eumelanin in nature. These features make its isolation prohibitively difficult. There may be several reasons for this, including its structural complexity. Indeed, pheomelanin is believed to be synthesized biologically from both tyrosine and cysteine and contains benzothiazine moieties as subunits within the structure. Experimentally, the structure of pheomelanin remains debatable and elusive as a result of the absence of sources of pure (high "melanin purity") pheomelanin in nature. Instead, it is found together with other kinds of melanin and other biomaterials (e.g. lipids) (low "melanin purity") making the extraction of pure pheomelanin prohibitively difficult. Compounding the elusive nature of these materials pheomelanins are poorly soluble in most organic and aqueous environments with harsh acidic conditions often deployed to degrade and disperse what are initially highly crosslinked and complex structures, which lead to repeated challenging of the existing knowledge of pheomelanin.

Unwanted exposure to ionizing radiation occurs during a vast array of normal human activities from air travel, to X-ray diagnostic procedures, and to extreme cases in the rare instances of nuclear reactor malfunction. Potential applications of commercial melanin include protection of tissues from the sun's radiation, and as higher energy radiation protective materials of use during radiation-based cancer treatments. Indeed, direct injection of eumelanin analogues into mice, was found to decrease death rates after lethal gamma-ray radiation as observed by various research groups. Furthermore, given the increased interest in space travel (i.e. SpaceX, Virgin Galactic), and the role of nuclear power in a non-carbon-based electrical grid of the present and future, new lightweight multifunctional and radioprotective materials are needed.

Although eumelanin, and more recently the nitrogen-free analogue, allomelanin, have been the focus of most radiation protection studies to date, some research suggests that pheomelanin has a better absorption coefficient for X-ray than the eumelanin analogue. Further, selenium is a heavier chalcogen, with the X-ray absorption coefficient being proportional to the fourth power of the atomic number (Z). Therefore, selenium enriched melanin materials can exhibit enhanced X-ray absorption properties. Indeed, selenium compounds of other kinds have been reported to protect animals in model studies, against ionizing radiation, inhibiting apoptosis/inflammation. As noted above, the sulfur-based pheomelanin is difficult to isolate and rare as described above, making it of poor commercial relevance at this time. Further, the art lacks a method for making selenomelanin, especially artificial selenomelanin, let alone artificial selenomelanin that is pheomelanin, which holds great promise for X-ray attenuation for the reasons just noted. Significant challenges associated with selenium chemistry, including its notoriously strong smell of selenium-containing precursors, sensitivity to redox conditions, and the constant cycle of metathesis reactions triggered by visible light.

Accordingly, there is a need for isolated artificial selenomelanin materials, especially of the pheomelanin type, and associated methods for making these. Further, fore at least the above described reasons, there is an abundance of advantages to be realized from the availability isolated artificial selenomelanin materials and from commercially viable methods for making these.

SUMMARY OF THE INVENTION

Provided herein are artificial selenomelanin materials, including artificial selenomelanin nanoparticles, and associated method for making artificial selenomelanin materials. The artificial selenomelanin materials disclosed herein provide a variety of advantages over conventional artificial melanin materials, including improved reduction in harm to biological cells caused by exposure to X-ray radiation. The methods disclosed herein provide new chemical pathways for synthesis of artificial melanins.

Aspects of the invention include an artificial selenomelanin material comprises: one or more selenomelanin polymers; wherein the one or more selenomelanin polymers comprise a plurality of covalently bonded selenomelanin base units; and wherein a chemical formula of each of the one or more selenomelanin base units comprises at least one selenium atom. Optionally, for any of the artificial selenomelanin materials, molecules, dispersions, formulations, and methods disclosed herein, each selenomelanin polymer is a pheomelanin. Preferably, for any of the artificial selenomelanin materials, molecules, dispersions, formulations, and methods disclosed herein, the chemical formula of each of the one or more selenomelanin base units comprises at least one covalent bond with each of the at least one selenium atom. Preferably, for any of the artificial selenomelanin materials, molecules, dispersions, formulations, and methods disclosed herein, each of the one or more selenomelanin polymers is not bound to, conjugated to, attached to, coated by, encompassed by, or otherwise chemically associated with a natural or biological proteinaceous matrix, component, or lipid. Preferably, for any of the artificial selenomelanin materials, molecules, dispersions, formulations, and methods disclosed herein, each of the plurality of selenomelanin base units is not bound to, conjugated to, attached to, coated by, encompassed by, or otherwise chemically associated with a natural or biological proteinaceous matrix, component, or lipid. Optionally, for any of the artificial selenomelanin materials, molecules, dispersions, formulations, and methods disclosed herein, the chemical formula of each of the one or more selenomelanin base units comprises one selenium atom and two covalent bonds with the selenium atom. Optionally, for any of the artificial selenomelanin materials, molecules, dispersions, formulations, and methods disclosed herein, the chemical formula of each of the one or more selenomelanin base units comprises a substituted or unsubstituted benzoselenazine or a derivative thereof, a substituted or unsubstituted benzoselenazole or a derivative thereof, a substituted or unsubstituted 7,10-dihydro-2H-[1,4]selenazino[3,2-h]isoquinolin-3(4H)-one or a derivative thereof, a substituted or unsubstituted benzoselenazinone or a derivative thereof, or any combination of these. Optionally, for any of the artificial selenomelanin materials, molecules, dispersions, formulations, and methods disclosed herein, each of the one or more selenomelanin base units comprises a moiety characterized by formula FX1, FX2, FX3A, FX3B, FX4, a combination of any of these, or a derivative of any of these:

(FX1)

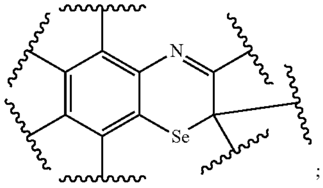

;

-continued (FX2)

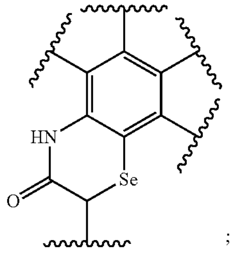

;

(FX3A)

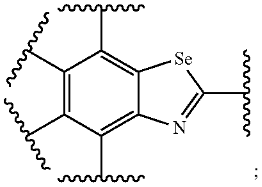

;

(FX3B)

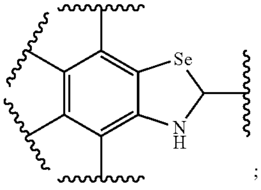

;

(FX4)

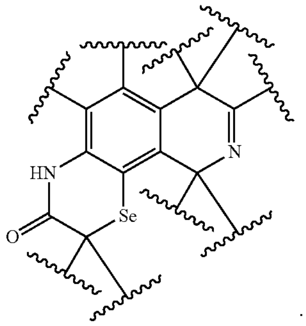

.

Optionally, for any of the artificial selenomelanin materials, molecules, dispersions, formulations, and methods disclosed herein, each of the one or more selenomelanin base units comprises a moiety characterized by formula FX1, FX2, FX3A, FX3B, FX4, or a combination of any of these. Preferably, for any of the artificial selenomelanin materials, molecules, dispersions, formulations, and methods disclosed herein, each of the one or more selenomelanin base units comprises a moiety characterized by formula FX1, FX2, FX3A, FX3B, FX4, or a combination of any of these. Preferably, for any of the artificial selenomelanin materials, molecules, dispersions, formulations, and methods disclosed herein, each of the one or more selenomelanin base units comprises a moiety characterized by formula FX1, FX2, FX3A, FX3B, or FX4. Preferably, for any of the artificial selenomelanin materials, molecules, dispersions, formulations, and methods disclosed herein, each of the one or more selenomelanin base units comprises a moiety characterized by formula FX1. Preferably, for any of the artificial selenomelanin materials, molecules, dispersions, formulations, and methods disclosed herein, but not necessarily, the artificial selenomelanin material is an artificial selenomelanin nanoparticle, an artificial selenomelanin layer, or an artificial selenomelanin thin film. Preferably, for any of the artificial selenomelanin materials, molecules, dispersions, formulations, and methods disclosed herein, but not necessarily, the artificial selenomelanin material is an artificial selenomelanin nanoparticle. Preferably, for any of the artificial selenomelanin materials, molecules, dispersions, formulations, and methods disclosed herein, each of the one or more selenomelanin base units comprises a heterocyclic moiety comprising a Se as a member of its ring structure. Preferably, for any of the artificial selenomelanin materials, molecules, dispersions, formulations, and methods disclosed herein, each of the one or more selenomelanin base units comprises a heterocyclic moiety comprising a Se and a N as members of its ring structure. Preferably, for any of the artificial selenomelanin materials, molecules, dispersions, formulations, and methods disclosed herein, each of the one or more selenomelanin base units comprises a moiety characterized by formula FX13, FX14, FX15, FX16, FX17, a derivative of any one of these, or a combination of any of these:

(FX13)

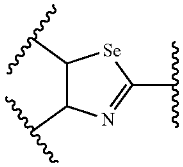

;

(FX14)

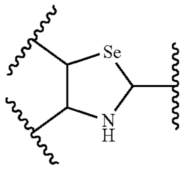

;

(FX15)

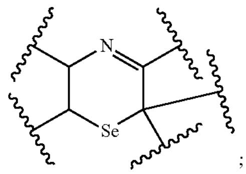

;

(FX16)

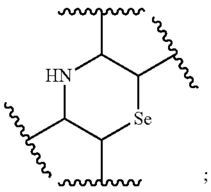

;

(FX17)

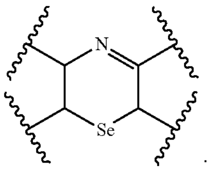 [SMILES: *C1=NC(*)C(*)[Se]C1*]

.

Preferably, for any of the artificial selenomelanin materials, molecules, dispersions, formulations, and methods disclosed herein, each of the one or more selenomelanin base units comprises a moiety characterized by formula FX13, FX14, FX15, FX16, FX17, or a combination of any of these. Optionally, for any of the artificial selenomelanin materials, molecules, dispersions, formulations, and methods disclosed herein, each of the one or more selenomelanin base units comprises a moiety characterized by formula FX13, FX14, FX15, FX16, or FX17.

In some embodiments, the chemical formula of each of the one or more selenomelanin base units comprises benzoselenazine and wherein the material comprises benzoselenazine at a concentration selected from the range of 10 wt. % to 100 wt. %. Optionally the material comprises benzoselenazine at a concentration selected from the range of 50 wt. % to 60 wt. %. For example, the chemical formula of each of the one or more selenomelanin base units comprises benzoselenazine and the material can comprise benzoselenazine at a concentration of 55 wt. %. In some embodiments, the artificial selenomelanin material is characterized a concentration of selenium selected from the range of 2 wt. % to 23 wt. %. For example, the artificial selenomelanin material can be characterized a concentration of selenium of 12 wt. %.

In an aspect, an artificial selenomelanin nanoparticle dispersion (also referred to as nanoparticle dispersion) comprises a plurality of artificial selenomelanin nanoparticles according to any of the embodiments disclosed herein, wherein the nanoparticle dispersion comprises the plurality of artificial selenomelanin nanoparticles dispersed in a solvent or solvent mixture. Preferably, for any of the artificial selenomelanin materials, molecules, dispersions, formulations, and methods disclosed herein, the solvent or solvent mixture is at least 50% water. Optionally, for any of the artificial selenomelanin materials, molecules, dispersions, formulations, and methods disclosed herein, the artificial selenomelanin nanoparticles in the artificial selenomelanin nanoparticle dispersion are characterized by an absolute value of a Zeta potential selected from the range of 15 mV to 50 mV, preferably 20 mV to 50 mV, optionally 15 mV to 40 mV, Optionally, for any of the artificial selenomelanin materials, molecules, dispersions, formulations, and methods disclosed herein, 20 mV to 40 mV, optionally 15 mV to 30 mV, optionally 20 mV to 30 mV, optionally 17 mV to 34 mV. (The absolute value, or modulus, of a real number is the non-negative value of the real number without regard to its sign.) Optionally, for any of the artificial selenomelanin materials, molecules, dispersions, formulations, and methods disclosed herein, the sign of the Zeta potential corresponding to the artificial selenomelanin nanoparticles in the artificial selenomelanin nanoparticle dispersion is negative. Preferably, for any of the artificial selenomelanin materials, molecules, dispersions, formulations, and methods disclosed herein, the artificial selenomelanin nanoparticles in the artificial selenomelanin nanoparticles dispersion are size-stable at nanoparticle concentrations selected from the range of 0.1 mg/mL to $10^{-4}$ mg/mL with respect to an average size of the nanoparticle at a concentration of 0.1 mg/mL. Preferably, for any of the artificial selenomelanin materials, molecules, dispersions, formulations, and methods disclosed herein, the artificial selenomelanin nanoparticles in the artificial selenomelanin nanoparticle dispersion are size-stable in the dispersion having a pH of 11, preferably at least 11, with respect to an average size of the nanoparticle in the dispersion having a pH of 7. Preferably, for any of the artificial selenomelanin materials, molecules, dispersions, formulations, and methods disclosed herein, the artificial selenomelanin nanoparticles in the artificial selenomelanin nanoparticle dispersion are size-stable when exposed to a concentration of NaCl selected from the range of 50 mM to 250 mM, preferably a concentration of NaCl being 250 mM, in the dispersion, with respect to an average size of the nanoparticles in an equivalent dispersion free of NaCl. Optionally, for any of the artificial selenomelanin materials, molecules, dispersions, formulations, and methods disclosed herein, the artificial selenomelanin nanoparticles in the artificial selenomelanin nanoparticle dispersion are stably dispersed in the dispersion for at least 7 days, preferably at least 14 days, preferably at least 60 days under ambient conditions.

Optionally, for any of the artificial selenomelanin materials, molecules, dispersions, formulations, and methods disclosed herein, each of said artificial melanin nanoparticles is independently characterized by a sphericity of greater than 0.75, preferably at least 0.80, preferably at least 0.85, more preferably at least 0.90, further more preferably at least 0.95, still more preferably at least 0.99. Optionally, for any of the artificial selenomelanin materials, molecules, dispersions, formulations, and methods disclosed herein, each of said artificial melanin nanoparticles are characterized by a polydispersity index less than or equal to 0.15, preferably less than or equal to 0.13, more preferably less than or equal to 0.10, still more preferably less than or equal to 0.05. Optionally, for any of the artificial selenomelanin materials, molecules, dispersions, formulations, and methods disclosed herein, the plurality of artificial melanin nanoparticles in the artificial selenomelanin nanoparticle dispersion are characterized by a peak size selected from the range of 20 nm to 300 nm in diameter, optionally 50 to 300 nm, optionally 70 to 300 nm, optionally 50 to 200 nm, optionally 20 to 100 nm, optionally 78-97 nm. For example, the plurality of artificial melanin nanoparticles in the artificial selenomelanin nanoparticle dispersion can be characterized by a peak size of 89 nm with a standard deviation of 6 nm. Preferably, for any of the artificial selenomelanin materials, molecules, dispersions, formulations, and methods disclosed herein, the plurality of artificial melanin nanoparticles are purified or isolated and/or characterized by a melanin purity of at least 20%. Preferably, for any of the artificial selenomelanin materials, molecules, dispersions, formulations, and methods disclosed herein, the plurality of artificial melanin nanoparticles are characterized by a melanin purity of at least 20%, optionally at least 25%, optionally at least 30%, preferably at least 50%, more preferably at least 70%, further more preferably at least 80%, yet further more preferably at least 90%, more preferably for some applications at least 95%, still more preferably for some applications at least 99%, still further more preferably for some application at least 99.9%. Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin nanoparticles comprises a selenomelanin polymer having selenomelanin base units comprising a moiety characterized by formula FX1, FX2, FX3A, FX3B, FX4, or a combination of any of these:

(FX1)

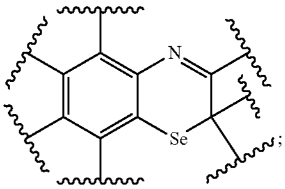

;

-continued (FX2)

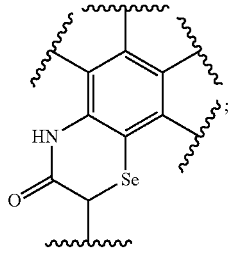

;

(FX3A)

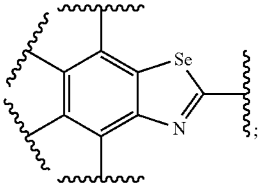

;

(FX3B)

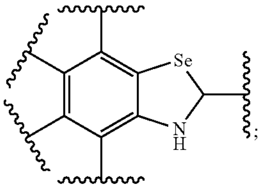

;

(FX4)

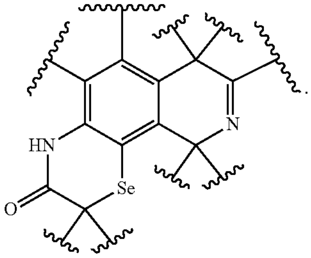

.

Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin nanoparticles comprises a selenomelanin polymer having selenomelanin base units comprises a heterocyclic moiety comprising a Se as a member of its ring structure. Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin nanoparticles comprises a selenomelanin polymer having selenomelanin base units comprises a heterocyclic moiety comprising a Se and a N as members of its ring structure. Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin nanoparticles comprises a selenomelanin polymer having selenomelanin base units comprises a moiety characterized by formula FX13, FX14, FX15, FX16, FX17, a derivative of any one of these, or a combination of any of these. Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin nanoparticles comprises a selenomelanin polymer having selenomelanin base units comprises a moiety characterized by formula FX13, FX14, FX15, FX16, FX17, or a combination of any of these. Optionally, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin nanoparticles comprises a selenomelanin polymer having selenomelanin base units comprises a moiety characterized by formula FX13, FX14, FX15, FX16, or FX17. Preferably, for any of the artificial selenomelanin materials, molecules, dispersions, formulations, and methods disclosed herein, each of the one or more selenomelanin nanoparticles is not bound to, conjugated to, attached to, coated by, encompassed by, or otherwise chemically associated with a natural or biological proteinaceous matrix, component, or lipid. Preferably, for any of the artificial selenomelanin materials, molecules, dispersions, formulations, and methods disclosed herein, each of at least 50%, optionally at least 75%, preferably at least 80%, preferably at least 90%, more preferably at least 95%, further more preferably at least 99%, of the artificial selenomelanin nanoparticles is free of artificial melanin monomers. Preferably, for any of the artificial selenomelanin materials, molecules, dispersions, formulations, and methods disclosed herein, each of the artificial selenomelanin nanoparticles is free of artificial melanin monomers. For example, artificial selenomelanin materials, such as nanoparticles, are extensively washed with HCl solution (e.g., once) and pure water (e.g., 3 times), as a result of which the artificial selenomelanin materials, or dispersion or formulations thereof, can be free of artificial selenomelanin monomers, as characterized by solid-state NMR, UV-Vis spectra, etc. Optionally, any dispersion and formulation disclosed herein comprises a concentration of melanin monomers being less than IC50 of the monomers, respectively. Optionally, for any of the artificial selenomelanin materials, molecules, dispersions, formulations, and methods disclosed herein, each of the artificial selenomelanin nanoparticles is external of a biological cell.

In some embodiments, the artificial selenomelanin nanoparticle is internalized in a biological cell. Optionally, for any of the artificial selenomelanin materials, molecules, dispersions, formulations, and methods disclosed herein, a plurality of the artificial selenomelanin nanoparticles is internalized in a plurality of biological cells. Optionally, for any of the artificial selenomelanin materials, molecules, dispersions, formulations, and methods disclosed herein, the plurality of biological cells is at least 100 cells, optionally at least 1000 cells, optionally at least 10000 cells. Preferably, for any of the artificial selenomelanin materials, molecules, dispersions, formulations, and methods disclosed herein, each artificial selenomelanin nanoparticle is internalized in a biological cell as part of a perinuclear cap in the biological cell. Preferably, for any of the artificial selenomelanin materials, molecules, dispersions, formulations, and methods disclosed herein, internalization of the plurality of the artificial selenomelanin nanoparticles in the plurality biological cells provides a cell viability of at least 90%, more preferably at least 95%, further more preferably at least 99%, with respect to water as a control. Preferably, for any of the artificial selenomelanin materials, molecules, dispersions, formulations, and methods disclosed herein, a viability of the plurality of biological cells is at least 80%, more preferably at least 90%, still more preferably at least 95%, when exposed to an artificial selenomelanin nanoparticle dispersion having a selenomelanin nanoparticle concentration of less than or equal to 0.02 mg/mL, compared to the plurality of biological cells being exposed to an equivalent dispersion or solvent free of said selenomelanin nanoparticles. Preferably, for any of the artificial selenomelanin materials, molecules, dispersions, formulations, and methods disclosed herein, a G2/M population in the plurality of biological cells having the internalized plurality of the selenomelanin nanoparticles is less than or equal to 20%, more preferably less than or equal to 15%, still more preferably less than or equal to 10%, further more preferably less than or equal to 5%, when the plurality of biological cells are exposed to 6 Gy X-ray radiation. Preferably, for any of the artificial selenomelanin materials, molecules, dispersions, formulations, and methods disclosed herein, a G2/M population in the plurality biological cells having the internalized plurality of the selenomelanin nanoparticles is statistically equivalent to a G2/M population in a plurality of equivalent biological cells free of internalized plurality of selenomelanin nanoparticles when the one or more biological cells are exposed to 2, 4, and 6 Gy X-ray radiation.

Optionally, for any of the artificial selenomelanin materials, molecules, dispersions, formulations, and methods disclosed herein, the artificial selenomelanin material further comprises selenomelanin monomers, wherein each selenomelanin monomer has a chemical formula comprising a selenium atom. Optionally, for any of the artificial selenomelanin materials, molecules, dispersions, formulations, and methods disclosed herein, each of the selenomelanin monomers is an amino acid. Optionally, for any of the artificial selenomelanin materials, molecules, dispersions, formulations, and methods disclosed herein, each of the selenomelanin monomers is a pheomelanin. Optionally, for any of the artificial selenomelanin materials, molecules, dispersions, formulations, and methods disclosed herein, each of the selenomelanin monomers comprises a substituted or unsubstituted benzoselenazine or a derivative thereof, a substituted or unsubstituted benzoselenazole or a derivative thereof, a substituted or unsubstituted 7,10-dihydro-2H-[1,4]selenazino[3,2-h]isoquinolin-3(4H)-one or a derivative thereof, a substituted or unsubstituted benzoselenazinone or a derivative thereof, or any combination of these. Optionally, for any of the artificial selenomelanin materials, molecules, dispersions, formulations, and methods disclosed herein, each of the one or more selenomelanin monomers comprises a moiety characterized by formula FX1, FX2, FX3A, FX3B, FX4, a combination of any of these, or a derivative of any of these:

(FX1)

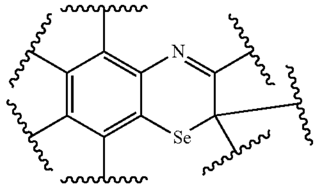

;

-continued (FX2)

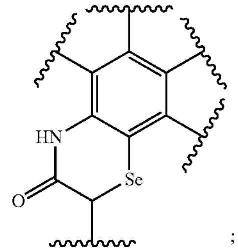

;

(FX3A)

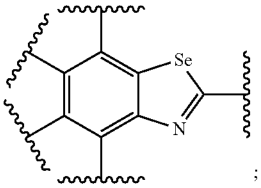

;

(FX3B)

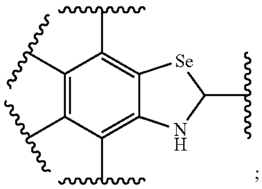

;

(FX4)

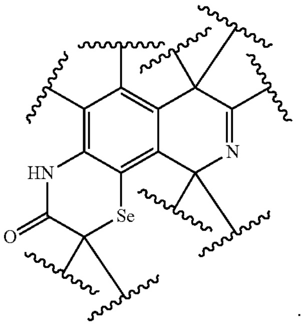

.

Optionally, for any of the artificial selenomelanin materials, molecules, dispersions, formulations, and methods disclosed herein, each of the one or more selenomelanin monomers comprises a moiety characterized by formula FX1, FX2, FX3A, FX3B, FX4, or a combination of any of these. Preferably, for any of the artificial selenomelanin materials, molecules, dispersions, formulations, and methods disclosed herein, each of the one or more selenomelanin monomers comprises a moiety characterized by formula FX1, FX2, FX3A, FX3B, or FX4. Preferably, for any of the artificial selenomelanin materials, molecules, dispersions, formulations, and methods disclosed herein, each of the one or more selenomelanin monomers comprises a moiety characterized by formula FX1. Preferably, for any of the artificial selenomelanin materials, molecules, dispersions, formulations, and methods disclosed herein, each of the one or more selenomelanin monomers comprises a heterocyclic moiety comprising a Se as a member of its ring structure. Preferably, for any of the artificial selenomelanin materials, molecules, dispersions, formulations, and methods disclosed herein, each of the one or more selenomelanin monomers comprises a heterocyclic moiety comprising a Se and a N as members of its ring structure. Preferably, for any of the artificial selenomelanin materials, molecules, dispersions, formulations, and methods disclosed herein, each of the one or more selenomelanin monomers comprises a moiety characterized by formula FX13, FX14, FX15, FX16, FX17, a derivative of any one of these, or a combination of any of these. Preferably, for any of the artificial selenomelanin materials, molecules, dispersions, formulations, and methods disclosed herein, each of the one or more selenomelanin monomers comprises a moiety characterized by formula FX13, FX14, FX15, FX16, FX17, or a combination of any of these. Optionally, for any of the artificial selenomelanin materials, molecules, dispersions, formulations, and methods disclosed herein, each of the one or more selenomelanin monomers comprises a moiety characterized by formula FX13, FX14, FX15, FX16, or FX17. Optionally, for any of the artificial selenomelanin materials, molecules, dispersions, formulations, and methods disclosed herein, each of the selenomelanin monomers is characterized by formula FX5, FX6, FX7, FX8, FX9, FX10, or FX11:

(FX5)

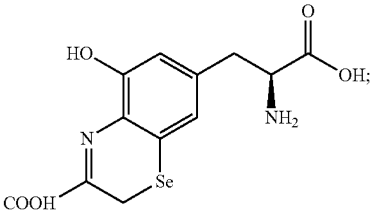

(FX6)

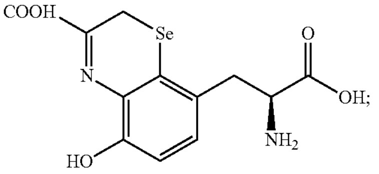

(FX7)

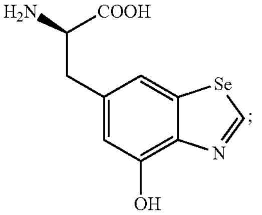

(FX8)

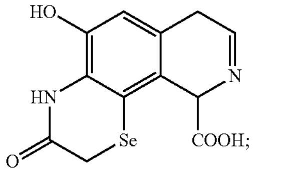

(FX9)

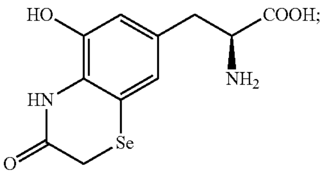

(FX10)

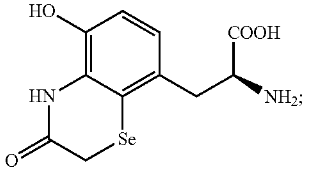

-continued (FX11)

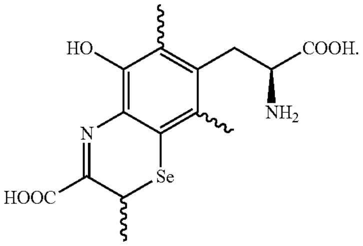

Preferably, for any of the artificial selenomelanin materials, molecules, dispersions, formulations, and methods disclosed herein, each of the one or more selenomelanin polymers is not bound to, conjugated to, attached to, coated by, encompassed by, or otherwise chemically associated with a natural or biological proteinaceous matrix, component, or lipid.

Aspects of the invention include a plurality of artificial selenomelanin materials according to any one of the embodiments of artificial selenomelanin materials disclosed herein. Preferably, for any of the artificial selenomelanin materials, molecules, dispersions, formulations, and methods disclosed herein, the plurality of artificial melanin materials are purified or isolated and/or characterized by a melanin purity of at least 20%. Preferably, for any of the artificial selenomelanin materials, molecules, dispersions, formulations, and methods disclosed herein, the plurality of artificial melanin materials are characterized by a melanin purity of at least 20%, optionally at least 25%, optionally at least 30%, preferably at least 50%, more preferably at least 70%, further more preferably at least 80%, yet further more preferably at least 90%, more preferably for some applications at least 95%, still more preferably for some applications at least 99%, still further more preferably for some application at least 99.9%. Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin materials comprises a selenomelanin polymer having selenomelanin base units comprising a moiety characterized by formula FX1, FX2, FX3A, FX3B, FX4, or a combination of any of these:

(FX1)

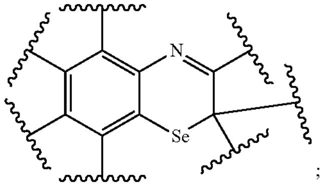

;

(FX2)

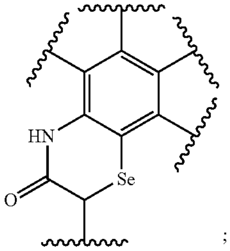

;

-continued (FX3A)

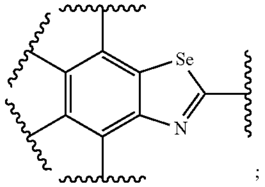

;

(FX3B)

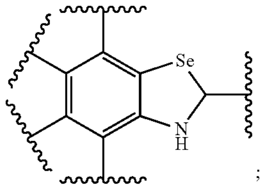

;

(FX4)

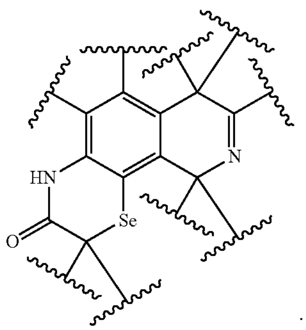

.

Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin materials comprises a selenomelanin polymer having selenomelanin base units comprises a heterocyclic moiety comprising a Se as a member of its ring structure. Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin materials comprises a selenomelanin polymer having selenomelanin base units comprises a heterocyclic moiety comprising a Se and a N as members of its ring structure. Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin materials comprises a selenomelanin polymer having selenomelanin base units comprises a moiety characterized by formula FX13, FX14, FX15, FX16, FX17, a derivative of any one of these, or a combination of any of these. Preferably, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin materials comprises a selenomelanin polymer having selenomelanin base units comprises a moiety characterized by formula FX13, FX14, FX15, FX16, FX17, or a combination of any of these. Optionally, for any of the artificial selenomelanin materials, molecules, dispersions, formulations, and methods disclosed herein, each of at least 50%, optionally at least 75%, preferably at least 90%, more preferably at least 95%, further more preferably at least 99%, of the plurality of artificial melanin materials comprises a selenomelanin polymer having selenomelanin base units comprises a moiety characterized by formula FX13, FX14, FX15, FX16, or FX17. Preferably, for any of the artificial selenomelanin materials, molecules, dispersions, formulations, and methods disclosed herein, each of the one or more selenomelanin materials is not bound to, conjugated to, attached to, coated by, encompassed by, or otherwise chemically associated with a natural or biological proteinaceous matrix, component, or lipid. Preferably, for any of the artificial selenomelanin materials, molecules, dispersions, formulations, and methods disclosed herein, each of at least 50%, optionally at least 75%, preferably at least 80%, preferably at least 90%, more preferably at least 95%, further more preferably at least 99%, of the artificial selenomelanin materials is free of artificial melanin monomers. Preferably, for any of the artificial selenomelanin materials, molecules, dispersions, formulations, and methods disclosed herein, each of the artificial selenomelanin materials is free of artificial melanin monomers. Optionally, any dispersion and formulation disclosed herein comprises a concentration of melanin monomers being less than IC50 of the monomers, respectively. Optionally, for any of the artificial selenomelanin materials, molecules, dispersions, formulations, and methods disclosed herein, each of the artificial selenomelanin materials is external of a biological cell.

Aspects of the invention include a method for making an artificial selenomelanin material comprises steps of: combining a first precursor and a second precursor, wherein each artificial selenomelanin material comprises: one or more selenomelanin polymers; wherein the one or more selenomelanin polymers comprise a plurality of covalently bonded selenomelanin base units; and wherein a chemical formula of each of the one or more selenomelanin base units comprises at least one selenium atom. Optionally, for any of the artificial selenomelanin materials, molecules, dispersions, formulations, and methods disclosed herein, the first precursor is selenocysteine or selenocystine. Optionally, the first precursor is a combination of selenocysteine and selenocystine. Optionally, the first precursor is selenocysteine. Optionally, the first precursor is selenocystine. Optionally, for any of the artificial selenomelanin materials, molecules, dispersions, formulations, and methods disclosed herein, the second precursor is a eumelanin. For example, using a eumelanin as the second precursor can increase the sphericity of the resulting artificial selenomelanin nanoparticle(s). Optionally, for any of the artificial selenomelanin materials, molecules, dispersions, formulations, and methods disclosed herein, the artificial selenomelanin material is an artificial selenomelanin nanoparticle, an artificial selenomelanin layer, or an artificial selenomelanin thin film. Preferably, for any of the artificial selenomelanin materials, molecules, dispersions, formulations, and methods disclosed herein, but not necessarily, the artificial selenomelanin material is an artificial selenomelanin nanoparticle. Optionally, for any of the artificial selenomelanin materials, molecules, dispersions, formulations, and methods disclosed herein, the method further comprises forming the second precursor; the step of forming the second precursor comprising oxidizing L-3,4-dihydroxyphenylalanine (L-DOPA), 5,6-dihydroxyindole-2-carboxylic acid, 5,6-dihydroxyindole, dopachrome, leucodopachrome, dopaquinone, indole-5,6-quinone, or a combination of these (e.g., to form a eumelanin seed of interest). Optionally, for any of the artificial selenomelanin materials, molecules, dispersions, formulations, and methods disclosed herein, the method further comprises forming the second precursor; the step of forming the second precursor comprising oxidizing L-3,4-dihydroxyphenylalanine (L-DOPA), 5,6-dihydroxyindole-2-carboxylic acid, 5,6-dihydroxyindole, dopachrome, leucodopachrome, dopaquinone, or indole-5,6-quinone. Optionally, for any of the artificial selenomelanin materials, molecules, dispersions, formulations, and methods disclosed herein, the step of forming the second precursor comprises using an aqueous solution with an oxidative agent. Optionally, for any of the artificial selenomelanin materials, molecules, dispersions, formulations, and methods disclosed herein, the oxidative agent is $KMnO_4$, hydrogen peroxide, sodium periodate, an enzymes, tyrosinase, horseradish peroxidase, or any combination thereof. Optionally, for any of the artificial selenomelanin materials, molecules, dispersions, formulations, and methods disclosed herein, the method further comprises forming the first precursor. Optionally, for any of the artificial selenomelanin materials, molecules, dispersions, formulations, and methods disclosed herein, the step of forming the first precursor comprises reducing selenocystine; wherein the first precursor is selenocysteine and/or selenocystine. Optionally, the first precursor is selenocysteine. Optionally, the first precursor is selenocystine. Optionally, for any of the artificial selenomelanin materials, molecules, dispersions, formulations, and methods disclosed herein, the step of forming the selenocysteine comprises reducing selenocystine using tris(2-carboxyethyl)phosphine (TCEP), tris(2-carboxyethyl)phosphine hydrochloride (TCEP·HCl), $NaBH_4$, Vitamin C, or a combination of these. Optionally, for any of the artificial selenomelanin materials, molecules, dispersions, formulations, and methods disclosed herein, a solution comprising the first precursor has a pH selected from the range of 7 to 9, and the step of combining comprises combining the second precursor and the solution comprising the first precursor. Optionally, for any of the artificial selenomelanin materials, molecules, dispersions, formulations, and methods disclosed herein, the step of combining comprises oxidative polymerization of the first precursor and the second precursor. Optionally, for any of the artificial selenomelanin materials, molecules, dispersions, formulations, and methods disclosed herein, the oxidative polymerization occurs over at least 24 hours. Optionally, for any of the artificial selenomelanin materials, molecules, dispersions, formulations, and methods disclosed herein, each selenomelanin polymer is a pheomelanin. Optionally, for any of the artificial selenomelanin materials, molecules, dispersions, formulations, and methods disclosed herein, the chemical formula of each of the one or more selenomelanin base units comprises at least one covalent bond with each of the at least one selenium atom. Optionally, for any of the artificial selenomelanin materials, molecules, dispersions, formulations, and methods disclosed herein, the chemical formula of each of the one or more selenomelanin base units comprises one selenium atom and two covalent bonds with the selenium atom. Optionally, for any of the artificial selenomelanin materials, molecules, dispersions, formulations, and methods disclosed herein, the chemical formula of each of the one or more selenomelanin base units comprises a substituted or unsubstituted benzoselenazine or a derivative thereof, a substituted or unsubstituted benzoselenazole or a derivative thereof, a substituted or unsubstituted 7,10-dihydro-2H-[1,4]selenazino[3,2-h]isoquinolin-3(4H)-one or a derivative thereof, a substituted or unsubstituted benzoselenazinone or a derivative thereof, or any combination of these. Optionally, for any of the artificial selenomelanin materials, molecules, dispersions, formulations, and methods disclosed herein, each of the one or more selenomelanin base units comprises a moiety characterized by formula FX1, FX2, FX3A, FX3B, FX4, a combination of any of these, or a derivative of any of these:

(FX1)

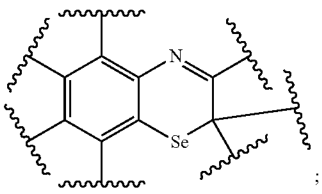

;

(FX2)

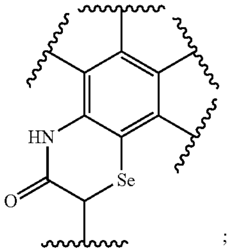

;

(FX3A)

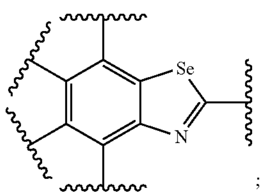

;

(FX3B)

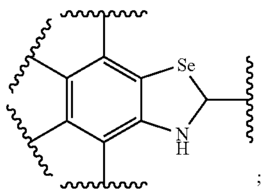

;

(FX4)

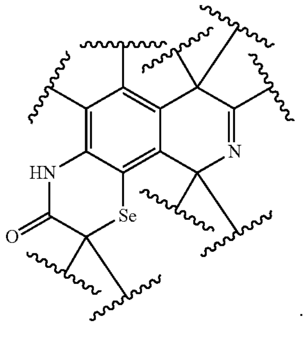

.

Optionally, for any of the artificial selenomelanin materials, molecules, dispersions, formulations, and methods disclosed herein, each of the one or more selenomelanin base units comprises a moiety characterized by formula FX1, FX2, FX3A, FX3B, FX4, or a combination of any of these. Preferably, for any of the artificial selenomelanin materials, molecules, dispersions, formulations, and methods disclosed herein, each of the one or more selenomelanin base units comprises a moiety characterized by formula FX1, FX2, FX3A, FX3B, or FX4. Preferably, the method comprises making a plurality of the artificial selenomelanin materials; wherein the plurality of the artificial selenomelanin materials is purified or isolated and/or characterized by a melanin purity of at least 20%, optionally at least 25%, optionally at least 30%, preferably at least 50%, more preferably at least 70%, further more preferably at least 80%, yet further more preferably at least 90%, more preferably for some applications at least 95%, still more preferably for some applications at least 99%, still further more preferably for some application at least 99.9%. Preferably, the method is characterized by a higher precursor conversion efficiency than that of an equivalent method where each Se is replaced with S.

Aspects of the invention include an artificial selenomelanin molecule comprises: a chemical formula that comprises a selenium atom; wherein artificial selenomelanin molecule is an amino acid. Optionally, for any of the artificial selenomelanin materials, molecules, dispersions, formulations, and methods disclosed herein, the artificial selenomelanin molecule is a selenomelanin polymer; wherein the selenomelanin polymer comprises a plurality of covalently bonded selenomelanin base units; and wherein a chemical formula of each of the one or more selenomelanin base units comprises at least one selenium atom. Optionally, for any of the artificial selenomelanin materials, molecules, dispersions, formulations, and methods disclosed herein, the artificial selenomelanin molecule is a pheomelanin. Optionally, for any of the artificial selenomelanin materials, molecules, dispersions, formulations, and methods disclosed herein, the chemical formula of the artificial selenomelanin molecule comprises at least one covalent bond with the selenium atom. Optionally, for any of the artificial selenomelanin materials, molecules, dispersions, formulations, and methods disclosed herein, the chemical formula of the artificial selenomelanin molecule comprises one selenium atom and two covalent bonds with the selenium atom. Optionally, for any of the artificial selenomelanin materials, molecules, dispersions, formulations, and methods disclosed herein, the chemical formula of the artificial selenomelanin molecule comprises a substituted or unsubstituted benzoselenazine or a derivative thereof, a substituted or unsubstituted benzoselenazole or a derivative thereof, a substituted or unsubstituted 7,10-dihydro-2H-[1,4]selenazino[3,2-h]isoquinolin-3(4H)-one or a derivative thereof, a substituted or unsubstituted benzoselenazinone or a derivative thereof, or any combination of these. Optionally, for any of the artificial selenomelanin materials, molecules, dispersions, formulations, and methods disclosed herein, each of the one or more selenomelanin base units comprises a moiety characterized by formula FX1, FX2, FX3A, FX3B, FX4, a combination of any of these, or a derivative of any of these:

(FX1)

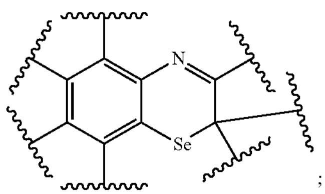

;

(FX2)

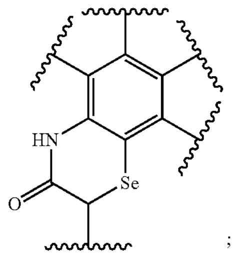

;

-continued (FX3A)

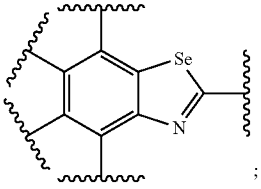

(FX3B)

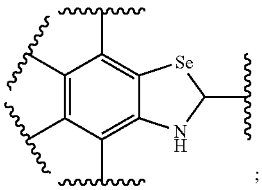

(FX4)

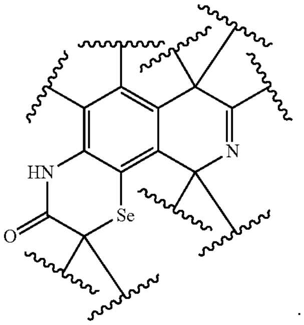

Optionally, for any of the artificial selenomelanin materials, molecules, dispersions, formulations, and methods disclosed herein, each of the one or more selenomelanin base units comprises a moiety characterized by formula FX1, FX2, FX3A, FX3B, FX4, or a combination of any of these. Optionally, for any of the artificial selenomelanin materials, molecules, dispersions, formulations, and methods disclosed herein, each of the one or more selenomelanin base units comprises a moiety characterized by formula FX1, FX2, FX3A, FX3B, or FX4. Optionally, for any of the artificial selenomelanin materials, molecules, dispersions, formulations, and methods disclosed herein, the artificial selenomelanin molecule is characterized by formula FX5, FX6, FX7, FX8, FX9, FX10, or FX11:

(FX5)

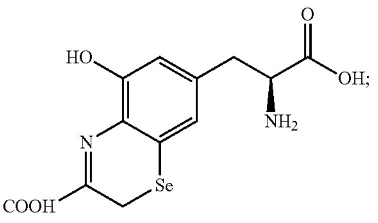

(FX6)

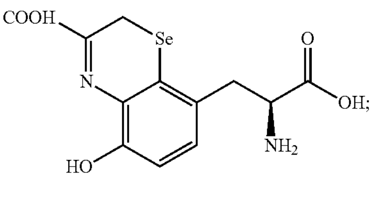

-continued (FX7)

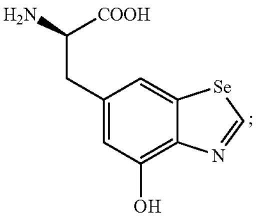

(FX8)

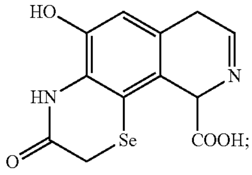

(FX9)

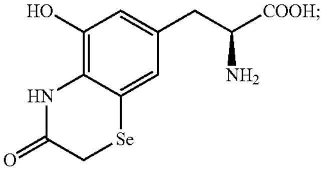

(FX10)

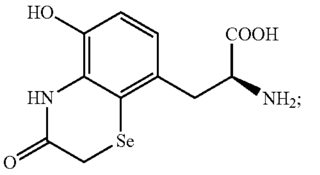

(FX11)

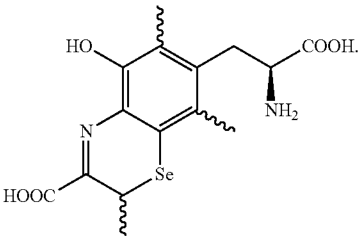

Aspects of the invention include, a method for making an artificial selenomelanin molecule comprises steps of: combining selenocysteine and a eumelanin; wherein the artificial selenomelanin molecule is characterized by a chemical formula comprising a selenium atom. Optionally, for any of the artificial selenomelanin materials, molecules, dispersions, formulations, and methods disclosed herein, the method further comprises forming the eumelanin; the step of forming the eumelanin comprising oxidizing L-3,4-dihydroxyphenylalanine (L-DOPA). Optionally, for any of the artificial selenomelanin materials, molecules, dispersions, formulations, and methods disclosed herein, the step of forming comprises oxidizing L-DOPA using an aqueous solution with $KMnO_4$. Optionally, for any of the artificial selenomelanin materials, molecules, dispersions, formulations, and methods disclosed herein, the method further comprises forming the selenocysteine by reducing selenocystine. Optionally, for any of the artificial selenomelanin materials, molecules, dispersions, formulations, and methods disclosed herein, the step of forming the selenocysteine comprises reducing selenocystine using tris(2-carboxyethyl) phosphine (TCEP), tris(2-carboxyethyl)phosphine hydrochloride (TCEP·HCl), $NaBH_4$, Vitamin C, or a combination of these. Optionally, for any of the artificial selenomelanin materials, molecules, dispersions, formulations, and methods disclosed herein, a solution comprising the selenocysteine has a pH of 8±1, and the step of combining comprises combining the eumelanin and the solution comprising selenocysteine. Optionally, for any of the artificial selenomelanin materials, molecules, dispersions, formulations, and methods disclosed herein, the step of combining comprises oxidation. Optionally, for any of the artificial selenomelanin materials, molecules, dispersions, formulations, and methods disclosed herein, the step of combining comprises a chemical pathway characterized by formula FX12:

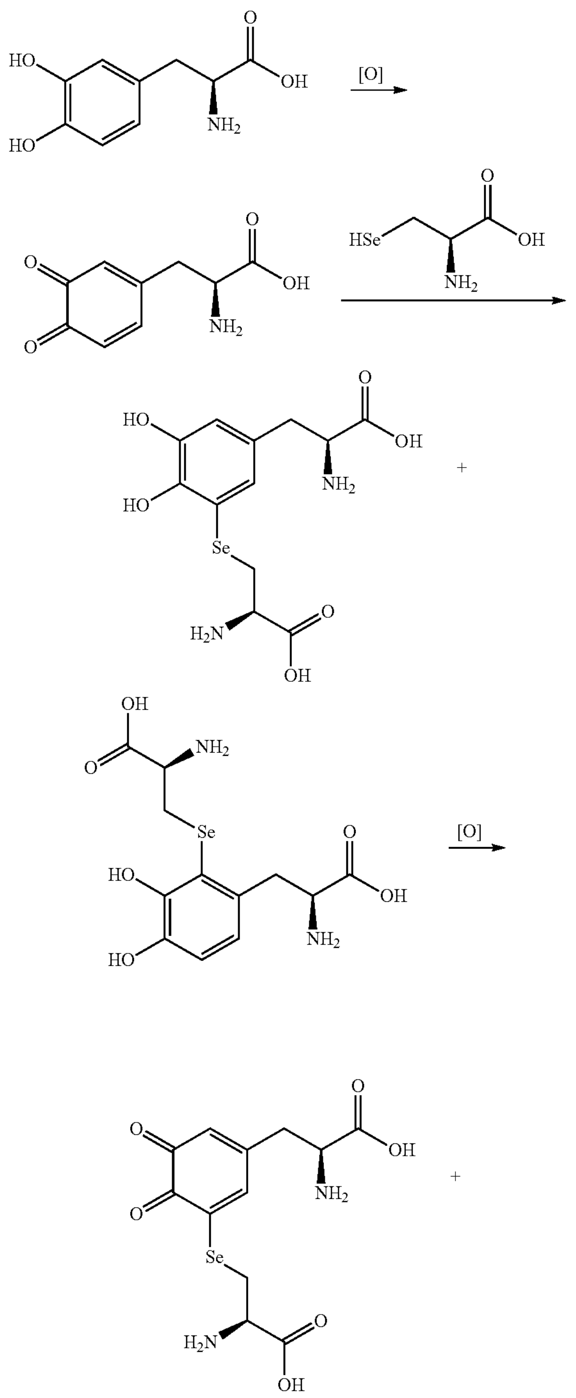

-continued

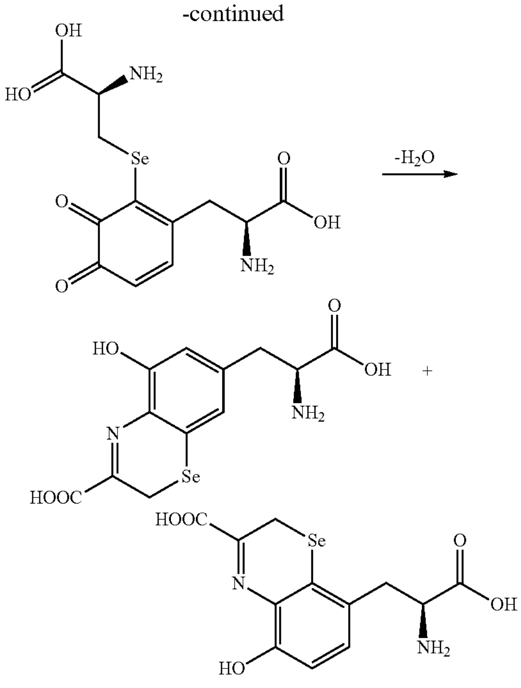

(FX12). Preferably, the method comprises making a plurality of the artificial selenomelanin molecules; wherein the plurality of the artificial selenomelanin molecules is purified or isolated and/or characterized by a melanin purity of at least 20%, optionally at least 25%, optionally at least 30%, preferably at least 50%, more preferably at least 70%, further more preferably at least 80%, yet further more preferably at least 90%, more preferably for some applications at least 95%, still more preferably for some applications at least 99%, still further more preferably for some application at least 99.9%. Preferably, the method is characterized by a higher precursor conversion efficiency than that of an equivalent method where each Se is replaced with S.

Aspects of the invention include a melanin formulation comprising the nanoparticle dispersion according to any of the embodiments thereof described herein. Aspects of the invention include a melanin formulation comprising: a continuous phase; wherein the continuous phase comprises: plurality of artificial selenomelanin materials according to any of the embodiments thereof described herein. Optionally, for any embodiments of the formulations disclosed herein, the continuous phase comprises at least one liquid, at least one gel, or a combination of these. Optionally, for any embodiments of the formulations disclosed herein, the formulation is a cosmetic formulation, a therapeutic formulation, or a formulation for prevention of radiation damage to biological cells or living tissue. Preferably, for any embodiments of the formulations disclosed herein, the plurality of artificial melanin materials are purified or isolated and/or characterized by a melanin purity of at least 20%, optionally at least 25%, optionally at least 30%, preferably at least 50%, more preferably at least 70%, further more preferably at least 80%, yet further more preferably at least 90%, more preferably for some applications at least 95%, still more preferably for some applications at least 99%, still further more preferably for some application at least 99.9%. Optionally, for any embodiments of the formulations disclosed herein, the formulation comprises less than or equal to 0.1 wt. %, preferably less than or equal to 0.01 wt. %, more preferably less than or equal to 0.001 wt. %, further more preferably less than or equal to 0.0001 wt. %, still more preferably less than or equal to 0.00001 wt. %, of artificial melanin monomers. Optionally, any dispersion and formulation disclosed herein comprises a concentration of melanin monomers being less than IC50 of the monomers, respectively. Preferably, for any embodiments of the formulations disclosed herein, the formulation is free of artificial melanin monomers. Optionally, for any embodiments of the formulations disclosed herein, the formulation comprises artificial selenomelanin materials at a concentration selected from the range of 1 wt. % to 100 wt. %, optionally 1 wt. % to 95 wt. %, optionally 1 wt. % to 90 wt. %, optionally, 50 wt. % to 95 wt. %, optionally 1 wt. % to 50 wt. %, optionally 20 wt. % to 70 wt. %. Aspects of the invention include a method for preventing radiation damage to tissue of a living subject, comprising: applying a melanin formulation to the tissue of the living subject, wherein the melanin formulation is according to any of the embodiments of formulations disclosed herein. Aspects of the invention also include a medical device or component of a medical device comprising one or more artificial melanin materials according to any of the embodiments thereof described herein. Aspects of the invention also include a device or component an air or space craft comprising one or more artificial melanin materials according to any of the embodiments thereof described herein. Aspects of the invention also include a textile comprising one or more artificial melanin materials according to any of the embodiments thereof described herein.

Preferably, for any of the artificial selenomelanin materials, molecules, dispersions, formulations, and methods disclosed herein, each of the one or more selenomelanin base units comprises a heterocyclic moiety comprising a Se as a member of its ring structure. Preferably, for any of the artificial selenomelanin materials, molecules, dispersions, formulations, and methods disclosed herein, each of the one or more selenomelanin base units comprises a heterocyclic moiety comprising a Se and a N as members of its ring structure. Optionally, for any of the artificial selenomelanin materials, molecules, dispersions, formulations, and methods disclosed herein, each of the one or more selenomelanin base units comprises a moiety characterized by formula FX13, FX14, FX15, FX16, FX17, a derivative of any one of these, or a combination of any of these:

(FX13)

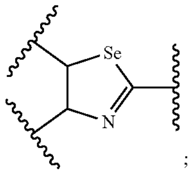

;

(FX14)

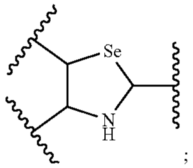

;

-continued (FX15)

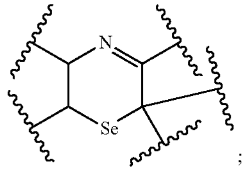

;

(FX16)

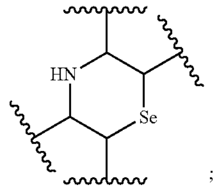

;

(FX17)

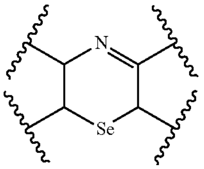

.

Optionally, for any of the artificial selenomelanin materials, molecules, dispersions, formulations, and methods disclosed herein, each of the one or more selenomelanin base units comprises a moiety characterized by formula FX13, FX14, FX15, FX16, FX17, or a combination of any of these. Optionally, for any of the artificial selenomelanin materials, molecules, dispersions, formulations, and methods disclosed herein, each of the one or more selenomelanin base units comprises a moiety characterized by formula FX13, FX14, FX15, FX16, or FX17.

Without wishing to be bound by any particular theory, there may be discussion herein of beliefs or understandings of underlying principles relating to the devices and methods disclosed herein. It is recognized that regardless of the ultimate correctness of any mechanistic explanation or hypothesis, an embodiment of the invention can nonetheless be operative and useful.

BRIEF DESCRIPTION OF THE DRAWINGS

FIG. 1A. Synthetic route for the selenomelanin by the oxidative copolymerization of L-DOPA and selenocysteine, and optical images of the sample suspension at 1 mg $mL^{-1}$ and 0.02 mg $mL^{-1}$. FIG. 1B. TEM image of SeNP (no stain) showed spherical nanoparticles. FIG. 1C. EPR spectra of SeNP in water. FIG. 1D. Extinction coefficient of SeNP compared with L-DOPA NP determined by UV-Vis spectroscopy. FIG. 1E. Solid state $^{13}C$ NMR spectra of SeNP.

FIG. 2A. Synthetic route and TEM image of SNP. FIG. 2B. EPR spectra also showed similar results with literature. FIG. 2C. SS NMR indicated that the cysteine is not cyclized and it's not a good structural mimic for natural pheomelanin.

FIGS. 4C, 4F, 4I and 4L are the magnification the perinucleous area of FIGS. 4B, 4E, 4H and 4K respectively. In embodiments, for STEM, NHEK cells are seeded on 13 mm Thermanox™ coverslips and fixed in 0.1 M sodium phosphate or PIPES buffer with 2.5% glutaraldehyde and 2% paraformaldehyde. In embodiments, the cells are microwaved using a Pelco Biowave and post-fixed with 1%0.0 in imidazole followed by 1% uranyl acetate. In embodiments, the cells are dehydrated with a series of ethanol and acetone and then permeated with EMBed812 resin in BEEM® capsules. In embodiments, the resin is polymerized by heating to 60° C. for 48 hours. In embodiments, ultramicrotomy is performed using a Leica EM UC7 Ultramicrotome and the cells sectioned to 60 nm thick. In embodiments, sections are mounted onto 1-2 mm slotted copper formvar/carbon grids and stained for 20 minutes with 2% uranyl acetate and 7 minutes with Reynolds lead citrate. Images are obtained on a Hitachi HD2300 cFEG STEM with an HAADF detector at 80 kV and an emission current of 57 μA.

FIG. 5A. Representative cell cycle distribution determined by flow cytometry with PI as the DNA stain. The cells were treated with different NPs and radiated with X-ray of 0 Gy, 2 Gy, 4 Gy and 6 Gy. The plots and figures are color coded. Black: No particle control; red: SeNP; blue: SNP control; gray: L-DOPA NP control. Y axis is histogram. X axis is the fluorescence of propidium iodide. FIG. 5B. ROS probe images observed by confocal microscopy. Confocal image false color: green (or, light gray regions of cells surrounding nucleus in the top-left, No NP 6Gy panel): ROS probe; Blue (central light gray regions of cells): Hoechst dye. Scale bar: 20 μm. FIG. 5C. G2/M phase population with different NPs with and without x-ray treatment. NS means no statistical difference (P>0.01) with reference no NP control at same X-ray dose. *******$P<10^{-9}$, **$P<10^{-6}$, **$P<10^{-4}$ with reference no NP control at same X-ray dose. FIG. 5D. Cells treated with SeNP for 24 h, and imaged via CLSM (scale bar is 20 μm). Cells were stained with wheat germ agglutinin (WGA) (red, surrounding light gray regions) and Hoechst 33342 (blue, middle light gray regions). FIG. 5E. Scale bar 1 μm. FIG. 5F. Attenuation of NP suspension measured by EBT3 Radiochromic film. Error bars represent standard deviation from three experiments. FIG. 5G. CDKN1a gene expression level decreased by SeNP treatment. Error bars represent standard deviation from three experiments. FIG. 5H. Live-cell imaging of ROS scavenging by CLSM showing DCFDA ROS-positive signal (green; light gray regions surrounding nucleus in top left panel), and nuclei stained with Hoechst 33342 (blue, middle light gray regions). Scale bar 20 μm.

FIG. 6A: Wide-scan survey spectra. FIG. 6B: the Se 3d spectrum. 56.4 eV indicate that there is mostly the C—Se—C structure.[3]

FIG. 19D. Experimental timeline for this initial study.

FIG. 25A: 0 Gy. FIG. 25B: 2 Gy. FIG. 25C: 4 Gy. FIG. 25D: 6 Gy. Red=SeNP. Blue=SNP. Gray=L-DOPA NP. Black=No NP control. Each histogram is offset for better clarity and is representative of three independent experiments.

FIG. 26A: Coloration of EBT3 film after different doses of x-ray irradiation. FIG. 26B: UV-Vis spectra of the corresponding films. FIG. 26C: Absorbance values at 635 nm for several x-ray doses. FIG. 26D: Averaged UV-Vis spectra of the films. Error bars represent the standard deviation of three independent experiments with new films and NP suspensions.

FIGS. 27A-27D. OEG-coated SeNP were synthesized to investigate how the surface chemistry influences the protection behavior. SeNP-OEG synthesis and characterization by FT-IR (FIGS. 27A and 27B). FIG. 27C: NHEK cells were treated with SeNP-OEG for 24 h, stained with Hoechst 33342 (blue; middle cellular regions) and WGA 633 (red; outline/perimeter light gray regions surrounding nuclear regions), and then imaged via confocal laser scanning microscopy. Confocal image false color: red: WGA 633; Blue: Hoechst dye. Scale bar is 20 μm. FIG. 27D: Representative cell cycle distribution determined by flow cytometry. The cells were treated with no NP, SeNP, or SeNP-OEG, and irradiated with 0 Gy, 2 Gy, 4 Gy or 6 Gy x-ray. NS means no statistical difference (P>0.01) compared with no NP control. **P<0.01, as compared with the SeNP treated cells at the same x-ray dose.

FIG. 29A: The monomers were feed to *Vibrio natriegens* to produce selenomelanin biologically. FIG. 29B: XPS could identify the Se element in the supernatant melanin. FIG. 29C: melanin ghost formed perinuclear cap in NHEK cells. FIG. 29D: The selenomelanin from supernatant and melanin ghost could both protect the cell cycle arrest at G2/M phase induced by x-ray.

FIG. 31A: Wide-scan survey spectra. FIG. 31B: the C1s spectrum. FIG. 31C: the O 1s spectrum. FIG. 31D: the N 1s spectrum, FIG. 31E: the S 2p spectrum. The S spectra confirmed the successful incorporation of sulfur from cysteine in the SNP product FIGS. 32A-32E. XPS spectrum of the L-DOPA NP sample drop-casted on a silicon substrate.

FIG. 35A: NHEK cell population. FIG. 35B: Singlet gate using PE-Texas red area against PE-Texas red width plot. FIG. 35C: Histogram of PI counts (Texas Red channel) used for cell cycle analysis in Flow-Jo. FIG. 35D: Experimental timeline FIGS. 36A-36B. Color change during the biological synthesis of selenomelanin.

FIG. 40A: EPR spectra of 4-Amino-TEMPO standard solution of 500, 100 and 10 μM. FIG. 40B: the integration plot of EPR spectra in FIG. 40A. The plots were baseline corrected in origin. FIG. 40C: The integration plot of integrated EPR spectra in FIG. 40B. FIG. 40D: the calibration curve of double integration area vs spin concentration. FIG. 40E: EPR spectra of 5.4 mg/mL SeNP aqueous suspension.

FIG. 41A. Synthetic route for selenomelanin NP via oxidative copolymerization of L-DOPA and selenocysteine. FIG. 41B. XPS Se 3d spectrum. FIG. 41C. $^{13}C$ ssNMR spectra of SeNP overlaid with L-DOPA NP and monomers. Carbon assignments are listed adjacent to each main NMR peak based on the monomer peak comparison and previous literature. Colored dots in FIG. 41C correspond with the proposed structure in FIG. 41A. Spinning side bands of SeNP are labeled with asterisks (*).

FIG. 42A. Synthetic route and proposed structure of PNP. FIG. 42B. Representative TEM image of PNP. Scale bar 200 nm. FIG. 42C. $^{13}C$ ssNMR spectra indicate uncyclized cysteine in PNP. The PNP NMR spectrum was processed with 60 Hz Gaussian line broadening for clarity. Carbon assignments of PNP are listed adjacent to each NMR peak based on the monomer peak comparison. The aromatic peaks have low intensity, and assignment is impractical. Inset is the zoomed aromatic region of cysteine, PNP and pheomelanin from bird feathers. The PNP spinning side band is labeled with an asterisk (*). Rooster pheomelanin peaks at 172 ppm, 72 ppm and 33 ppm were assigned to lipids. FIG. 42D. Natural pheomelanin extraction from covert feathers of a Rhode Island red rooster shown in photography.

FIGS. 43A-43G. Radio-protecting selenomelanin synthesized by living cells. FIG. 43A. SEM of the selenomelanin ghost made by *V. natriegens* fed with selenocystine and L-DOPA. Scale bar 1 μm. FIG. 43B. $^{13}C$ ssNMR of selenomelanin nanoparticles made by *V. natriegens* in culture medium. FIG. 43C. XPS Se 3d spectrum of selenomelanin ghosts. FIG. 43D. Representative CLSM image showing perinuclear caps in NHEK cells formed by selenomelanin ghosts. Cell membranes were stained with WGA (red), and nuclei with Hoechst 33342 (blue). Scale bar 20 μm. FIG. 43E. Representative STEM micrograph showing the perinuclear caps formed in NHEK cells. Scale bar 2 μm. FIG. 43F. Zoomed STEM image showing semi-hollow selenomelanin ghosts in the perinuclear region. Scale bar 1 μm. FIG. 43G. Selenomelanin ghosts protect against cell cycle arrest induced by X-rays. Error bars represent standard deviation from three experiments. NS $P>0.01$, *$P<10^{-3}$, ***$P<10^{-5}$, determined by Student's two-tailed t-test.

FIG. 47A. Wide-scan survey spectrum. FIG. 47B. C 1s spectrum. FIG. 47C. O 1s spectrum. FIG. 47D. N 1s spectrum, E. S 2p spectrum. The S spectrum confirmed successful incorporation of sulfur from cysteine into the PNP product. FIG. 47F. EPR spectrum of PNP aqueous suspension. FIG. 47G. DLS intensity plot of PNP. FIG. 47H. SEM image of PNP. FIG. 47I. Circular dichroism spectra of PNP, L-DOPA, and cysteine monomers. The PNP sample has some chiral signal, corresponding to an open chain structure as indicated by the ssNMR of PNP in FIGS. 42A-42D.

FIG. 50A. NP dilution. FIG. 50B. Changing ionic strength (NaCl concentration). FIG. 50C. Increasing pH. Samples were measured in triplicate (n=3). Error bars indicate s.d. First, all three types of NPs retained the same size at even $10^{-4}$ mg $mL^{-1}$ concentration as shown by DLS (FIG. 50A). The high stability against dilution is probably because melanins are crosslinked by covalent/non-covalent interactions. Secondly, they behave differently against ionic strength and alkaline conditions. As shown in FIG. 50B, SeNPs experienced a much smaller size change under high ionic strength environments than L-DOPA NP. As 250 mM is relevant to biological applications,[11] this suggests that SeNP has good stability in vitro. Interestingly, SeNP was found to be soluble at pH>11. In contrast, similar solubility was not observed with PNP and L-DOPA. This is more evidence that SeNP are a good mimic for natural pheomelanin, as they were reported to be soluble under alkaline conditions due to their smaller molecular weight.[12] FIG. 50D. TEM image of SeNP sample in pH 13 buffer. Irregular aggregates were observed, with very few spherical particles, indicating that the SeNP are dissolved under alkaline conditions.

FIGS. 53A-53C are the DLS plot, TEM image and SEM image of the nanoparticles made by *V. natriegens* in the supernatant, respectively. FIGS. 53D-53F are the DLS plot, TEM image and SEM image of the micrometer-sized selenomelanin ghosts after purification, respectively. Scale bar 200 nm.

FIG. 55A. $^{13}C$ ssNMR spectrum of selenomelanin ghosts. FIG. 55B. XPS Se3d spectrum of selenomelanin ghosts drop-casted onto a silicon substrate after different ion beam etching times (generally, as represented by arrows, increased etching time corresponds to increased signal counts). FIG. 55C. Se 3d spectra after different beam etching times.

STATEMENTS REGARDING CHEMICAL COMPOUNDS AND NOMENCLATURE

Figure 1A:
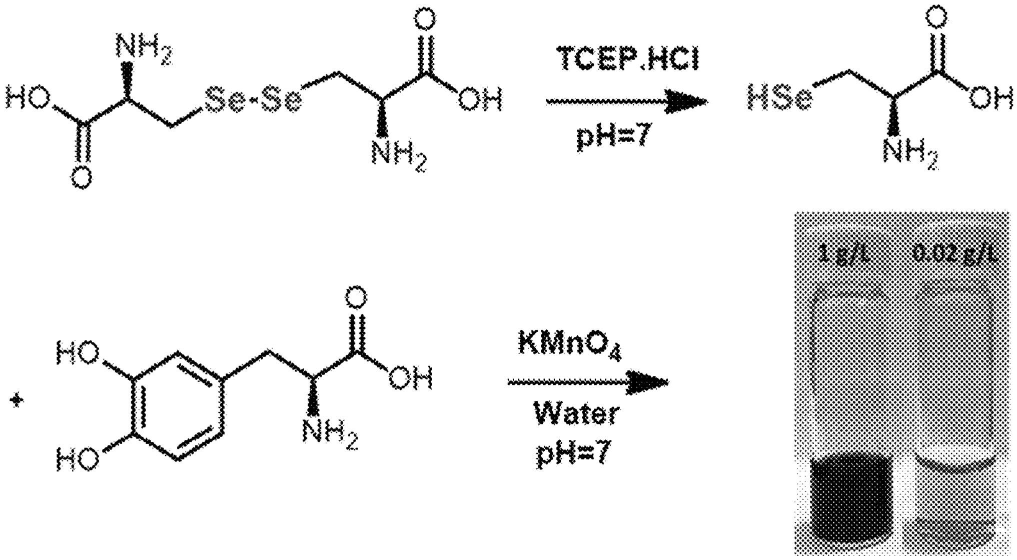
FIGS. 1A-1E. Synthesis and characterization of selenomelanin nanoparticles (SeNP).

In general, the terms and phrases used herein have their art-recognized meaning, which can be found by reference to standard texts, journal references and contexts known to those skilled in the art. The following definitions are provided to clarify their specific use in the context of the invention.

The term "melanin" generally refers to one or more compounds or materials that function as a pigment, such as when internalized or taken up by a biological cell, for example. It is also noted that melanin is not necessarily taken up by cells. Melanin can be used for forming cell walls in fungi, for example, such as to provide rigidity, defense mechanisms, and more. In another illustrative example, melanin is used by birds, such as where melanin is organized in a matrix of keratin or similar type of biological material, where it can be organized into monolayers or multilayers to provide structural color, warmth, and more. A melanin compound or material may be, but is not limited to, a melanin monomer, a melanin oligomer, a melanin polymer, a melanin nanoparticle, a melanin layer (e.g., a melanin thin film), or other melanin material, for example. For example, melanin nanoparticles internalized by a biological cell function as a pigment in the cell.

The terms "artificial melanin" and "synthetic melanin" are used interchangeably herein and refer to one or more melanin compounds, molecules, or materials, such as melanin monomers, melanin oligomers, or melanin nanoparticles, that are synthesized and are at least partially, or preferably entirely, not derived from or not extracted from a natural source, such as a biological source, a living organism, or a once living organism. The terms "synthetic" and "artificial" are used interchangeably herein when referring to a melanin or a material comprising a melanin. The terms "synthetic melanin nanoparticles" and "artificial melanin nanoparticles" are used interchangeably herein, and are intended to have the same meaning throughout the present disclosure, and refer to nanoparticles formed of artificial melanin, such as artificial melanin monomers and/or artificial melanin oligomers. The terms "synthetic melanin thin film" and "artificial melanin thin film" are used interchangeably herein, and are intended to have the same meaning throughout the present disclosure, and refer to a thin film formed of artificial melanin, such as artificial melanin monomers and/or artificial melanin oligomers. The terms "synthetic melanin layer" and "artificial melanin layer" are used interchangeably herein, and are intended to have the same meaning throughout the present disclosure, and refer to a layer formed of artificial melanin, such as artificial melanin monomers and/or artificial melanin oligomers. An artificial melanin nanoparticle, artificial melanin thin film, artificial melanin layer, and any compound, material, or formulation comprising any of these, comprises artificial melanin monomers, artificial melanin oligomers, and/or artificial melanin polymers. Optionally, an artificial melanin nanoparticle, artificial melanin thin film, artificial melanin layer, and any compound, material, or formulation comprising any of these, consists of or consists essentially of artificial melanin, such as artificial melanin monomers, artificial melanin oligomers, and/or artificial melanin polymers. Optionally, an artificial melanin nanoparticle, artificial melanin thin film, artificial melanin layer, and any compound, material, or formulation comprising any of these, is free (or substantially free) of artificial melanin monomers and comprises artificial melanin oligomers and/or artificial melanin polymers. Preferably, each artificial melanin monomer, artificial melanin oligomer, and artificial melanin polymer of an artificial melanin nanoparticle, artificial melanin thin film, artificial melanin layer, and any compound, material, or formulation comprising any of these, is not bound to, conjugated to, attached to, coated by, encompassed by or chemically otherwise associated with a natural or biological proteinaceous matrix, component, or lipid. A natural or biological proteinaceous matrix or component refers to a naturally or biologically derived matrix or component or a matrix or component extracted from a natural or biological source, such as a once living organism, said matrix or component comprising one or more proteins. A natural or biological proteinaceous lipid refers to a naturally or biologically derived lipid or a lipid extracted from a natural or biological source, such as a once living organism, said lipid comprising one or more proteins such as the lipid (plasma) membrane of a melanocyte or melanosome). Optionally, each artificial melanin monomer, artificial melanin oligomer, and artificial melanin polymer of an artificial melanin nanoparticle, artificial melanin thin film, artificial melanin layer, and any compound, material, or formulation comprising any of these, is not bound to, conjugated to, attached to, coated by, encompassed by or otherwise chemically associated with a natural or biological lipid (e.g. a lipid bilayer, lipid membrane or phospholipid compound). A natural or biological lipid refers to a naturally or biologically derived lipid or a lipid extracted from a natural or biological source, such as a once living organism. Optionally, any artificial melanin monomer, artificial melanin oligomer, and artificial melanin polymer of an artificial melanin nanoparticle, artificial melanin thin film, artificial melanin layer, and any compound, material, or formulation comprising any of these, is bound to, conjugated to, attached to, coated by, encompassed by, and/or otherwise associated with a synthetic or artificial lipid or with a synthetic or artificial phospholipid. A synthetic or artificial lipid refers to a synthesized lipid that is not derived from or is not extracted from a natural or biological source, such as a once living organism.

The term "selenomelanin" refers to melanin comprising selenium. For example, a selenomelanin material comprises selenium. Preferably, a chemical formula of a selenomelanin material comprises selenium (e.g., at least one selenium atom).

In certain embodiments, the term "pheomelanin" refers to a melanin whose chemical formula comprises at least one substituted or unsubstituted benzothiazine, at least one substituted or unsubstituted benzothiazole, at least one substituted or unsubstituted benzoselenazole, at least one substituted or unsubstituted benzoselenazine, at least one derivative of any of these, or any combination of these. In certain embodiments, the term pheomelanin refers to a melanin made from L-DOPA and cysteine, whose chemical formula comprises at least one substituted or unsubstituted benzothiazine, at least one substituted or unsubstituted benzothiazole, at least one substituted or unsubstituted benzoselenazole, at least one substituted or unsubstituted benzoselenazine, at least one derivative of any of these, or any combination of these. In certain embodiments, a selenium pheomelanin refers to a melanin whose chemical formula comprises at least one substituted or unsubstituted benzoselenazole, at least one substituted or unsubstituted benzoselenazine, at least one derivative of any of these, or any combination of these.

In certain embodiments, the term eumelanin refers to a melanin whose chemical formula comprises at least one dihydoxyindole (DHI) (e.g., 5,6-dihydroxyindole), at least one dihydroxyindole-2-carboxylic acid (DHICA) (e.g., 5,6-dihydroxyindole-2-carboxylic acid), or a combination of these.

The term "melanin purity" can be used to characterize a collection or plurality of melanin materials (e.g., a plurality of artificial melanin nanoparticles, optionally in a dispersion or formulation) and refers to a relative measure of purity or content of a melanin type (e.g., pheomelanin) corresponding to a given melanin material with respect to all types (e.g., eumelanin, neuromelanin, pyomelanin, allomelanin and pheomelanin) of melanin materials in the collection or plurality of melanin materials. Unless stated otherwise, melanin purity refers the relative purity or content of artificial selenomelanin molecules and materials, or selenomelanin polymers or base units thereof, that are or comprise pheomelanin (in a collection or plurality of melanin or melanin-containing molecules or materials) with respect to all artificial selenomelanin molecules and materials, or selenomelanin polymers or base units thereof, in said collection or plurality. Melanin purity is a quantitative value selected from the range of 0 to 1.

The term "precursor conversion efficiency" characterizes a method or synthesis of a melanin molecule or material and refers to a ratio of moles of produced selenomelanin monomers and selenomelanin base units to moles of a precursor used in said method of synthesis. The precursor refers to a first or a second precursor, such as a selenocystein or a eumelanin.

The term "polydispersity" or "dispersity" refers to a measure of heterogeneity of sizes particles. For example, polydispersity can be used to characterize a width of a particle size distribution (e.g., particle size vs. count or frequency), such as a particle size distribution of artificial melanin nanoparticles. For example, polydispersity may characterize heterogeneity of sizes of artificial melanin nanoparticles, such as artificial melanin nanoparticles in a solvent or artificial melanin nanoparticles in a dry state, such as those forming a film or layer. A "polydispersity index" is a measure of polydispersity. A polydispersity index can be measured using Dynamic Light Scattering (DLS), for example. Particles characterized by a polydispersity index of less than 0.1 are typically referred to as "monodisperse". For example, a polydispersity index (PDI) can be calculated as the square of the standard deviation of the particle size distribution divided by its mean:

$$= \left(\frac{\sigma}{d}\right)^2,$$

where $\sigma$ is standard deviation of the particle size distribution and d is the mean diameter of the particle size distribution. Polydispersity and polydispersity index, as well as techniques for determining these, are further described in "NanoComposix's Guide to Dynamic Light Scattering Measurement and Analysis" [dated February 2015 (version 1.4), published by nanoComposix of San Diego, CA, and available at nanoComposix_Guidelines_for_DLS_Measurements_and_Analysis (last accessed Jun. 26, 2019)], which is incorporated herein by reference. The polydispersity index can also be calculated from electron microscope (SEM and/or TEM) images where the diameter is measured using software such as ImageJ, followed by calculating a mean size of the distribution, and then using the aforementioned equation to calculate the polydispersity index.

The term "nanoparticle" as used herein, refers to a physical particle having at least one size characteristic or physical dimension less than less than 1 μm. Preferably, term "nanoparticle" as used herein, refers to a physical particle whose longest size characteristic or physical dimension is less than 1 μm.

The term "size characteristic" refers to a property, or set of properties, of a particle that directly or indirectly relates to a size attribute. According to some embodiments, a size characteristic corresponds to an empirically-derived size characteristic of a particle(s) being detected, such as a size characteristic based on, determined by, or corresponding to data from any technique or instrument that may be used to determine a particle size, such as electron microscope (e.g., SEM and TEM) or a light scattering technique (e.g., DLS). For example, a size characteristic can correspond to a spherical particle exhibiting similar or substantially same properties, such as aerodynamic, hydrodynamic, optical, and/or electrical properties, as the particle(s) being detected). According to some embodiments, a size characteristic corresponds to a physical dimension, such as a cross-sectional size (e.g., length, width, thickness, or diameter).

The term "particles" refers to small solid objects that may be dispersed and/or suspended in a fluid (e.g., liquid). For example, a slurry, a dispersion, and a suspension each include particles in a fluid. The terms "particle" and "particulate" may be used interchangeably. An exemplary particle is an artificial melanin nanoparticle. A plurality of particles may be associated together to form an agglomerate of particles. Generally, the term "particle", such as "nanoparticle" or "melanin nanoparticle", refers to an individual particle rather than to an agglomerate of such individual particles.

The term "sphericity" may be used to describe a given particle and refers to a ratio of surface area of a sphere (having the same volume as the given particle) to the surface area of the particle. An ideal sphere has a sphericity of 1. For example, an ideal cylinder has a sphericity of approximately 0.874.

The terms "collapsed ellipsoid" optionally refers a structure resembling an ellipsoid that has partially collapsed or imploded, such as a deflated balloon, for example. A collapsed ellipsoid may resemble an ellipsoid having indentations therein. A sphere is an exemplary ellipsoid. A collapsed sphere may resemble, but is not limited to, structures described in Vliegenthart, et al. (G A Vliegenthart and G Gompper, 2011 New J. Phys. 13 045020, DOI 10.1088/1367-2630/13/4/045020). Some walnut-like structures resemble collapsed ellipsoids or ellipsoids having indentations.

The term "dispersed" refers to species, such as particles, in a fluid forming a dispersion. As used herein, the term "dispersion" broadly refers to a mixture of one or more chemical species, such as particles, in a fluid, such as the art-recognized meaning of solution, dispersion, and/or suspension. The chemical species, such as particles, dispersed in a dispersion can be referred as a dispersed species. Preferably, a dispersion is a mixture of particles, such as artificial melanin particles, in a liquid, such as a solvent. Preferably, but not necessarily, a dispersion is a homogeneous mixture. In the context of a dispersion, the term "homogeneous" refers to a liquid mixture that appears uniform to the naked eye. In contrast, a heterogenous liquid mixture includes particles that are precipitated from or suspended in the liquid mixture and are large enough to be distinctly identifiable by the naked eye in the liquid mixture. A heterogeneous liquid mixture includes, for example, sedimented and/or sedimenting particles. Preferably, but not necessarily, the term "dispersion" is broadly intended to include solutions and dispersions, such as colloids, which are not heterogenous liquid mixtures. Preferably, but not necessarily, a dispersion is a microscopically homogenous, or uniform, mixture of particles in a liquid, such as a solvent. Preferably, but not necessarily, a dispersion is thermodynamically favored remain stably dispersed or is thermodynamically favored to segregate by sedimentation but wherein sedimentation is kinetically slowed or prevented. Particles, of a dispersion, that are characterized as stably dispersed remain dispersed in the dispersion and do not sediment or precipitate out of the liquid, of the dispersion, for at least 5 hours, preferably at least 12 hours, preferably at least 24 hours, and more preferably at least 1 week, under normal temperature and pressure (NTP) and exposure to air. In embodiments, particles that are not or cannot be dispersed in a fluid refer to particles that form precipitates or sediments upon being mixed in the fluid.

The term "size stable" refers to stability of particles in a dispersion with respect to a size characteristic of said particles. Preferably, particles in a dispersion characterized as size stable are characterized by a size characteristic being within 50%, within 40%, within 30%, preferably within 20%, more preferably within 15%, still more preferably within 10%, further more preferably within 5%, or equivalent to a reference or initial size characteristic, under given conditions and optionally for a given time. For example, nanoparticles of a dispersion characterized as size-stable in the dispersion having a pH of at least 11, with respect to an average size of the nanoparticle in the dispersion having a pH of 7, have an average size in the pH 11 dispersion that is within 50%, within 40%, within 30%, preferably within 20%, more preferably within 15%, still more preferably within 10%, further more preferably within 5%, or equivalent to an average size of the otherwise equivalent nanoparticles in the otherwise equivalent dispersion having a pH of 7. Preferably, but not necessarily, nanoparticles characterized as size stable as so size stable for time that is at least 1 hour to 5 hours, preferably at least 5 hours to 12 hours, more preferably at least 12 hours to 1 week, still more preferably at least 1 week.

The term "structural color" refers to the generation of color due to interference of visible light structural features, such as a film or layer or a microstructured surface. A layer of melanin nanoparticles may exhibit color due to interference of visible light with the microstructure of the layer, rather than solely due to pigmentation. Without wishing to be bound by any particular theory, the effect of structural color can enable a spectrum on non-fading, non-photobleaching colors which can be iridescent or non-iridescent. Without wishing to be bound by any particular theory, high refractive index of melanin and synthetic melanin, and its broadband absorption across the visible spectrum allows it to interact with light in such a way that a multitude of colors are produced.

The term "peak size" size refers to the statistical mode, or peak frequency, of a particle size distribution, or the particle size most commonly found in the particle size distribution. A particle size distribution can be measured using dynamic light scattering, for example.

The term "sphere" as used herein, in the usual and customary sense, refers to a round or substantially round geometrical object in three-dimensional space that is substantially the surface of a completely round ball, analogous to a circular object in two dimensions. A sphere may be defined mathematically as the set of points that are all at the same or substantially all at the same distance r from a given point, but in three-dimensional space, where r is the radius of the mathematical ball and the given point is the center or substantially the center of the mathematical ball. In embodiments, the longest straight line through the ball, connecting two points of the sphere, passes through the center and its length is thus twice the radius, it is a diameter of the ball. A nanosphere is a nanoparticle having a radius of less than 1 μm.

The terms "ultraviolet induced damage" and "UV induced damage" as used interchangeably herein refer, in the usual and customary sense, to chemical changes attending irradiation of light of sufficient energy. UV induced damage can include scission of nucleic acids (e.g., DNA or RNA), and breaking of bonds in proteins, lipids, and other physiological molecules. For example, the damage can be damage resulting from reactive oxygen species (ROS).

The terms "reactive oxygen species" and "ROS" as used interchangeably herein refer, in the usual and customary sense, to transient species, typically formed during exposure to radiation (e.g., UV irradiation) capable of inducing oxidative decomposition.

The terms "cell" and "biological cell" are used interchangeably are refer to a cell carrying out metabolic or other function sufficient to preserve or replicate its genomic DNA. A cell can be identified by well-known methods in the art including, for example, presence of an intact membrane, staining by a particular dye, ability to produce progeny or, in the case of a gamete, ability to combine with a second gamete to produce a viable offspring. Cells may include prokaryotic and eukaryotic cells. Prokaryotic cells include but are not limited to bacteria. Eukaryotic cells include but are not limited to yeast cells and cells derived from plants and animals, for example mammalian, insect (e.g., *spodoptera*) and human cells. A "viable cell" is a living biological cell.

The term "self-assembly" refers to a process in which individual elements assemble into a network or organized structure without external direction. In an embodiment, self-assembly leads to a decrease in entropy of a system. In an embodiment, self-assembly may be induced, or initiated, via contacting or reacting the individual elements, optionally at a certain critical concentration, and/or via temperature and/or via pressure. A "self-assembled structure" is a structure or network formed by self-assembly. In an embodiment, self-assembly is a polymer crystallization process. The Gibbs free energy of the self-assembled structure is lower than of the sum of the individual components in their non-organized arrangement prior to self-assembly under otherwise identical conditions (e.g., temperature and pressure). In an embodiment, entropy of a self-assembled structure is lower than that of the sum of the individual components in their non-organized arrangement prior to self-assembly under otherwise identical conditions (e.g., temperature and pressure). For example, artificial melanin nanoparticles of this disclosure can form by self-assembly of a plurality of oligomers and/or melanin monomers. For example, structures or layers (e.g., films) for artificial melanin nanoparticles may form by self-assembly, such as structures or layers formed of artificial melanin nanoparticles and exhibiting structural color.

The term "substantially" refers to a property, condition, or value that is within 20%, 10%, within 5%, within 1%, optionally within 0.1%, or is equivalent to a reference property, condition, or value. The term "substantially equal", "substantially equivalent", or "substantially unchanged", when used in conjunction with a reference value describing a property or condition, refers to a value that is within 20%, within 10%, optionally within 5%, optionally within 1%, optionally within 0.1%, or optionally is equivalent to the provided reference value. For example, a diameter is substantially equal to 100 nm (or, "is substantially 100 nm") if the value of the diameter is within 20%, optionally within 10%, optionally within 5%, optionally within 1%, within 0.1%, or optionally equal to 100 nm. The term "substantially greater", when used in conjunction with a reference value describing a property or condition, refers to a value that is at least 1%, optionally at least 5%, optionally at least 10%, or optionally at least 20% greater than the provided reference value. The term "substantially less", when used in conjunction with a reference value describing a property or condition, refers to a value that is at least 1%, optionally at least 5%, optionally at least 10%, or optionally at least 20% less than the provided reference value.

The terms "keratinocyte" and "keratinocytes" as used herein, refer to the predominant cell type in the epidermis, the outermost layer of the skin, constituting the majority (e.g., 90%-95%) of the cells found there. Keratinocytes are found in the deepest basal layer of the stratified epithelium that comprises the epidermis, and are sometimes referred to as basal cells or basal keratinocytes. Keratinocytes are maintained at various stages of differentiation in the epidermis and are responsible for forming tight junctions with the nerves of the skin. They also keep Langerhans cells of the epidermis and lymphocytes of the dermis in place. Keratinocytes contribute to protecting the body from UV radiation by taking up melanosomes. Keratinocytes contribute to protecting the body from UV radiation by taking up melanosomes, vesicles containing the endogenous photoprotectant melanin, from epidermal melanocytes. Each melanocyte in the epidermis has several dendrites that stretch out to connect it with many keratinocytes. The melanin is then stored within keratinocytes and melanocytes in the perinuclear area as "supranuclear caps", where it protects the DNA from UV-induced damage. In embodiments, the terms "supranuclear cap" and "perinuclear cap" are used interchangeably and intended to have the same meaning. In addition to their structural role, keratinocytes play a role in immune system function. The skin is the first line of defense and keratinocytes serve as a barrier between an organism and its environment. In addition to preventing toxins and pathogens from entering an organisms body, they prevent the loss of moisture, heat and other important constituents of the body. In addition to their physical role, keratinocytes serve a chemical immune role as immunomodulaters, responsible for secreting inhibitory cytokines in the absence of injury and stimulating inflammation and activating Langerhans cells in response to injury. Langerhans cells serve as antigen-presenting cells when there is a skin infection and are the first cells to process microbial antigens entering the body from a skin breach.

The terms "under conditions suitable to afford uptake", "taken up" and "take up" as used herein, refer, in the usual and customary sense, to experimental conditions well known in the art which allow uptake (e.g., endocytosis) of a species into a cell. In some embodiments, the term "internalized" when referring to particles internalized in or by a biological cell, refers to particles taken up by the biological cell, such as by, but not limited to, formation of perinuclear caps.

The term "endocytosis" as used herein, refers to a form of active transport in which a cell transports molecules (such as proteins) into the cell by engulfing them in an energy-using process. Endocytosis includes pinocytosis and phagocytosis. Pinocytosis is a mode of endocytosis in which small particles are brought into the cell, forming an invagination, and then suspended within small vesicles. These pinocytotic vesicles subsequently fuse with lysosomes to hydrolyze (break down) the particles. Phagocytosis is the process by which a cell engulfs a solid particle to form an internal compartment known as a phagosome.

The terms "treating" or "treatment" as used herein, refers to any indicia of success in the treatment or amelioration of an injury, disease, pathology or condition, including any objective or subjective parameter such as abatement; remission; diminishing of symptoms or making the injury, pathology or condition more tolerable to the patient; slowing in the rate of degeneration or decline; making the final point of degeneration less debilitating; improving a patient's physical or mental well-being. The treatment or amelioration of symptoms can be based on objective or subjective parameters; including the results of a physical examination, neuropsychiatric exams, and/or a psychiatric evaluation. The term "treating," and conjugations thereof, include prevention of an injury, pathology, condition, or disease.

The term "effective amount" as used herein, refers to an amount sufficient to accomplish a stated purpose (e.g. Achieve the effect for which it is administered, treat a disease, reduce one or more symptoms of a disease or condition, and the like). An example of an "effective amount" is an amount sufficient to contribute to the treatment, prevention, or reduction of a symptom or symptoms of a disease, which could also be referred to as a "therapeutically effective amount." A "reduction" of a symptom or symptoms (and grammatical equivalents of this phrase) means decreasing of the severity or frequency of the symptom(s), or elimination of the symptom(s). A "prophylactically effective amount" of a drug is an amount of a drug that, when administered to a subject, will have the intended prophylactic effect, e.g., preventing or delaying the onset (or reoccurrence) of an injury, disease, pathology or condition, or reducing the likelihood of the onset (or reoccurrence) of an injury, disease, pathology, or condition, or their symptoms. The full prophylactic effect does not necessarily occur by administration of one dose, and may occur only after administration of a series of doses. Thus, a prophylactically effective amount may be administered in one or more administrations. The exact amounts will depend on the purpose of the treatment, and will be ascertainable by one skilled in the art using known techniques (see, e.g., Lieberman, Pharmaceutical Dosage Forms (vols. 1-3, 1992); Lloyd, The Art, Science and Technology of Pharmaceutical Compounding (1999); Pickar, Dosage Calculations (1999); and Remington: The Science and Practice of Pharmacy, 20th Edition, 2003, Gennaro, Ed., Lippincott, Williams & Wilkins).

The term "administering" as used herein, refers to oral administration, administration as an inhaled aerosol or as an inhaled dry powder, suppository, topical contact, intravenous, parenteral, intraperitoneal, intramuscular, intralcsional, intrathecal, intranasal or subcutaneous administration, or the implantation of a slow-release device, e.g., a mini-osmotic pump, to a subject. Administration is by any route, including parenteral and transmucosal (e.g., buccal, sublingual, palatal, gingival, nasal, vaginal, rectal, or transdermal). Parenteral administration includes, e.g., intravenous, intramuscular, intra-arteriole, intradermal, subcutaneous, intraperitoneal, intraventricular, and intracranial. Other modes of delivery include, but are not limited to, the use of liposomal formulations, intravenous infusion, transdermal patches, etc. By "co-administer" it is meant that a composition described herein is administered at the same time, just prior to, or just after the administration of one or more additional therapies, for example cancer therapies such as chemotherapy, hormonal therapy, radiotherapy, or immunotherapy. The compound of the invention can be administered alone or can be co-administered to the patient. Co-administration is meant to include simultaneous or sequential administration of the compound individually or in combination (more than one compound or agent). The compositions of the present invention can be delivered transdermally, by a topical route, formulated as applicator sticks, solutions, suspensions, emulsions, gels, creams, ointments, pastes, jellies, paints, powders, and aerosols. Oral preparations include tablets, pills, powder, dragees, capsules, liquids, lozenges, cachets, gels, syrups, slurries, suspensions, etc., suitable for ingestion by the patient. Solid form preparations include powders, tablets, pills, capsules, cachets, suppositories, and dispersible granules. Liquid form preparations include solutions, suspensions, and emulsions, for example, water or water/propylene glycol solutions. The compositions of the present invention may additionally include components to provide sustained release and/or comfort. Such components include high molecular weight, anionic mucomimetic polymers, gelling polysaccharides and finely-divided drug carrier substrates. These components are discussed in greater detail in U.S. Pat. Nos. 4,911,920; 5,403,841; 5,212,162; and 4,861,760. The entire contents of these patents are incorporated herein by reference in their entirety for all purposes. The compositions of the present invention can also be delivered as microspheres for slow release in the body. For example, microspheres can be administered via intradermal injection of drug-containing microspheres, which slowly release subcutaneously (see Rao, J Biomater Sci. Polym. Ed. 7:623-645, 1995; as biodegradable and injectable gel formulations (see, e.g., Gao Pharm. Res. 12:857-863, 1995); or, as microspheres for oral administration (see, e.g., Eyles, J Pharm. Pharmacol. 49:669-674, 1997). In another embodiment, the formulations of the compositions of the present invention can be delivered by the use of liposomes which fuse with the cellular membrane or are endocytosed, i.e., by employing receptor ligands attached to the liposome, that bind to surface membrane protein receptors of the cell resulting in endocytosis. By using liposomes, particularly where the liposome surface carries receptor ligands specific for target cells, or are otherwise preferentially directed to a specific organ, one can focus the delivery of the compositions of the present invention into the target cells in vivo. (See, e.g., Al-Muhammed, J. Microencapsul. 13:293306, 1996; Chonn, Curr. Opin. Biotechnol. 6:698-708, 1995; Qstio, Am. J Hasp. Pharm. 46: 1576-1587, 1989).

The term "contacting" may include allowing two species to react, interact, or physically touch, wherein the two species may be, for example, a pharmaceutical composition as provided herein and a cell. In embodiments contacting includes, for example, allowing a pharmaceutical composition as described herein to interact with a cell or a patient.

The terms "analog" and "analogue" are used interchangeably and are used in accordance with their plain ordinary meaning within Chemistry and Biology and refers to a chemical compound that is structurally similar to another compound (i.e., a so-called "reference" compound) but differs in composition, e.g., in the replacement of one atom by an atom of a different element, or in the presence of a particular functional group, or the replacement of one functional group by another functional group, or the absolute stereochemistry of one or more chiral centers of the reference compound, including isomers thereof. Accordingly, an analog is a compound that is similar or comparable in function and appearance but not in structure or origin to a reference compound.

Except where otherwise specified, the term "molecular weight" refers to an average molecular weight. Except where otherwise specified, the term "average molecular weight," refers to number-average molecular weight. Number average molecular weight is defined as the total weight of a sample volume divided by the number of molecules within the sample. As is customary and well known in the art, peak average molecular weight and weight average molecular weight may also be used to characterize the molecular weight of the distribution of polymers within a sample.

The term "weight-average molecular weight" ($M_w$) refers to the average molecular weight defined as the sum of the products of the molecular weight of each polymer molecule ($M_i$) multiplied by its weight fraction ($w_i$): $M_w=\Sigma w_i M_i$. As is customary and well known in the art, peak average molecular weight and number average molecular weight may also be used to characterize the molecular weight of the distribution of polymers within a sample.

The term "wt. %" or "wt %" refers to a weight percent, or a mass fraction represented as a percentage by mass. The term "at. %" or "at %" refers to an atomic percent, or an atomic ratio represented as a percentage of a type of atom with respect to total atoms in a given matter, such as a molecule, compound, material, nanoparticle, polymer, dispersion, etc.

The term "oligomerization" refers to a chemical process of converting a monomer or a mixture of monomers into an oligomer. The term "oxidative oligomerization" refers to a chemical process of oligomerization that includes chemical oxidation of one or more monomers to form an oligomer. An oligomerization is a polymerization process, wherein an oligomer is formed as a result of the polymerization.

As used herein, the term "polymer" refers to a molecule composed of repeating structural units connected by covalent chemical bonds often characterized by a number of repeating units, also referred to as base units (e.g., greater than or equal to 2 base units). As used herein, a term "polymer" is inclusive of an "oligomer" (i.e., an oligomer is a polymer; i.e., a polymer is optionally an oligomer). An "oligomer" refers to a molecule composed of repeating structural units, also referred to as base units, connected by covalent chemical bonds often characterized by a number of repeating units less such that the oligomer is a low molecular weight polymer. Preferably, but not necessarily, for example, an oligomer has equal to or less than 100 repeating units. Preferably, but not necessarily, for example, an oligomer has a lower molecular weight less than or equal to 10,000 Da. Oligomers may be the polymerization product of one or more monomer precursors. Polymerization of one or more monomers, or monomer precursors, resulting in formation of an oligomer may be referred to as oligomerization. An oligomer optionally includes 100 or less, 50 or less, 15 or less, 12 or less, 10 or less, or 5 or less repeating units (or, “base units”). An oligomer may be characterized has having a molecular weight of 10,000 Da or less, 5,000 Da or less, 1,000 Da or less, 500 Da or less, or 200 Da or less. A dimer, a trimer, a tetramer, or a pentamer is an oligomer having two, three, four, or five, respectively, repeating units, or base units. Polymers can have, for example, greater than 100 repeating units. Polymers can have, for example, a high molecular weight, such as greater than 10,000 Da, in some embodiments greater than or equal to 50,000 Da or greater than or equal to 100,000 Da. The term polymer includes homopolymers, or polymers consisting essentially of a single repeating monomer subunit. The term polymer also includes copolymers which are formed when two or more different types of monomers are linked in the same polymer. Copolymers may comprise two or more monomer subunits, and include random, block, brush, brush block, alternating, segmented, grafted, tapered and other architectures. Useful polymers include organic polymers or inorganic polymers that may be in amorphous, semi-amorphous, crystalline or semi-crystalline states. Polymer side chains capable of cross linking polymers (e.g., physical cross linking) may be useful for some applications.

As used herein, the term “group” may refer to a functional group of a chemical compound. Groups of the present compounds refer to an atom or a collection of atoms that are a part of the compound. Groups of the present invention may be attached to other atoms of the compound via one or more covalent bonds. Groups may also be characterized with respect to their valence state. The present invention includes groups characterized as monovalent, divalent, trivalent, etc. valence states.

The term “moiety” refers to a group, such as a functional group, of a chemical compound or molecule. A moiety is a collection of atoms that are part of the chemical compound or molecule. The present invention includes moieties characterized as monovalent, divalent, trivalent, etc. valence states. Generally, but not necessarily, a moiety comprises more than one functional group.

As used herein, the term “substituted” refers to a compound wherein one or more hydrogens is replaced by another functional group, provided that the designated atom’s normal valence is not exceeded. An exemplary substituent includes, but is not limited to: a halogen or halide, an alkyl, a cycloalkyl, an aryl, a heteroaryl, an acyl, an alkoxy, an alkenyl, an alkynyl, an alkylaryl, an arylene, a heteroarylene, an alkenylene, a cycloalkenylene, an alkynylene, a hydroxyl (—OH), a carbonyl (RCOR'), a sulfide (e.g., RSR'), a phosphate ($ROP({=}O)(OH)_2$), an azo (RNNR'), a cyanate (ROCN), an amine (e.g., primary, secondary, or tertiary), an imine (RC(=NH)R'), a nitrile (RCN), a pyridinyl (or pyridyl), a diamine, a triamine, an azide, a diimine, a triimine, an amide, a diimide, or an ether (ROR'); where each of R and R' is independently a hydrogen or a substituted or unsubstituted alkyl group, aryl group, alkenyl group, or a combination of these. Optional substituent functional groups are also described below. In some embodiments, the term substituted refers to a compound wherein each of more than one hydrogen is replaced by another functional group, such as a halogen group. For example, when the substituent is oxo (i.e., =O), then two hydrogens on the atom are replaced. The substituent group can be any substituent group described herein. For example, substituent groups can include one or more of a hydroxyl, an amino (e.g., primary, secondary, or tertiary), an aldehyde, a carboxylic acid, an ester, an amide, a ketone, nitro, an urea, a guanidine, cyano, fluoroalkyl (e.g., trifluoromethane), halo (e.g., fluoro), aryl (e.g., phenyl), heterocyclyl or heterocyclic group (i.e., cyclic group, e.g., aromatic (e.g., heteroaryl) or non-aromatic where the cyclic group has one or more heteroatoms), oxo, or combinations thereof. Combinations of substituents and/or variables are permissible provided that the substitutions do not significantly adversely affect synthesis or use of the compound.

As used herein, the term “derivative” refers to a compound wherein an atom or functional group is replaced by another atom or functional group (e.g., a substituent function group as also described below), including, but not limited to: a hydrogen, a halogen or halide, an alkyl, a cycloalkyl, an aryl, a heteroaryl, an acyl, an alkoxy, an alkenyl, an alkynyl, an alkylaryl, an arylene, a heteroarylene, an alkenylene, a cycloalkenylene, an alkynylene, a hydroxyl (—OH), a carbonyl (RCOR'), a sulfide (e.g., RSR'), a phosphate ($ROP({=}O)(OH)_2$), an azo (RNNR'), a cyanate (ROCN), an amine (e.g., primary, secondary, or tertiary), an imine (RC(=NH)R'), a nitrile (RCN), a pyridinyl (or pyridyl), a diamine, a triamine, an azide, a diimine, a triimine, an amide, a diimide, or an ether (ROR'); where each of R and R' is independently a hydrogen or a substituted or unsubstituted alkyl group, aryl group, alkenyl group, or a combination of these. Optional substituent functional groups are also described below. Preferably, the term “derivative” refers to a compound wherein one or two atoms or functional groups are independently replaced by another atom or functional group. Preferably, the term derivative does not refer to or include replacement of a chalcogen atom (S, Se) that is a member of a heterocyclic group. Preferably, and unless otherwise stated, the term derivative does not refer to or include replacement of a chalcogen atom (S, Se) nor a N (nitrogen) where the chalcogen atom and the N are members same heterocyclic group. Preferably, but not necessarily, the term derivative does not include breaking a ring structure, replacement of a ring member, or removal of a ring member.

As is customary and well known in the art, hydrogen atoms in formulas, such as but not limited to in formula FX1, are not always explicitly shown, for example, hydrogen atoms bonded to the carbon atoms of aromatic, heteroaromatic, and alicyclic rings are not always explicitly shown. The structures provided herein, for example in the context of the description of formula (FX1) and schematics and structures in the drawings, are intended to convey to one of reasonable skill in the art the chemical composition of compounds of the methods and compositions of the invention, and as will be understood by one of skill in the art, the structures provided do not indicate the specific positions and/or orientations of atoms and the corresponding bond angles between atoms of these compounds.

As used herein, the terms “alkylene” and “alkylene group” are used synonymously and refer to a divalent group derived from an alkyl group as defined herein. The invention includes compounds having one or more alkylene groups. Alkylene groups in some compounds function as linking and/or spacer groups. Compounds of the invention may have substituted and/or unsubstituted $C_1$-$C_{20}$ alkylene, $C_1$-$C_{10}$ alkylene and $C_1$-$C_5$ alkylene groups, for example, as one or more linking groups (e.g. $L^1$-$L^6$).

As used herein, the terms “cycloalkylene” and “cycloalkylene group” are used synonymously and refer to a divalent group derived from a cycloalkyl group as defined herein. The invention includes compounds having one or more cycloalkylene groups. Cycloalkyl groups in some compounds function as linking and/or spacer groups. Compounds of the invention may have substituted and/or unsubstituted $C_3$-$C_{20}$cycloalkylene, $C_3$-$C_{10}$ cycloalkylene and $C_3$-$C_5$ cycloalkylene groups, for example, as one or more linking groups (e.g. $L^1$-$L^6$).

As used herein, the terms "arylene" and "arylene group" are used synonymously and refer to a divalent group derived from an aryl group as defined herein. The invention includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as linking and/or spacer groups. Arylene groups in some compounds function as chromophore, fluorophore, aromatic antenna, dye and/or imaging groups. Compounds of the invention include substituted and/or unsubstituted $C_3$-$C_{30}$ arylene, $C_3$-$C_{20}$ arylene, $C_3$-$C_{10}$ arylene and $C_1$-$C_5$ arylene groups, for example, as one or more linking groups (e.g. $L^1$-$L^6$).

As used herein, the terms "heteroarylene" and "heteroarylene group" are used synonymously and refer to a divalent group derived from a heteroaryl group as defined herein. The invention includes compounds having one or more heteroarylene groups. In an embodiment, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as linking and/or spacer groups. Heteroarylene groups in some compounds function as chromophore, aromatic antenna, fluorophore, dye and/or imaging groups. Compounds of the invention include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups, for example, as one or more linking groups (e.g. $L^1$-$L^6$).

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as linking and/or spacer groups. Compounds of the invention include substituted and/or unsubstituted $C_2$-$C_{20}$ alkenylene, $C_2$-$C_{10}$ alkenylene and $C_2$-$C_5$ alkenylene groups, for example, as one or more linking groups (e.g. $L^1$-$L^6$).

As used herein, the terms "cylcoalkenylene" and "cylcoalkenylene group" are used synonymously and refer to a divalent group derived from a cylcoalkenyl group as defined herein. The invention includes compounds having one or more cylcoalkenylene groups. Cycloalkenylene groups in some compounds function as linking and/or spacer groups. Compounds of the invention include substituted and/or unsubstituted $C_3$-$C_{20}$ cylcoalkenylene, $C_3$-$C_{10}$ cylcoalkenylene and $C_3$-$C_5$ cylcoalkenylene groups, for example, as one or more linking groups (e.g. $L^1$-$L^6$).

As used herein, the terms "alkynylene" and "alkynylene group" are used synonymously and refer to a divalent group derived from an alkynyl group as defined herein. The invention includes compounds having one or more alkynylene groups. Alkynylene groups in some compounds function as linking and/or spacer groups. Compounds of the invention include substituted and/or unsubstituted $C_2$-$C_{20}$ alkynylene, $C_2$-$C_{10}$ alkynylene and $C_2$-$C_5$ alkynylene groups, for example, as one or more linking groups (e.g. $L^1$-$L^6$).

As used herein, the term "halo" refers to a halogen group such as a fluoro (—F), chloro (—Cl), bromo (—Br), iodo (—I) or astato (—At).

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and functional groups, for example, provided as substituents.

The term "carbocyclic" refers to ring structures containing only carbon atoms in the ring. Carbon atoms of carbocyclic rings can be bonded to a wide range of other atoms and functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)$_n$-alkoxy wherein n is an integer from 1 to 10, preferably 1 to 4, and more preferably for some embodiments 1 to 3.

Amino acids include glycine, alanine, valine, leucine, isoleucine, methionine, proline, phenylalanine, tryptophan, asparagine, glutamine, glycine, serine, threonine, serine, rhreonine, asparagine, glutamine, tyrosine, cysteine, lysine, arginine, histidine, aspartic acid and glutamic acid. As used herein, reference to "a side chain residue of a natural α-amino acid" specifically includes the side chains of the above-referenced amino acids. Peptides and peptide moieties, as used and described herein, comprise two or more amino acid groups connected via peptide bonds.

Amino acids and amino acid groups refer to naturally-occurring amino acids, unnatural (non-naturally occurring) amino acids, and/or combinations of these. Naturally-occurring amino acids are those encoded by the genetic code, as well as those amino acids that are later modified, e.g., hydroxyproline, γ-carboxyglutamate, and O-phosphoserine. Naturally-occurring α-amino acids include, without limitation, alanine (Ala), cysteine (Cys), aspartic acid (Asp), glutamic acid (Glu), phenylalanine (Phe), glycine (Gly), histidine (His), isoleucine (lie), arginine (Arg), lysine (Lys), leucine (Leu), methionine (Met), asparagine (Asn), proline (Pro), glutamine (Gln), serine (Ser), threonine (Thr), valine (Val), tryptophan (Trp), tyrosine (Tyr), and combinations thereof. Stereoisomers of a naturally-occurring α-amino acids include, without limitation, D-alanine (D-Ala), D-cysteine (D-Cys), D-aspartic acid (D-Asp), D-glutamic acid (D-Glu), D-phenylalanine (D-Phe), D-histidine (D-His), D-isoleucine (D-Ile), D-arginine (D-Arg), D-lysine (D-Lys), D-leucine (D-Leu), D-methionine (D-Met), D-asparagine (D-Asn), D-proline (D-Pro), D-glutamine (D-Gln), D-serine (D-Ser), D-threonine (D-Thr), D-valine (D-Val), D-tryptophan (D-Trp), D-tyrosine (D-Tyr), and combinations thereof.

Unnatural (non-naturally occurring) amino acids include, without limitation, amino acid analogs, amino acid mimetics, synthetic amino acids, N-substituted glycines, and N-methyl amino acids in either the L- or D-configuration that function in a manner similar to the naturally-occurring amino acids. For example, "amino acid analogs" can be unnatural amino acids that have the same basic chemical structure as naturally-occurring amino acids (i.e., a carbon that is bonded to a hydrogen, a carboxyl group, an amino group) but have modified side-chain groups or modified peptide backbones, e.g., homoserine, norleucine, methionine sulfoxide, methionine methyl sulfonium. "Amino acid mimetics" refer to chemical compounds that have a structure that is different from the general chemical structure of an amino acid, but that functions in a manner similar to a naturally-occurring amino acid. Amino acids may be referred to herein by either the commonly known three letter symbols or by the one-letter symbols recommended by the IUPAC-IUB Biochemical Nomenclature Commission.

The terms "monomer" or "polymerizable monomer" can be used interchangeably and refer to a monomer precursor capable of undergoing polymerization as described herein to form a polymer according to embodiments described herein. The term "polymerizable monomer" is also interchangeably referred to herein as a "monomer precursor." Generally, the "monomer" or "polymerizable monomer" comprises an olefin capable of undergoing polymerization as described herein.

The terms "monomer unit," "repeating monomer unit," "repeating unit," and "polymerized monomer" can be used interchangeably and refer to a monomeric portion of a polymer described herein which is derived from or is a product of polymerization of one individual "monomer" or "polymerizable monomer." Each individual monomer unit of a polymer is derived from or is a product of polymerization of one polymerizable monomer. Each individual "monomer unit" or "repeating unit" of a polymer comprises one (polymerized) polymer backbone group. For example, in a polymer that comprises monomer units X and Y arranged as X—Y—X—Y—X—Y—X—Y (where each X is identical to each other X and each Y is identical to each other Y), each X and each Y is independently can be referred to as a repeating unit or monomer unit.

Alkyl groups include straight-chain, branched and cyclic alkyl groups. Alkyl groups include those having from 1 to 30 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having $10^{-30}$ carbon atoms. The term cycloalkyl specifically refers to an alky group having a ring structure such as ring structure comprising 3-30 carbon atoms, optionally 3-20 carbon atoms and optionally 2-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, 7-, or 8-member ring(s). The carbon rings in cycloalkyl groups can also carry alkyl groups. Cycloalkyl groups can include bicyclic and tricycloalkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups. As used herein MeO— refers to $CH_3O$—. Compositions of some embodiments of the invention comprise alkyl groups as terminating groups, such as polymer backbone terminating groups and/or polymer side chain terminating groups. Substituted alkyl groups may include substitution to incorporate one or more silyl groups, for example wherein one or more carbons are replaced by Si.

Alkenyl groups include straight-chain, branched and cyclic alkenyl groups. Alkenyl groups include those having 1, 2 or more double bonds and those in which two or more of the double bonds are conjugated double bonds. Alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having $10^{-20}$ carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6- or 7-member ring(s). The carbon rings in cycloalkenyl groups can also carry alkyl groups. Cycloalkenyl groups can include bicyclic and tricyclic alkenyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms. Compositions of some embodiments of the invention comprise alkenyl groups as terminating groups, such as polymer backbone terminating groups and/or polymer side chain terminating groups.

Aryl groups include groups having one or more 5-, 6-7-, or 8-member aromatic rings, including heterocyclic aromatic rings. The term heteroaryl specifically refers to aryl groups having at least one 5-, 6-7-, or 8-member heterocyclic aromatic rings. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein are provided in a covalently bonded configuration in the compounds of the invention at any suitable point of attachment. In embodiments, aryl groups contain between 5 and 30 carbon atoms. In embodiments, aryl groups contain one aromatic or heteroaromatic six-member ring and one or more additional five- or six-member aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents. Compositions of some embodiments of the invention comprise aryl groups as terminating groups, such as polymer backbone terminating groups and/or polymer side chain terminating groups.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms. Compositions of some embodiments of the invention comprise arylalkyl groups as terminating groups, such as polymer backbone terminating groups and/or polymer side chain terminating groups.

As to any of the groups described herein which contain one or more substituents, it is understood that such groups do not contain any substitution or substitution patterns which are sterically impractical and/or synthetically nonfeasible. In addition, the compounds of this invention include all stereochemical isomers arising from the substitution of these compounds. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for any alkyl, alkenyl and aryl group includes substitution with one or more of the following substituents, among others:

halogen, including fluorine, chlorine, bromine or iodine;

pseudohalides, including —CN;

—COOR where R is a hydrogen or an alkyl group or an aryl group and more specifically where R is a methyl, ethyl, propyl, butyl, or phenyl group all of which groups are optionally substituted;

—COR where R is a hydrogen or an alkyl group or an aryl group and more specifically where R is a methyl, ethyl, propyl, butyl, or phenyl group all of which groups are optionally substituted;

—$CON(R)_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—$OCON(R)_2$ where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—$N(R)_2$ where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring which can contain one or more double bonds and can contain one or more additional carbon atoms;

—SR, where R is hydrogen or an alkyl group or an aryl group and more specifically where R is hydrogen, methyl, ethyl, propyl, butyl, or a phenyl group, which are optionally substituted;

—$SO_2R$, or —SOR where R is an alkyl group or an aryl group and more specifically where R is a methyl, ethyl, propyl, butyl, or phenyl group, all of which are optionally substituted;

—OCOOR where R is an alkyl group or an aryl group;

—$SO_2N(R)_2$ where each R, independently of each other R, is a hydrogen, or an alkyl group, or an aryl group all of which are optionally substituted and wherein R and R can form a ring which can contain one or more double bonds and can contain one or more additional carbon atoms; and —OR where R is H, an alkyl group, an aryl group, or an acyl group all of which are optionally substituted. In a particular example R can be an acyl yielding —OCOR" where R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups which contain one or more substituents, it is understood that such groups do not contain any substitution or substitution patterns which are sterically impractical and/or synthetically non-feasible.

Many of the molecules disclosed herein contain one or more ionizable groups. Ionizable groups include groups from which a proton can be removed (e.g., —COOH) or added (e.g., amines) and groups that can be quaternized (e.g., amines). All possible ionic forms of such molecules and salts thereof are intended to be included individually in the disclosure herein. With regard to salts of the compounds herein, one of ordinary skill in the art can select from among a wide variety of available counterions that are appropriate for preparation of salts of this invention for a given application. In specific applications, the selection of a given anion or cation for preparation of a salt can result in increased or decreased solubility of that salt.

The compounds of this invention can contain one or more chiral centers. Accordingly, this invention is intended to include racemic mixtures, diastereomers, enantiomers, tautomers and mixtures enriched in one or more stereoisomer. The scope of the invention as described and claimed encompasses the racemic forms of the compounds as well as the individual enantiomers and non-racemic mixtures thereof.

As used herein, the term "isomers" refers to compounds having the same number and kind of atoms, and hence the same molecular weight, but differing in respect to the structural arrangement or configuration of the atoms.

The term "tautomer," as used herein, refers to one of two or more structural isomers which exist in equilibrium and which are readily converted from one isomeric form to another. It will be apparent to one skilled in the art that certain compounds of this invention may exist in tautomeric forms, all such tautomeric forms of the compounds being within the scope of the invention.

Unless otherwise stated, structures depicted herein are also meant to include all stereochemical forms of the structure; i.e., the R and S configurations for each asymmetric center. Therefore, single stereochemical isomers as well as enantiomeric and diastereomeric mixtures of the present compounds are within the scope of the invention.

Unless otherwise stated, structures depicted herein are also meant to include compounds which differ only in the presence of one or more isotopically enriched atoms. For example, compounds having the present structures except for the replacement of a hydrogen by a deuterium or tritium, or the replacement of a carbon by $^{13}C$- or $^{14}C$-enriched carbon are within the scope of this invention.

The compounds of the present invention may also contain unnatural proportions of atomic isotopes at one or more of the atoms that constitute such compounds. For example, the compounds may be radiolabeled with radioactive isotopes, such as for example tritium ($^3H$), iodine-125 ($^{125}I$), or carbon-14 ($^{14}C$). All isotopic variations of the compounds of the present invention, whether radioactive or not, are encompassed within the scope of the present invention.

The symbol "∿" denotes the point of attachment of one or more chemical moieties, one or more functional groups, one or more atoms, one or more ions, an unpaired electron, or one or more other chemical species to the represented molecule, compound, or chemical formula. For example, in the formula

,

"X" represents a molecule or compound, the symbol "∿" denotes a point of attachment of one or more chemical moieties, one or more functional groups, one or more atoms, one or more ions, an unpaired electron, or one or more other chemical species to X (where X corresponds to the represented molecule, compound, or chemical formula) via covalent bonding, wherein the covalent bonding can be any feasible covalent bond, including, but not limited to, a single bond, a double bond, or a triple bond. As an illustrative example, in the moiety

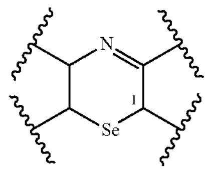
, the carbon labeled "1" has point of attachment which can be a double bond to another species, such a double bond to an oxygen, or two single bonds to two independent species, such as two distinct single bonds each to a hydrogen. As another illustrative example, when two points of attachment are shown on a single atom of a molecule, such as in the moiety

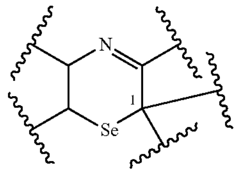 [SMILES: *C1=NC(*)C(*)[Se]C1(*)*]

where the carbon labeled "1" has two points of attachment shown, the shown points of attachment on the same single atom (e.g., carbon 1), can be interpreted as representing either a preferable embodiment of two distinct bonds to that same single atom (e.g., two hydrogens bonded to carbon 1) or an optional embodiment of a single point of attachment to said same single atom (e.g., the two points of attachment on carbon 1 can optionally be consolidated as representing one double to carbon 1, such as a double bond to oxygen). As used herein, the various functional groups represented will be understood to have a point of attachment at the functional group having the hyphen or dash (—) or a dash used in combination with an asterisk (*). In other words, in the case of $—CH_2CH_2CH_3$ or $—CH_2CH_2CH_3$, it will be understood that the point of attachment is the $CH_2$ group at the far left. If a group is recited without an asterisk or a dash, then the attachment point is indicated by the plain and ordinary meaning of the recited group.

Where substituent groups are specified by their conventional chemical formulae, written from left to right, they equally encompass the chemically identical substituents that would result from writing the structure from right to left, e.g., $—CH_2O—$ is equivalent to $—OCH_2—$.

Additional embodiments and descriptions may be found in U.S. Provisional Patent Application No. 62/868,369, filed Jun. 28, 2019, Huang, et al. (Huang, Y.; Li, Y.; Hu, Z.; Yue, X.; Proetto, M. T.; Jones, Y.; Gianneschi, N. C., Mimicking Melanosomes: Polydopamine Nanoparticles as Artificial Microparasols. ACS Cent Sci 2017, 3 (6), 564-569), and US Patent Publication No. 2020/0113934A1, all of which are incorporated herein in their entirety to the extent not inconsistent herewith.

In an embodiment, a composition or compound of the invention, such as an alloy or precursor to an alloy, is isolated or substantially purified. In an embodiment, an isolated or purified compound is at least partially isolated or substantially purified as would be understood in the art. In an embodiment, a substantially purified composition, compound or formulation of the invention has a chemical purity of 95%, optionally for some applications 99%, optionally for some applications 99.9%, optionally for some applications 99.99%, and optionally for some applications 99.999% pure.

DETAILED DESCRIPTION OF THE INVENTION

In the following description, numerous specific details of the devices, device components and methods of the present invention are set forth in order to provide a thorough explanation of the precise nature of the invention. It will be apparent, however, to those of skill in the art that the invention can be practiced without these specific details.

The invention can be further understood by the following non-limiting examples.

EXAMPLE 1

To our knowledge, disclosed herein is a first synthesis of selenomelanin, especially as made by the copolymerization of selenocysteine and L-DOPA. Artificial selenomelanin nanoparticles (SeNPs) are spherical nanoparticles with chemical structures closely mimicking natural pheomelanin made from cysteine and L-DOPA. They can form perinuclear cap in keratinocytes cells and scavenge ROS from the cells. Selenium pheomelanin could better protect NHEK cells against G2/M phase arrest caused by X-ray radiation, maintaining good cell cycle distribution for up to 6 Gy X-ray radiation. The selenium pheomelanin may find application in protection against potential source of unwanted exposure to the public, radiation worker or patient receiving radiotherapy. Provocatively, it may be evolutionarily beneficial to utilize selenocysteine in the preparation of natural melanins.

Exemplary applications include, but are not limited to: radioprotection, antioxidant Capability, cell cycle protection, and biomaterials.

Exemplary advantages to the artificial selenomelanin materials and/or associated methods disclosed herein include, but are not limited to: first selenomelanin synthesis, to our knowledge; facial synthesis from commercial starting materials; structural mimic of Natural pheomelanin; well-characterized chemical composition; benzoselenazine subunits; uniform and ordered morphologies; ionizing radiation protection; perinulear cap in keratinocytes; and ionizing radiation attenuation.

Melanins are a family of heterogenous polymeric pigments that are found ubiquitously across plant, animal, bacteria, fungal kingdoms. Skin pigmentation in humans arises from two different types of melanin; eumelanin and pheomelanin. They provide coloration, signaling, free radical scavenging, photo protection et al. Yet the knowledge of melanin synthesis and function is still limited. We are reporting the design, synthesis, and biological applications of the first selenomelanin (SeNP) as a nature inspired nanomaterial for ionizing radiation protection. The SeNPs exploit the unique selenium chemistry to make pheomelanin nanoparticles with high selenium content. The synthetic selenium pheomelanin were characterized by Transmission electron microscopy (TEM), X-ray photoelectron spectroscopy (XPS), inductively coupled plasma optical emission spectrometry (ICP-OES), UV-Vis spectroscopy, ICP-MS, Electron paramagnetic resonance spectroscopy (EPR), dynamic light scattering (DLS), Zeta potential, circular dichroism (CD) spectra etc. Solid state Nuclear magnetic resonance spectroscopy (NMR) suggested that the selenium pheomelanin were built of benzoselenazine subunits, which is a direct analog to natural pheomelanin's benzothiazine building block. The SeNPs could be endocytosed and form paranuclear cap in primary NHEK cells. We then found the cell cycle change induced by X-ray, specifically, the G2/M phase arrest, could be significantly decreased by the SeNPs. Strict control experiments revealed that selenomelanin is superior in protecting X-ray induced cell cycle change compare with other cysteine pheomelanin and L-DOPA eumelanin. By connecting selenium chemistry with melanin material, this research work provides a valuable starting point to study a broader interaction of melanin-based functional materials with ionizing radiation.

Exemplary synthesis procedures for artificial selenomelanin materials, according to certain embodiments:

The SeNPs are synthesized by copolymerization of Selenocysteine and L-3,4-dihydroxyphenylalanine (L-DOPA) under oxidation by $KMnO_4$ in pH=7 water solution at room temperature. The reaction is a templated polymerization reaction with L-DOPA eumelanin nanoparticle as the seeds.

First, 120 mg L-DOPA is dissolved in 100 mL water under sonication and then mixed with 1.8 mL $KMnO_4$ (31.6 mg/mL) in a 250 mL round-bottom flask. The reaction was stirred at room temperature for 30 min to form the eumelanin seeds.

Secondly, selenocysteine solution is formed in situ by reducing selenocystine (122 mg) with 86 mg tris(2-carboxyethyl)phosphine (TCEP) followed by tuning the pH to 7 with 1 M NaOH solution. The selenocysteine solution was degassed and added in one portion to the reaction system.

Thirdly, the product is collected after overnight reaction by centrifuge at 40° C. (11500 rpm for 15 min) and purified by washing with deionized water three times.

Finally, the mass concentration of the final nanoparticle solution is determined by lyophilizing small aliquot solution overnight and weighing with Mettler analytical balance.

Selenomelanin can be made by the copolymerization of selenocysteine and L-DOPA. Selenocystine could generate better structural mimics of natural pheomelanin compared to that prepared with cysteine nucleophiles. The resulting materials are superior X-ray attenuation agents. Selenomelanin helped the cells maintain good cell cycle distribution even with 6 Gy X-ray radiation, which is a lethal dosage for human being. The selenium pheomelanin can find application in protection against potential source of unwanted exposure to the public, radiation worker or patient receiving radiotherapy.

EXAMPLE 2A: SELENOMELANIN: AN ABIOTIC SELENIUM ANALOGUE OF NATURE'S SULFUR-CONTAINING PHEOMELANIN

Overview: Selenium can be used to generate structural mimics of the naturally occurring sulfur-containing class of melanin known as pheomelanin. The resulting selenomelanin materials are superior X-ray attenuation agents compared to pheomelanin. Provocatively, this points to a potentially beneficial role for the utilization of selenocysteine in the evolution of natural melanins, a role yet unknown to biology. We examine this new class of melanin through synthetic methods development, comparative solid-state NMR of natural versus artificial materials, and through the forced biosynthesis of selenomelanin through selenocysteine feeding experiments in pheomelanin-producing bacteria.

Melanins are a family of heterogenous polymeric pigments that are found ubiquitously across plant, animal, bacterial and fungal kingdoms where they act variously as pigments and as radiation protection agents.[1] In these organisms, they often give rise to color through broad absorption and as nanoscale structural coloration elements.[2, 3] There exist five multifunctional, yet structurally and biosynthetically incompletely understood varieties of melanin: eumelanin, neuromelanin, pyomelanin, allomelanin and pheomelanin. Although eumelanin and allomelanin have been the focus of most radiation protection studies to date, some research suggests that pheomelanin has a better absorption coefficient for X-rays than eumelanin. Skin and hair pigmentation by melanin in humans are the melanized structures most well-known to people. The variety of colors found in our hair and skin, arises from two fundamental varieties of melanin: eumelanin and pheomelanin.[4, 5] Eumelanin protects human skin and eyes from UV radiation damage and is mostly associated with black/brown pigmentation, while the sulfur-containing analogue, pheomelanin is suspected to be phototoxic upon UV excitation, and is mostly associated with lighter features including in red hair.[6-8]

In this work, we introduce a new class of melanin, as an abiotic analogue of naturally occurring pheomelanins that differ from eumelanin by the incorporation of cysteine, and hence sulfur. We reasoned that if a selenium enriched melanin existed, it would be a better X-ray protector than the sulfur-containing pheomelanin because the X-ray absorption coefficient is proportional to the fourth power of the atomic number (Z). Notably, selenium is an essential micronutrient, with the amino acid selenocysteine being genetically encoded in 25 natural human proteins. Therefore, we hypothesize that selenomelanin exists in nature, where it provides superior ionizing radiation protection to organisms compared to known melanins. We generate a selenium containing analogue of pheomelanin through a chemical or a biosynthetic route using selenocysteine as a feedstock. The resulting selenomelanin is a structural mimic of natural pheomelanin as evidenced by solid state NMR studies. We hypothesized selenomelanin would have superior X-ray attenuation ability compared to known melanins. Indeed, this was proven as they performed better, effectively prevented neonatal human epidermal keratinocytes (NHEK cells) from G2/M phase arrest under high X-ray radiation doses. This work reveals the richness of synthetic melanin chemistry in yielding new structure and function by rational design, giving rise to materials that expand on a naturally occurring biomaterial evolved with an already extraordinary array of functions.

Artificial analogues of eumelanin have been synthesized by numerous methods including oxidative polymerization of myriad monomers under alkaline conditions via chemical or by chemoenzymatic methods.[9, 10] For the most part, these synthetic analogues of eumelanin are based on polydopamine. The resulting synthetic eumelanin materials have been used as free radical scavengers,[10, 11] as multimodal imaging contrast agents,[11-15] as surface coatings and adhesives,[9, 16] and as biocompatible UV radiation protection agents that mimic some of the morphological and functional characteristics of the naturally occurring melanin organelles, melanosomes, in human skin cells.[17] By contrast, the sulfur-containing melanin, pheomelanin, is less studied, likely because it is structurally more complex than eumelanin, and because pure pheomelanin is a rarity or is nonexistent, meaning it is never found without eumelanin in nature. These features make its isolation prohibitively difficult. There may be several reasons for this, including its structural complexity. Indeed, pheomelanin is believed to be synthesized biologically from both tyrosine and cysteine and contains benzothiazine moieties as subunits within the structure.[18] Experimentally, the structure of pheomelanin remains debatable and elusive as a result of the absence of sources of pure pheomelanin in nature.[19] Instead, it is found together with other kinds of melanin and other biomaterials (e.g. lipids) making the extraction of pure pheomelanin prohibitively difficult.[4, 8] Compounding the elusive nature of these materials pheomelanins are poorly soluble in most organic and aqueous environments with harsh acidic conditions often deployed to degrade and disperse what are initially highly crosslinked and complex structures.[20] which lead to repeated challenging of the existing knowledge of pheomelanin.

X-rays and γ-rays mainly interact with materials through photon scattering, the photoelectric effect or pair production.[21] Unwanted exposure to ionizing radiation occurs during a vast array of normal human activities from air travel, to X-ray diagnostic procedures, and to extreme cases in the rare instances of nuclear reactor malfunction. Melanized microorganisms are often found to be prevalent and content species living in high exposure environments. One example is the Chernobyl reactor site, and another in orbiting space craft. In these environments, work has indicated that melanin operates as nature's radioprotective shield, having been found upregulated in fungi in these locations, for example.[22] Therefore, the generation, optimization and study of melanins for use in ionizing-radiation protection for materials and for living systems has been of broad interest, replicating and inspired by what we observe in nature in terms of melanin structure and function. Applications include protection of tissues from the sun's radiation, and as higher energy radiation protective materials of use during radiation-based cancer treatments. Indeed, direct injection of eumelanin analogues into mice, was found to decrease death rates after lethal gamma-ray radiation as observed by various research groups.[23, 24] Furthermore, given the increased interest in space travel (i.e. SpaceX, Virgin Galactic),[25] and the role of nuclear power in a non-carbon-based electrical grid of the present and future,[26] new lightweight multifunctional and radioprotective materials are needed.

Selenium compounds have been reported to protect animals against ionizing radiation, inhibiting apoptosis and inflammation in model studies.[27, 28] Selenium is an essential micronutrient.[29] Indeed, the amino acid selenocysteine is encoded by a UGA codon when the SECIS (SElenoCysteine Insertion Sequence) is present in the mRNA, and is hence incorporated in 25 natural human proteins.[30-32] This makes it a good candidate for examining selenium's role as a substitute in biomaterials that are known to naturally utilize cysteine. This is despite the difficulty of working with small molecule selenium compounds that have notorious odors, are redox sensitive, and undergo constant metathesis triggered by visible light.[33]

Although eumelanin, and more recently the nitrogen-free analogue, allomelanin,[25] have been the focus of most radiation protection studies to date, some research suggests that pheomelanin has a better absorption coefficient for X-ray than the eumelanin analogue.[26] From this work, we reasoned that if a selenium enriched melanin existed in nature, or could be generated in the laboratory, it would be a better X-ray protector than the sulfur-containing pheomelanin. This is because selenium is a heavier chalcogen, with the X-ray absorption coefficient being proportional to the fourth power of the atomic number (Z).[27] Therefore, selenium enriched melanin materials should exhibit enhanced X-ray absorption properties. Indeed, selenium compounds of other kinds have been reported to protect animals in model studies, against ionizing radiation, inhibiting apoptosis/inflammation.[28-30] Most provocatively, selenium is an essential micronutrient with the amino acid selenocysteine being genetically encoded in 25 natural human proteins.[31] This fact alone makes it a good candidate for examining selenium's role in biomaterials that naturally utilize cysteine. Such avenues of research open up the possibility of advancing these biomaterials beyond evolved structures. They also point at the possibility that biological sources of selenomelanin will be discovered in the future. However, back on Earth, and in lieu of its discovery as a natural product, a synthetic route must be devised, let alone that such a prospective natural product may be prohibitively rare and/or difficult to extract in commercially relevant quantity or purity. The nucleophilic 1,6-Michael addition of the cysteine thiol group to the enzymatically generated dopaquinone is important for pheomelanin biosynthesis.[18] We contemplate that it then follows that efficient incorporation of the better nucleophile provided by selenocysteine would yield a selenium version of pheomelanin through a related route. Nevertheless, selenium chemistry is difficult due to its notorious strong smell, sensitivity to redox conditions and the constant cycle of metathesis reactions triggered by visible light.[32, 33]

Herein, we report the design, synthesis, biosynthesis, characterization and radiation protection capability of a first-generation selenomelanin nanoparticle (SeNP). Selenomelanin was characterized by Transmission electron microscopy (TEM), X-ray photoelectron spectroscopy (XPS), UV-Vis spectroscopy, inductively coupled plasma optical emission spectrometry (ICP-OES), electron paramagnetic resonance spectroscopy (EPR), dynamic light scattering (DLS), Zeta potential, circular dichroism (CD) spectroscopy and solid state Nuclear magnetic resonance spectroscopy (ss NMR). These results show that the selenomelanin is built from benzoselenazine subunits, making it a direct analog to the natural pheomelanin, containing benzothiazine building block. We prepare selenomelanin nanoparticles (SeNPs) which form perinuclear caps, or microparasols, in neonatal human epidermal keratinocyte (NHEK) cells, and significantly decrease cell cycle arrest following X-ray insult, as compared to synthetic pheomelanin or eumelanin. Selenomelanin is superior in protecting X-ray induced cell cycle changes compared with synthetic pheomelanin and synthetic L-DOPA based eumelanin. Furthermore, we demonstrated that selenomelanin could be biologically synthesized (biosynthesized) by bacteria fed selenocystine and L-3,4-dihydroxyphenylalanine (L-DOPA).

Figure 1B:
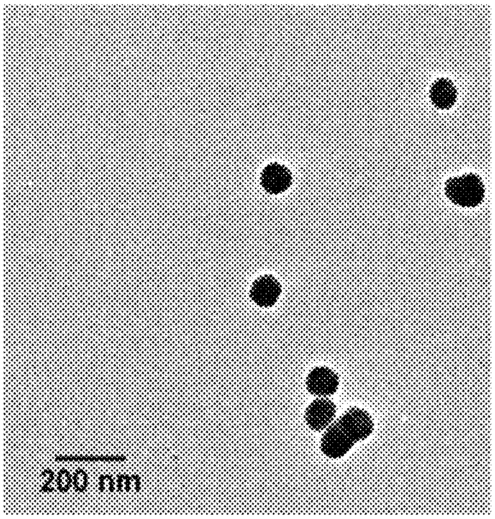
Figure 1C:
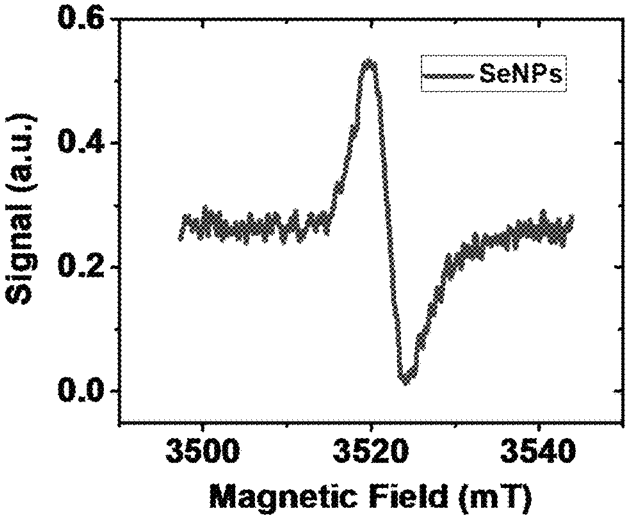
Figure 1D:
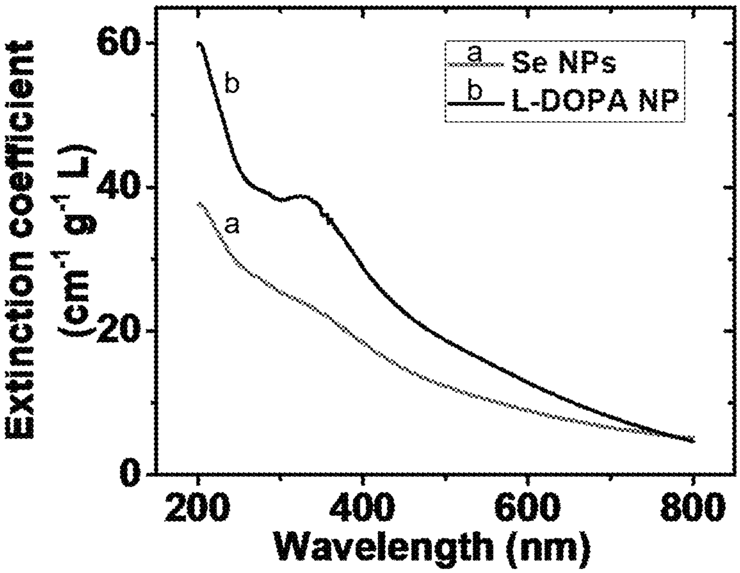
Figure 28:
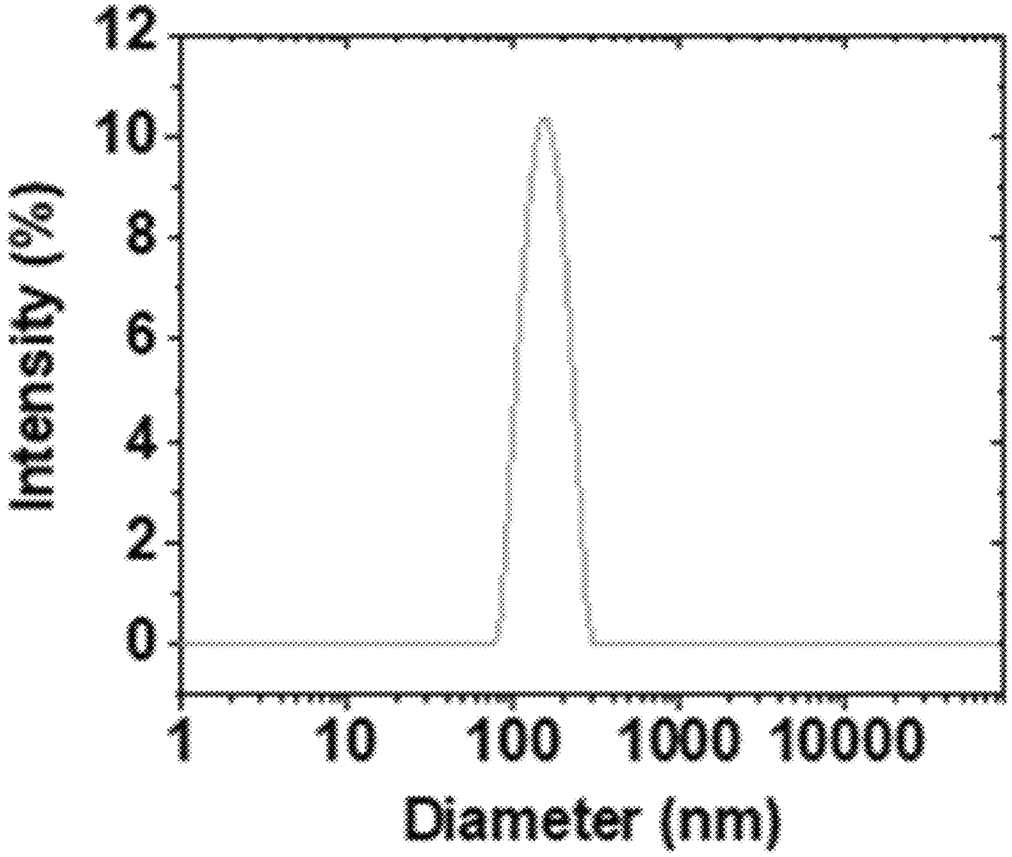
FIG. 28. A size histogram (DLS intensity plot) corresponding to artificial selenomelanin nanoparticles (SeNP), showing a size characteristic of artificial selenomelanin nanoparticles, according to certain embodiments.

Results and Discussion: Design, synthesis and characterization of SeNP: We embarked on pursuing the synthesis of a selenomelanin inspired by the approach developed by Lee and co-workers for synthetic pheomelanin.[34] We discovered that the oxidative copolymerization of selenocysteine and L-3,4-dihydroxyphenylalanine (L-DOPA) can yield spherical pheomelanin nanoparticles. The typical synthesis involved two steps (FIG. 1A): the oxidation of L-DOPA to yield the eumelanin seeds, and the subsequent copolymerization of L-DOPA and selenocysteine solution formed in situ by reduction of selenocystine. The reaction also works without the seeds, but irregular morphology results. The seed reaction gave nanoparticles that have broad band absorption across the UV-Visible regions, which is typical for the melanin NPs. The extinction coefficient is lower than NPs made of pure L-DOPA, presumably because of the incorporation of heavier selenocysteine. The reaction can yield nanoparticles 160 nm in diameter, for example, (FIG. 1B, FIG. 28) with broad band absorption across the UV-Visible region, as is typical for melanin (FIGS. 1A and 1D). Note that $KMnO_4$ has been previously used for melanin synthesis.[35, 36] Under strongly acidic conditions (1 M $H_2SO_4$), 4 mM $KMnO_4$ can lead to decomposition of the polymer skeleton—a method used for HPLC type analysis of these materials.[37-39] However, in our experiments, the pH of the reaction was kept at approximately 7.0 and the $KMnO_4$ concentration was lower (1.4 mM). The extinction coefficient (e) in the UV-Vis region is lower than for nanoparticles made purely from L-DOPA (FIG. 1D). Using Fourier-transform infrared (FTIR) spectroscopy, we observed the typical absorption bands in SeNP at 3600-2400 $cm^{-1}$ (stretching vibration of —OH, —COOH, —NH), 1715

Figure 6A:
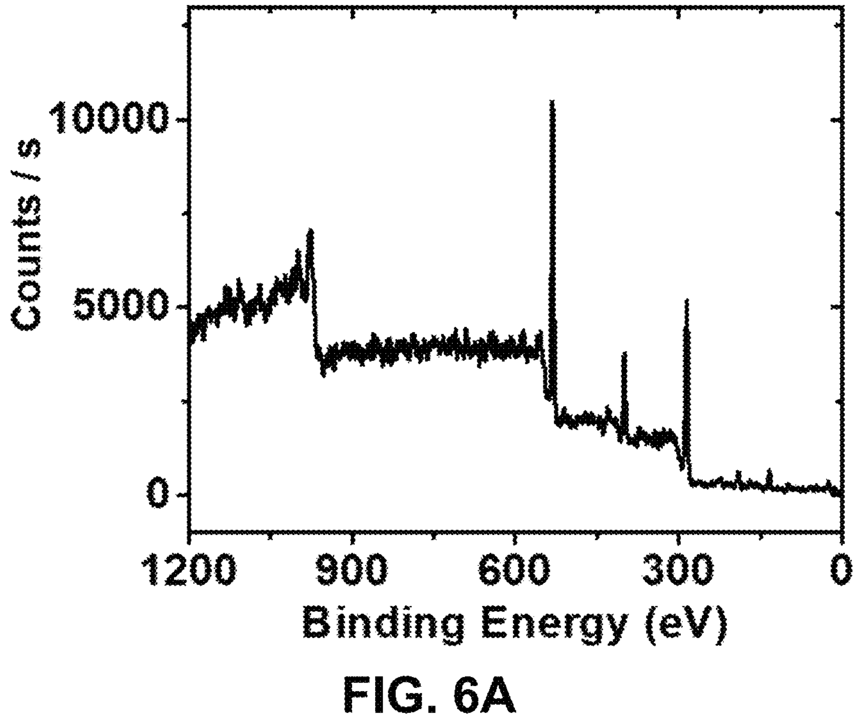
FIGS. 6A-6B. XPS spectrum of the SeNP sample drop-casted on a silicon substrate.
Figure 6B:
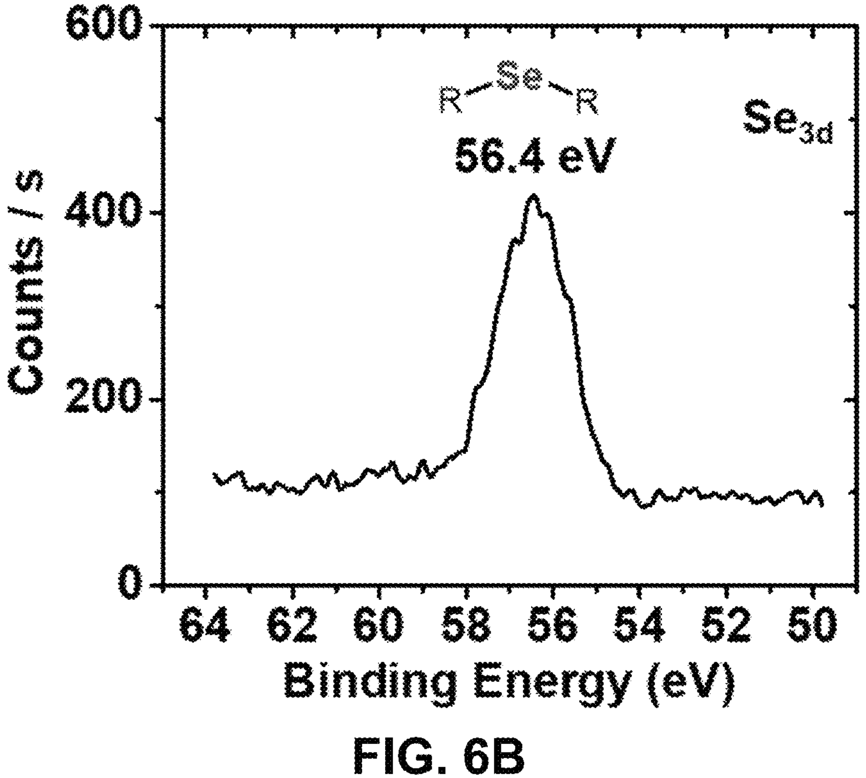
Figure 6C:
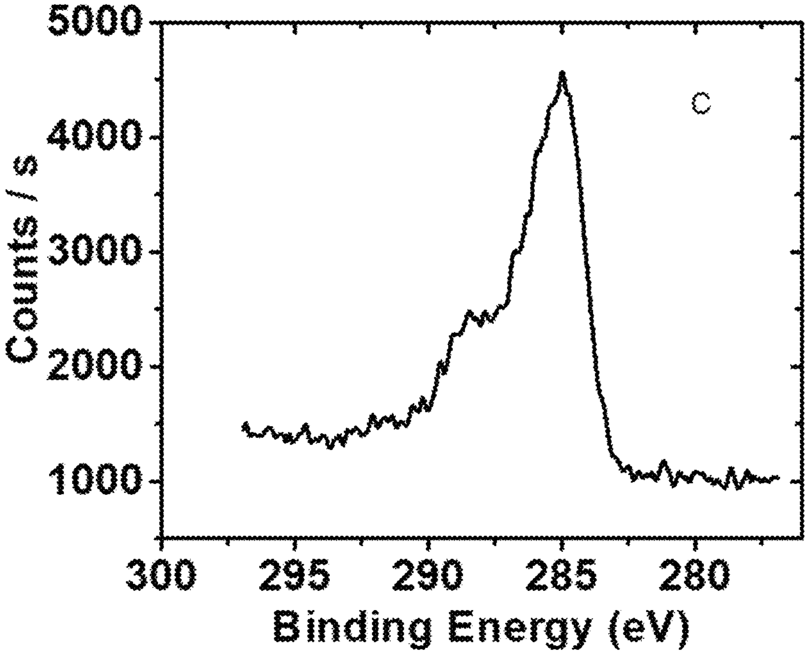
FIG. 6C: the C1s spectrum.
Figure 6D:
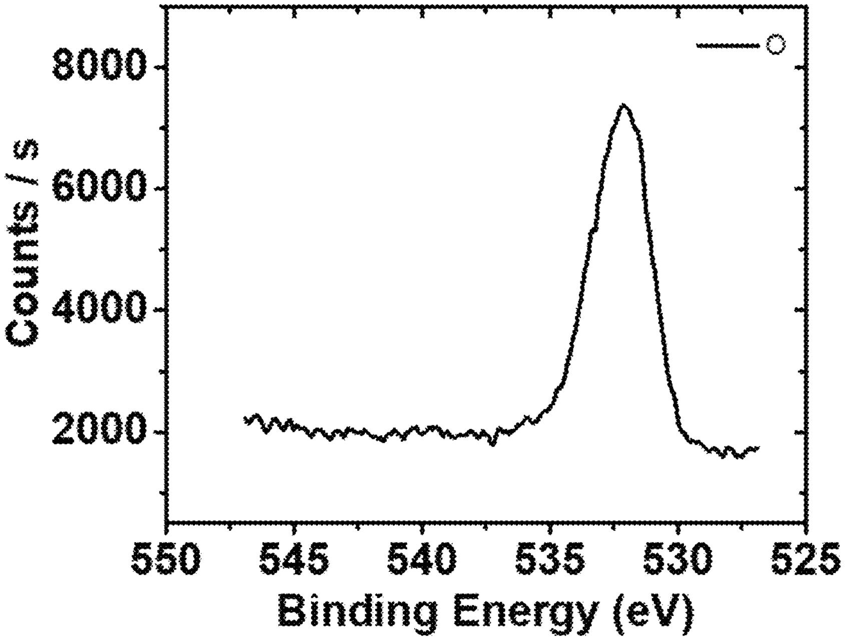
FIG. 6D: the O 1s spectrum.
Figure 6E:
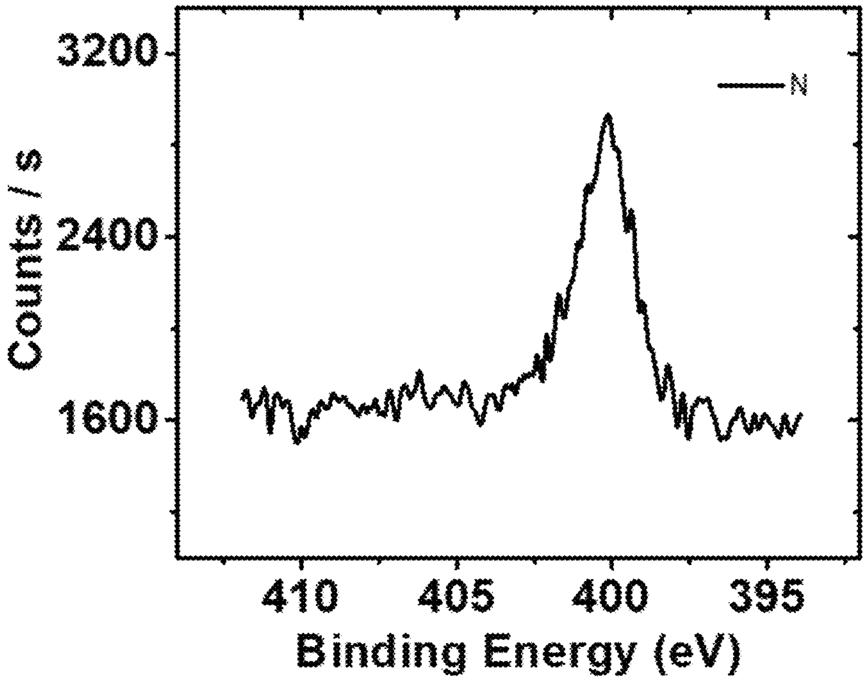
FIG. 6E: the N 1s spectrum.
Figure 9A:
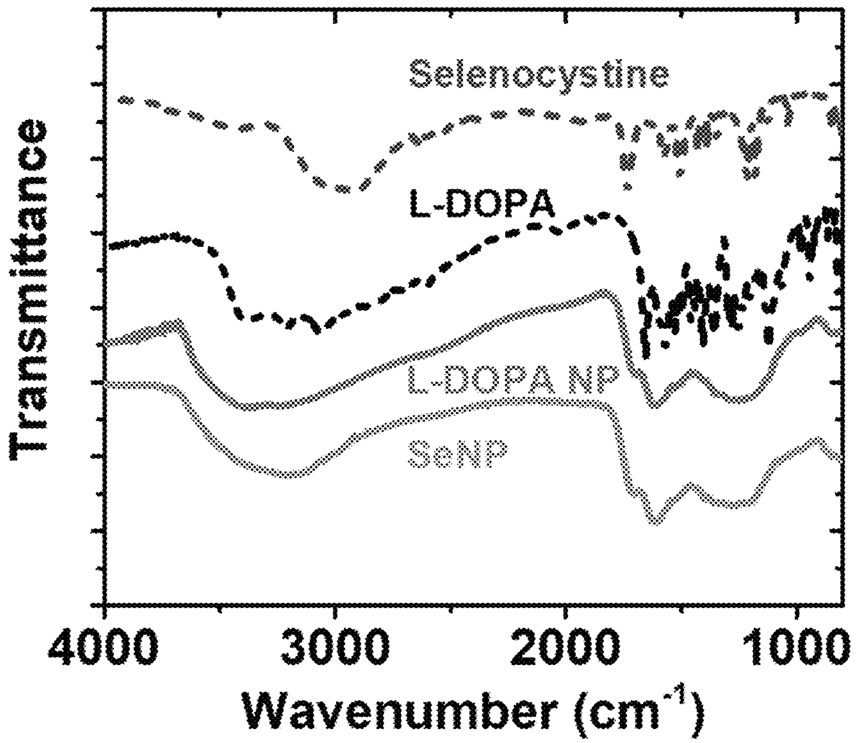
FIG. 9A. FT-IR spectra of L-DOPA NP, SeNP and the corresponding starting materials. Dotted lines are the monomers and solid lines are the NP samples. Y axis are the offset transmittance of each sample.
Figure 9B:
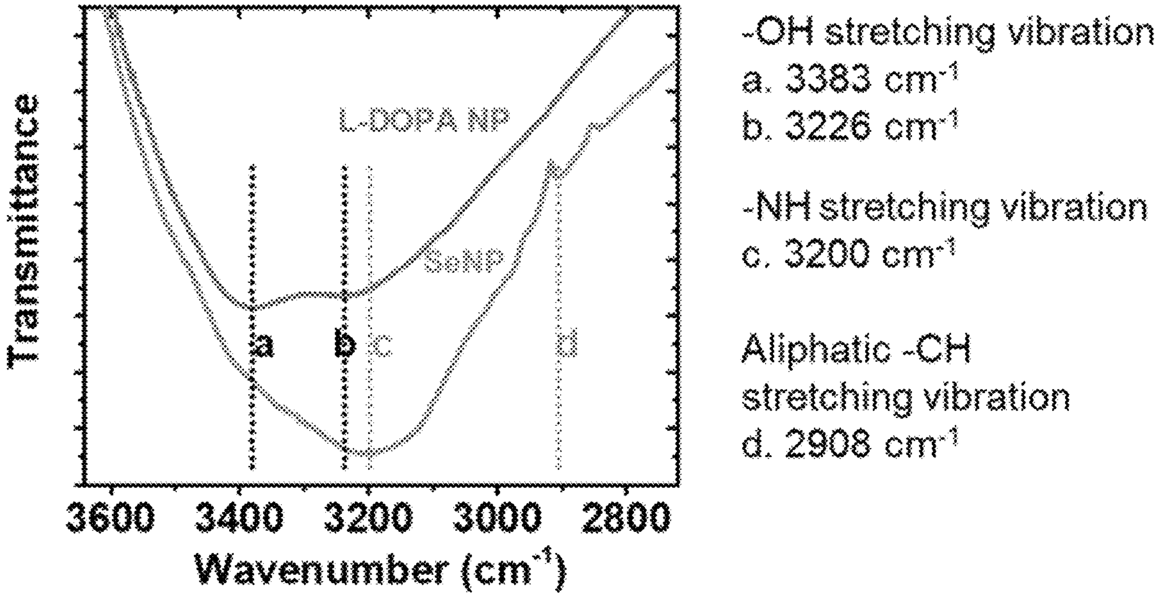
FIG. 9B. Zoomed spectra of SeNP and L-DOPA NP. Typical absorption bands were observed in SeNP sample at 3600-2400 $cm^{-1}$ (stretching vibration of —OH, —COOH, —NH), 2908 $cm^{-1}$ (stretching vibration of aliphatic —CH), 1715 $cm^{-1}$ (stretching vibration of C═O from —COOH) and 1616 $cm^{-1}$ (stretching vibration of —$NH_2$, bending vibrations of aromatic ring C═C). The main differences between the SeNP with L-DOPA NP are the broad peak at 3600-2400 $cm^{-1}$ and peak at 3200 $cm^{-1}$ for SeNP in b (stretching vibration of —NH), while L-DOPA NP has two major peaks at 3383 and 3226 $cm^{-1}$ (stretching vibration of —OH), which indicates that SeNP has more —NH groups as compared to L-DOPA NP. In addition, the 2908 $cm^{-1}$ peak in SeNP suggested more aliphatic —CH is present, while for L-DOPA NP, the L-DOPA monomer cyclizes at a faster rate to produce DOPAchrome, leading to very few aliphatic —CH in the polymeric NP.
Figure 40A:
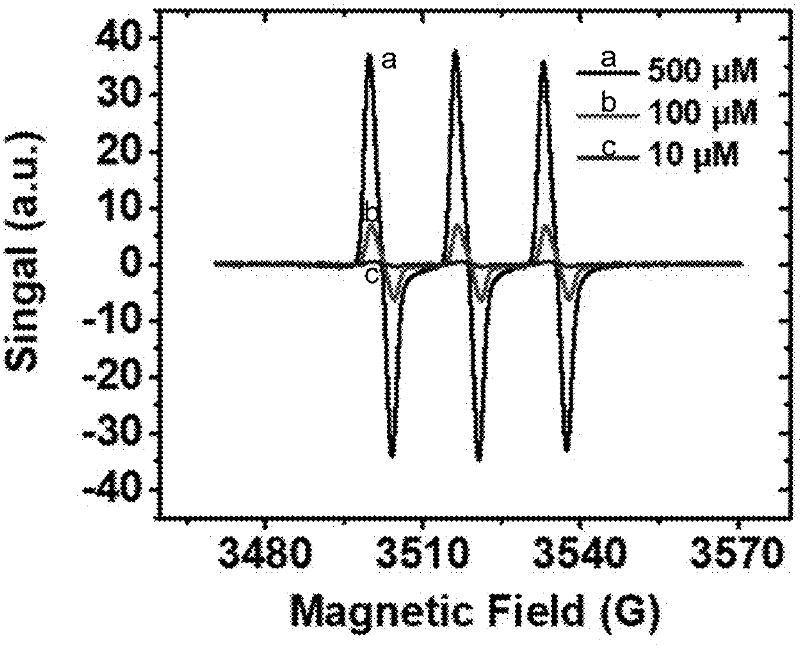
FIGS. 40A-40E. EPR quantification of the radical content in the SeNP.
Figure 40B:
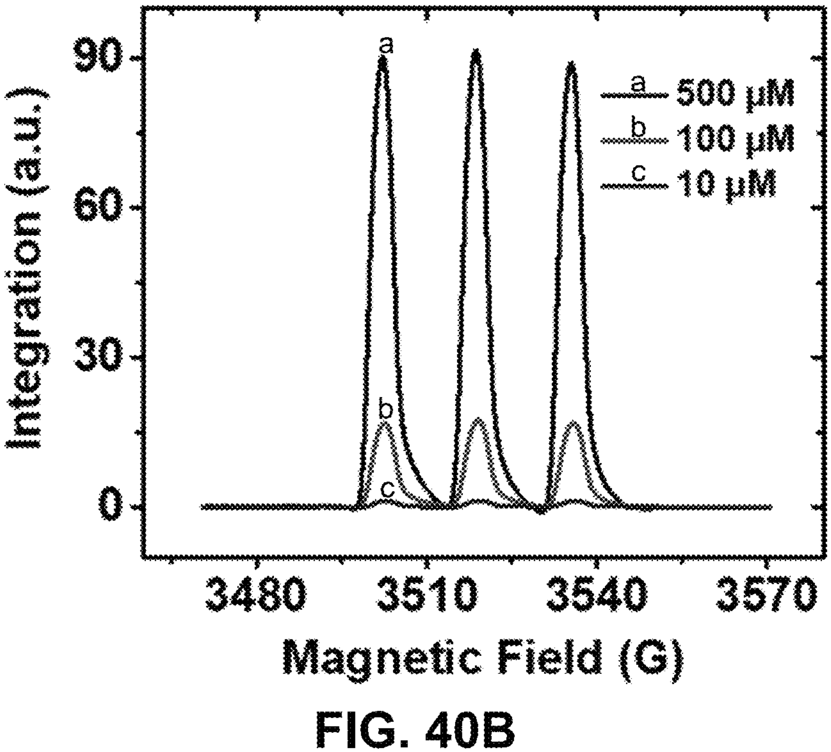
Figure 40C:
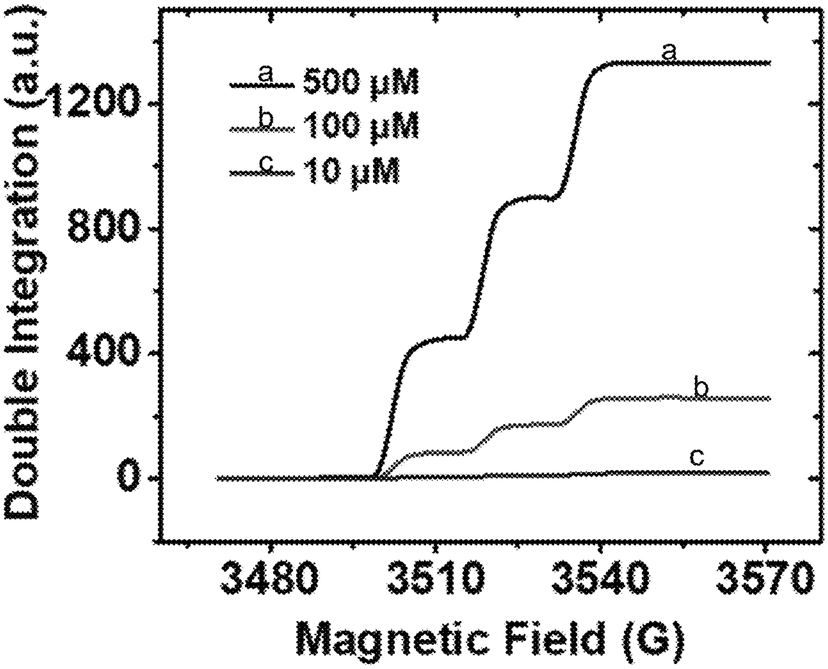
Figure 40D:
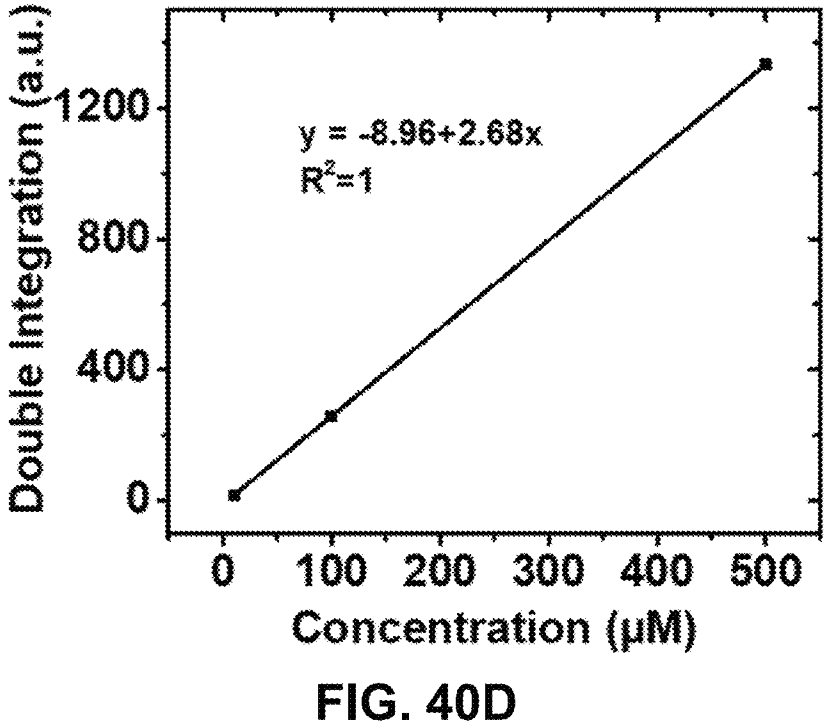
Figure 40E:
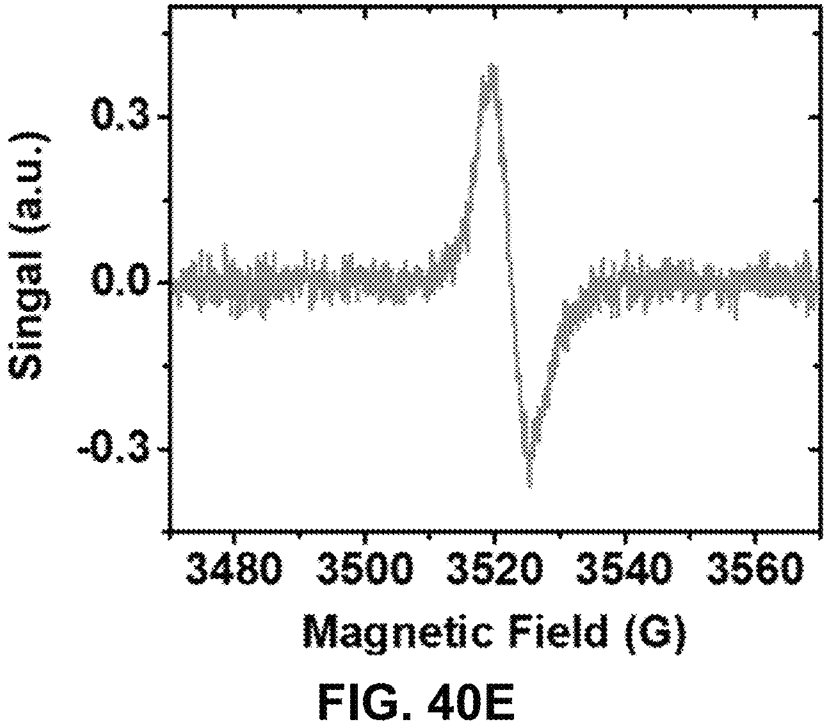

$cm^{-1}$ (stretching vibration of C═O from —COOH) and 1616 $cm^{-1}$ (stretching vibration of —$NH_2$, bending vibrations of aromatic ring C═C) (Appendix SI Fig.). TEM image (FIG. 1 B) showed spherical nanoparticles, which is consistent with the hydrodynamic radius of 80 nm measured by DLS (FIG. 9). XPS data showed the presence of Se (56.4 eV) in the sample, corresponding to the monoselenide structure in the nanoparticles[35] (FIGS. 6A-6B). And EPR spectra (FIG. 1C) indicate the particles also has stable unpaired electrons of $1.12\times10^{18}$ per gram (FIG. 40D), consistent with typical synthetic melanin.[26] In preferable embodiments, no heat, organic solvent or sophisticated purification is involved in preparation of our material.

Figure 1E:
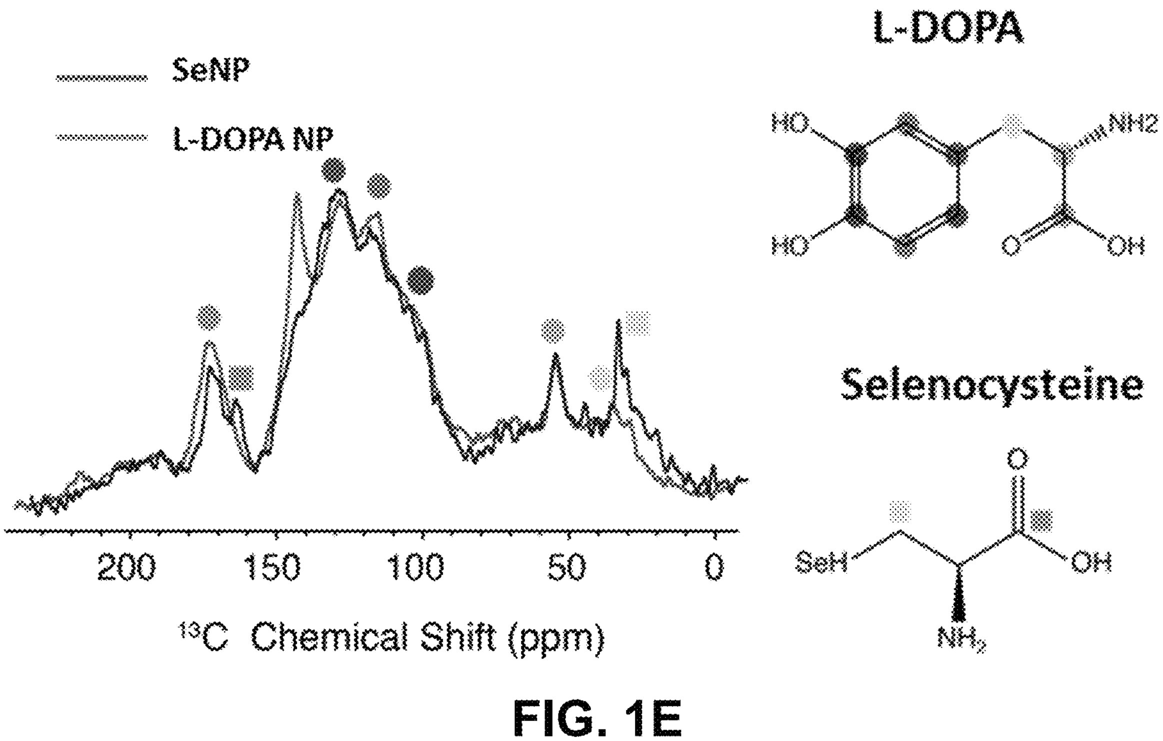
Figure 10:
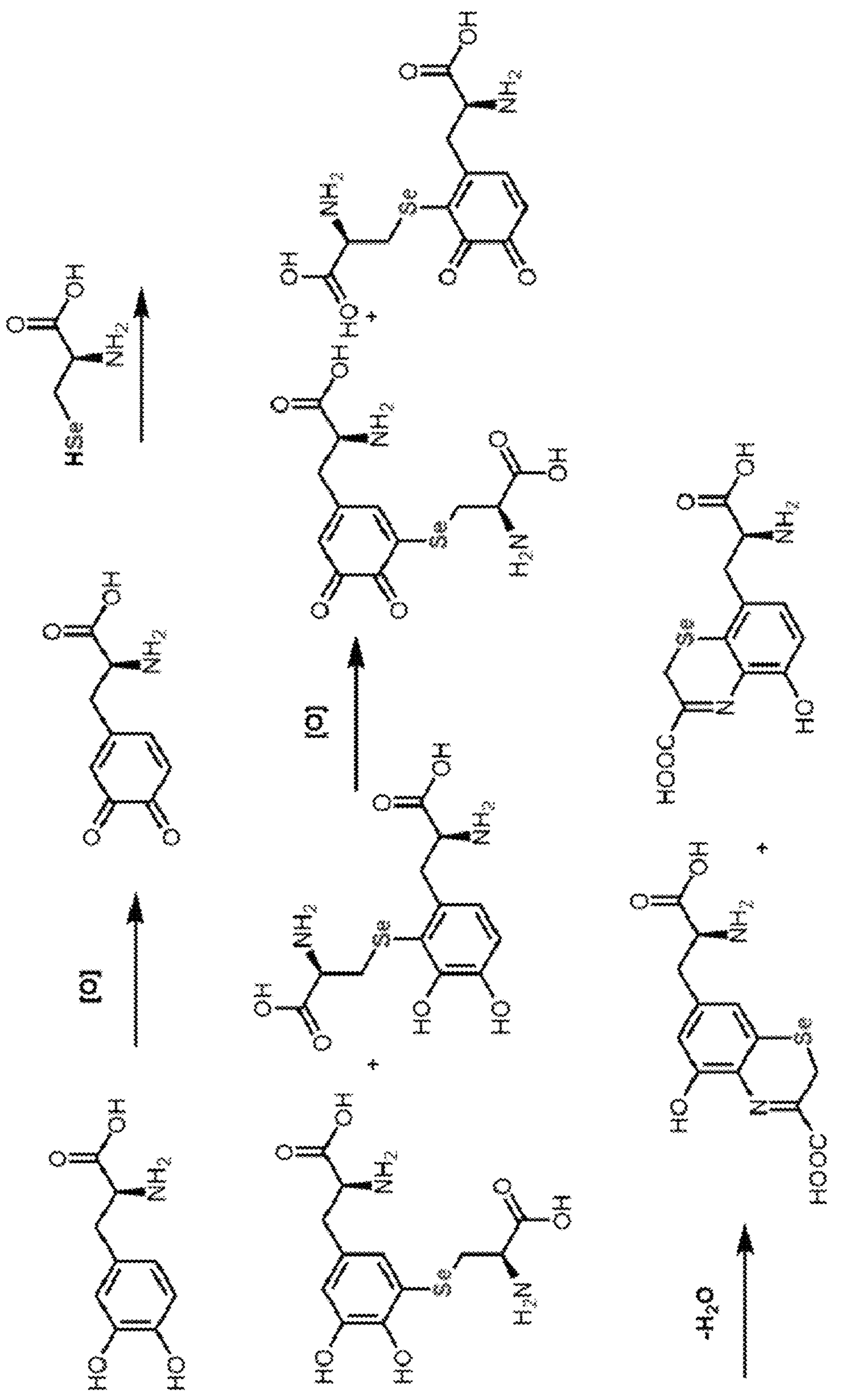
FIG. 10. Adapted Raper-Mason pathway for the synthetic selenium pheomelanin, according to certain embodiments.

Characterization of melanin is generally challenging due to its insolubility, hierarchical structure, and multiscale disorder (from covalent bonds, to redox states, to non-covalent interactions). Pheomelanin is more difficult than eumelanin because of the additional cysteine incorporation. Previously research was mainly based on HPLC to separate the fully degraded product of melanin and correlate the small molecules to the assumed structure. In this work, we used solid state NMR (ssNMR) as it is a powerful tool to characterize insoluble complex samples like melanin without any tedious and disruptive sample preparation. Control experiment with pure L-DOPA sample and the melanin based on enzymatic oxidation of L-DOPA enabled the clear assignments of the standard $^{13}C$ NMR peaks. FIG. 1E showed the overlay of Se NP (blue trace) with the standard L-DOPA melanin trace (green). The new peak around 163 ppm indicated the presence of a new carbonyl group, which is ascribe to the —COOH of selenocysteine. The decrease of the peak at 143 ppm suggested the chemical environment of the aromatic carbon (carbon 3 or 4) near the catechol group changed, which is consistent with the Raper-Mason scheme. As selenium is a better nucleophile than sulfur, we anticipate that the 1,6-Michael Addition of selenol is more favorable than the thiol of cysteine. The further cyclization by forming imine bond would change the chemical shift of the carbon 3 or carbon 4. We believe the adapted Raper-Mason model in (FIG. 10) should be applicable to this case. By comparing the integration area of the two peaks at 163 ppm (from selenocysteine) and 172 ppm (from L-DOPA), the estimated molar ratio is 0.42:1. Selenium atomic concentration quantified by complementary ICP-OES indicated that the molar ratio of selenocysteine and L-DOPA is 0.44:1, corresponding to benzoselenazine subunit content ~55% (wt/wt). In addition, CD spectra (FIGS. 7-8) showed that the two starting materials are both chiral, whereas the nanoparticles product has little CD signal, indicating fewer chiral structures present in the final product. The CD results are consistent with the SS $^{13}C$ NMR results, as the intramolecular cyclization reaction would lead to achiral planar structure. These collective results establish that selenomelanin was successfully made from selenocysteine and L-DOPA.

Figure 2A:
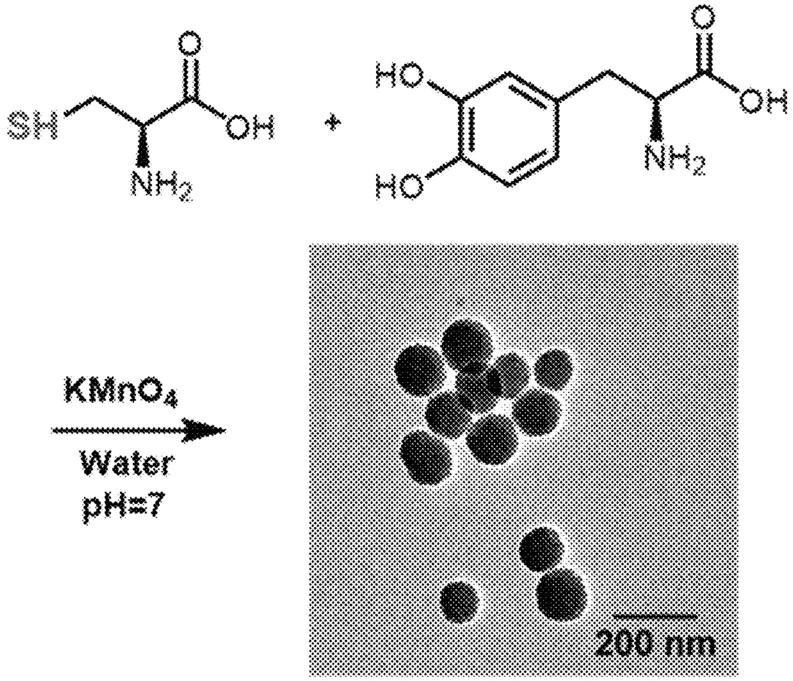
FIGS. 2A-2C. Control pheomelanin SNP synthesis and characterization.
Figure 2B:
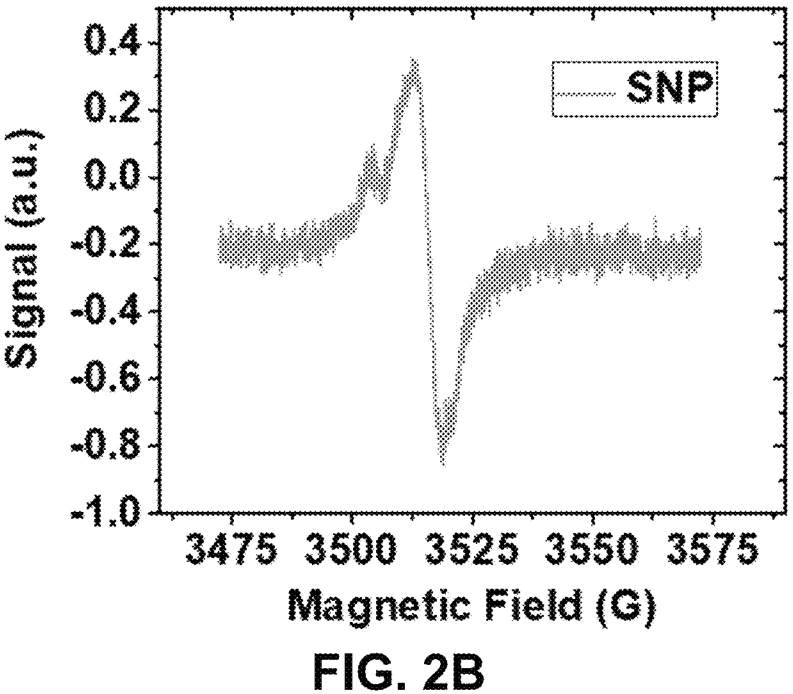
Figure 2C:
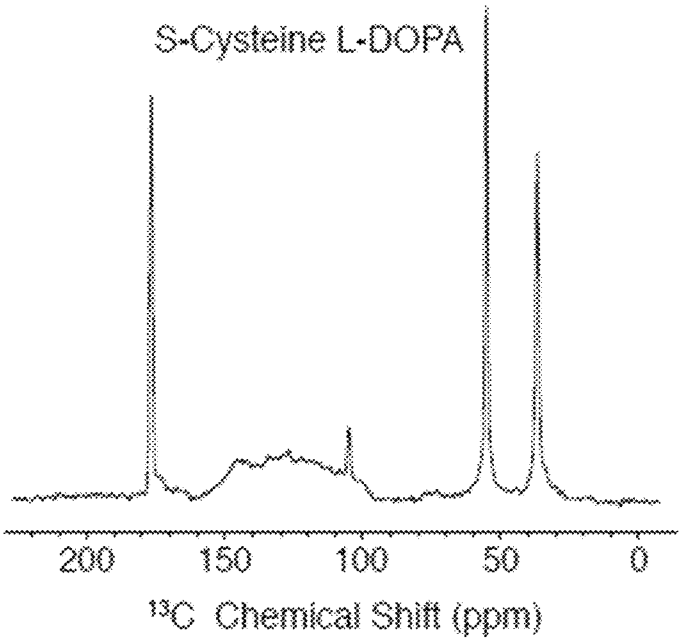
Figure 31A:
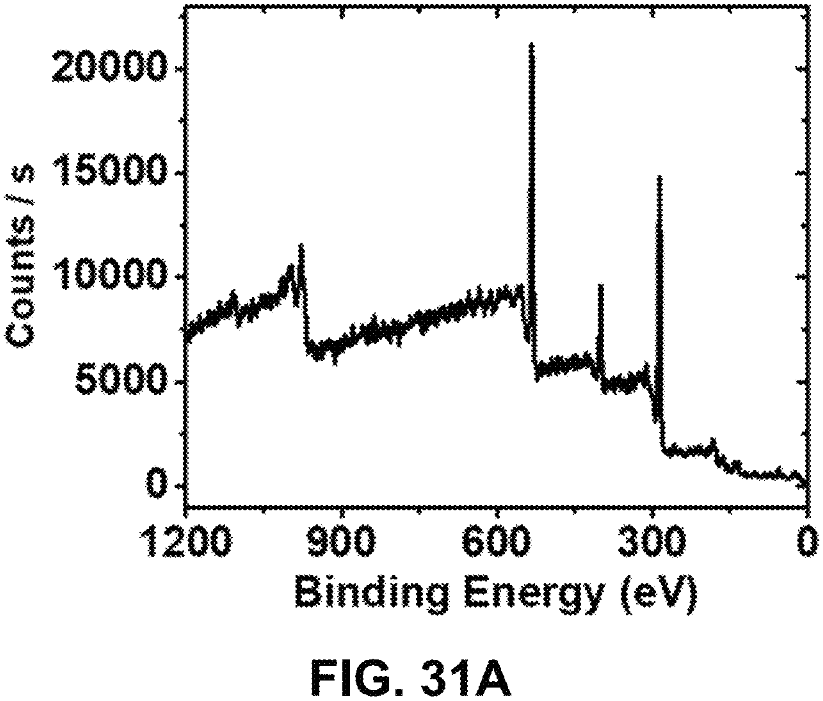
FIGS. 31A-31E. XPS spectrum of the SNP sample drop-casted on a silicon substrate.
Figure 31B:
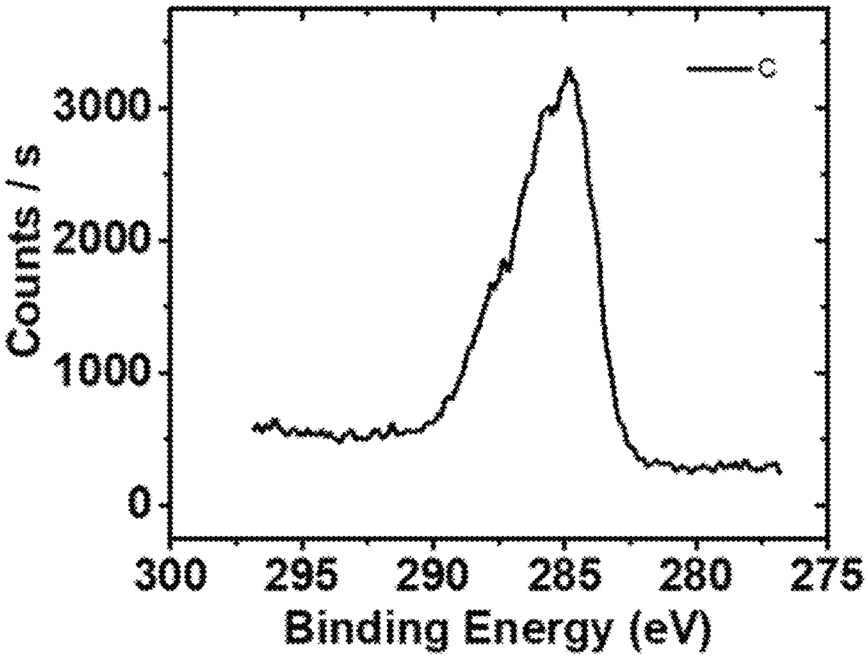
Figure 31C:
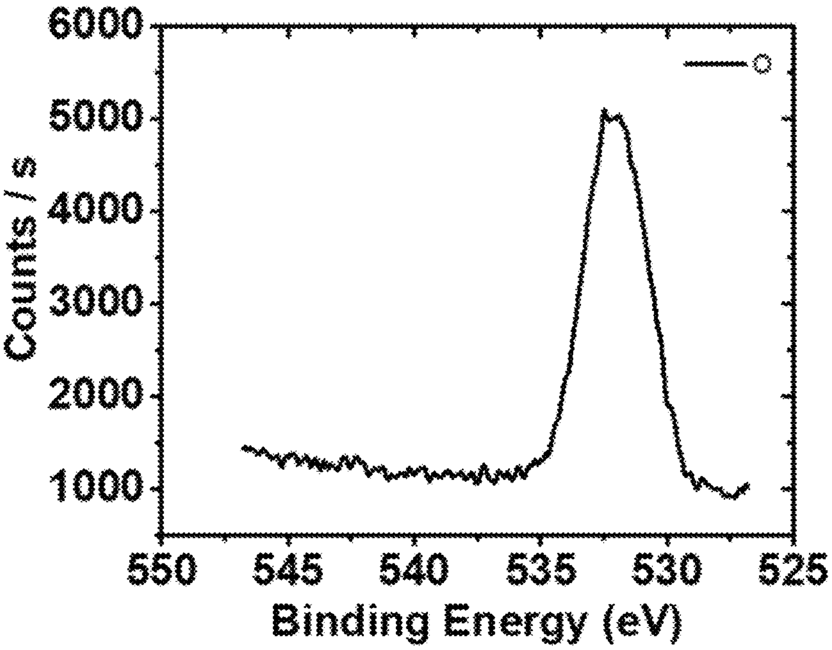
Figure 31D:
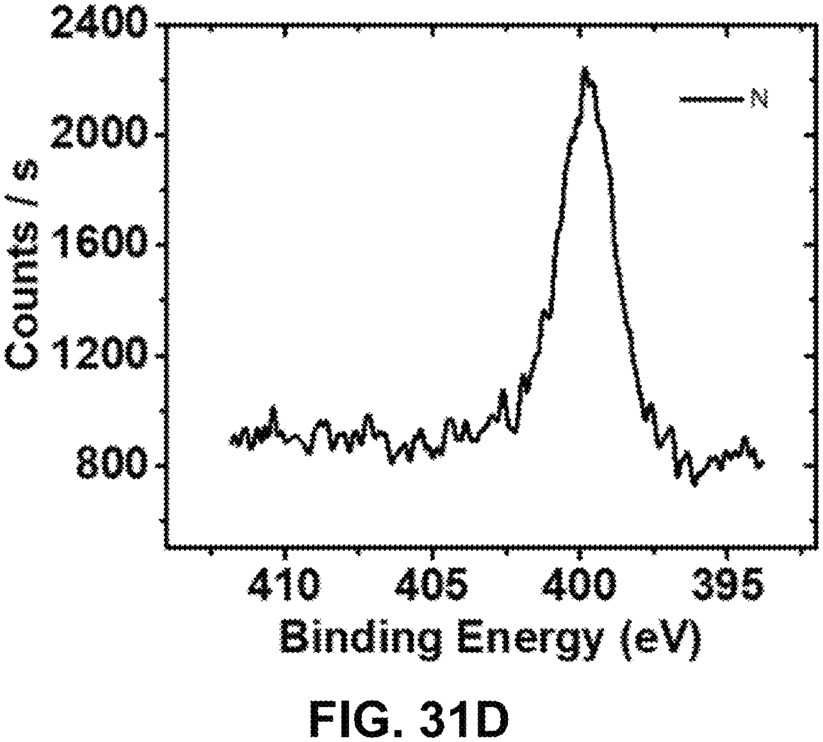
Figure 31E:
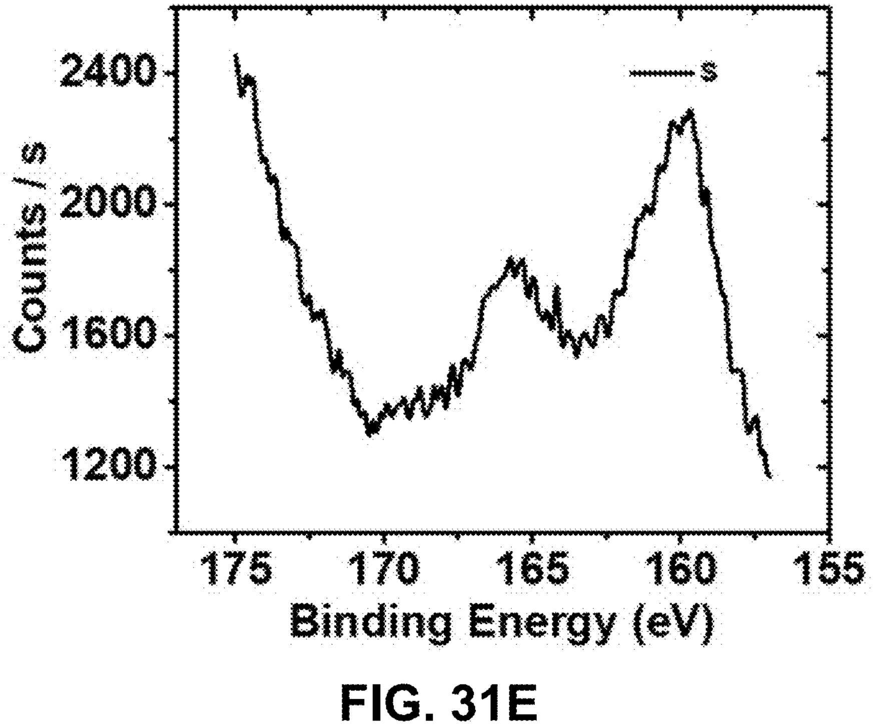
Figure 42A:
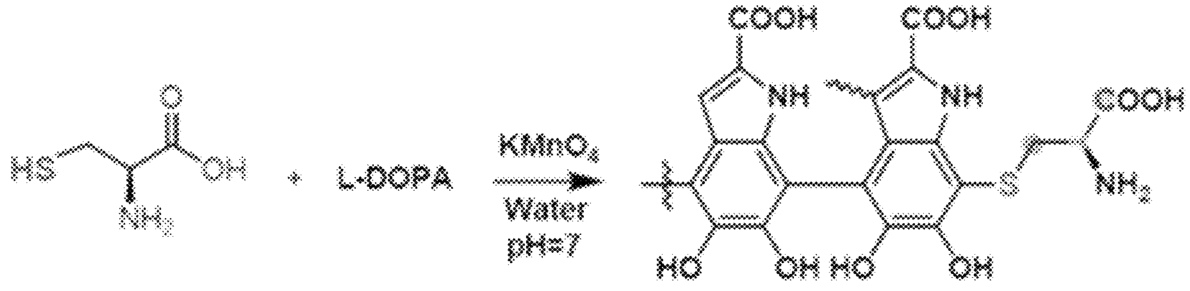
FIGS. 42A-42D. Pheomelanin nanoparticle (PNP) synthesis and comparative ssNMR with natural pheomelanin.
Figure 42B:
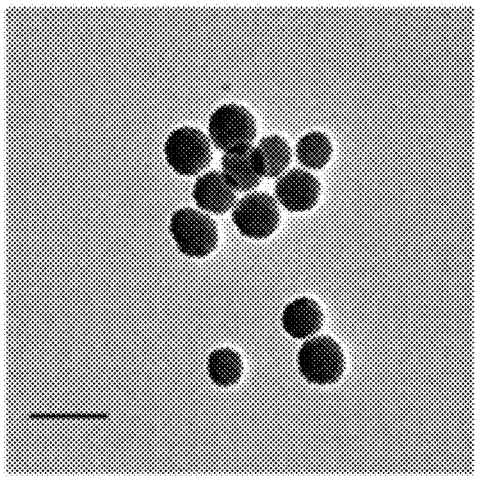
Figure 42C:
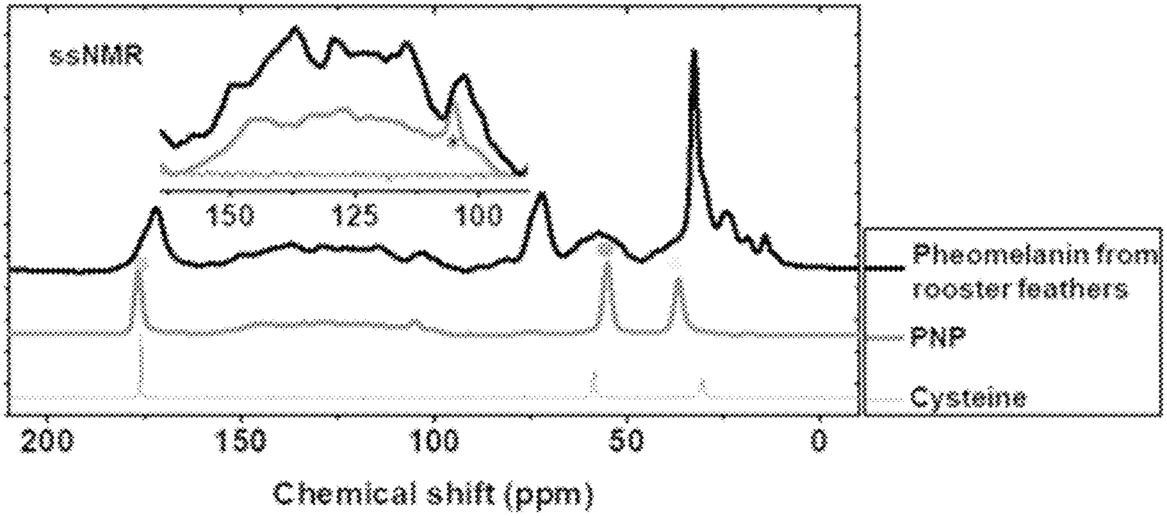

Synthesis of pheomelanin control SNP ("SNP" or "PNP", used interchangeably herein) and eumelanin control L-DOPA NP: To compare the property of selenomelanin with eumelanin and pheomelanin, we made two other types of NP as control. We synthesized the cysteine pheomelanin using commercial L-cysteine and L-DOPA as starting materials, denoted as SNP. SNP has S content about 7.5% according to the ICP-OES results, which is similar to typical natural melanin.[36] XPS spectra also confirm the existence of sulfur (FIG. 31E). Yet solid-state NMR (FIG. 2C and FIG. 42C) indicated that the benzothiazine structure is not absent in the final product. We reasoned that the Michael addition reaction occurred after adding cysteine, yet the subsequent intramolecular cyclization step was hindered by the electron-donation of the sulfide group to the ortho quinone group. Whereas for the isomeric selenium intermediate, 5-selenocysteine-dopa or 2-selenocysteine-dopa, the selenium atom has weaker electron-donating capacity due to the orbital mismatch between the selenium lone pair and the phenyl π electrons. Therefore, the selenium intermediates have a more electrophilic ortho quinone group, making the nucleophilic attack of amine more favorable. The resulting absence of benzothiazine using the literature reported method makes the previous structure studies of pheomelanin less relevant to natural pheomelanin,[34] and renders the function studies based on synthetic pheomelanin debatable. Our selenomelanin is a better structural mimic of natural pheomelanin and more consistent with the established Raper-Mason pathway.

Figure 42D:
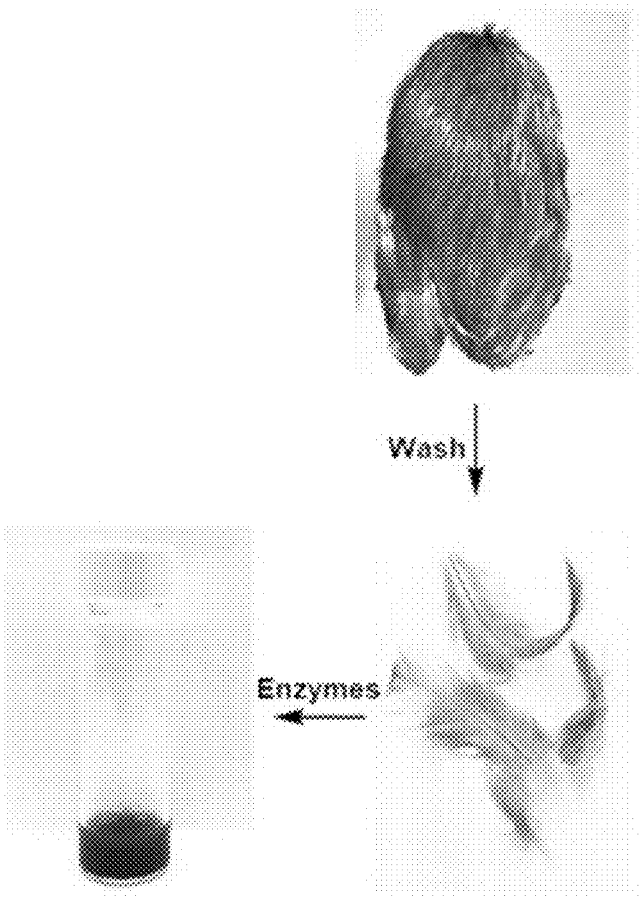
Figure 48:
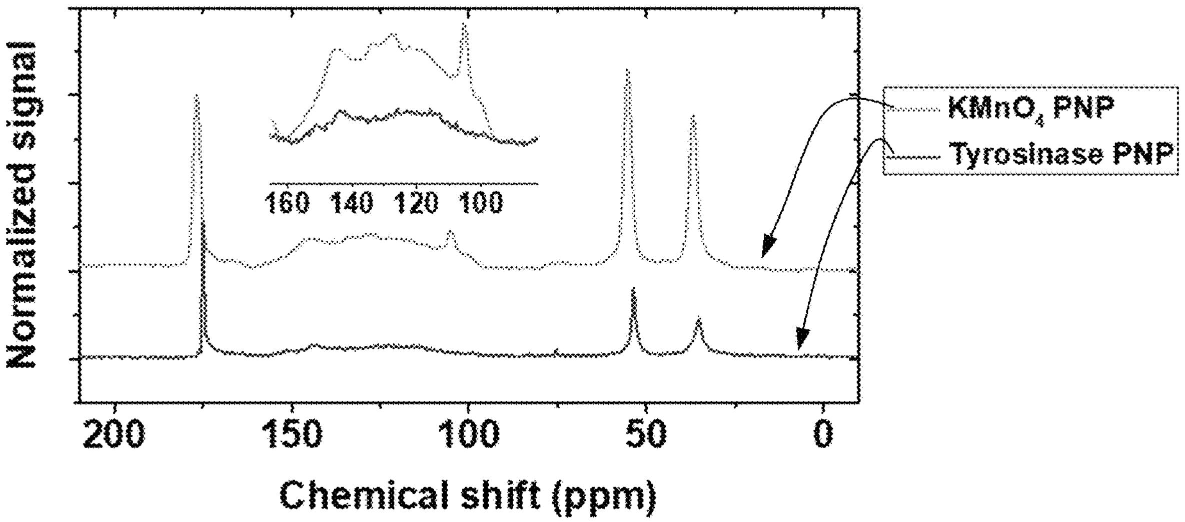
FIG. 48. Comparative $^{13}C$ ssNMR spectra of pheomelanin synthesized by both $KMnO_4$ (see also FIGS. 42A-42D) or the enzymatic (tyrosinase) method. Red curve: ssNMR spectrum of pheomelanin mimic made by oxidation of L-DOPA and cysteine using tyrosinase as reported by Ito and coworkers. Blue curve: Data for the chemical oxidation reaction as shown in FIGS. 42A-42D. Inset shows the zoomed aromatic regions.
Figure 49:
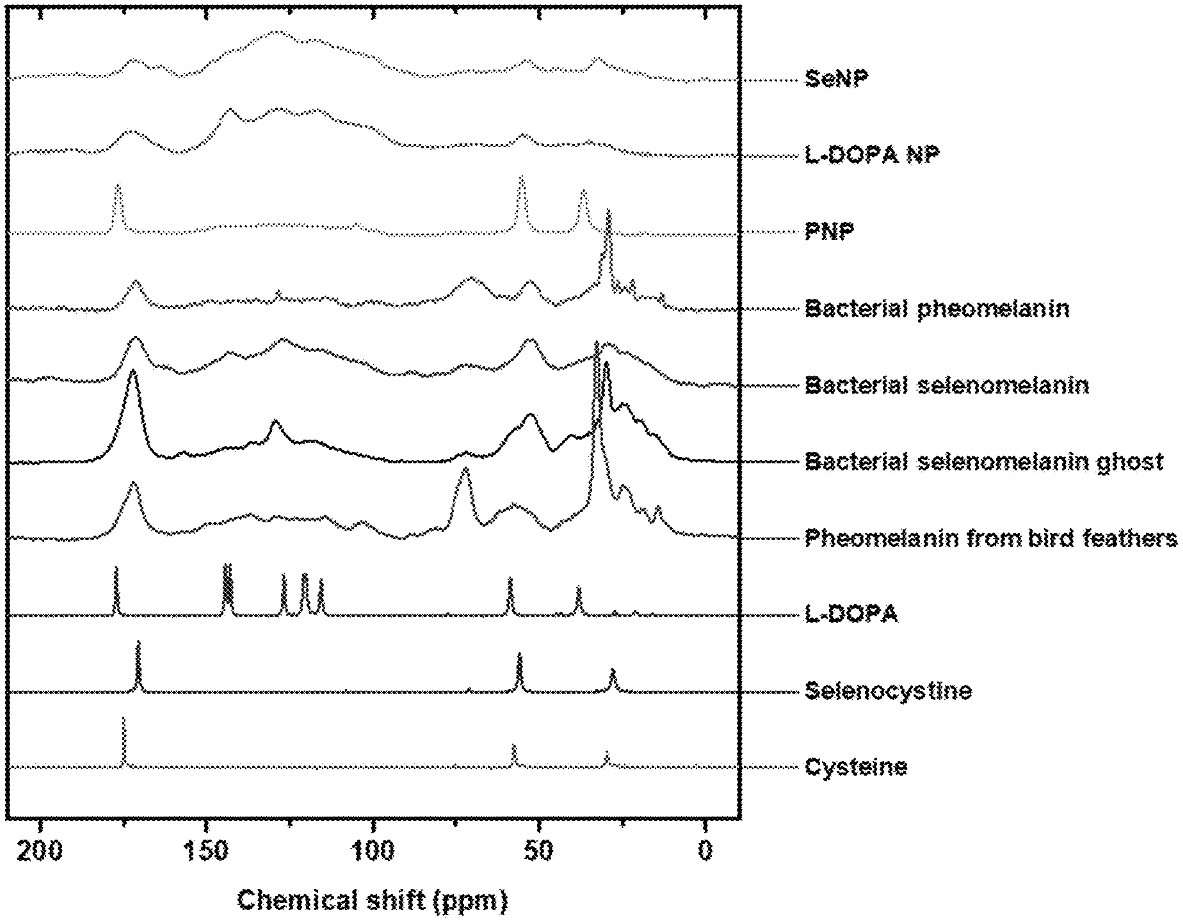
FIG. 49. $^{13}C$ ssNMR spectra of all the melanin and monomers used in this paper. Melanins include SeNP, L-DOPA NP, PNP, bacterial pheomelanin made by feeding L-DOPA and cysteine to *V. natriegens* (vide infra), bacterial selenomelanin and selenomelanin ghosts made by feeding L-DOPA and selenocystine to *V. natriegens* (vide infra), and natural pheomelanin extracted from covert feathers of a Rhode Island red rooster. Monomers include L-DOPA, selenocystine, and cysteine.
Figure 50A:
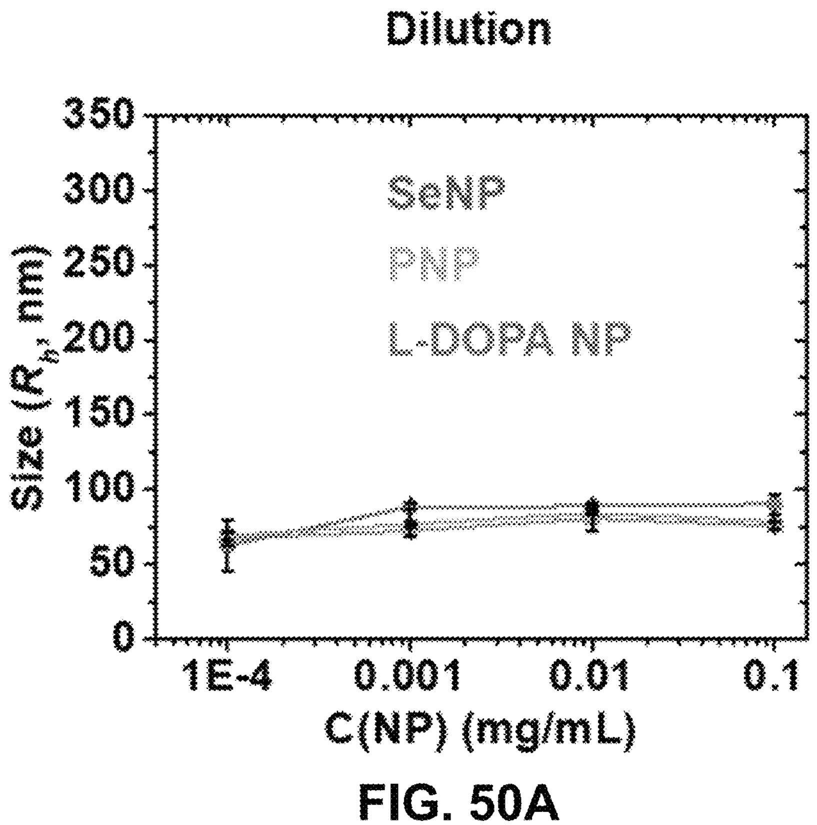
FIGS. 50A-50D. Hydrodynamic radius measured by DLS of different NP under various conditions, and TEM analysis.
Figure 50B:
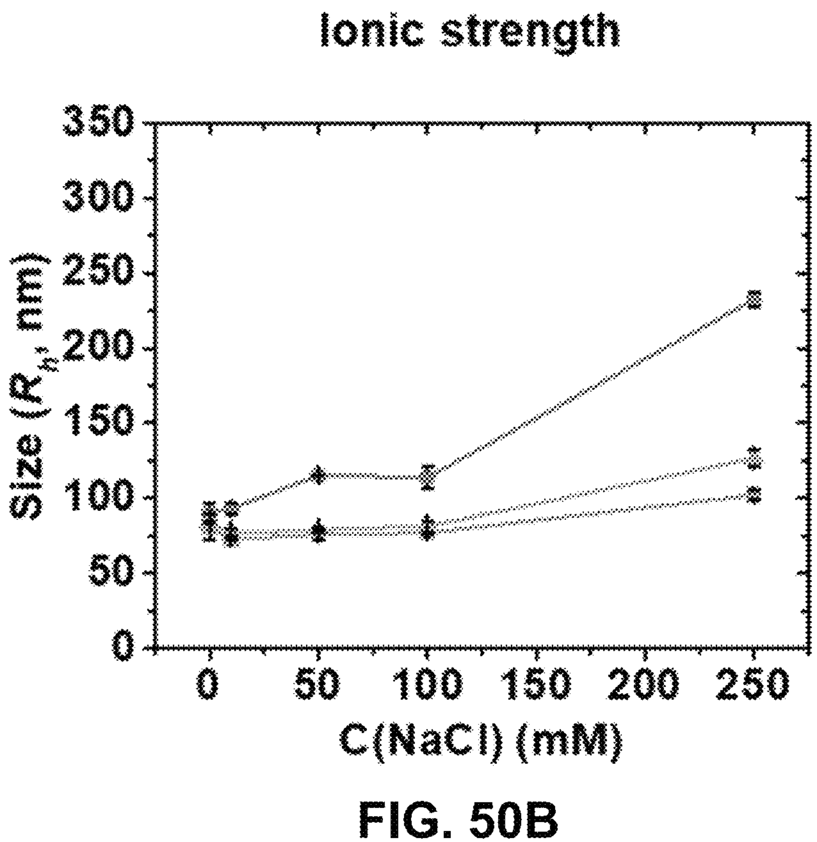
Figure 50C:
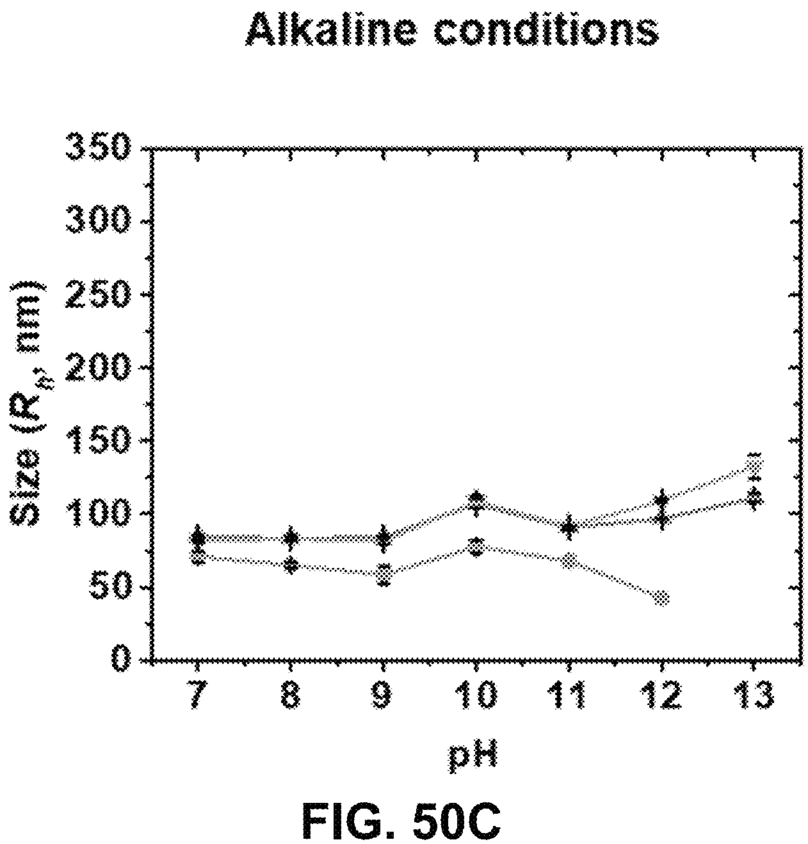
Figure 50D:
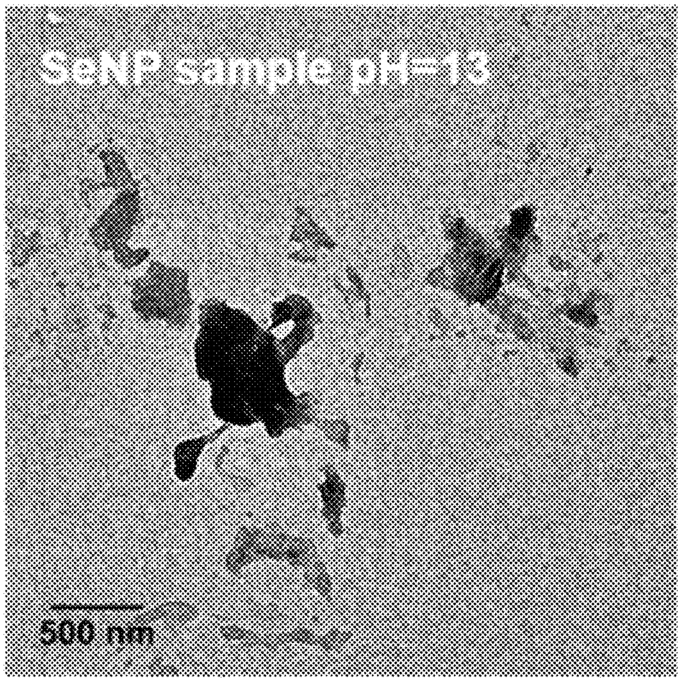

Alternative discussion of synthesis of pheomelanin nanoparticles (PNPs) and eumelanin nanoparticles (L-DOPA NPs): PNPs were synthesized using L-cysteine and L-DOPA (FIGS. 42A-42D, Table 1, FIGS. 47A-47I) according to literature procedures.[35] PNPs have a sulfur content of ~7.5% as determined by ICP-OES, which is similar to that of natural pheomelanin.[17] XPS confirmed the presence of sulfur (FIGS. 47A-47I), yet ssNMR (FIG. 42C) revealed the absence of benzothiazine groups in the final product. CD spectroscopy of PNP shows a clear signal (FIGS. 47A-47I) indicating a chiral structure, which is consistent with the ssNMR results, and the presence of non-cyclized cysteine adducts. The oxidation of L-DOPA and cysteine using tyrosinase[39] gave similar results to the permanganate oxidation as determined by $^{13}C$ ssNMR spectroscopy (FIG. 48). We reasoned that while the addition of cysteine occurred, the subsequent intramolecular cyclization step was hindered by electron-donation of the sulfide group to the quinone. Whereas for selenocysteine, the weaker electron-donating capability of selenide groups results in a more electrophilic ortho quinone group due to orbital mismatch between selenium and quinone. It should be noted that, to the best of our knowledge, papers reporting the synthesis of pheomelanins have omitted ssNMR data. Here, we find that the published method in our hands results in an absence of benzothiazine rings and the presence of dangling cysteines, bringing into question how analogous this synthetic pheomelanin is to that from natural sources. Regardless, for comparison, we designate this material as a synthetic pheomelanin and utilize it in functional studies against the SeNP analogue (vide infra).[35] We note that in addition to the synthetic route, and for structure verification, natural pheomelanin was extracted from the covert feathers of a Rhode Island red rooster (FIG. 42D) which have high pheomelanin content.[41] This natural pheomelanin has an aromatic region analogous to what we observe in the SeNP ssNMR spectrum (FIG. 42C inset), corresponding to the proposed benzothiazine structure (FIG. 49).

Figure 12A:
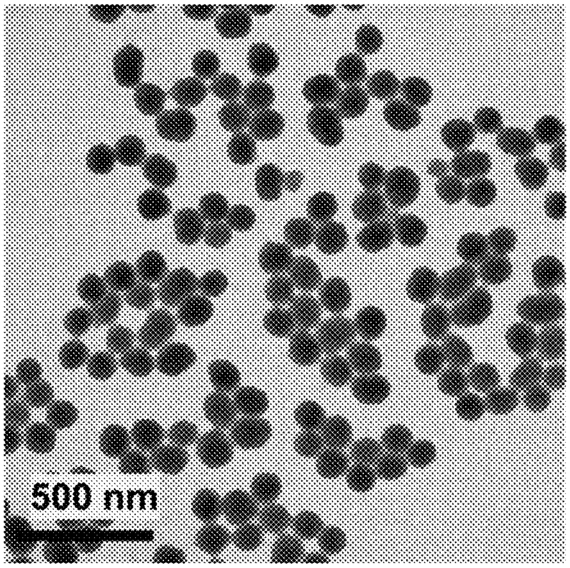
FIGS. 12A-12B. STEM (FIG. 12A) and SEM (FIG. 12B) of L-DOPA NPs.
Figure 12B:
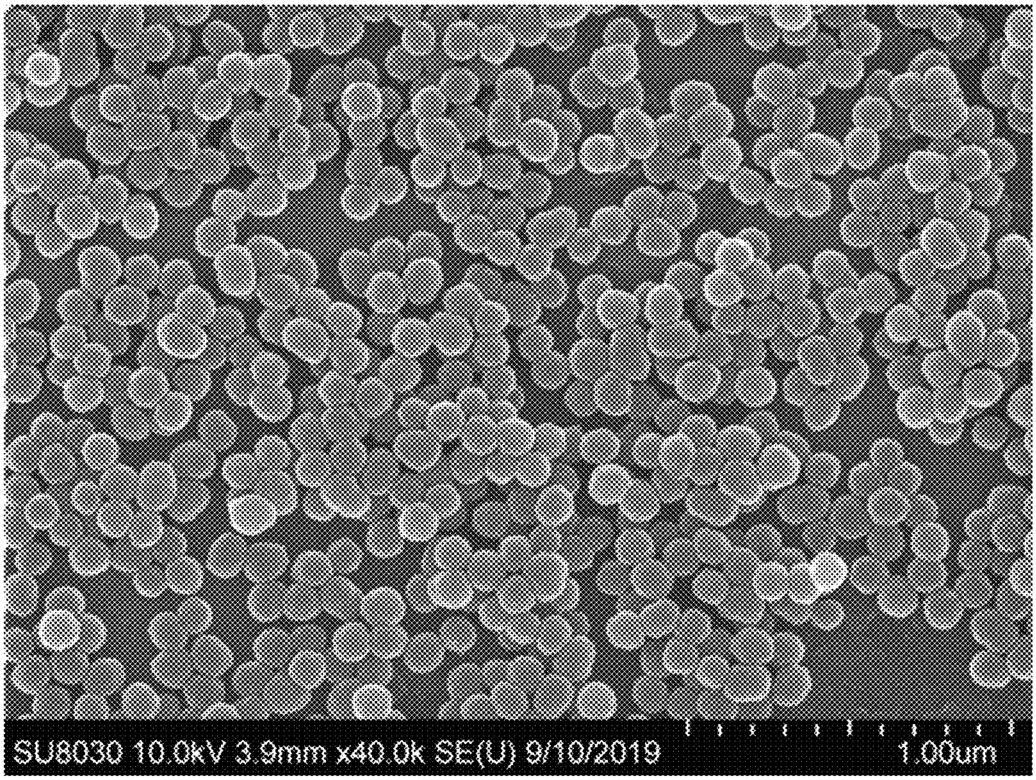
Figure 13:
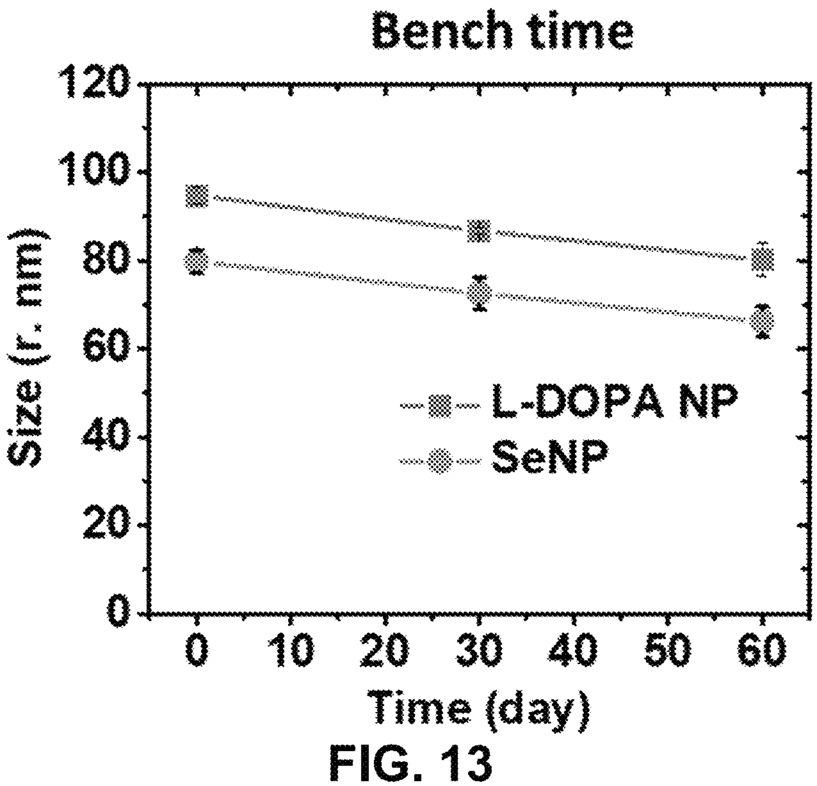
FIG. 13. Hydrodynamic radius change of L-DOPA NP and SeNP by DLS over 60 days under ambient conditions.
Figure 15A:
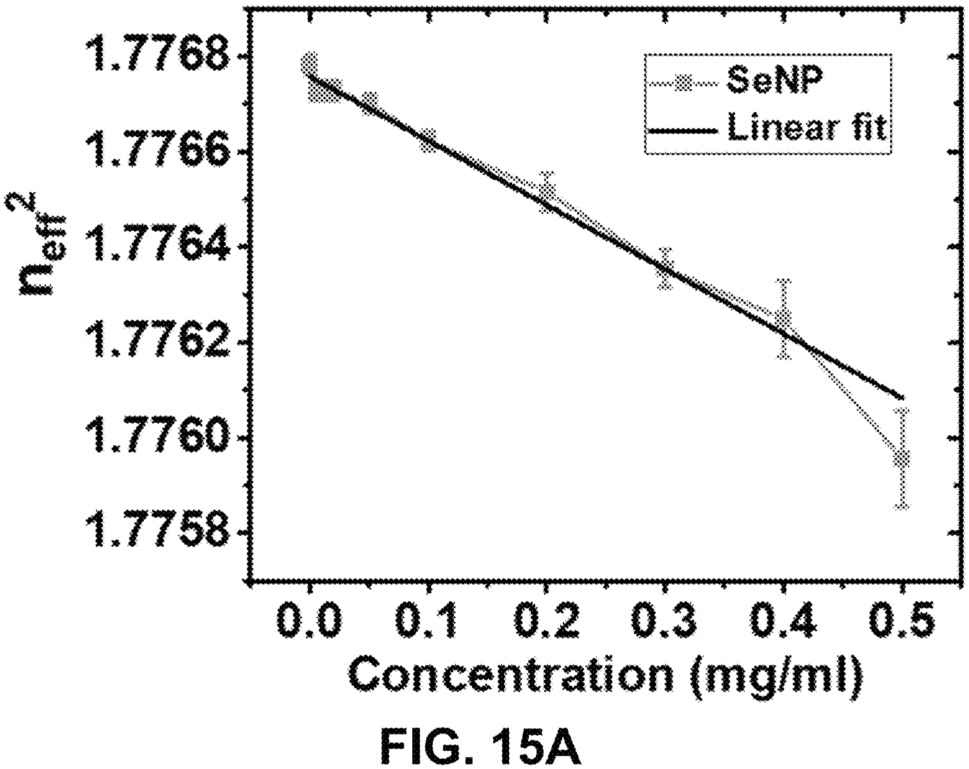
FIG. 15A: Refractive index measurement of the SeNP sample. RI=1.3323.
Figure 15B:
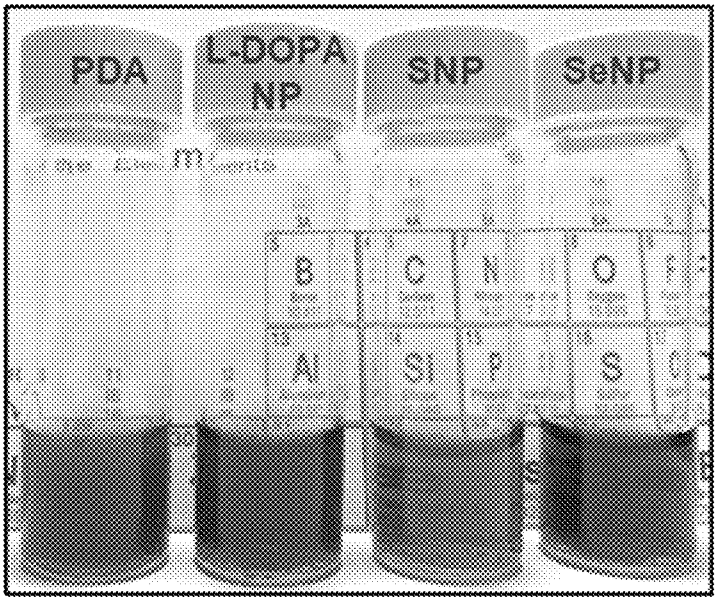
FIG. 15B: Optical image of the different nanoparticles solutions at 0.1 mg mL in ultrapure water: polydopamine (PDA), L-DOPA NP, SNP, SeNP.
Figure 32A:
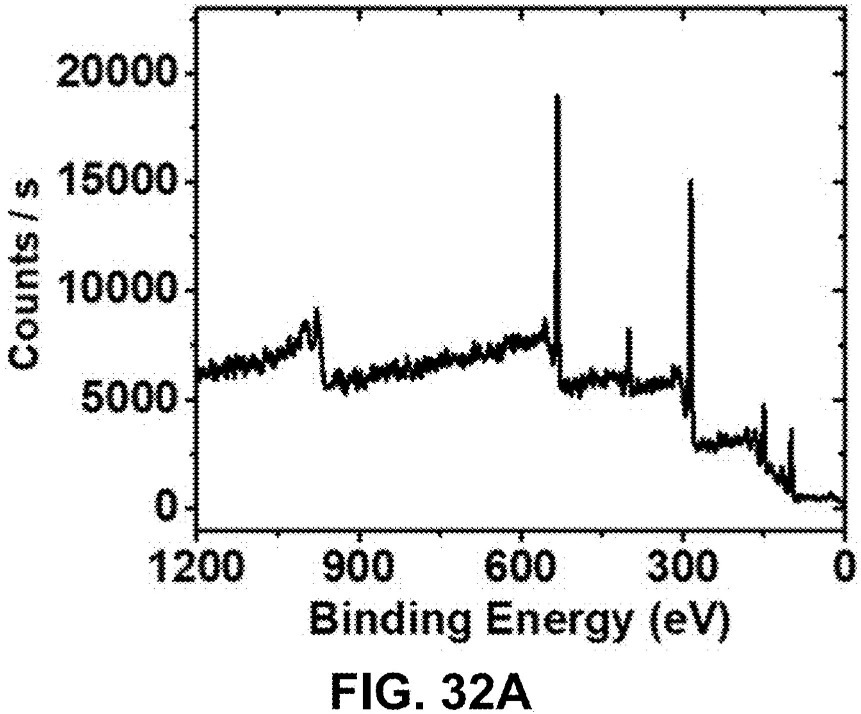
FIG. 32A: Wide-scan survey spectra.
Figure 32B:
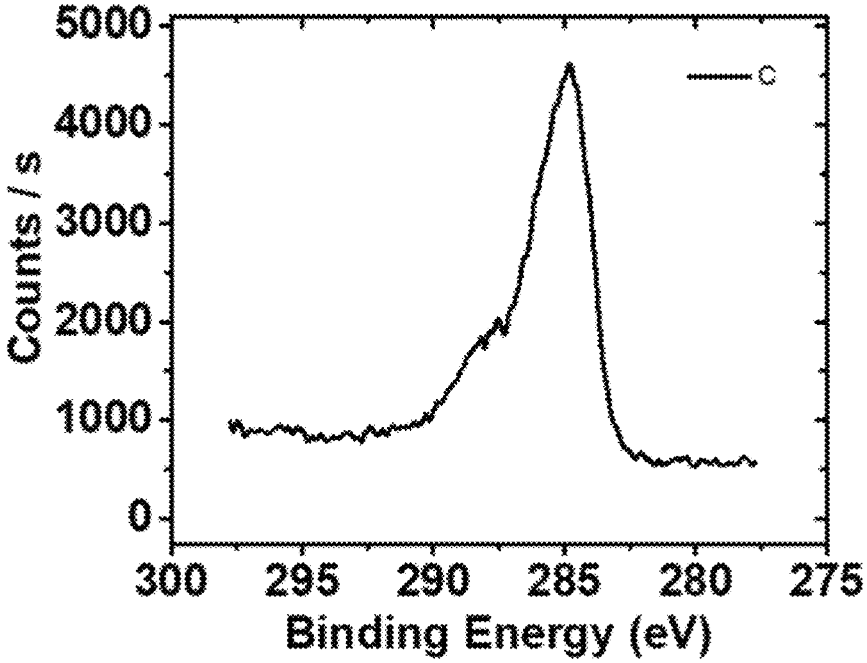
FIG. 32B: the C1s spectrum.
Figure 32C:
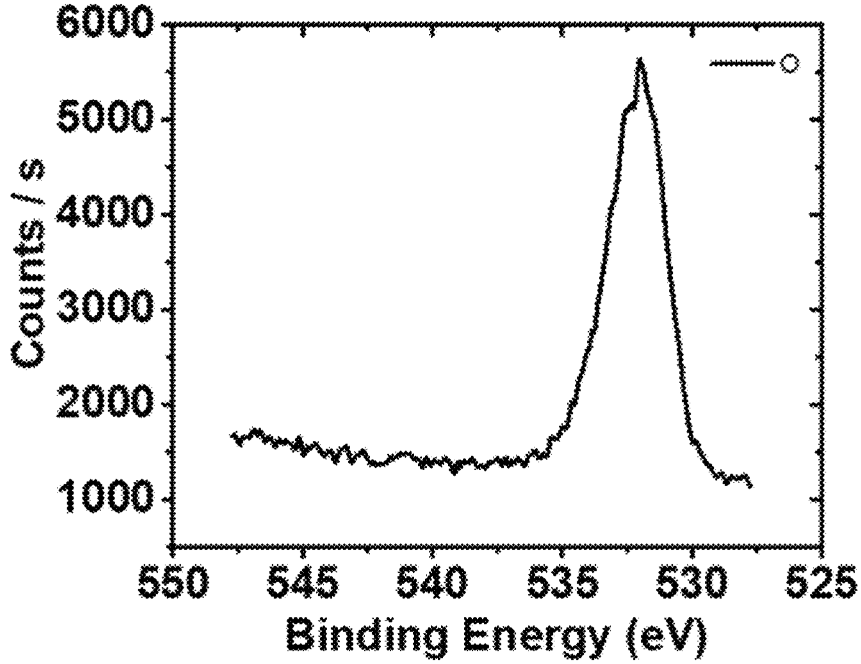
FIG. 32C: the O 1s spectrum.
Figure 32D:
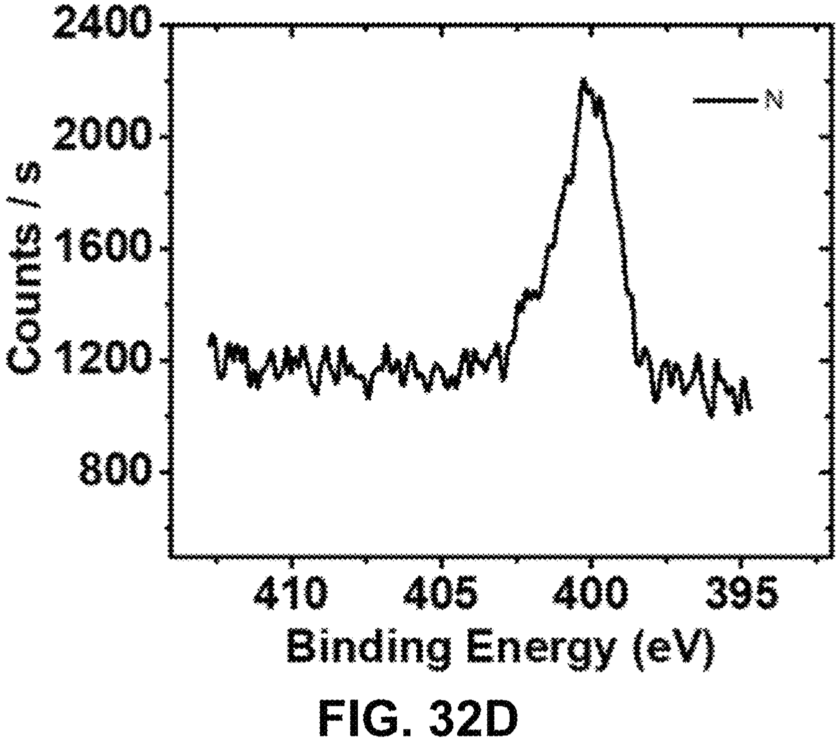
FIG. 32D: the N 1s spectrum.
Figure 32E:
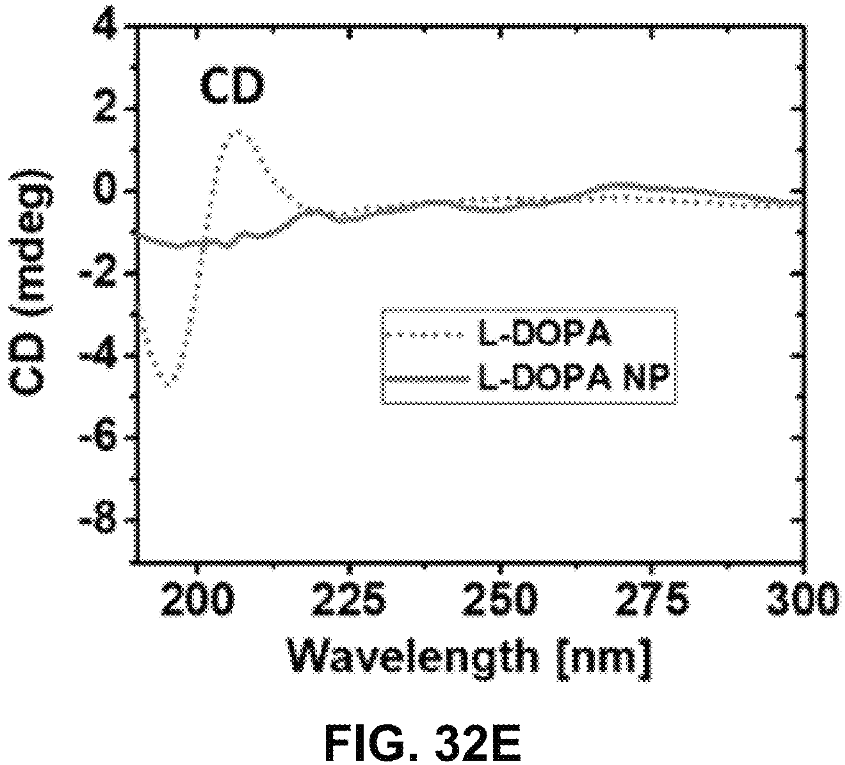
FIG. 32E: Circular dichroism spectra of L-DOPA NP and L-DOPA monomer. The L-DOPA NP sample has no CD signal, suggesting most of the building blocks are 5,6-dihydroxy-indole-2-carboxylic acid (DHICA).

To complete the library of melanin nanoparticles (table 1), eumelanin control was prepared via oxidative polymerization of L-DOPA in water (FIGS. 12A-12B for TEM and SEM characterization, see also FIG. 32E). The three types of melanin NPs (SeNP, PNP and L-DOPA NP) are all spherical nanoparticle with similar radius. While SeNP and SNP have similar zeta potential, the L-DOPA eumelanin has lower values, likely due to the presence of 3,4-dihydroxyindole carboxylic acid (DHICA) with catechol and carboxylic acid groups. Circular dichroism spectra of SNP showed clear signal (FIGS. 7-8), indicating chiral structure, which is consistence with the SS $^{13}C$ NMR result. L-DOPA NP showed minimal CD signal (FIGS. 7-8) suggesting the successful formation of dihydroxyindole sub-structure, which is the most important building block for eumelanin. Their stability was investigated under various conditions, including dilution, ionic strength, and varying pH (FIGS. 50A-50D and FIG. 13). SeNPs showed good stability under ambient conditions, low refractive index (FIG. 15A, 15B) and solubility in alkaline conditions.

TABLE 1

The nanoparticle library used in this work. Cysteine melanin SNP was used as a pheomelanin control and L-DOPA NP worked as a eumelanin control.

| | Monomer | Oxidant | Size (r · nm) | Zeta potential (mV) | Molar ratio of Cys/SeC to L-DOPA[a] | Circular dichroism Signal[b] |
|---|---|---|---|---|---|---|
| SeNP | Selenocysteine L-DOPA | $KMnO_4$ | 80 | −20.3 | 0.44:1 | − |
| SNP | Cysteine L-DOPA | $KMnO_4$ | 89 | −16.4 | 0.65:1 | + |
| L-DOPA NP | L-DOPA | $KMnO_4$ | 90 | −52.2 | NA | − |

Figure 7:
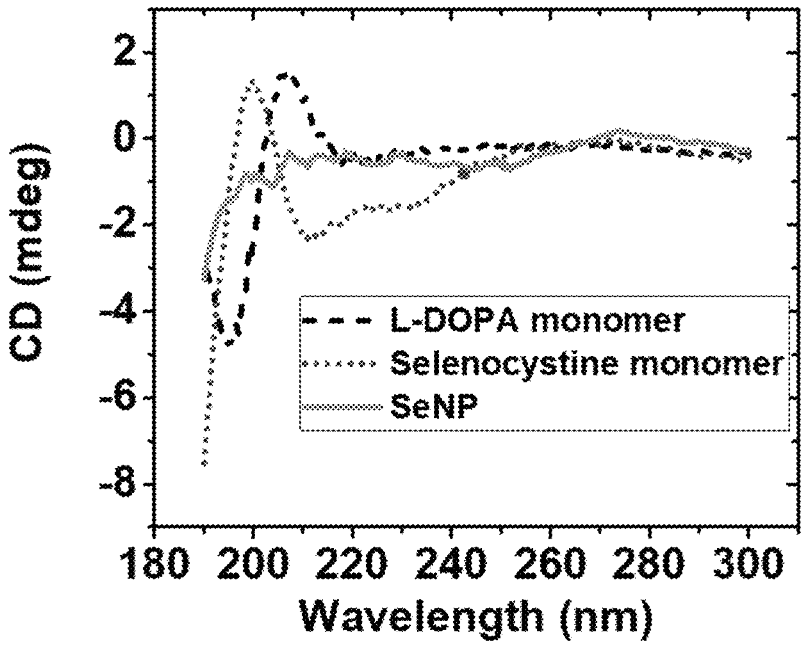
FIG. 7. Circular dichroism spectra of L-DOPA, selenocystine and SeNP. The monomers both have CD signal, yet the SeNP have little chiral signal. The disappearance of CD signal suggested the change of chiral structures, which is consistent with the proposed cyclized subunits of SeNP.
Figure 8:
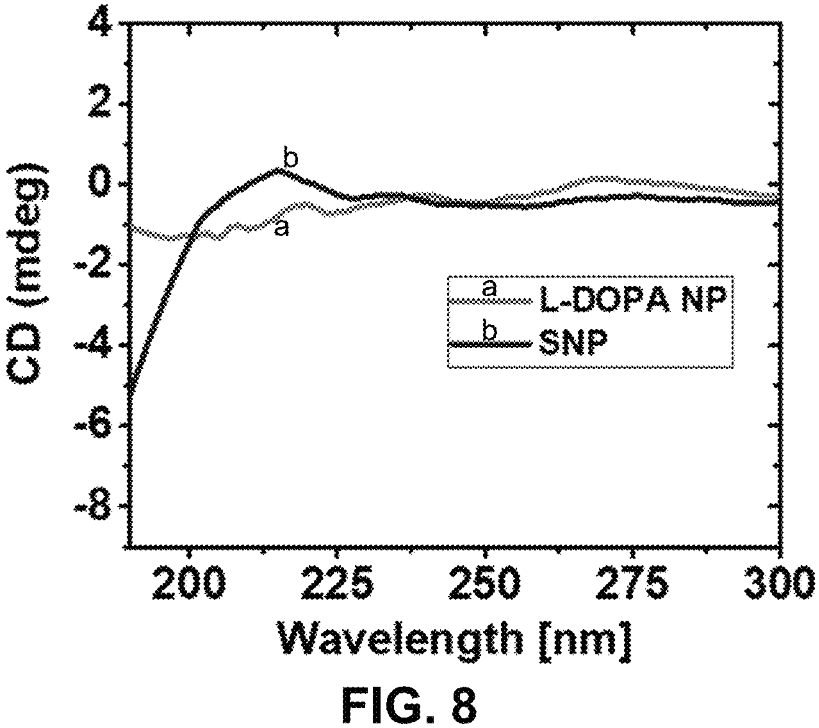
FIG. 8. Circular dichroism spectra of L-DOPA NP and SNP. The L-DOPA NP sample have no CD signal, suggestion most of the building blocks are 5,6-dihydroxyindole-2-carboxylic acid (DHICA). The SNP sample has some chiral signal. The CD signal suggested signal open chain structure as indicated by the solid-state NMR of SNP.

[a]The molar ratio was calculated from ICP-OES results.
[b]CD spectra is shown in FIGS. 7-8.

Figure 3A:
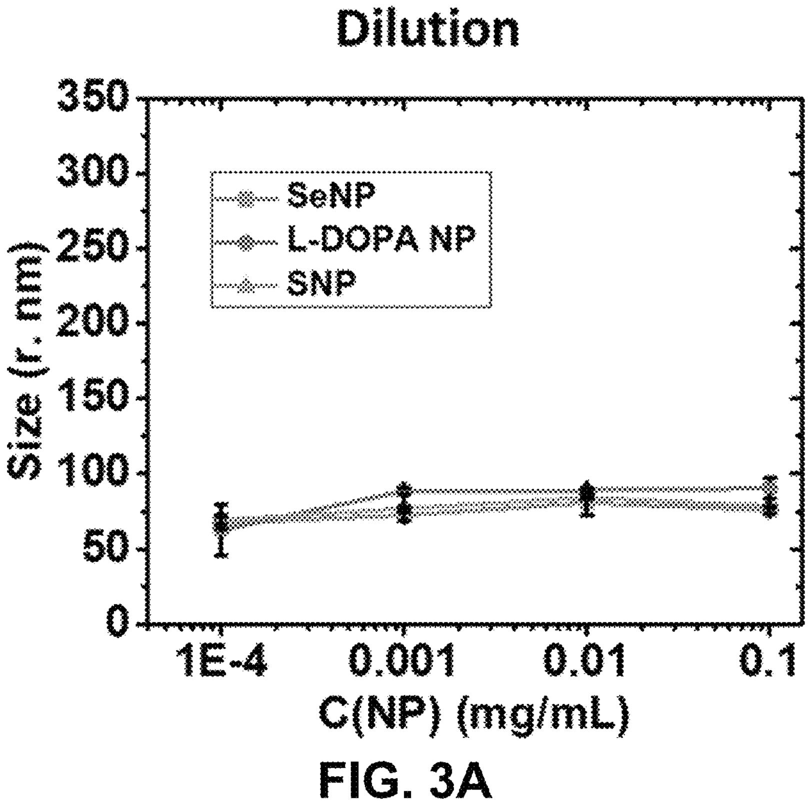
FIGS. 3A-3C. Stability and solubility test of SeNP compared with L-DOPA eumelanin NPs and SNPs. Hydrodynamic radius measured by DLS under different NP concentrations (FIG. 3A), different NaCl concentrations (FIG. 3B), and (FIG. 3C) different pH (from 7-14). Samples were measured in triplicates (n=3). The error bars indicate standard deviation (s.d).
Figure 3B:
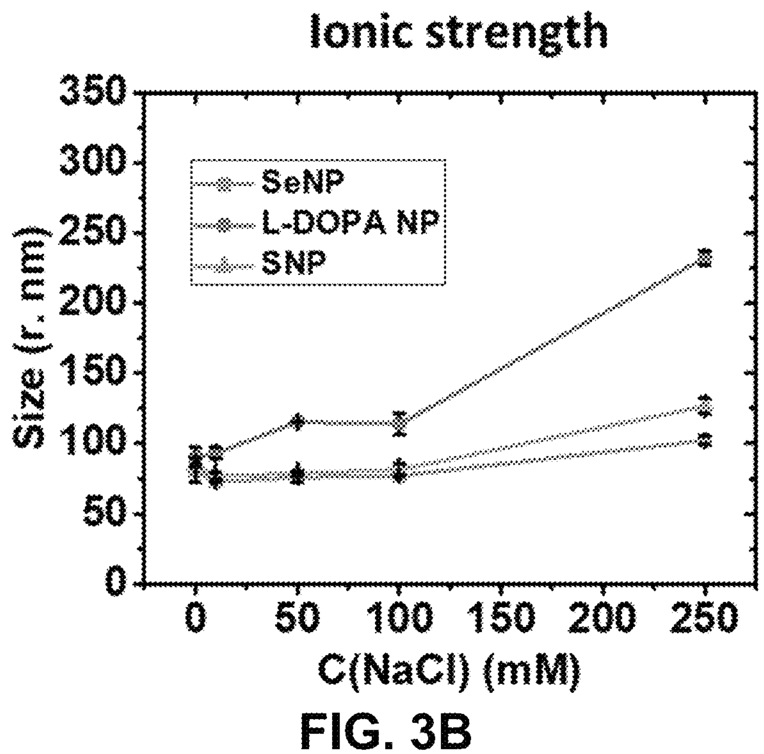
Figure 3C:
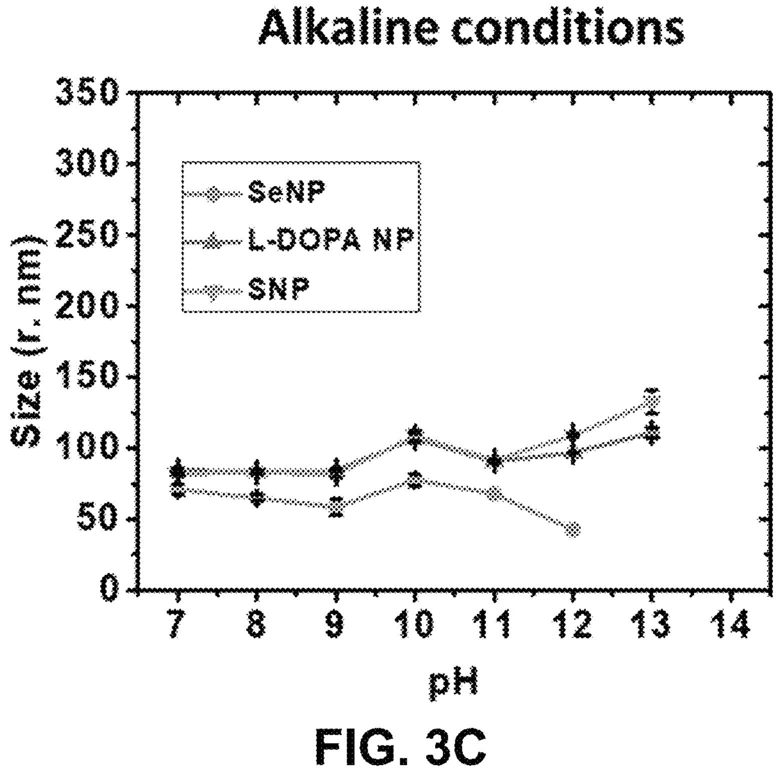

To elucidate whether the different NPs have monomer dependent structural properties, we subsequently investigated their relative stability of under various conditions. First, for all the three types of NPs, no apparent size decrease was observed at $10^{-4}$ mg/mL concentration by DLS (FIG. 3A). The high stability against dilution is probably because melanins are crosslinked by covalent/non-covalent interactions. Secondly, they behave differently against ionic strength and alkaline conditions. As shown in FIG. 3B, SeNPs experienced much smaller size change under high ionic strength environments compared with L-DOPA. As 250 mM is relevant biologically applications,[33] this suggests that SeNP has good stability in vitro. Interestingly, SeNP was found to be soluble under pH>11 conditions (FIG. 3C). In contrast, similar solubility was not observed with SNP and L-DOPA. This is another evidence that SeNP is a good mimic for natural pheomelanin as they were reported to be soluble under alkaline conditions due to the smaller molecular weight of pheomelanins.[38] Furthermore, colloidal stability over 60 days (FIG. 13) indicated that no large aggregates were formed in SeNP sample and only minimal hydrodynamic radius decrease was observed. The trend is the same with L-DOPA NP, yet the reason for the slight size decrease is unclear. The good stability during the experimental conditions can be attributed to the low zeta potential of about −20.3 mV that lead to strong electrostatic repulsion (Table 1), facilitating the long-time storage of the nanomaterials. Based on the above experiments, we reasoned that SeNP has good stability under ambient conditions and solubility in alkaline conditions, confirming its natural pheomelanin like properties and facilitating its biological applications.

Figure 16:
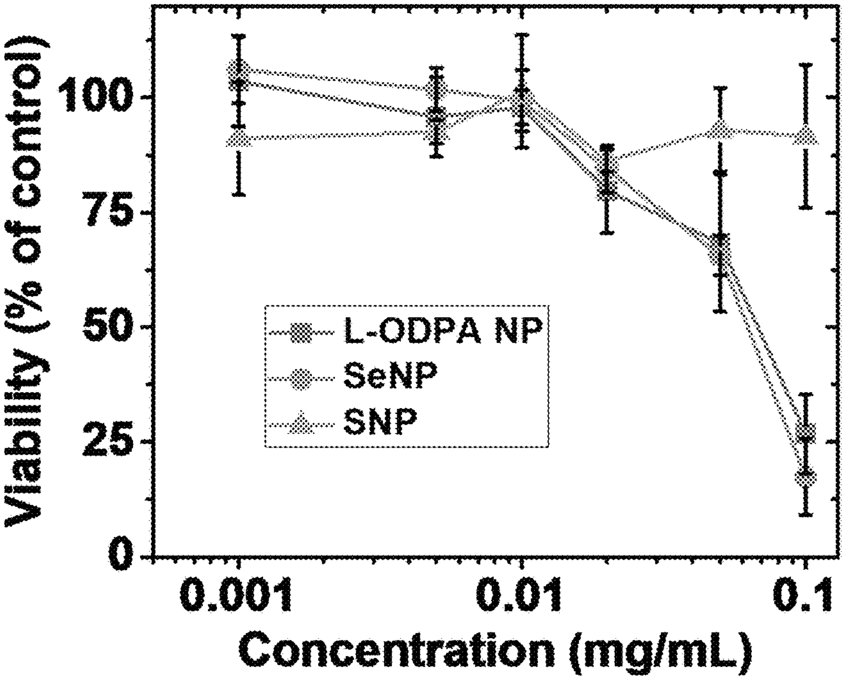
FIG. 16. Cell viability of NHEK cells after incubation with NPs for 24 h. The viability was determined using the CellTiter-Blue® assay.

Cytotoxicity and perinuclear cap formation: With this library of NPs in hand, we then explored their toxicity and subcellular distribution in NHEK. Our prior work has shown that polydopamine based melanin nanoparticles can mimic natural eumelanin and be taken up by keratinocytes and further protect human epidermal keratinocytes from adult against UV damage.[17] The polydopamine NPs are primarily localized inside perinuclear vesicles and form artificial caps in the NHEK cells after incubation for 24 hours. In this study, primary NHEK cells are chosen since natural melanin is typically transferred to keratinocytes in the epidermis after being made in melanosomes. Also batch to batch variations can be avoided since we can acquire a steady source of fresh tissue to isolate primary NHEK cells. First, the NHEK cell viability was studied as a function of NP concentration (FIG. 16). SeNP did not caused decrease viability until concentrations went above 0.02 mg $mL^{-1}$, which is similar to L-DOPA NPs. Therefore, the concentration for further experiments were kept below 0.01 mg $mL^{-1}$ (vide infra).

Figures 4A, 4B, 4C, 4D, 4E, 4F, 4G, 4H, 4I, 4J, 4K, 4L:
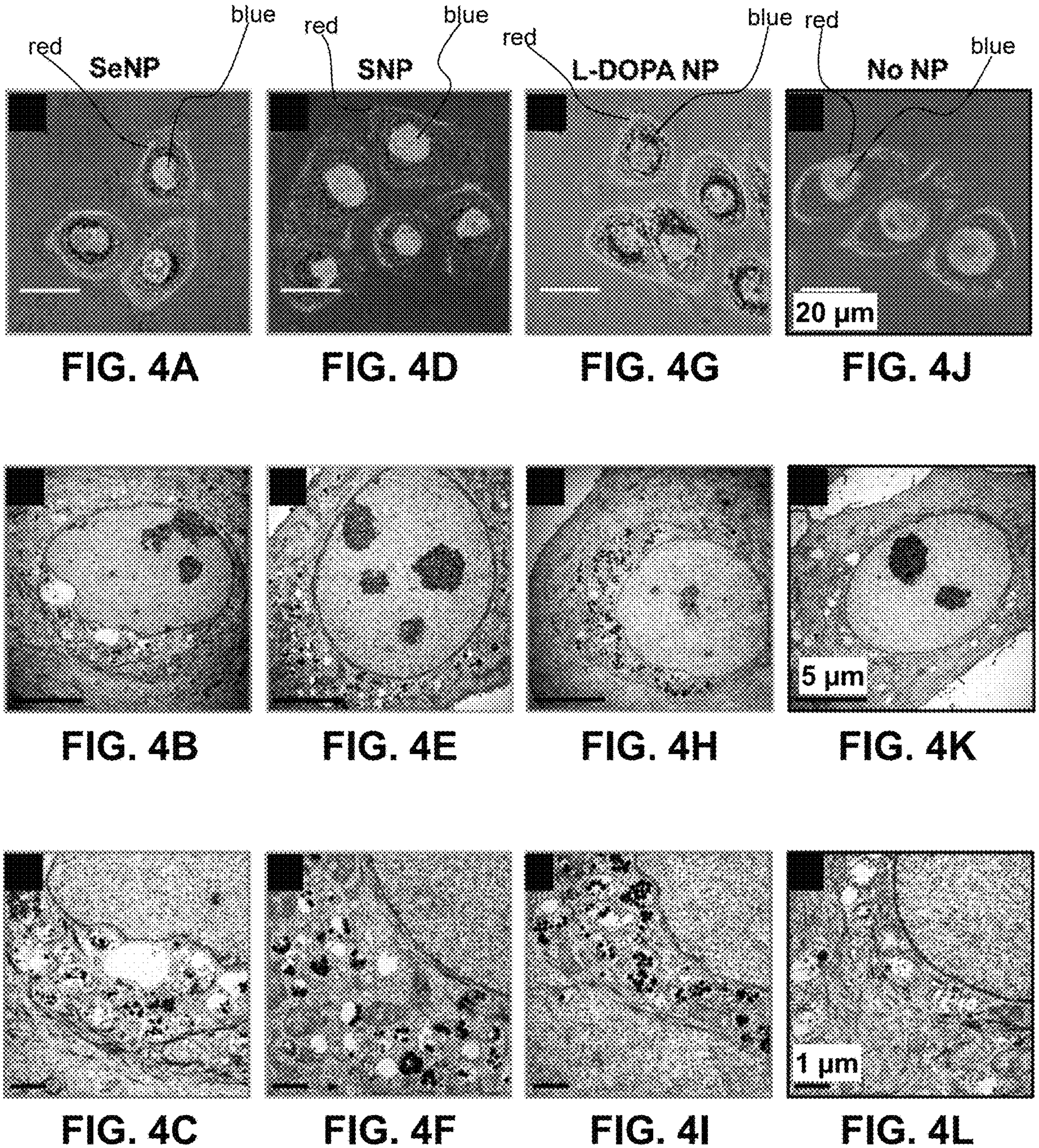
FIGS. 4A-4L. The subcellular distribution of different NPs in NHEK cells. Cells treated with SeNP (FIGS. 4A, 4B, 4C), SNP (FIGS. 4D, 4E, 4F), L-DOPA NP (FIGS. 4G, 4H, 4I) and No NP (FIGS. 4J, 4K, 4L) for 24 h imaged via confocal laser scanning microscopy and STEM. For confocal images (FIGS. 4A, 4D, 4G, 4J), cells were stained with wheat germ agglutinin (WGA)-633 to stain the cell membrane (false color red; light gray outlines/perimeters), and Hoechst dye to stain the nucleus (false color blue; light gray central regions). For STEM images (FIGS. 4B, 4C, 4E, 4F, 4H, 4I, 4K, 4L), samples were prepared by flat embedding cells in monolayer cell culture. The images were contrast-inverted to reflect the appearance of standard TEM images.

Next, we incubate the NHEK cells in the presence of different NPs at 0.004 mg $mL^{-1}$ for 24 h and then the intracellular distribution was observed by confocal microscopy. Although the SeNP has much lower refractive index, artificial pheomelanin caps showed up in confocal bright field (FIG. 4A). Similarly, SNP and L-DOPA NP could also form caps around the nucleus of NHEK cells (FIGS. 4D, 4G). Additionally, to better characterize the distribution of NPs in NHEK cells, we embed the cells in resin and sliced them for scanning transmission electron microscopy (STEM) studies. SeNPs could be observed inside vesicles in the perinucleous area of each keratinocyte and dispersed in keratin filaments, suggesting the same distribution with natural melanosomes. Similar distribution was observed for the other two types of NPs (FIGS. 4E, 4I, 4L) and the previous extracted natural melanosomes.[34] This result indicates that synthetic SeNP could mimic the natural distribution of eumelanin in keratinocytes, facilitating the further bio applications in X-ray protection.

Figure 17A:
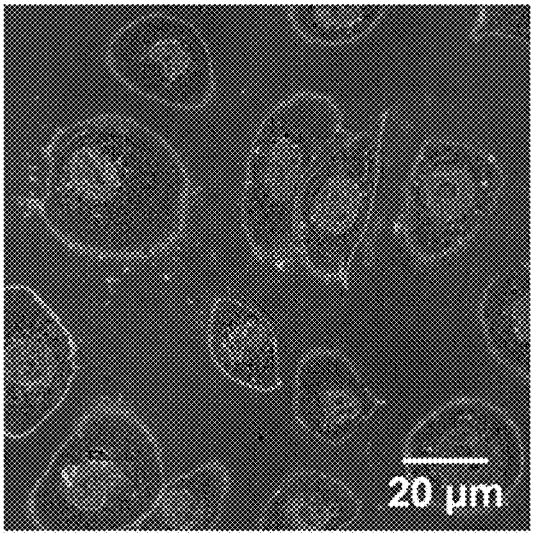
FIGS. 17A-17B. NHEK cell morphology before and after x-ray irradiation. Bright field image overlay with fluorescent channels for WGA (green) and DAPI (blue).
Figure 17B:
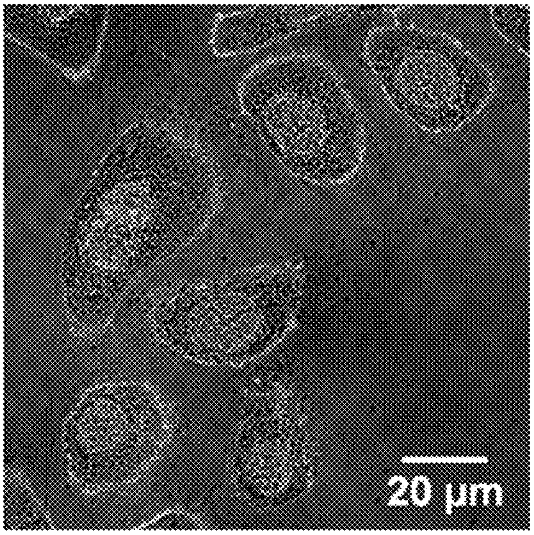

Protection effect of SeNP against X-ray induced cell cycle change is superior to other NPs: We next sought to study the protection effect of the NPs against X-ray radiation at harmful dosage. Shinomiya, et al., reported photon of different energy (UV and X-ray) has different effect on the cell cycle kinetics in WiDr colorectal carcinoma cells.[35] UV exposure could induce transient G1 arrest, while X-ray radiation induces G2/M arrest, further resulting in apoptosis. We wonder whether the SeNP has the capability to protect the cells against X-ray induced cell cycle change. To investigate the X-ray protection capability of the SeNP, we first validated the G2/M arrest by testing the cell cycle distribution using propidium iodide (PI) as the DNA binding dye. PI could stoichiometrically bind with DNA and detecting the fluorescence of each cell with flow cytometry could differentiate cells of different phase. After X-ray radiation, NHEK cell were incubated and cell cycle distribution were determined at different time points. G2/M population increase was observed after 24 h (FIG. 24, which is consistent with the prior report,[34] indicating that the cell cycle arrest caused by X-ray is generic to different cell lines. Secondly, to eliminate the possible quench of black melanin NP to the fluorescence of PI, we screened different concentrations of NPs and find that below 0.005 mg $mL^{-1}$, good cell cycle distribution could be obtained. For all the further experiments, we keep the concentrations to be 0.004 mg $mL^{-1}$. Besides, no apparent size change in the cells were observed for NHEK cells after X-ray treatment (FIGS. 17 A B).

Figure 5A:
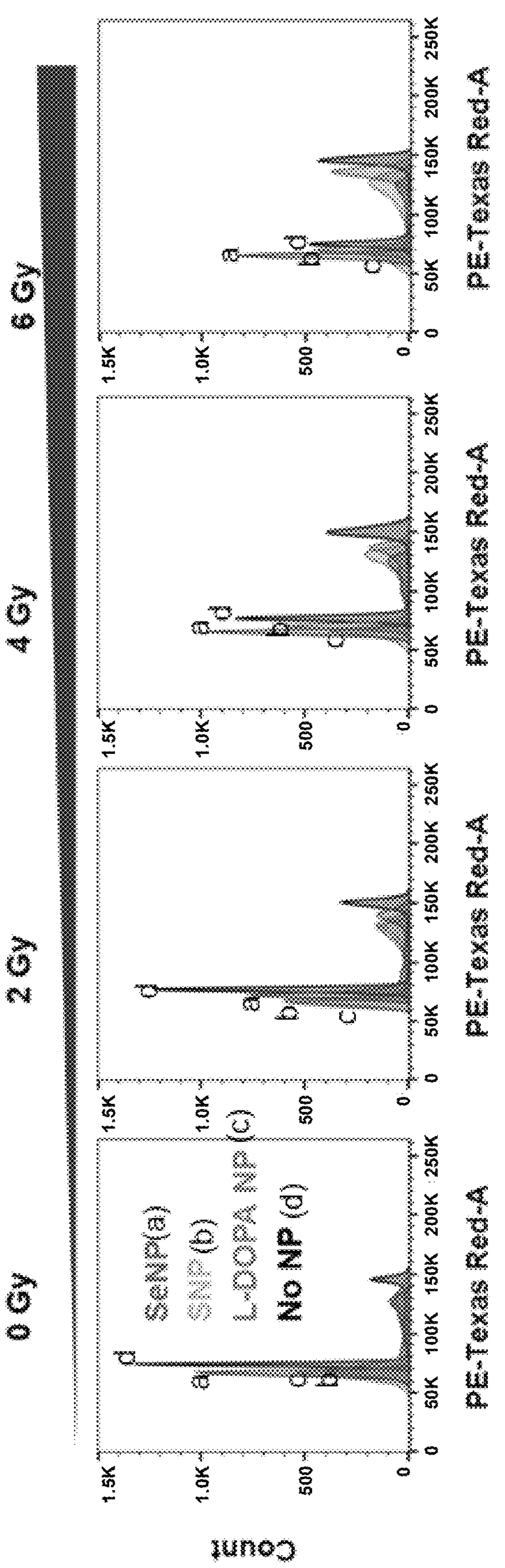
FIGS. 5A-5H. SeNPs' protection effect against cell cycle change induced by X-ray. SNP and SeNP were both used to treat the NHEK cells as a control.
Figure 19A:
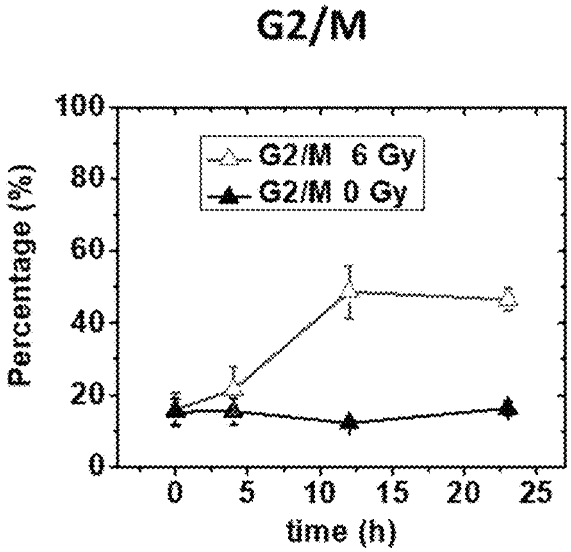
FIGS. 19A-19D. Cell cycle changes of NHEK cells induced by x-ray irradiated. The cell population percentage in different cell cycle phases, (FIG. 19A), S (FIG. 19B), and G0/G1 (FIG. 19C) are plotted against post-irradiation time.
Figure 24:
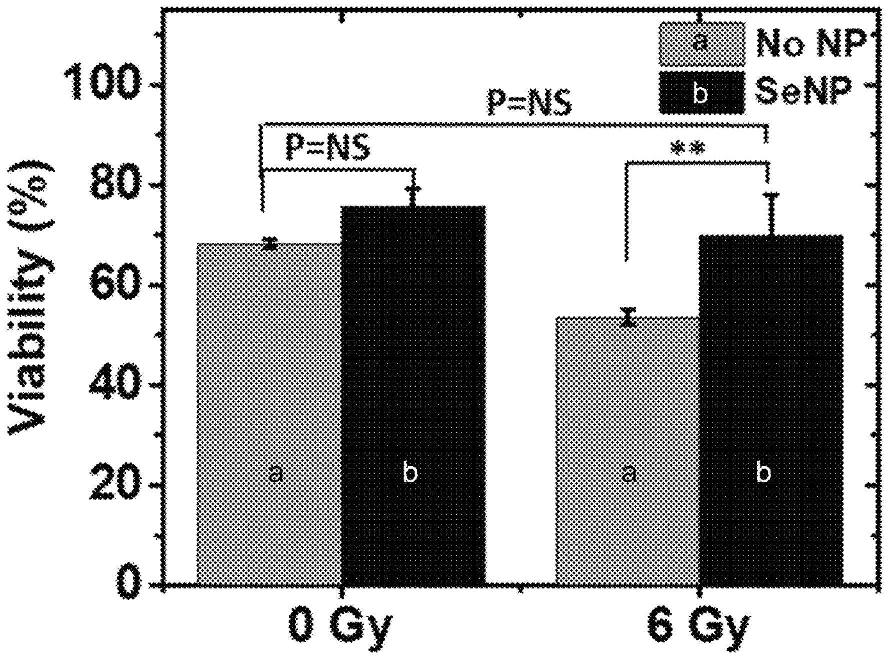
FIG. 24. NHEK cell viability using flow cytometry. Cells were treated with and without SeNP, followed by 6 Gy or 0 Gy x-ray irradiation and then incubated for 24 h. Red=SeNP. Black=No NP control.
Figure 25A:
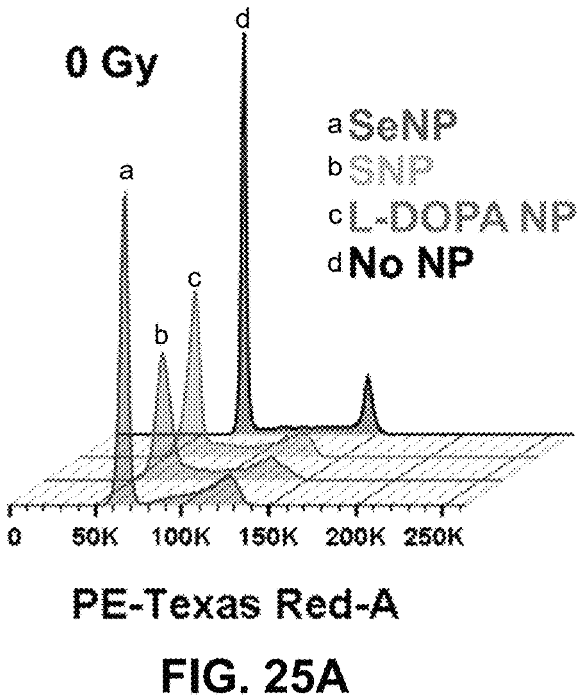
FIGS. 25A-25D. Cell cycle distribution plots of cells treated with different NPs followed by x-ray irradiation with different doses.
Figure 25B:
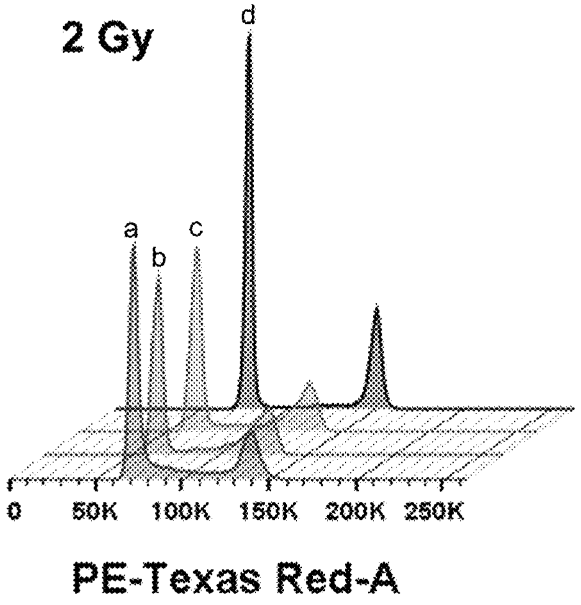
Figure 25C:
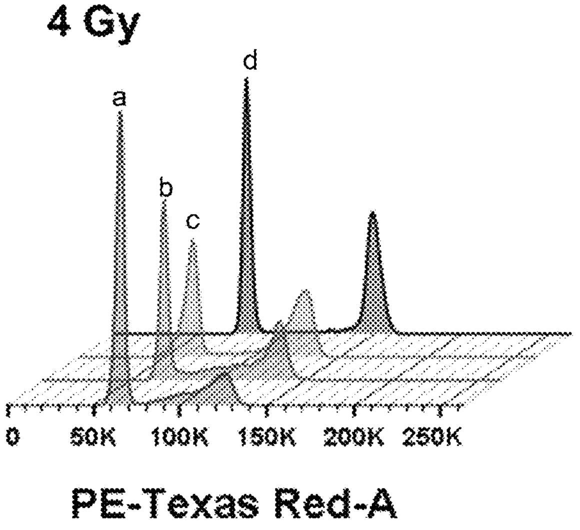
Figure 25D:
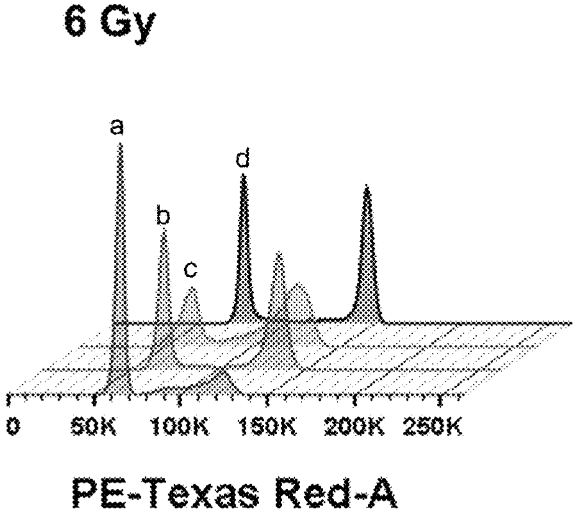

Detailed cell cycle experiments revealed that SeNP could inhibit the G2/M arrest for up to 6 Gy X-ray (FIG. 5A). It should be pointed out that the dosage a radiotherapy patient is 1.8-2 Gy per day. And a straight 5 Gy radiation is lethal to humans.[36] In order to better study the dose dependent response of the NHEK cells, we radiated the cells with X-ray of different dosage, including 0 Gy, 2 Gy, 4 Gy and 6 Gy. As shown in FIG. 5C, the cells in G2/M phase increased significantly with the X-ray dosage increasing, confirming that X-ray could cause the G2/M arrest. Interestingly, we observed much lower G2/M population in the SeNP treated cells. To our surprise, even for cells after 6 Gy X-ray radiation, which is the maximum dosage a patient can receive in three days for radiotherapy, the cells in the G2/M phase still remained ~17%, which showed no statistical difference with the none X-ray treated cells (P=0.22). In contrast, no significant changes in G2/M population were observed in SNP or L-DOPA NP incubated cells with cells in the absence of any NPs (P>0.01) (FIG. 5C). In the meantime, the cellular viability of cells protected by SeNP was maintained after 6 Gy radiation, as confirmed by flow cytometry with nuclear staining (FIGS. 19A and 24). While the cells without SeNP showed lower viability after 6 Gy radiation followed by 24 h incubation compared with the non-radiated cells. These results indicated that the SeNPs could protect the cells from X-ray induced cell cycle change and the subsequent apoptosis. However, the reason why SeNP is superior to the other to remains insufficiently understood.

Figure 51:
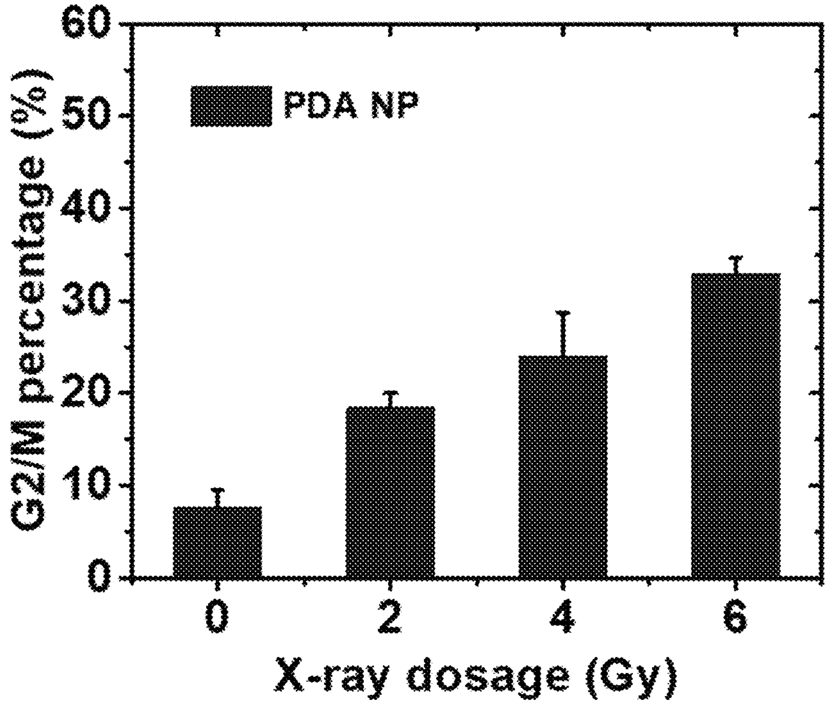
FIG. 51. Cell cycle distribution of cells treated with PDA NP followed by X-ray irradiation with different doses. Cells were incubated with PDA NP (0.004 mg $mL^{-1}$) for 24 h then irradiated with X-rays. All other conditions are identical for SeNP, PNP and L-DOPA NP. PDA was synthesized by standard oxidation in air under alkaline conditions.[15]
Figure 52:
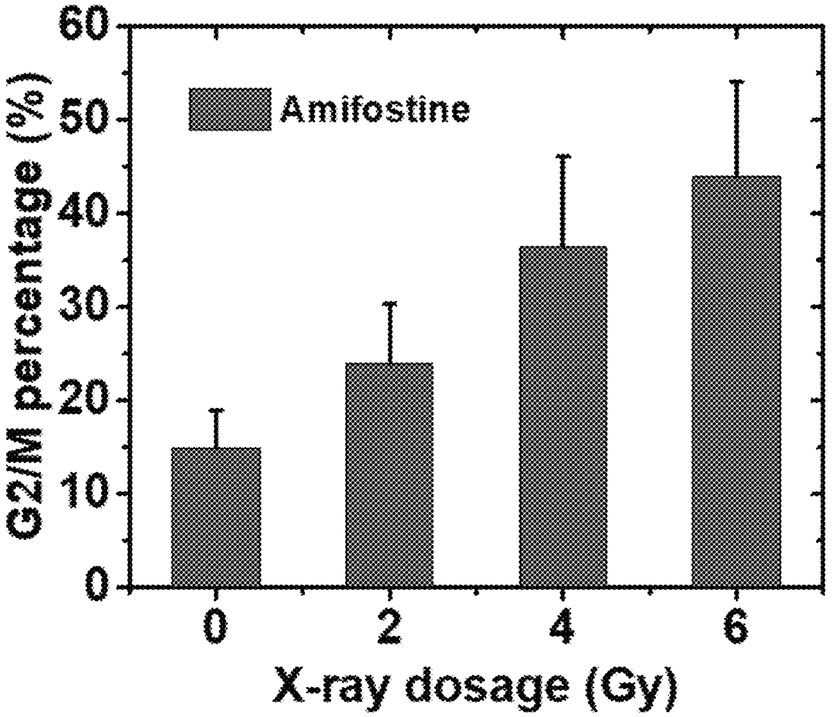
FIG. 52. Cell cycle distribution of cells treated with Amifostine followed by X-ray irradiation with different doses. Cells were incubated with Amifostine (2 mg/mL) for 1 h then irradiated with X-ray. The dosage of Amifostine was chosen according to a previous paper.[16] Amifostine works by scavenging reactive oxygen species. Our result suggests no protection against the cell cycle arrest caused by X-ray.
Figure 53A:
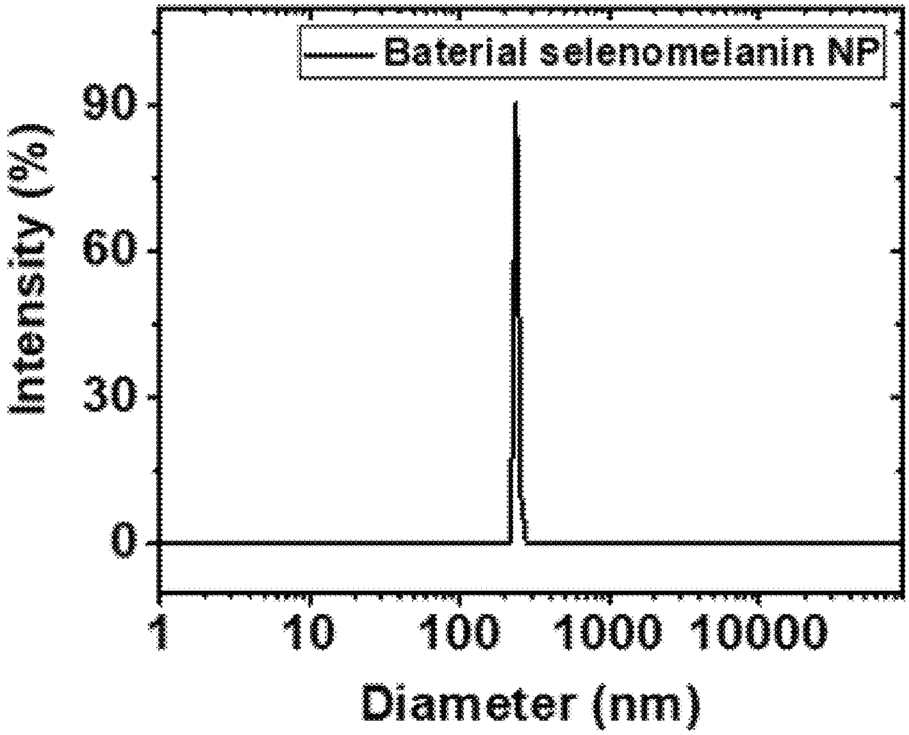
FIGS. 53A-53F. DLS, TEM, and SEM of selenomelanin NPs and ghosts made by *V. natriegens*.
Figure 53B:
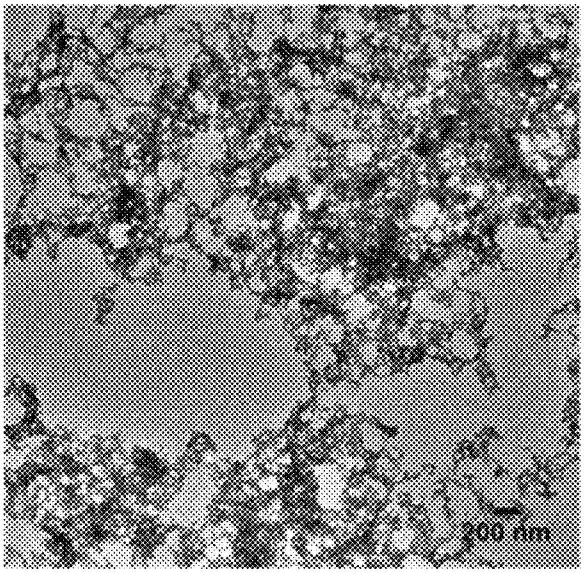
Figure 53C:
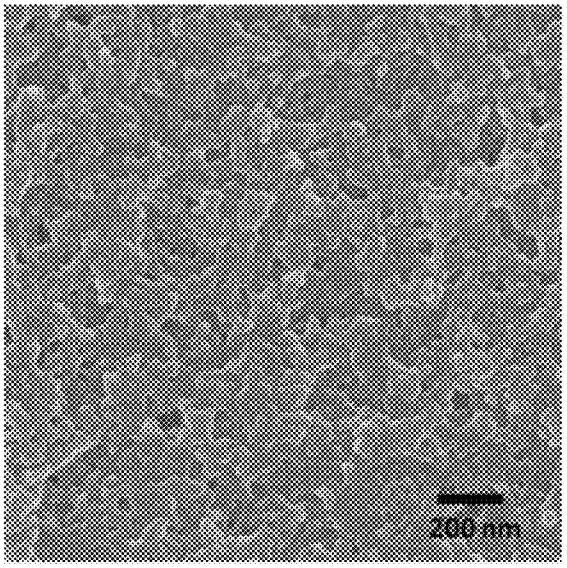
Figure 53D:
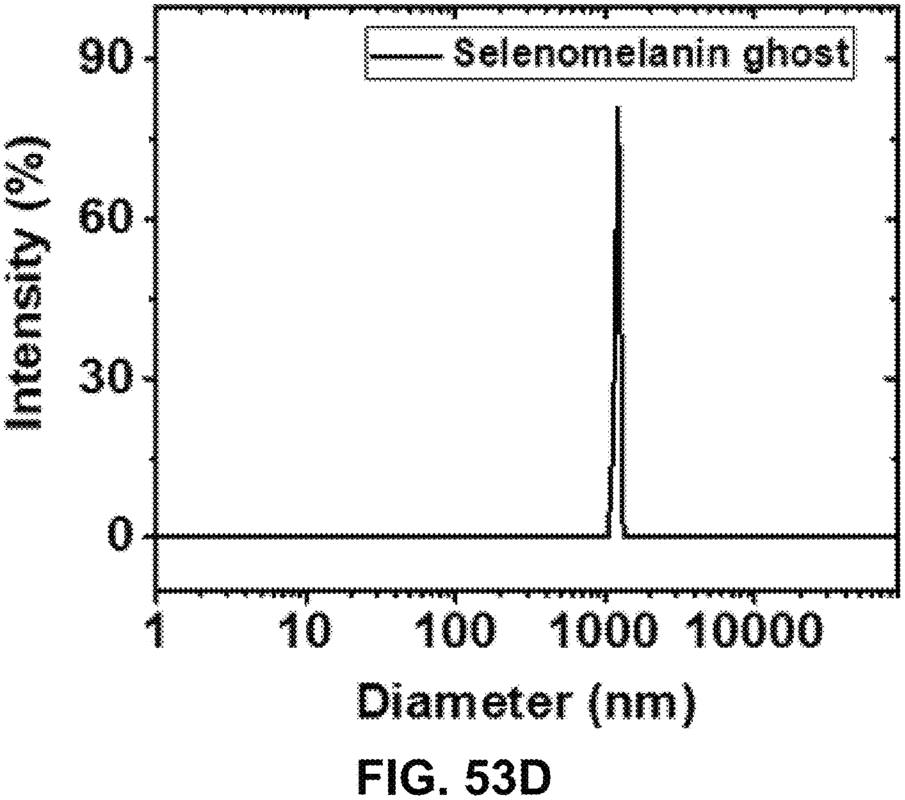
Figure 53E:
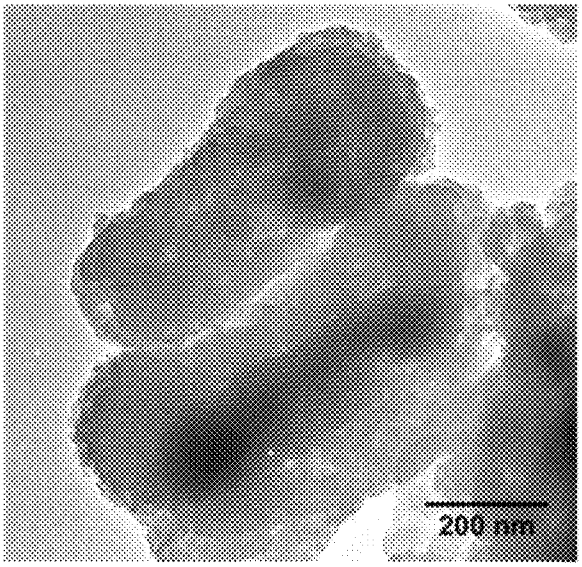
Figure 53F:
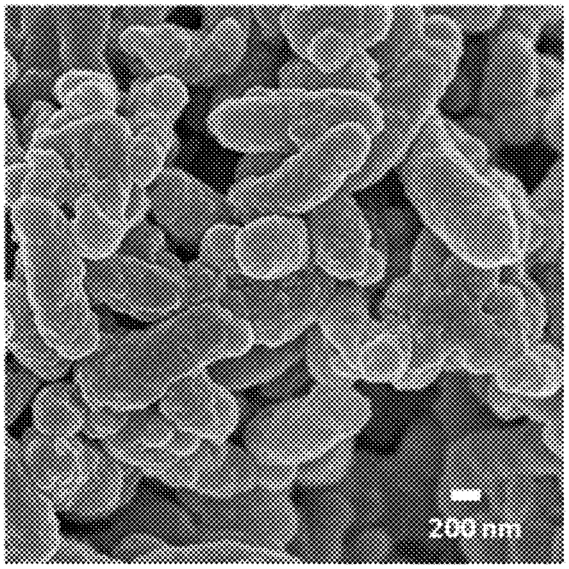

As further discussion, cell cycle experiments on treated cells revealed that of the three particles, only SeNP prevents G2/M arrest induced by X-rays (FIG. 5C, FIGS. 25A-25D, Table 3). In these studies, NHEK cells were treated with one of the synthetic melanin NPs (NP concentrations were kept at 0.004 mg $mL^{-1}$ to eliminate possible quenching of the propidium iodide fluorescence) and then irradiated with either 0 Gy, 2 Gy, 4 Gy or 6 Gy of X-ray radiation. It is worth noting that a typical clinical dose used for cancer radiotherapy patients is 1.8-2 Gy per day, while 5 Gy of radiation is lethal to humans.[42] For SeNPs, even after 6 Gy X-ray irradiation, the G2/M phase population remained at 17%, which is statistically identical to non-X-ray treated cells (P=0.22). Another eumelanin control, namely polydopamine nanoparticles (PDA NPs), was synthesized. Cell cycle experiments showed that after 6 Gy radiation, the G2/M phase population increased to 33% (FIG. 51). This result further confirms the superior protection effect of selenomelanin. The FDA approved drug amifostine for cytoprotection against radiotherapy was also tested, yet no difference was observed compared to the control where particles were omitted (FIG. 52). Moreover, the viability of cells protected by SeNPs was maintained after 6 Gy irradiation (FIG. 23A-23E, FIG. 24, Table 2). These results indicate that SeNPs can protect human skin cells from X-ray-induced cell cycle changes. While using selenomelanin for X-ray protection, direct exposure to sunlight should be avoided since pheomelanin has pro-oxidant properties upon photo excitation.[19]

Figure 18:
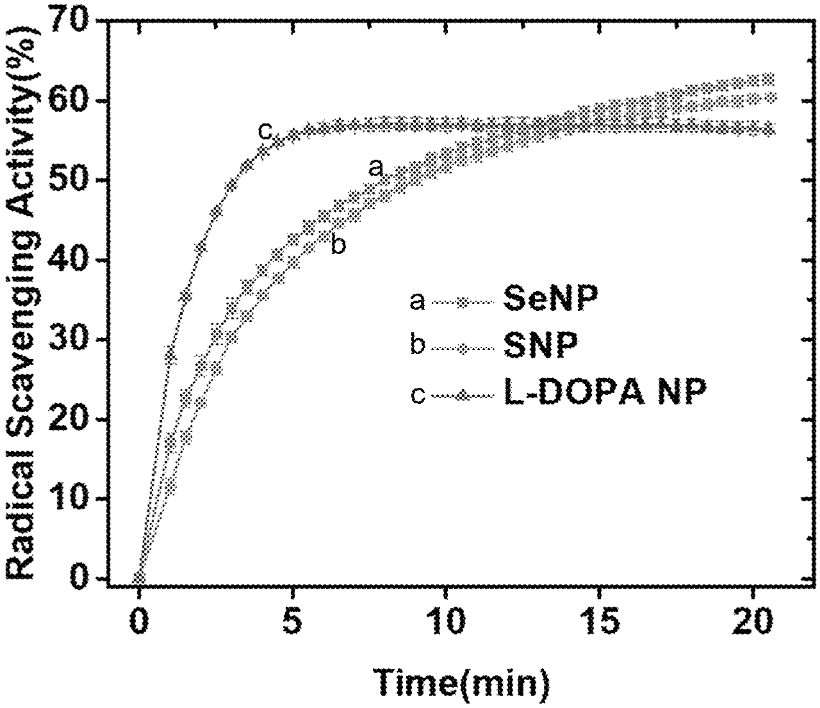
FIG. 18. DPPH assay for antioxidant activity of SeNP (red), SNP (blue) and L-DOPA NP (gray). Error bars represent the standard deviation of triplicate studies.
Figure 21:
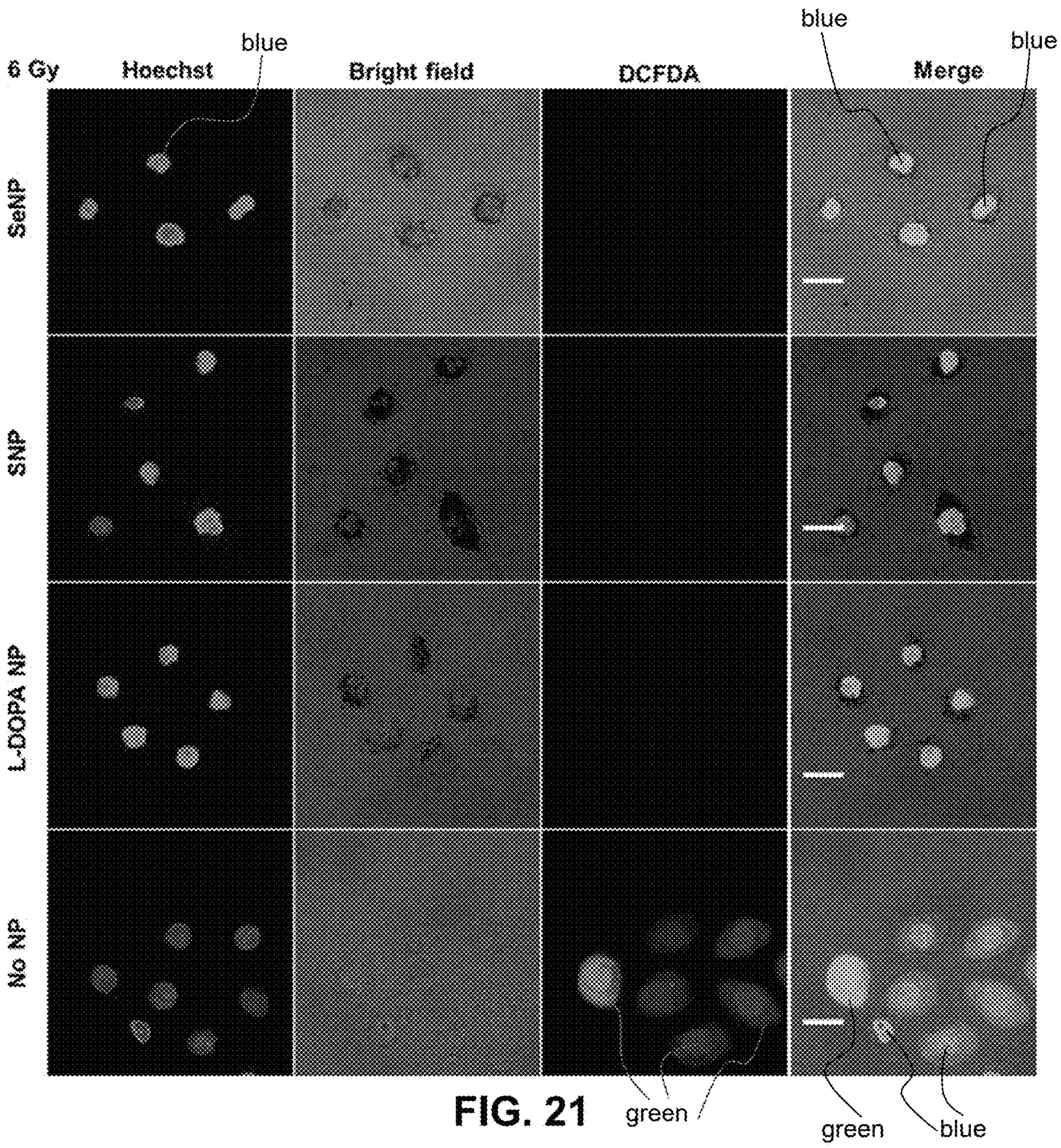
FIG. 21. Single channel confocal images of cells irradiated by 6 Gy x-ray for FIG. 5. ROS scavenging in NP-treated NHEK cells after 6 Gy x-ray irradiation, stained with Hoechst 33342 (blue) and DCFDA probe (green). Scale bars are 20 μm.
Figure 22:
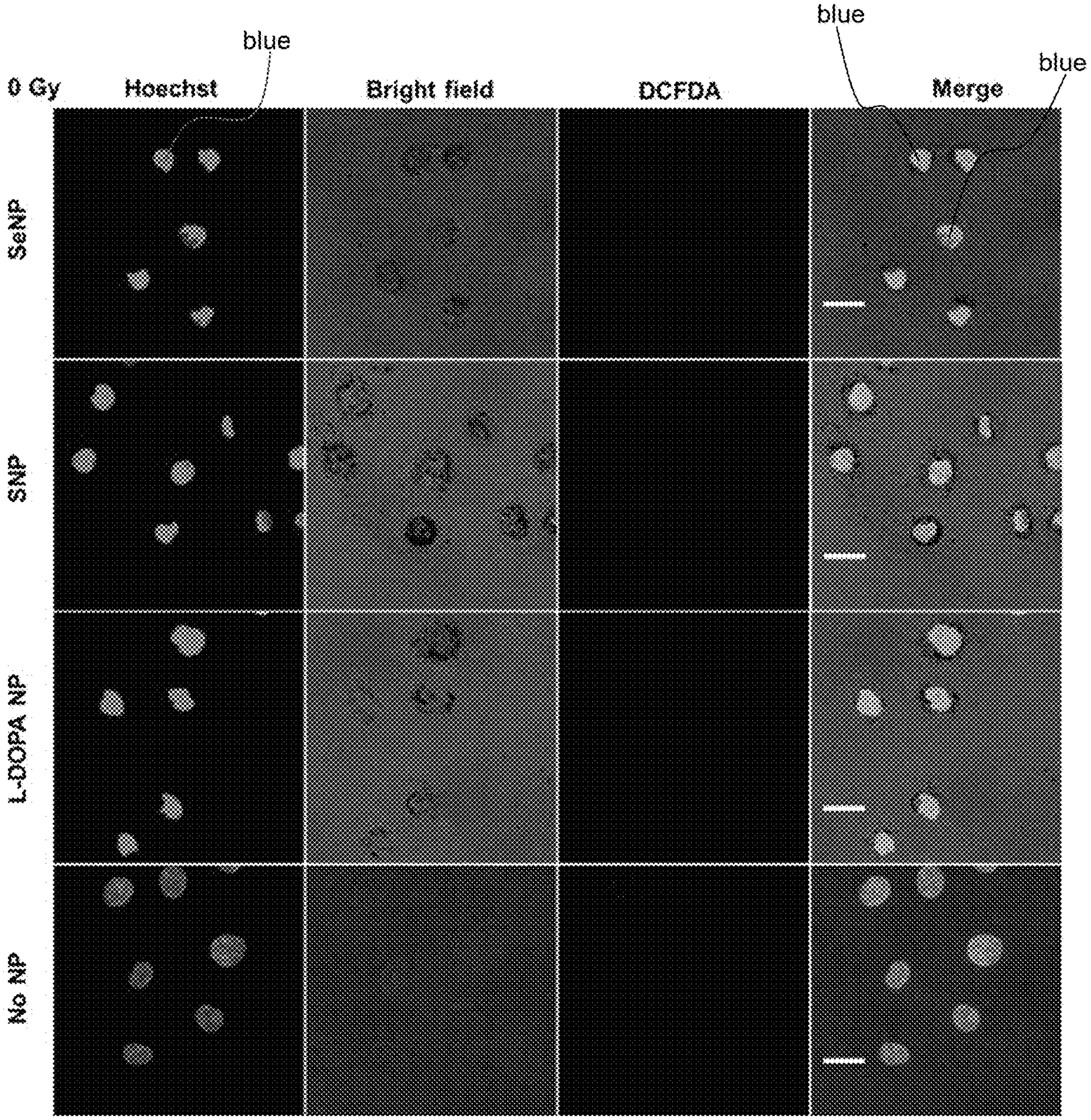
FIG. 22. Single channel confocal images of non-irradiated cells for FIG. 5. ROS scavenging in NP-treated NHEK cells with no x-ray irradiation, stained with Hoechst 33342 (blue) and DCFDA probe (green). Scale bars are 20 μm.
Figures 23A, 23B:
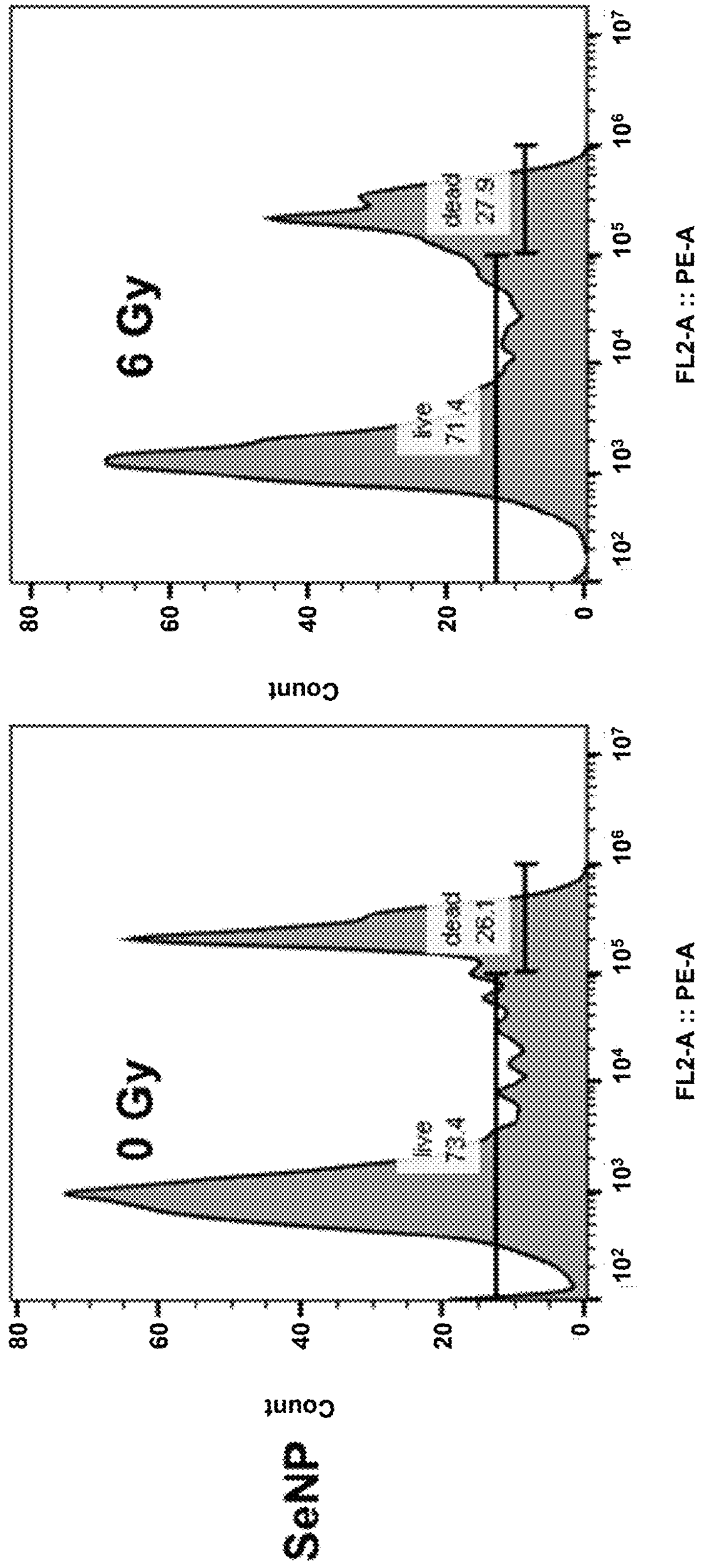
FIGS. 23A-23F. NHEK cell viability using flow cytometry. After harvesting the cells and washing with DPBS, PI solution (0.5 μL, 1 mg/mL in PBS) was added to each well. Cells were incubated on ice for 15 minutes prior to live cell flow cytometry measurements. Cells were treated with and without SeNP, radiated with 6 Gy or 0 Gy x-ray, and incubated for 24 h. Cells were treated with SeNP (0.004 mg $mL^{-1}$) followed by 0 Gy (FIG. 23A) or 6 Gy (FIG. 23B) x-ray irradiation, or no particles followed by 0 Gy (FIG. 23C) or 6 Gy (FIG. 23D) x-ray irradiation. NHEK cells without PI stain were used as live control (FIG. 23E). Cells fixed with 70% ethanol and stained with PI were used as dead cell control for cell gating (FIG. 23F).
Figure 23D:
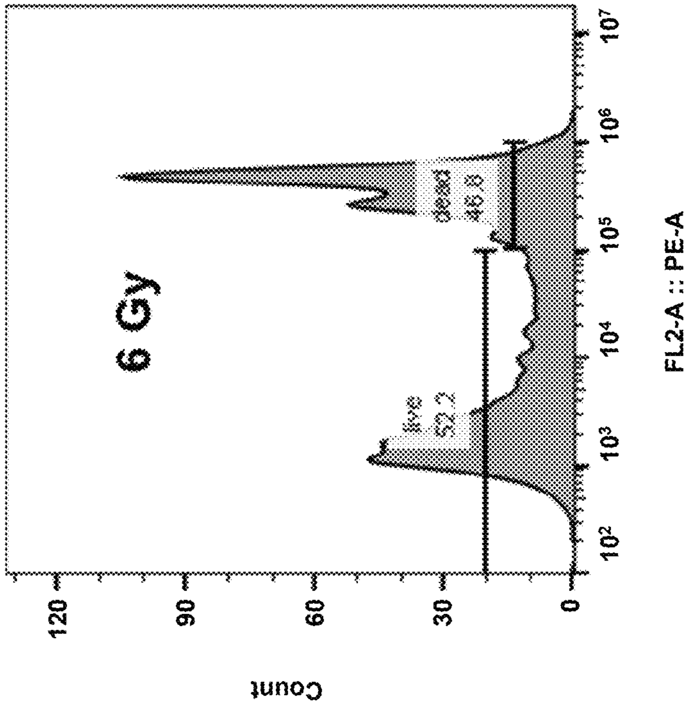
Figure 23C:
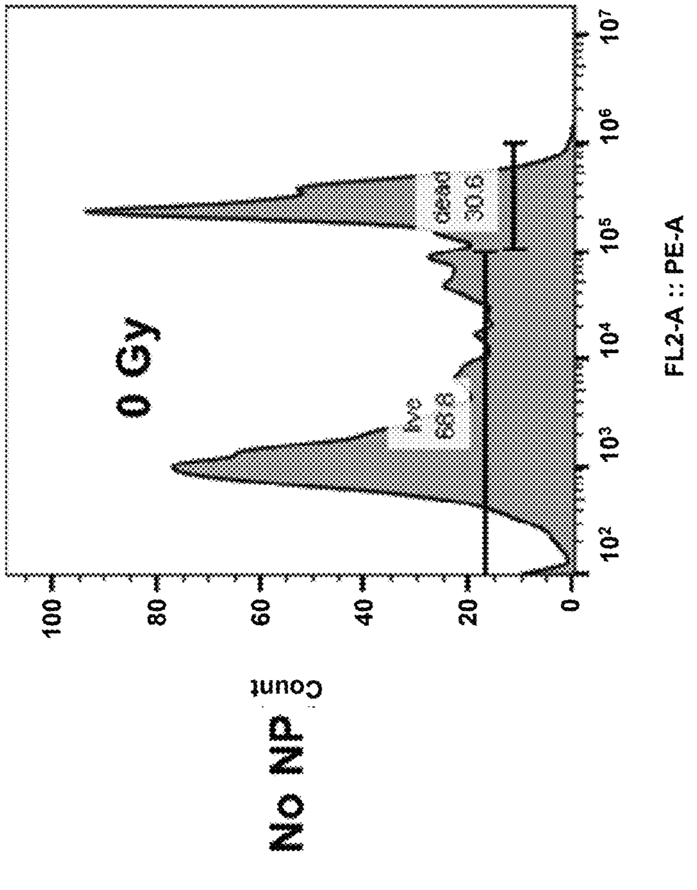
Figure 23F:
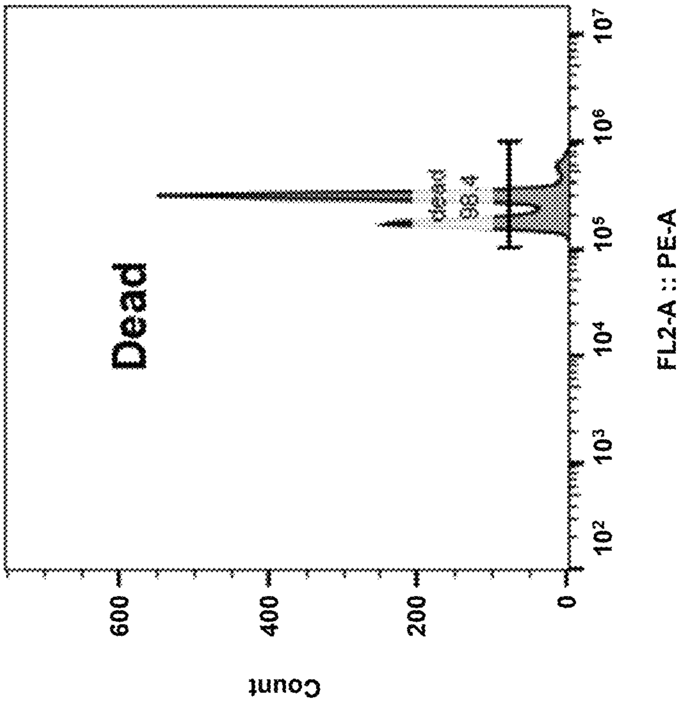
Figure 23E:
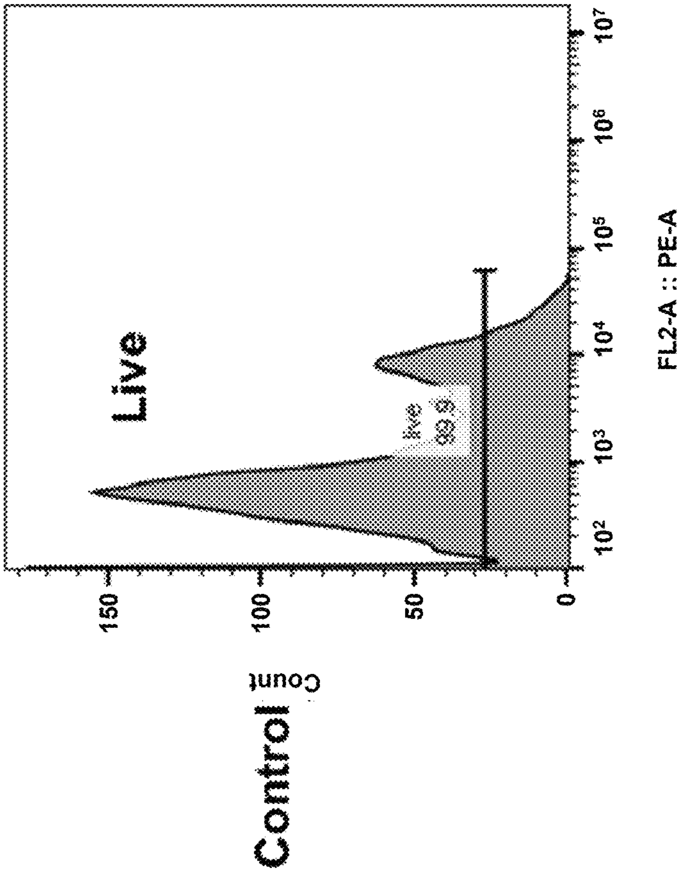

To address this question, the antioxidant properties of the different particles were accessed. Exposure of a living system to high energy radiation leads to the ionization of water and ultimately the production of toxic reactive oxygen species (ROS),[42] which accounts for approximately two thirds of the biological damage produced by X-ray.[43] In FIG. 5B, ROS probe was used in live NHEK cells. Strong green fluorescence from the ROS probe ((2',7'-dichlorofluorescein diacetate, DCFDA) was detected after 6 Gy X-ray in cells with no particles treated, confirming that X-ray could induced the generation of ROS via the high-energy electron generated by Compton scattering.[44] For the NP treated groups, very low ROS signal was observed, suggesting that the three types of melanin NPs could efficiently quench the damaging ROS (FIGS. 21-22). Further we used DPPH radical (2,2-Diphenyl-1-(2,4,6-trinitrophenyl) hydrazyl) to monitor the kinetics of radical quenching. The results revealed that SeNP is faster than SNP, yet L-DOPA NP is faster than the other two types of NPs (FIG. 18. The quick scavenging of SeNP could detoxify from ROS caused by X-ray and maintain a robust redox balance.

We next sought to compare the X-ray physical attenuation capability of SeNP with SNP and L-DOPA NP. The SeNP was hypothesized to be better attenuating material based on the following two reasons. (1) As high Z materials, such as lead, are known to attenuate high-energy radiations better, we hypothesis the heavier Se elements in SeNPs would make them a better radiation shielding materials.[45] (2) The numerous electron-rich aromatic structures in the SeNP could account for the energy loss of X-ray ejected electrons, when the photoelectric effect predominates.[46] To experimentally test our hypothesis, we used the dosimetry X-ray film and radiated them with different dosage of X-ray (0-6 Gy). The X-ray dosage was found to be proportional to the absorbance of film at $\lambda_{max}$ 635 nm ($R^2$=0.98), validating that the film could be used to detect different X-ray dosage. Then, X-ray was shined through the nanoparticle suspension onto the film. The film underneath the SeNPs has lowest absorbance at 635 nm, while the L-DOPA and SNP has no statistical difference in terms of the film absorption. Therefore, we think the SeNP could attenuate the X-ray better. As attenuation is closely related to the local concentration, we assume the aggregated perinuclear cap may play an important role by providing better attenuation towards X-ray.

Figure 26A:
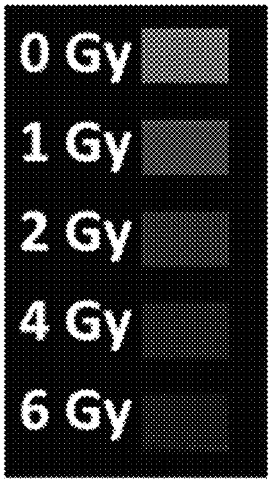
FIGS. 26A-26D. X-ray GAFCHROMIC EBT3 film experiments to evaluate the physical shielding of different NPs. The x-ray films were cut into 4 mm×40 mm sections, placed underneath a 2 mL NP suspension (1 mg/mL) in a capless 8 mL scintillation vial, irradiated from above, and subsequently measured in a quartz cuvette using a UV-Vis spectrometer.
Figure 26B:
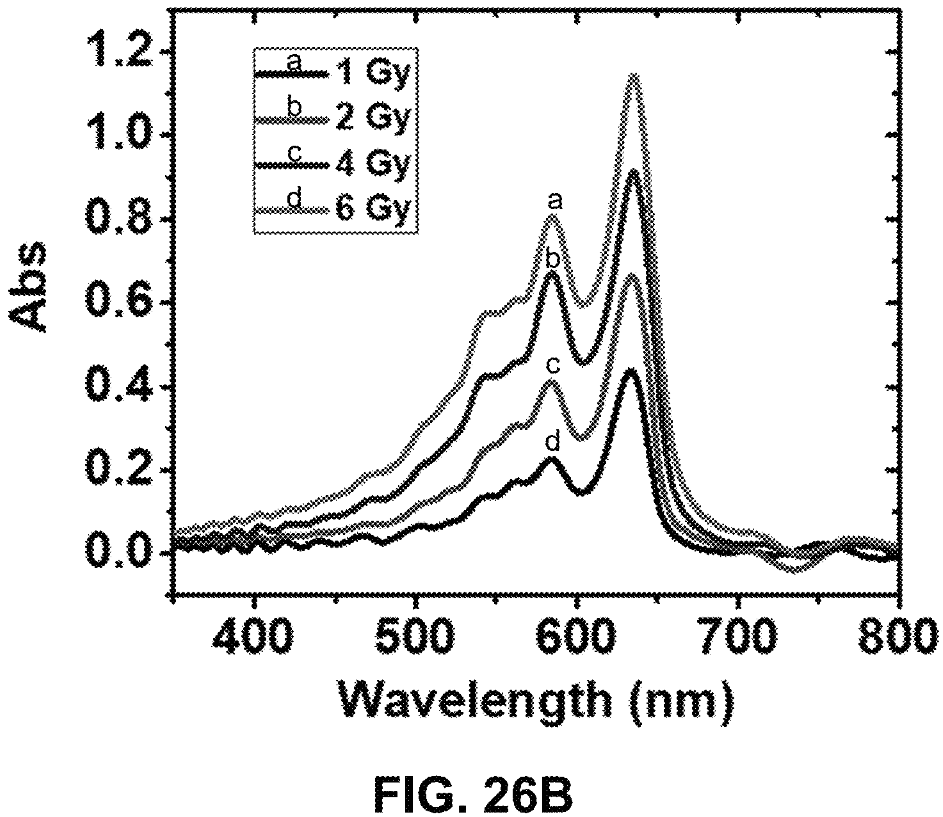
Figure 26C:
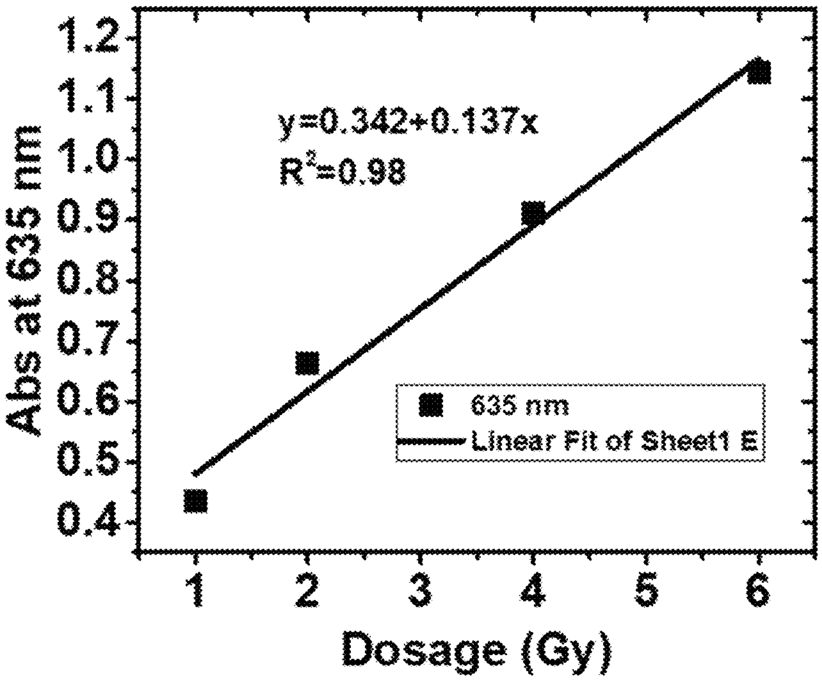
Figure 26D:
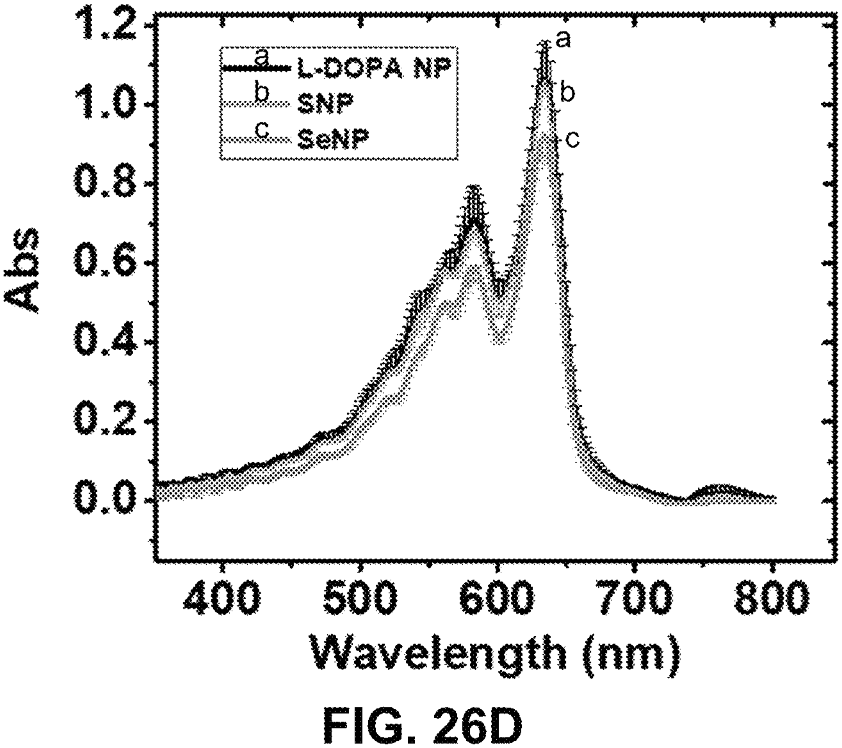

As further discussion, the radiation-related gene expression level of cyclin-dependent kinase inhibitor, a regulator of cell cycle progression, was also assessed. Reverse transcription polymerase chain reaction (RT-PCR) studies (FIG. 5G) revealed a 3-fold upregulation of the cyclin-dependent kinase inhibitor 1a (CDKN1a) gene 3 hrs after 6 Gy X-ray radiation (P<0.0001). SeNP treatment suppressed CDKN1a expression in NHEK cells significantly (P=0.01). Additionally, we compared the X-ray attenuation capability of the different NPs. Nanoparticle suspensions were placed over radiochromic film and exposed to X-ray radiation. The film underneath the SeNPs had the lowest absorbance at 635 nm (FIG. 5F, FIG. 26B), while the L-DOPA NP and PNP suspensions had no statistical difference in the film absorption, suggesting that SeNPs can better attenuate X-ray radiation. Taken together, ROS scavenging, gene expression regulation, and physical attenuation all contribute to the superior protective effects of SeNPs.

To further explore whether the perinuclear cap is necessary for X-ray protection, we modified the surface chemistry of SeNP and explored their protection effect in cells. The SeNPs were coated with OEG (MW=550 g $mol^{-1}$) by Michael addition and Schiff-base reactions. The conjugation was confirmed by FTIR spectra (FIGS. 27A-D).[11] Interestingly, when the NHEK cells were incubated with SeNP-OEG samples at the same condition, no perinuclear caps were observed under confocal microscopy. This indicate that the surface chemistry is important for the particle distribution and the perinuclear cap formation. More importantly, we characterized the cell cycle protection effect of SeNP-OEG. No statistical difference in the G2/M population SeNP-OEG of cells loaded with were shown for 2 Gy and 4 Gy with reference to cells treated with SeNP. However, at higher dosage 6 Gy, cells treated by SeNP-OEG showed ~40% G2/M population, which is much higher than the group treat with SeNP (17%) (P=0.00015). This result suggests that the perinuclear cap plays an important role in the ionizing radiation protection and that designing nanomaterials that can preferentially form strong caps is necessary for unwanted exposure to high dosage of ionizing radiation.

Figure 29A:
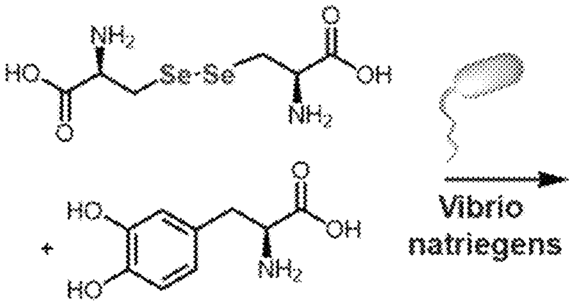
FIGS. 29A-29D. The selenomelanin sample synthesized by *Vibrio natriegens*.
Figure 29B:
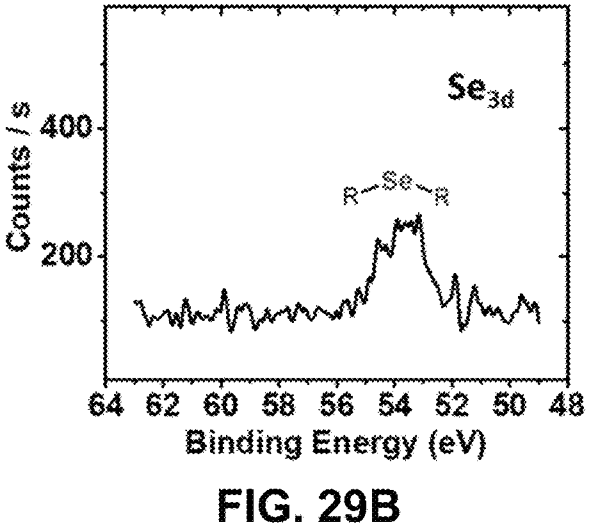
Figure 29C:
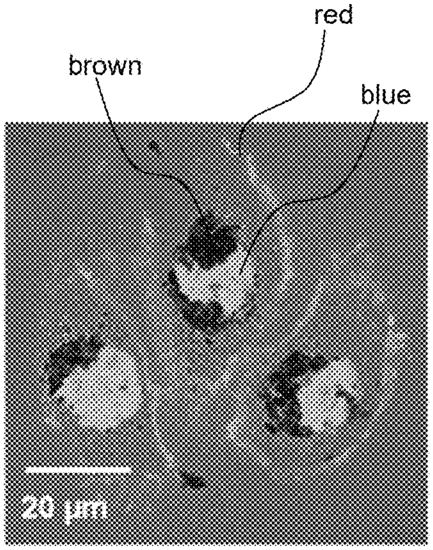
Figure 29D:
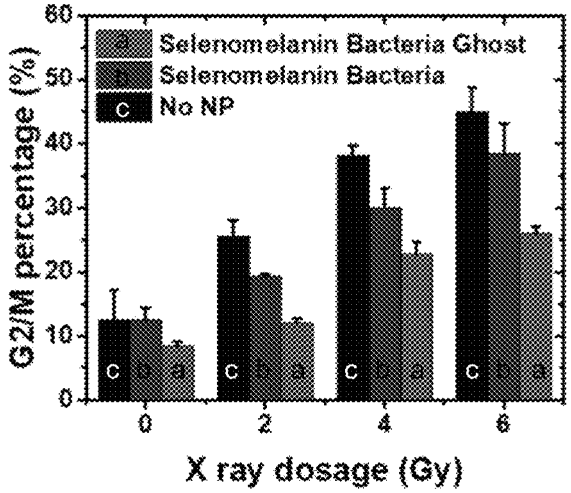

Biosynthesis of selenomelanin: After identifying selenomelanin as superior radioprotectors, we hypothesized that if sufficient selenium precursors are present, natural life could also produce selenomelanin. To test our hypothesis, we fed selenocystine and L-DOPA to model bacteria and then characterized the melanin product. Melanin was purified both from *Vibrio natriegens* cultural medium and the bacterial cell wall, the latter of which is known as melanin ghost. ICP-MS suggested that they both have selenium, yet the contents are lower than chemically synthetic SeNP. XPS in FIG. 29B could confirm the Se element in the melanin from cultural medium, further confirming that selenomelanin could be naturally incorporated in live cells through biosynthetic pathway. We then sought to explore whether the biosynthesized selenomelanin could provide similar protection effect against x-ray. Confocal image (FIG. 29C) showed that the selenomelanin ghost formed obvious perinuclear cap in NHEK cells. By testing the cell cycle distribution after x-ray radiation (FIG. 29D), we find that the biosynthetic selenomelanin also decrease the G2/M arrest caused by different dosage of x-ray, confirming that they have similar functions as the chemically synthesized SeNP. Especially for the selenomelanin ghost, they can decrease the G2/M population by 25% after a lethal 6 Gy radiation. The promising results encouraged us to think that selenomelanin may be present in high radiation exposure natural environments as a result of the evolution. Yet it remains an open question, to the best of our knowledge.

Figure 41A:
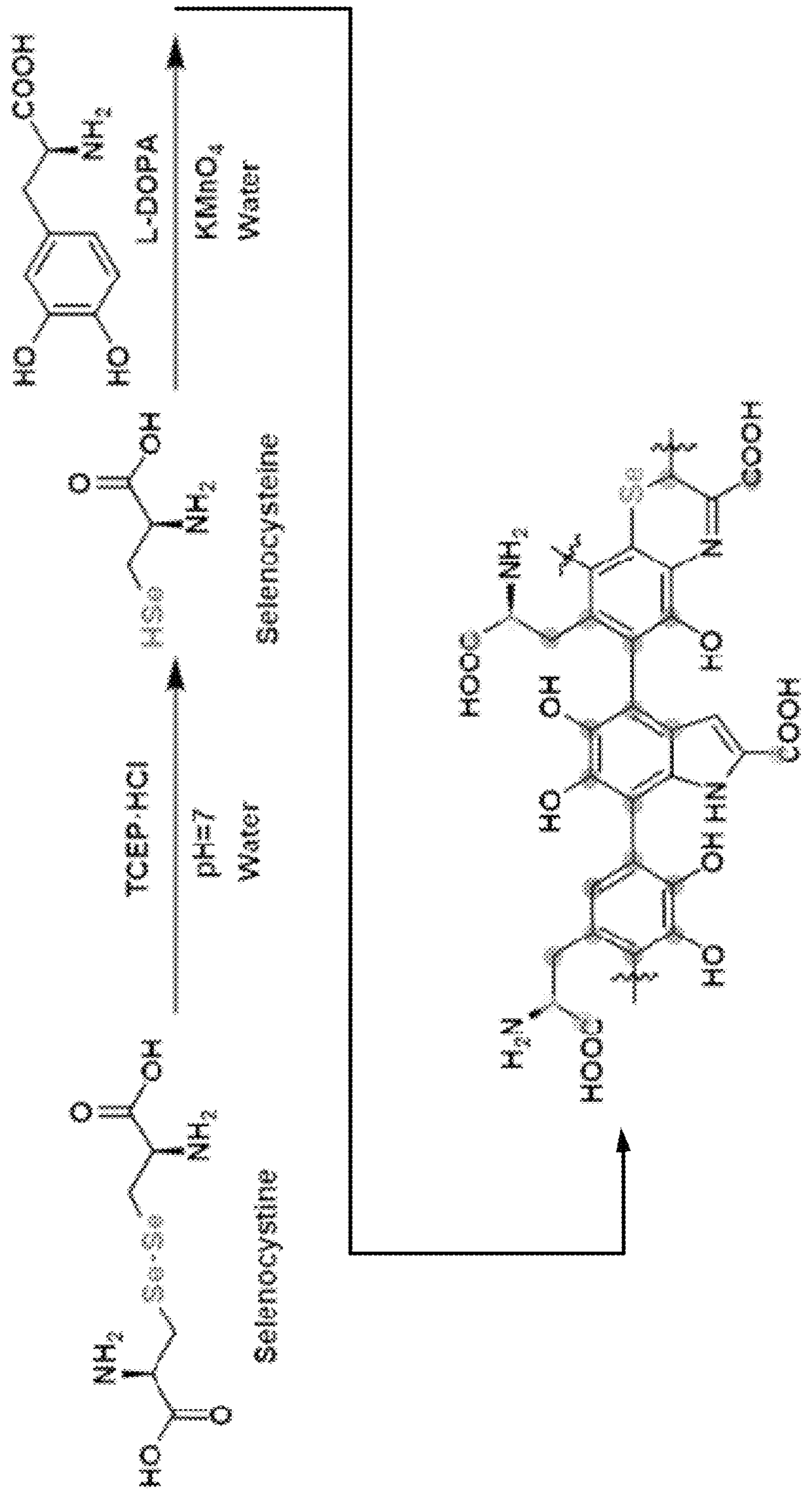
FIGS. 41A-41C. Selenomelanin chemical synthesis and characterization.
Figure 41B:
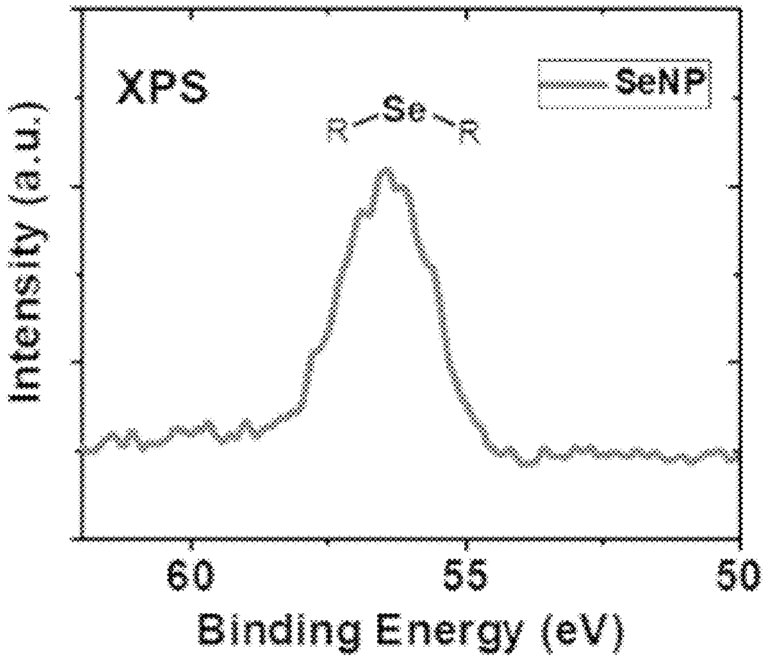
Figure 41C:
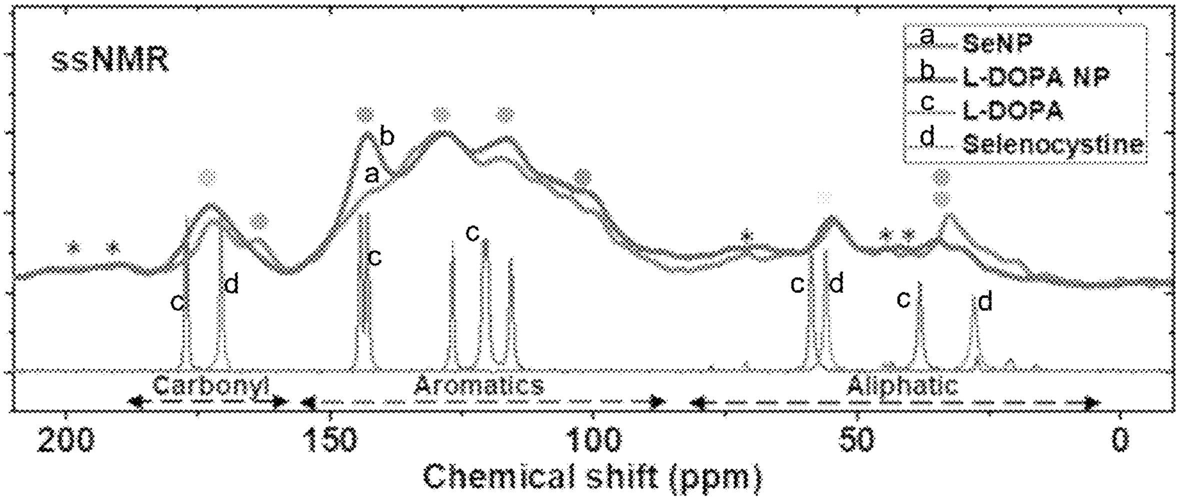
Figure 43A:
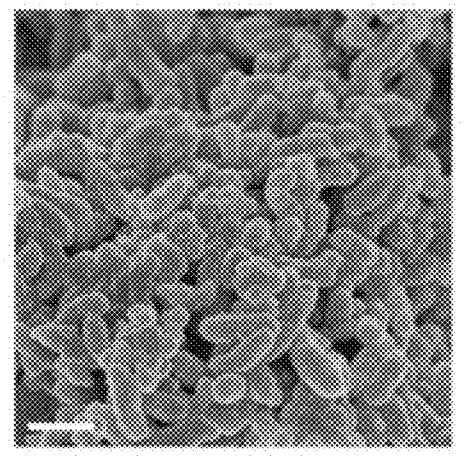
Figure 43B:
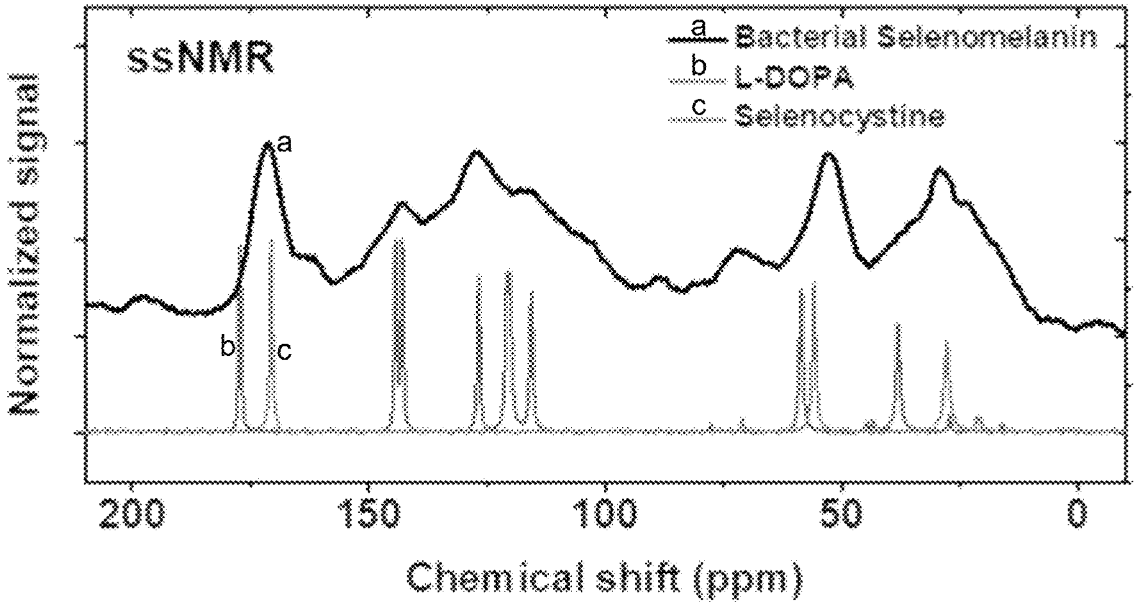
Figure 43C:
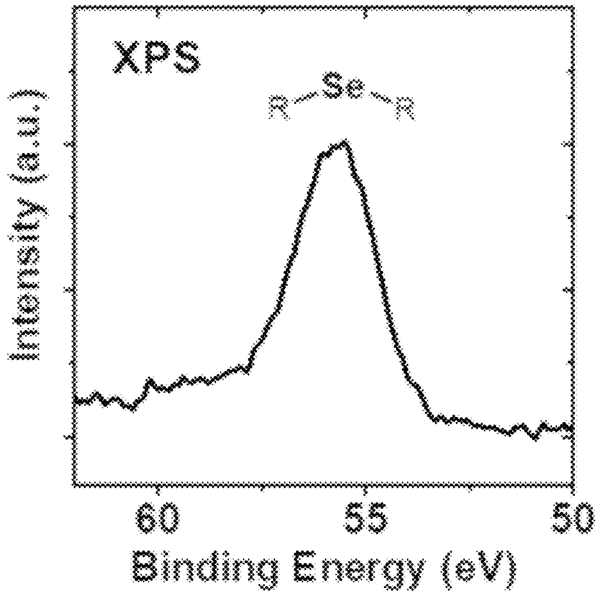
Figure 43D:
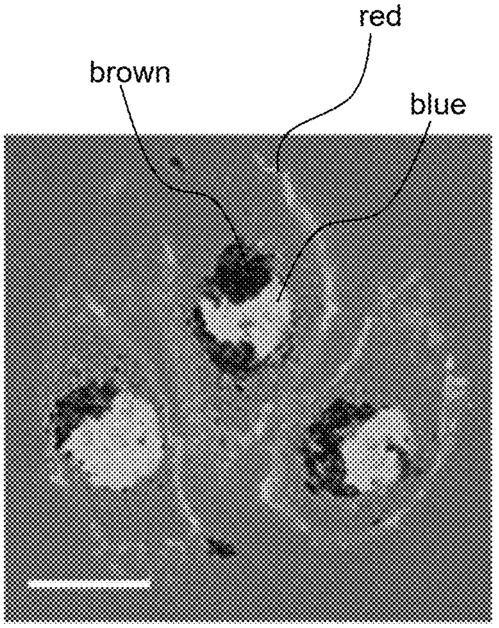
Figure 44:
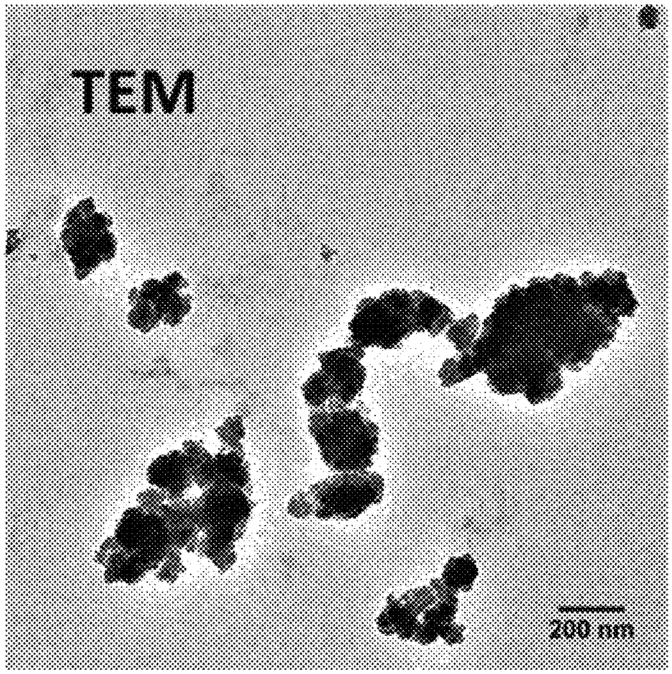
FIG. 44. TEM image of selenomelanin formed without eumelanin seeds. Irregular morphology was observed. Samples were drop-casted onto copper grids and imaged without staining.
Figure 45:
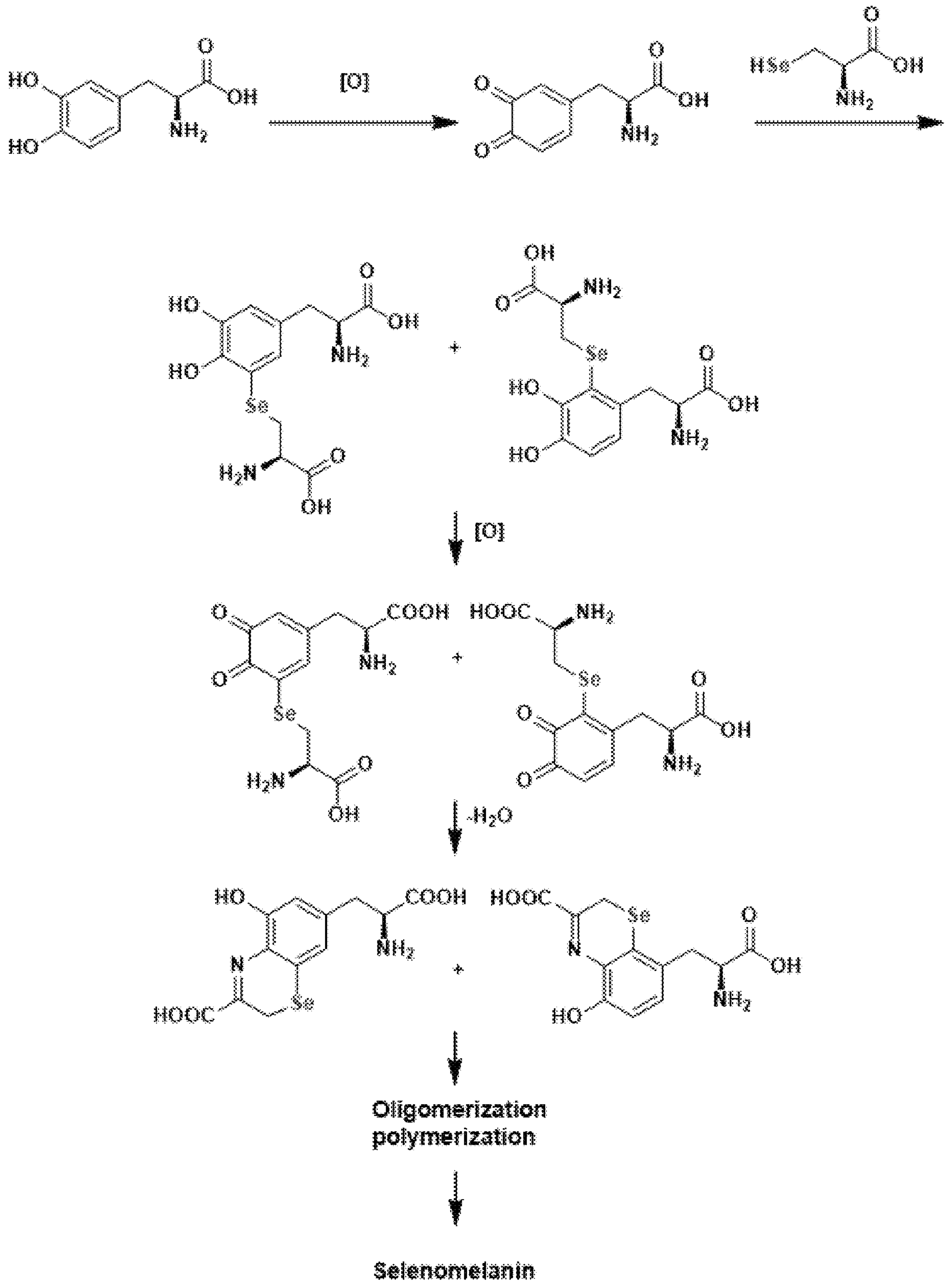
FIG. 45. Adapted Raper-Mason pathway for the formation of synthetic selenomelanin analogous to pheomelanin.
Figure 46:
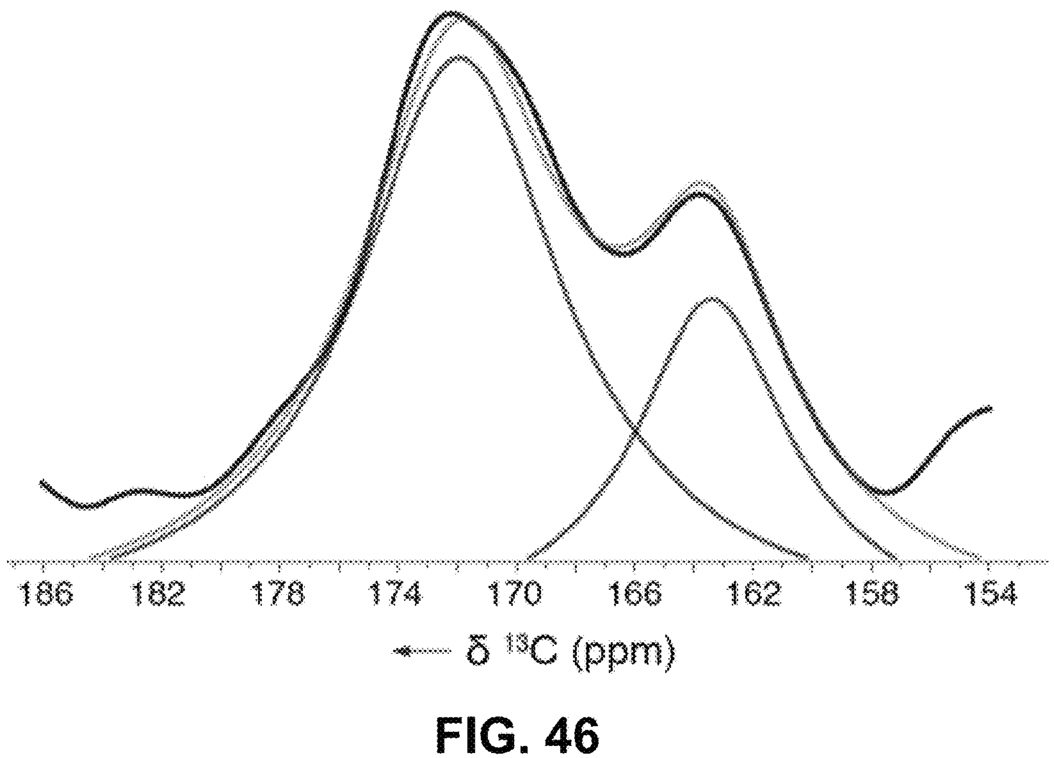
FIG. 46. $^{13}C$ ssNMR spectral integration in the COOH region of SeNP spectrum. The two peaks at 163 ppm (from selenocysteine) and 172 ppm (from L-DOPA) were deconvoluted and then integrated to determine the molar ratio of selenocysteine and L-DOPA to be 0.42:1.
Figure 47A:
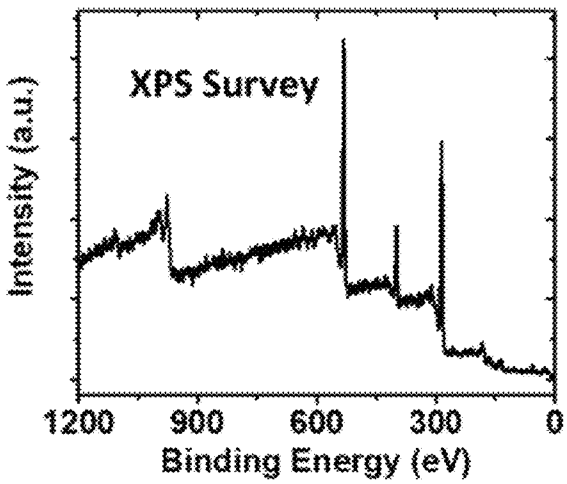
FIGS. 47A-47I. Characterization of PNP. XPS spectra of PNP drop-casted onto a silicon substrate.
Figure 47B:
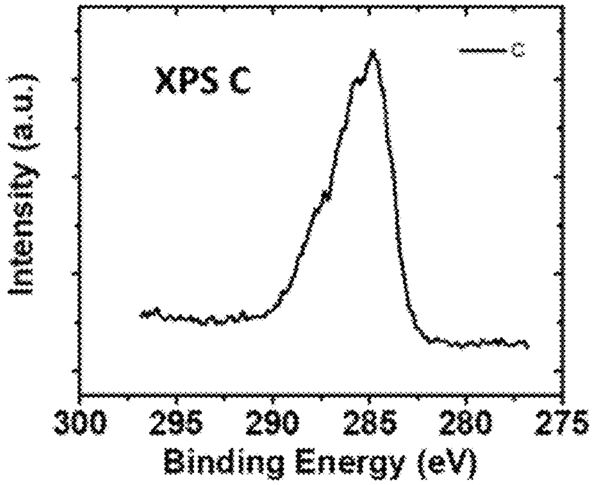
Figure 47C:
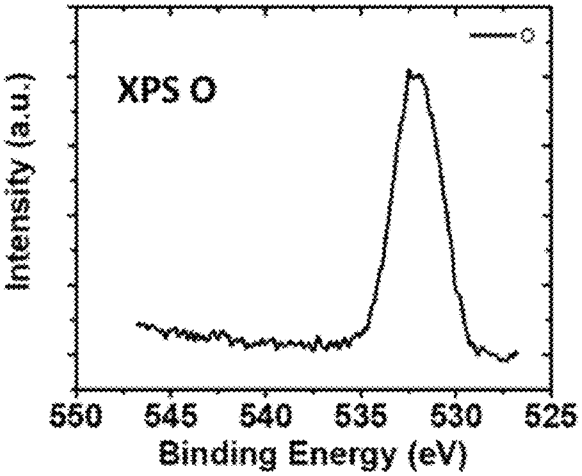
Figure 47D:
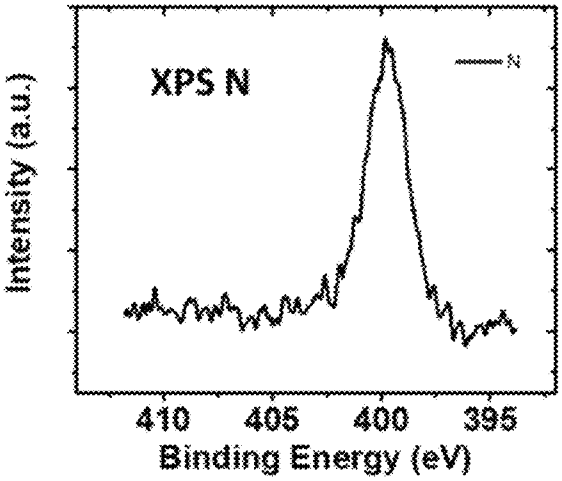
Figure 47E:
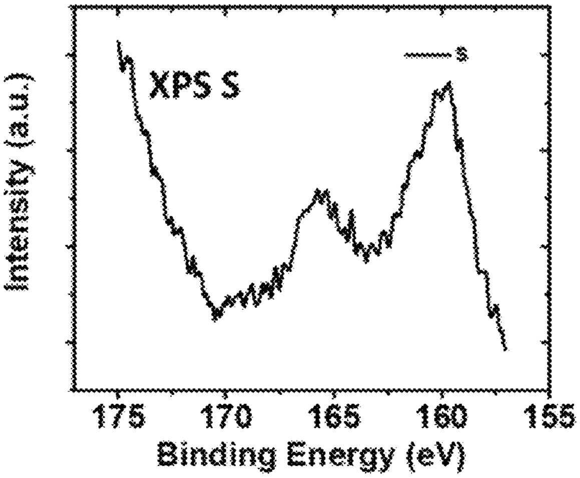
Figure 47F:
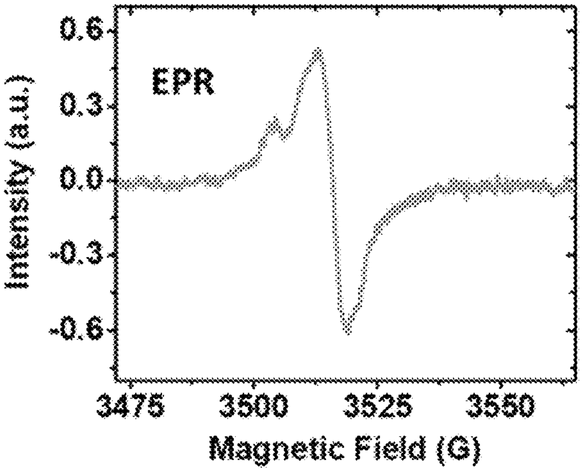
Figure 47G:
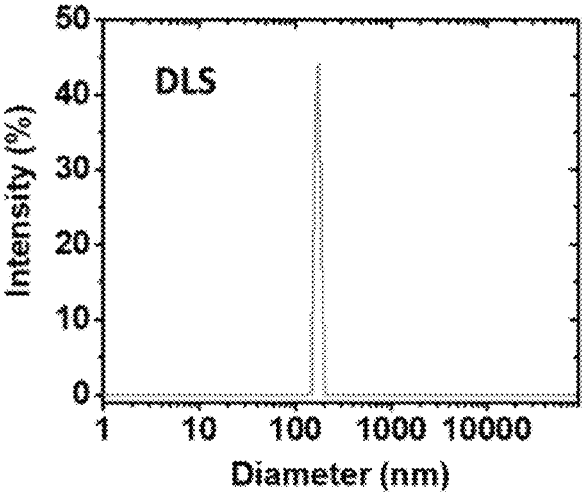
Figure 47H:
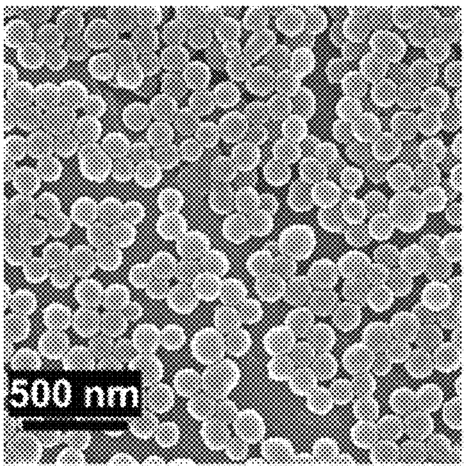
Figure 47I:
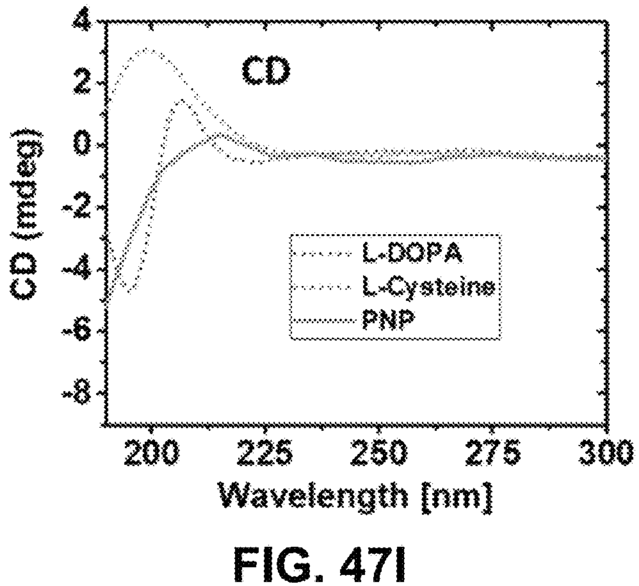
Figure 54:
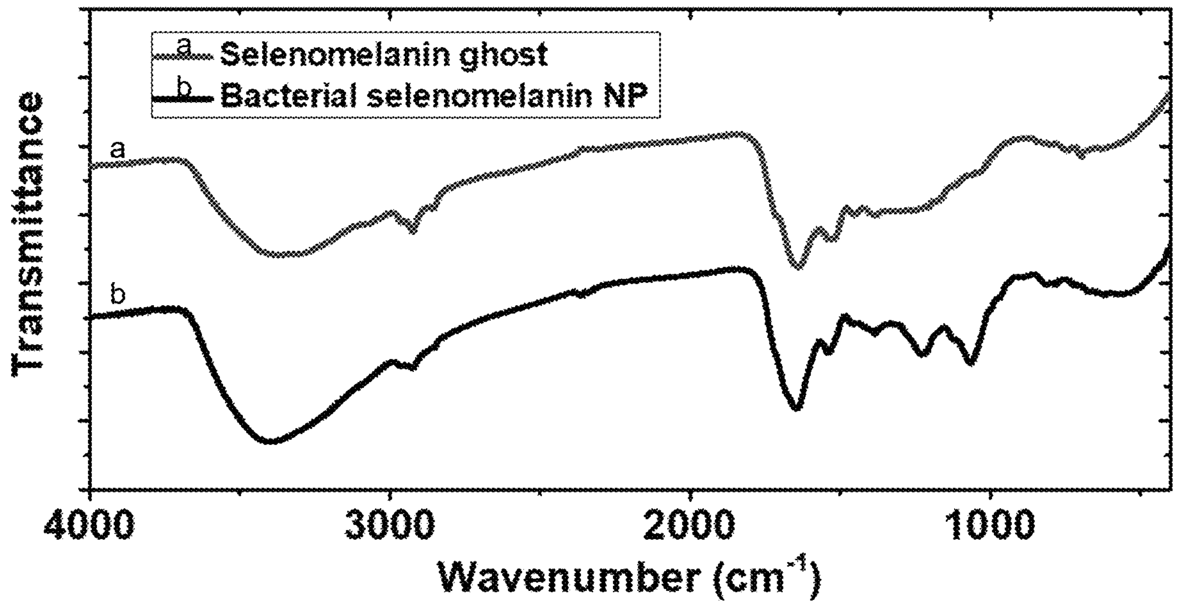
FIG. 54. FTIR spectra of selenomelanin made by *V. natriegens*. Bacterial selenomelanin NP is the nanoparticles made by bacteria in the supernatant. Selenomelanin ghost is the ghost after purification.
Figure 55A:
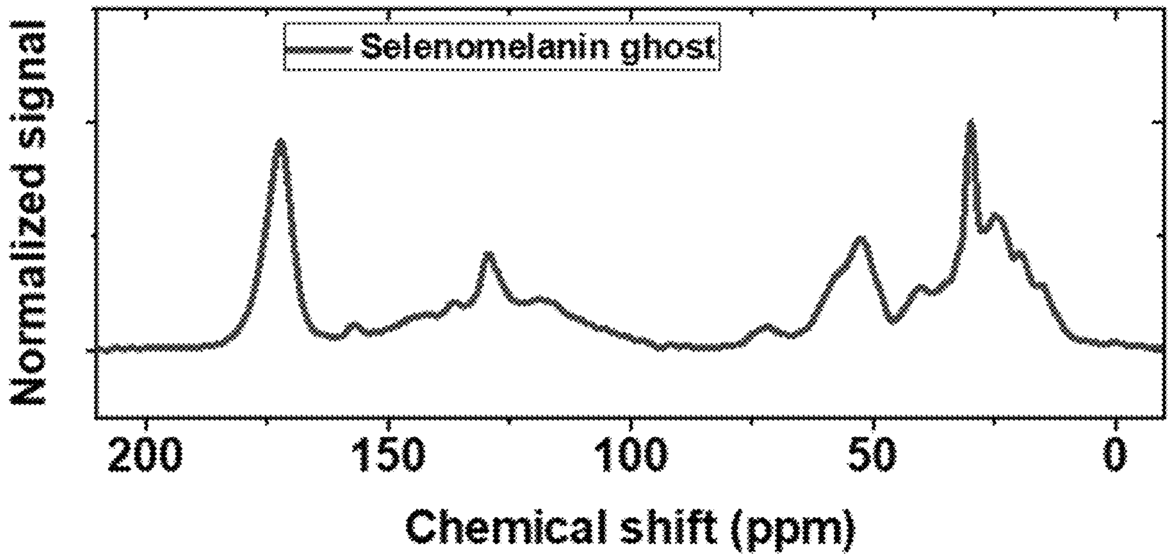
FIGS. 55A-55C. Characterization of selenomelanin ghosts.
Figure 55B:
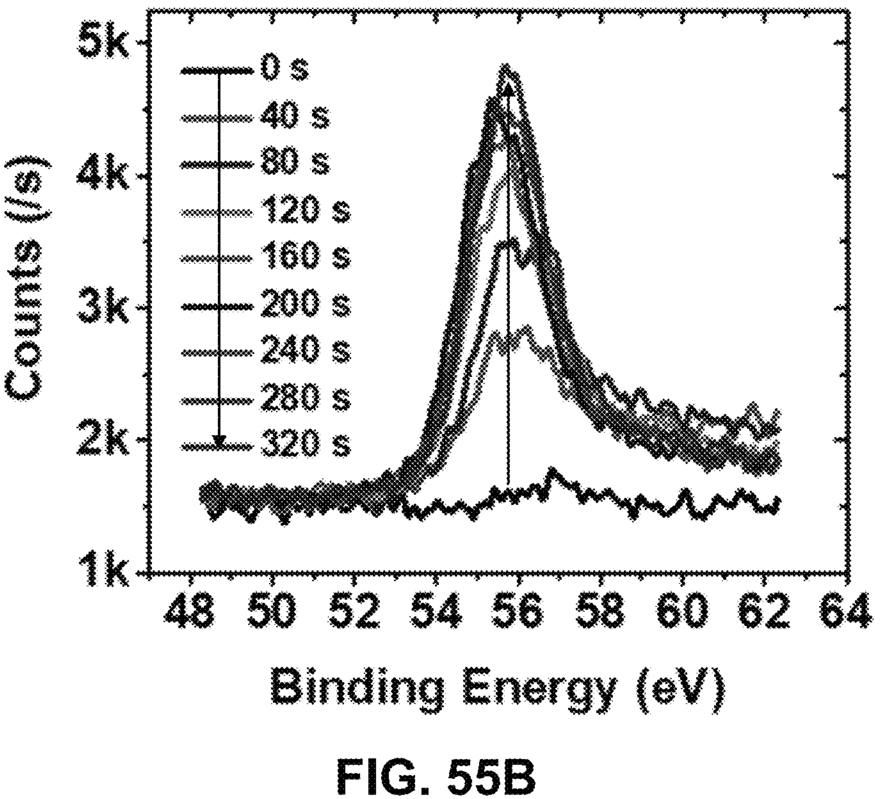
Figure 55C:
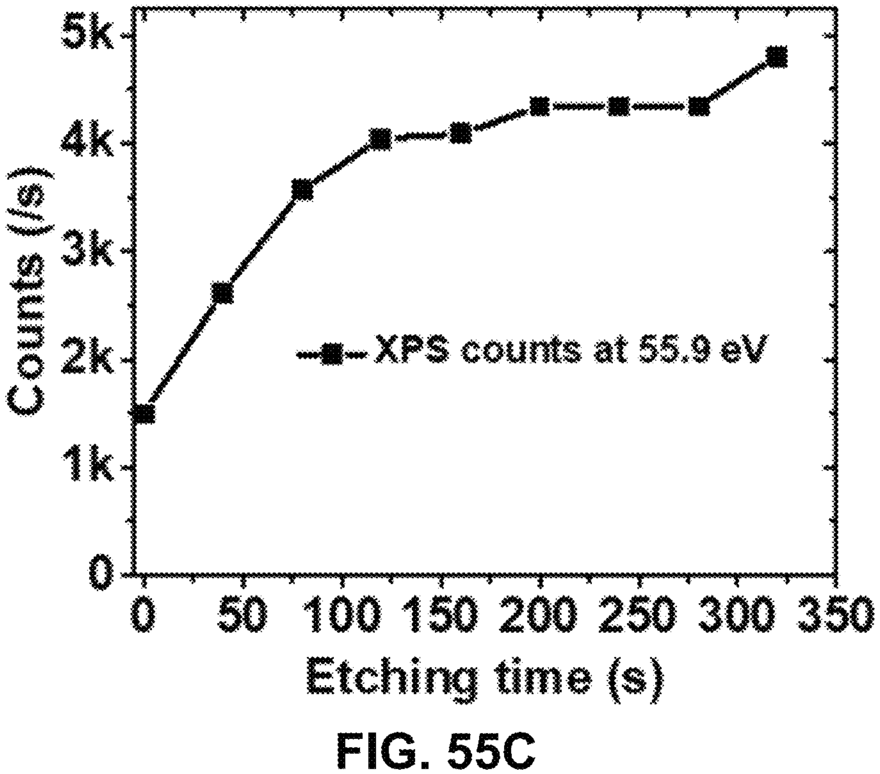

It is known that fungi and bacteria metabolize selenium species contributing to selenium cycling in nature.[44, 45] In addition, eukaryotic species such as mammals, ancient fungi, nematodes, and *Drosophila* produce one or more selenoproteins.[30, 46, 47] Furthermore, it was recently reported that when zebrafish larvae were treated with selenium compounds, selenium preferentially accumulated in melanized cells (see N. V. Dolgova, M. J. Hackett, T. C. MacDonald, S. Nehzati, A. K. James, P. H. Krone, G. N. George, I. J. Pickering, *Metallomics* 2016, 8, 305-312.). However, the authors did not argue that the melanin itself acted as a repository for the selenium, but rather that proteins in those cells had incorporated the element. These facts lead to our reasoning that selenomelanin should be a part of the melanin family. Therefore, we set out to show whether bacteria genetically modified with a tyrosinase gene can produce selenomelanin in vitro if given selenocysteine. To test this, we fed selenocystine and L-DOPA to engineered tyrosinase-producing *Vibrio natriegens* (FIGS. 43A-43G, FIGS. 36-36B).[49] Melanin was produced in cell-free supernatant as nanoparticles, or associated with the cell walls, to form micron-size melanin ghosts (FIG. 43A, FIGS. 53A-53F). ssNMR of the nanoparticles (FIG. 43B) showed similar features to those of synthetic selenomelanin (FIG. 41C). FTIR spectra (FIG. 54) suggested the presence of amide bonds from peptidoglycans. ICP-OES indicated the presence of selenium, while XPS (FIG. 43C, FIGS. 55A-55C) showed increased counts of the Se 3d band with longer beam etching times, suggesting that selenomelanin is buried inside the bacterial cell wall, further affirming that selenomelanin could be naturally incorporated in live cells through biosynthetic pathways. Indeed, the successful incorporation of selenium in biosynthesized melanin provides a possible answer to the question of selenium accumulation in melanized tissues of zebrafish in previous studies.[48]

We finally explored whether the biosynthesized selenomelanin could provide any X-ray protection. Light microscopy (FIG. 43D) showed that selenomelanin ghosts were internalized and formed perinuclear caps in NHEK cells. STEM microscopy also supported the melanosome-mimicking distribution (FIG. 43E) and the semi-hollow structure of the ghosts (FIG. 43F). Cell cycle distribution studies showed that biosynthetic selenomelanin also decreased G2/M arrest caused by X-rays (FIG. 43G, Table 5). These promising results show that selenomelanin is a feasible natural melanin and that it could be beneficial to some organisms where high selenium and high radiation exposure are found in natural ecosystems. This work points to the possibility that melanin acts as a repository for selenium, and that it may be an important part of selenium metabolism.

TABLE 5

Statistical analysis for FIG. 43G. Cell population percentage in G2/M phase after X-ray irradiation. Student's two-tailed t-tests were performed in Excel.

| | X-ray | G2/M population (%) | | Student's T test | |
|---|---|---|---|---|---|
| | dosage | Average | s.d. | P | Significance |
| Selenomelanin ghost | 0 Gy | 11.8 | 3.5 | 0.53 | NS |
| | 2 Gy | 14.8 | 3.1 | 0.00053 | *** |
| | 4 Gy | 22.9 | 1.9 | 2.3E−06 | ***** |
| | 6 Gy | 26.1 | 1.0 | 8.5E−06 | ***** |
| No NP | 0 Gy | 13.6 | 4.9 | | |
| | 2 Gy | 25.8 | 3.0 | | |
| | 4 Gy | 37.9 | 1.0 | | |
| | 6 Gy | 44.5 | 4.0 | | |

P values are generated from the t-test results using selenomelanin ghost and non-treated groups at the same dose of X-ray.
$P < 0.01$ was considered statistically significant.

Selenomelanin was made for the first time via seeded copolymerization of selenocysteine and L-DOPA. SeNPs are spherical nanoparticles with chemical structures closely mimicking natural pheomelanin made from cysteine. They can form perinuclear caps in keratinocytes cells and scavenge ROS from the cells. Selenomelanin could better protect NHEK cells against G2/M phase arrest caused by X-ray radiation, maintaining good cell cycle distribution for up to 6 Gy X-ray radiation. The selenomelanin may find application in protection against potential source of unwanted exposure to the public, radiation worker or patient receiving radiotherapy. This work greatly expands our knowledge on the scope of synthetic melanin. The structure-relationship revealed here will guide the future rational design and chemical synthesis of melanin based functional materials. We also demonstrated that selenomelanin could be synthesized in live cells though biosynthetic pathways. We envision that by feeding selenocysteine to mammalian skin melanocytes, it could be possible to dictate the cells to make selenium pheomelanin to harness their unique chemical and biological properties. It remains elusive whether selenium pheomelanin is present in natural sources and how much percentage compared with cysteine pheomelanin.

By connecting selenium chemistry with melanin material, this work provides a valuable starting point to study a broader interaction of functional melanin materials with ionizing radiation. Moreover, we reasoned that this line of research may guide the discovery of selenomelanin in natural source, which is a missing piece for the current knowledge of nature's melanin kingdom.

REFERENCES IN EXAMPLE 2A

1. Lampel, A.; McPhee, S. A.; Park, H.-A.; Scott, G. G.; Humagain, S.; Hekstra, D. R.; Yoo, B.; Frederix, P. W. J. M.; Li, T.-D.; Abzalimov, R. R.; Greenbaum, S. G.; Tuttle, T.; Hu, C.; Bettinger, C. J.; Ulijn, R. V., Polymeric peptide pigments with sequence-encoded properties. *Science* 2017, 356 (6342), 1064-1068.
2. Xiao, M.; Li, Y.; Allen, M. C.; Deheyn, D. D.; Yue, X.; Zhao, J.; Gianneschi, N. C.; Shawkey, M. D.; Dhinojwala, A., Bio-Inspired Structural Colors Produced via Self-Assembly of Synthetic Melanin Nanoparticles. *ACS Nano* 2015, 9 (5), 5454-5460.
3. Xiao, M.; Hu, Z.; Wang, Z.; Li, Y.; Tormo, A. D.; Le Thomas, N.; Wang, B.; Gianneschi, N. C.; Shawkey, M. D.; Dhinojwala, A., Bioinspired bright noniridescent photonic melanin supraballs. *Science Advances* 2017, 3 (9).
4. Simon, J. D.; Peles, D. N., The Red and the Black. *Acc. Chem. Res.* 2010, 43 (11), 1452-1460.
5. Ito, S.; Wakamatsu, K., Chemistry of Mixed Melanogenesis-Pivotal Roles of Dopaquinone. *Photochem. Photobiol.* 2008, 84 (3), 582-592.
6. Seagle, B.-L. L.; Rezai, K. A.; Kobori, Y.; Gasyna, E. M.; Rezaei, K. A.; Norris, J. R., Jr., Melanin photoprotection in the human retinal pigment epithelium and its correlation with light-induced cell apoptosis. *Proceedings of the National Academy of Sciences of the United States of America* 2005, 102 (25), 8978-8983.
7. Mostert, A. B.; Rienecker, S. B.; Noble, C.; Hanson, G. R.; Meredith, P., The photoreactive free radical in eumelanin. *Science Advances* 2018, 4 (3).
8. Solano, F., Photoprotectionversusphotodamage: updating an old but still unsolved controversy about melanin. *Polym. Int.* 2016, 65 (11), 1276-1287.
9. Lee, H.; Dellatore, S. M.; Miller, W. M.; Messersmith, P. B., Mussel-Inspired Surface Chemistry for Multifunctional Coatings. *Science* 2007, 318 (5849), 426-430.
10. Ju, K.-Y.; Lee, Y.; Lee, S.; Park, S. B.; Lee, J.-K., Bioinspired Polymerization of Dopamine to Generate Melanin-Like Nanoparticles Having an Excellent Free-Radical-Scavenging Property. *Biomacromolecules* 2011, 12 (3), 625-632.
11. Liu, Y.; Ai, K.; Ji, X.; Askhatova, D.; Du, R.; Lu, L.; Shi, J., Comprehensive Insights into the Multi-Antioxidative Mechanisms of Melanin Nanoparticles and Their Application To Protect Brain from Injury in Ischemic Stroke. *J. Am. Chem. Soc.* 2017, 139 (2), 856-862.
12. Fan, Q.; Cheng, K.; Hu, X.; Ma, X.; Zhang, R.; Yang, M.; Lu, X.; Xing, L.; Huang, W.; Gambhir, S. S.; Cheng, Z., Transferring biomarker into molecular probe: melanin nanoparticle as a naturally active platform for multimodality imaging. *J. Am. Chem. Soc.* 2014, 136 (43), 15185-94.
13. Lemaster, J. E.; Wang, Z.; Hariri, A.; Chen, F.; Hu, Z.; Huang, Y.; Barback, C. V.; Cochran, R.; Gianneschi, N. C.; Jokerst, J. V., Gadolinium Doping Enhances the Photoacoustic Signal of Synthetic Melanin Nanoparticles: A Dual Modality Contrast Agent for Stem Cell Imaging. *Chem. Mater.* 2019, 31 (1), 251-259.
14. Li, Y.; Huang, Y.; Wang, Z.; Carniato, F.; Xie, Y.; Patterson, J. P.; Thompson, M. P.; Andolina, C. M.; Ditri, T. B.; Millstone, J. E.; Figueroa, J. S.; Rinehart, J. D.; Scadeng, M.; Botta, M.; Gianneschi, N. C., Polycatechol Nanoparticle MRI Contrast Agents. *Small* 2016, 12 (5), 668-677.
15. Sun, Y.; Ding, F.; Chen, Z.; Zhang, R.; Li, C.; Xu, Y.; Zhang, Y.; Ni, R.; Li, X.; Yang, G.; Sun, Y.; Stang, P. J., Melanin-dot-mediated delivery of metallacycle for NIR-II/photoacoustic dual-modal imaging-guided chemo-photothermal synergistic therapy. *Proc Natl Acad Sci USA* 2019, 116 (34), 16729-16735.
16. Ryu, J. H.; Messersmith, P. B.; Lee, H., Polydopamine Surface Chemistry: A Decade of Discovery. *ACS Appl Mater Interfaces* 2018, 10 (9), 7523-7540.
17. Huang, Y.; Li, Y.; Hu, Z.; Yue, X.; Proetto, M. T.; Jones, Y.; Gianneschi, N. C., Mimicking Melanosomes: Polydopamine Nanoparticles as Artificial Microparasols. *ACS Cent Sci* 2017, 3 (6), 564-569.
18. Napolitano, A.; Panzella, L.; Leone, L.; d'Ischia, M., Red Hair Benzothiazines and Benzothiazoles: Mutation-Inspired Chemistry in the Quest for Functionality. *Acc. Chem. Res.* 2013, 46 (2), 519-528.
19. Sealy, R.; Hyde, J.; Felix, C.; Menon, I.; Prota, G., Eumelanins and pheomelanins: characterization by electron spin resonance spectroscopy. *Science* 1982, 217 (4559), 545-547.
20. Thomson, R. H., The Pigments of Reddish Hair and Feathers. *Angew. Chem., Int. Ed.* 1974, 13 (5), 305-312.
21. Iaea, *Radiation Oncology Physics: a Handbook for Teachers and Students*. IAEA: Vienna, 2005.
22. Mironenko, N. V.; Alekhina, I. A.; Zhdanova, N. N.; Bulat, S. A., Intraspecific variation in gamma-radiation resistance and genomic structure in the filamentous fungus *Alternaria alternata*: a case study of strains inhabiting Chernobyl reactor no. 4. *Ecotoxicol Environ Saf* 2000, 45 (2), 177-87.
23. Schweitzer, A. D.; Revskaya, E.; Chu, P.; Pazo, V.; Friedman, M.; Nosanchuk, J. D.; Cahill, S.; Frases, S.; Casadevall, A.; Dadachova, E., Melanin-covered nanoparticles for protection of bone marrow during radiation therapy of cancer. *Int J Radiat Oncol Biol Phys* 2010, 78 (5), 1494-502.
24. Lin, J.; Wang, M.; Hu, H.; Yang, X.; Wen, B.; Wang, Z.; Jacobson, O.; Song, J.; Zhang, G.; Niu, G.; Huang, P.; Chen, X., Multimodal-Imaging-Guided Cancer Phototherapy by Versatile Biomimetic Theranostics with UV and gamma-Irradiation Protection. *Adv Mater* 2016, 28 (17), 3273-9.
25. Zhou, X.; McCallum, N. C.; Hu, Z.; Cao, W.; Gnanasekaran, K.; Feng, Y.; Stoddart, J. F.; Wang, Z.; Gianneschi, N. C., Artificial Allomelanin Nanoparticles. *ACS Nano* 2019, 13 (10), 10980-10990.
26. Schweitzer, A. D.; Howell, R. C.; Jiang, Z.; Bryan, R. A.; Gerfen, G.; Chen, C.-C.; Mah, D.; Cahill, S.; Casadevall, A.; Dadachova, E., Physico-Chemical Evaluation of Rationally Designed Melanins as Novel Nature-Inspired Radioprotectors. *PLOS ONE* 2009, 4 (9), e7229.
27. Lusic, H.; Grinstaff, M. W., X-ray-computed tomography contrast agents. *Chem. Rev.* 2013, 113 (3), 1641-1666.
28. Shimazu, F.; Tappel, A. L., Selenoamino Acids: Decrease of Radiation Damage to Amino Acids and Proteins. *Science* 1964, 143 (3604), 369-371.

29. Kunwar, A.; Bag, P. P.; Chattopadhyay, S.; Jain, V. K.; Priyadarsini, K. I., Anti-apoptotic, anti-inflammatory, and immunomodulatory activities of 3,3'-diselenodipropionic acid in mice exposed to whole body gamma-radiation. *Arch Toxicol* 2011, 85 (11), 1395-405.
30. Kunwar, A.; Bansal, P.; Kumar, S. J.; Bag, P. P.; Paul, P.; Reddy, N. D.; Kumbhare, L. B.; Jain, V. K.; Chaubey, R. C.; Unnikrishnan, M. K.; Priyadarsini, K. I., In vivo radioprotection studies of 3,3'-diselenodipropionic acid, a selenocystine derivative. *Free Radic Biol Med* 2010, 48 (3), 399-410.
31. Van Vranken, D.; Weiss, G., *Introduction to bioorganic chemistry and chemical biology*. Garland Science, Taylor & Francis Group: New York, 2013.
32. Xu, H.; Cao, W.; Zhang, X., Selenium-Containing Polymers: Promising Biomaterials for Controlled Release and Enzyme Mimics. *Acc. Chem. Res.* 2013, 46 (7), 1647-1658.
33. Xia, J.; Li, T.; Lu, C.; Xu, H., Selenium-Containing Polymers: Perspectives toward Diverse Applications in Both Adaptive and Biomedical Materials. *Macromolecules* 2018, 51 (19), 7435-7455.
34. Pyo, J.; Ju, K. Y.; Lee, J. K., Artificial pheomelanin nanoparticles and their photo-sensitization properties. *J Photochem Photobiol B* 2016, 160, 330-5.
35. Ma, N.; Li, Y.; Ren, H.; Xu, H.; Li, Z.; Zhang, X., Selenium-containing block copolymers and their oxidation-responsive aggregates. *Polym. Chem.* 2010, 1, 1609-1614.
36. Ito, S.; Fujita, K., Microanalysis of eumelanin and pheomelanin in hair and melanomas by chemical degradation and liquid chromatography. *Anal. Biochem.* 1985, 144 (2), 527-536.
37. MacLeod, M. J.; Johnson, J. A., PEGylated N-Heterocyclic Carbene Anchors Designed To Stabilize Gold Nanoparticles in Biologically Relevant Media. *J. Am. Chem. Soc.* 2015, 137 (25), 7974-7977.
38. Ito, S.; Novellino, E.; Chioccara, F.; Misuraca, G.; Prota, G., Co-polymerization of dopa and cysteinyldopa in melanogenesis in vitro. *Experientia* 1980, 36 (7), 822-3.
39. Ando, H.; Niki, Y.; Ito, M.; Akiyama, K.; Matsui, M. S.; Yarosh, D. B.; Ichihashi, M., Melanosomes Are Transferred from Melanocytes to Keratinocytes through the Processes of Packaging, Release, Uptake, and Dispersion. Journal of Investigative Dermatology 2012, 132 (4), 1222-1229.
40. Iwamoto, K.; Shinomiya, N.; Mochizuki, H. J. A., Different cell cycle mechanisms between UV-induced and X-ray-induced apoptosis in WiDr colorectal carcinoma cells. Apoptosis 1999, 4 (1), 59-66.
41. Dadachova, E.; Bryan, R. A.; Howell, R. C.; Schweitzer, A. D.; Aisen, P.; Nosanchuk, J. D.; Casadevall, A., The radioprotective properties of fungal melanin are a function of its chemical composition, stable radical presence and spatial arrangement. Pigment Cell Melanoma Res 2008, 21 (2), 192-9.
42. Foote, C. S.; Valentine, J. S.; Greenberg, A.; Liebman, J. F., Active Oxygen in Chemistry. 1996.
43. National Research Council, S.; Committee on the Biological Effects of Ionizing, R., Health Effects of Exposure to Low Levels of Ionizing Radiation: BEIR V. 2001.
44. Hall, S.; Rudrawar, S.; Zunk, M.; Bernaitis, N.; Arora, D.; McDermott, C. M.; Anoopkumar-Dukie, S., Protection against Radiotherapy-Induced Toxicity. Antioxidants (Basel) 2016, 5 (3).
45. Nambiar, S.; Yeow, J. T., Polymer-composite materials for radiation protection. ACS Appl Mater Interfaces 2012, 4 (11), 5717-26.
46. Dadachova, E.; Bryan, R. A.; Huang, X.; Moadel, T.; Schweitzer, A. D.; Aisen, P.; Nosanchuk, J. D.; Casadevall, A., Ionizing radiation changes the electronic properties of melanin and enhances the growth of melanized fungi. PLoS One 2007, 2 (5), e457.

EXAMPLE 2B: SUPPORTING INFORMATION TO EXAMPLE 2A

Materials and Instruments

Materials for chemistry experiments: L-3,4-dihydroxyphenylalanine (L-DOPA), tris(2-carboxyethyl)phosphine hydrochloride (TCEP·HCl), and potassium permanganate ($KMnO_4$) were purchased from Fisher Scientific. Selenocystine was purchased from Chempep Inc. M-OEG550-amine was purchased from Polymer Source, Inc. All reagents and materials were used as received unless otherwise stated.

Materials for biological experiments: Propidium iodide, Wheat Germ Agglutinin (WGA) conjugated to Alexa Fluor 633 or 488, Hoechst, DNase-free RNase, and 2',7'-dichlorofluorescein diacetate (DCFDA) were purchased from ThermoFisher Scientific.

For the X-ray experiments: X-ray related experiments were performed in a Radsource-2000 x-ray irradiator under ORS Health Physics Services (HPS) at Northwestern University. The gray (Gy) unit is defined as the absorption of one joule of radiation energy per kilogram of matter. 1 Gy=1 J/kg. The x-ray dose rate was 4.446 Gy/min at level 5.

A vinyl coated lead sheet (5.1×30.5 cm) with 2.2 mm thickness was purchased from Fisher Scientific to selectively shield x-ray irradiation.

Instrumentation for nanoparticle characterizations: Dynamic Light Scattering (DLS) measurements were performed on a DynaPro Nanostar (Wyatt Technology Corp) at room temperature in ultrapure water at around 0.05 mg/mL. Zeta potential was measured on a Malvern zetasizer in ultrapure water at room temperature. UV-Vis spectra were collected on a Cary Series 100 UV-Vis spectrophotometer. X-ray photoelectron spectroscopy (XPS) samples were drop casted onto a silicon substrate, and spectra were collected on a Thermo Scientific ESCALAB 250Xi in NUANCE at Northwestern University. Circular dichroism spectra were measured on Circular Dichroism Spec J-815 in Keck Biophysics Facility (KeckBio) at Northwestern University. FTIR spectra were collected on a *Nexus* 870 spectrometer (Thermo Nicolet) in NU Atomic and Nanoscale Characterization Experimental Center (NUANCE) at Northwestern University. ICP-OES was performed on a computer-controlled (QTEGRA software) Thermo iCap7600 ICP-OES (Thermo Fisher Scientific, Waltham, MA, USA) operating in axial view and equipped with a CETAC 520 autosampler (Omaha, NE, USA) at Northwestern University. For scanning electron microscope (SEM) images, particles were drop-casted onto aluminum SEM stubs and dried overnight. They were plasma coated with 10 nm osmium and then imaged immediately using a Hitachi SU8030 cFEG SEM at 10.0 kV and an emission current of 15 mA. For scanning transmission electron microscopy (STEM) images, particles were drop-casted onto 400 mesh formvar/carbon grids (Ted Pella), which were first surface plasma treated using a PELCO easiGlow glow discharge cleaning system. Images were obtained on a Hitachi HD2300 cFEG STEM with a bright field detector at 200 kV and an emission current of 57 μA.

Transmission electron microscopy (TEM) micrographs were obtained on a Hitachi 7700 TEM in NUANCE center in northwestern university. TEM samples were prepared by drop casting 10 μL of sample solution in water onto the copper grid (Lacey carbon, 300 mesh, from Ted Pella) without further staining. For scanning electron microscope (SEM) images, particles were drop-casted onto aluminum SEM stubs and left to dry overnight. They were plasma coated with 10 nm osmium and then imaged immediately using a Hitachi SU8030 cFEG SEM at 10.0 kV and an emission current of 15 mA. For scanning transmission electron microscopy (STEM) images, particles were drop-casted onto 400 mesh formvar/carbon grids (Ted Pella), which were first surface plasma treated using a PELCO easiGlow glow discharge cleaning system. Images were obtained on a Hitachi HD2300 cFEG STEM with a bright field detector at 200 kV and an emission current of 57 μA.

Instrumentation for cell experiments: CellTiter-Blue® fluorescence measurements were recorded using a Perkin Elmer EnSpire ultimode Plate Reader in the Gianneschi lab. Confocal laser scanning microscopy (CLSM) images were obtained on a Leica SP5 laser scanning confocal microscope in Biological Imaging Facility (BIF) at Northwestern University. Cell cycle tests were performed on an E.A1 LSR Fortessa 2 cell analyzer in the Flow Cytometry Core at Northwestern University. Cell viability based on flow cytometry using PI was performed on a Beckman Coulter CytoFLEX Flow Cytometer in the Gianneschi lab.

Experimental Details

Figure 30:
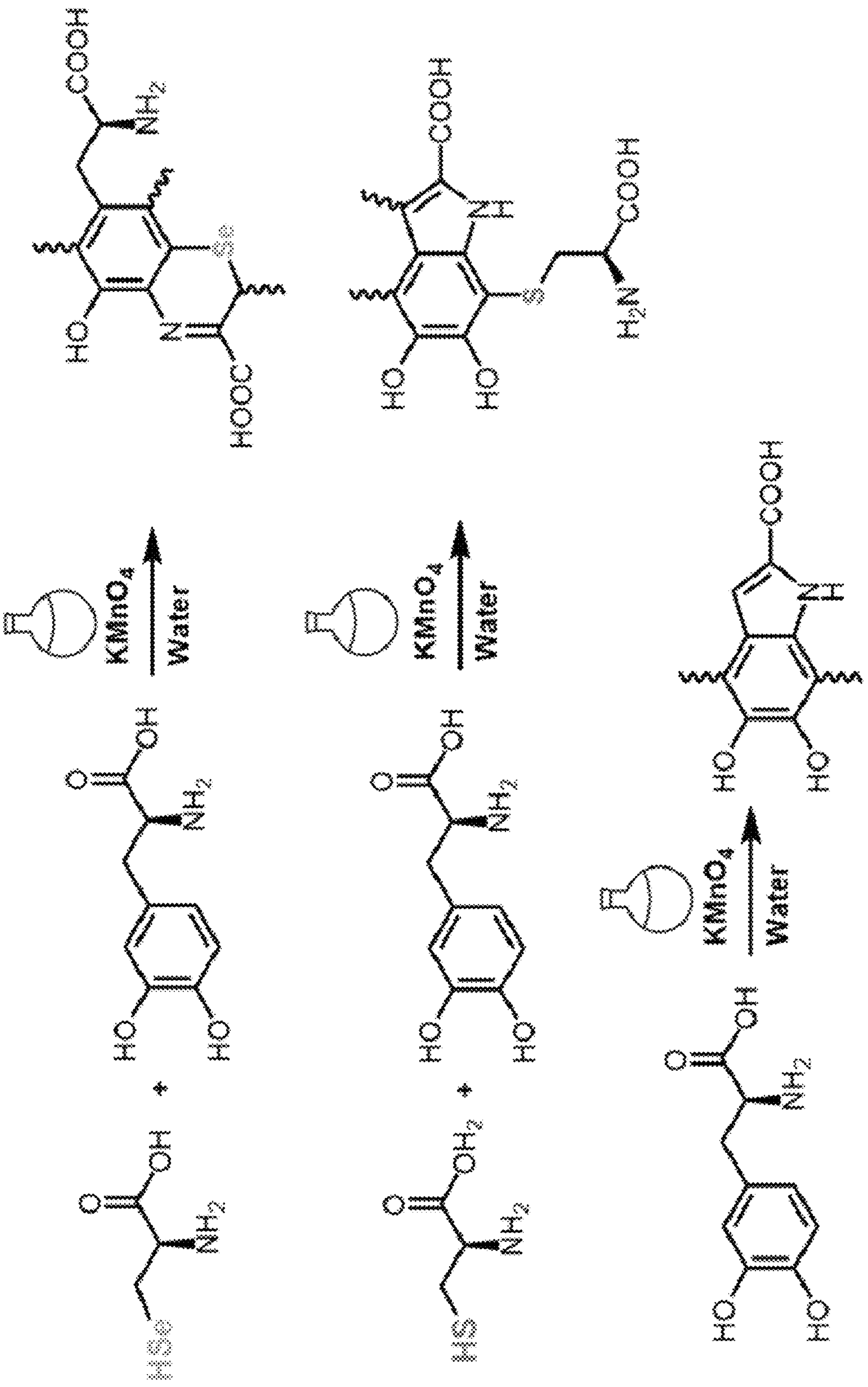
FIG. 30. Scheme 1: Exemplary chemical synthesis routes of the SeNP, SNP, and L-DOPA NP.

Chemical synthesis of nanoparticles: FIG. 30 shows Scheme 1. Scheme 1 is a chemical synthesis route of the SeNP, SNP, and L-DOPA NP.

Synthesis of SeNP: SeNP were synthesized by oxidative copolymerization of selenocysteine and L-3,4-dihydroxyphenylalanine (L-DOPA) using $KMnO_4$ in ultrapure water (pH=7) at room temperature. The reaction is a templated polymerization reaction with L-DOPA eumelanin nanoparticle as the seeds. First, 120 mg (0.6 mmol) of L-DOPA was dissolved in 100 mL water and then mixed with 1.8 mL $KMnO_4$ (31.6 mg/mL, 0.2 M) in a 250 mL round-bottom flask for 30 minutes to form eumelanin seeds. Next, a selenocysteine solution was formed in situ by adding a degassed solution of selenocystine (122 mg, 0.3 mmol), reduced with 86 mg TCEP·HCl (0.3 mmol) and the pH adjusted to 7 using 1 M NaOH. After overnight reaction, the product was collected by centrifugation at 40° C. (11500 rpm for 15 min) and purified by 3 mL of washing with 1 M HCl solution to exchange the $Mn^{2+}$ ions and washing with ultrapure water three times. Finally, the mass concentration of the final nanoparticle solution was determined by lyophilizing small aliquot solution overnight and weighing with Mettler analytical balance.

In the alternative, selenomelanin nanoparticles (SeNPs) are synthesized by oxidative copolymerization of selenocysteine and L-3,4-dihydroxyphenylalanine (L-DOPA) using $KMnO_4$ in ultrapure water (pH=7) at room temperature. The reaction is a templated polymerization reaction with L-DOPA eumelanin nanoparticle as the seeds. First, 120 mg (0.6 mmol) of L-DOPA was dissolved in 100 mL water and then mixed with 1.8 mL $KMnO_4$ (31.6 mg $mL^{-1}$, 0.2 M) in a 250 mL round-bottom flask for 30 minutes to form eumelanin seeds. Next, a selenocysteine solution was added to the reaction flask in one portion (selenocysteine is not stable and therefore was formed in situ by adding 86 mg TCEP·HCl (0.3 mmol) to a degassed solution of selenocystine (122 mg, 0.3 mmol), and the pH was adjusted to 7 using 1 M NaOH solution). After overnight reaction, the product was collected by centrifugation at 40° C. (11500 rpm for 15 min) and purified by washing with 3 mL of 1 M HCl solution to exchange the $Mn^{2+}$ ions and subsequent washing with ultrapure water three times. Finally, the mass concentration of the final nanoparticle solution was determined by lyophilizing a small aliquot solution overnight and weighing with an analytical balance.

Selenomelanin can also be generated without first forming pure L-DOPA eumelanin seeds. This approach yields irregular morphologies rather than SeNPs (Supplementary Information, FIG. S1B).

Synthesis of SNP: The synthesis was performed as reported by Lee et al.[1] Briefly, 140 mg of L-DOPA (0.7 mmol) and 171.2 mg (0.7 mmol) of L-cysteine were dissolved in 100 mL of water under sonication. Then, 720 μL of a 0.2 M $KMnO_4$ solution (31.6 mg/mL) was quickly added. The reaction was stirred for 24 h at room temperature. The resulting NPs were purified by centrifugation at 11000 rpm for 10 min, followed by washing in 3 mL of a 1 M HCl solution to exchange the $Mn^{2+}$ ions, and triple wash with ultrapure water.

Synthesis of L-DOPA NP: As reported by Lee et al,[1] 280 mg of L-DOPA was dissolved in 100 mL of ultrapure water, 1.44 mL of a 0.2 M $KMnO_4$ solution (31.6 mg/mL) was quickly injected into the solution, and the reaction stirred vigorously at room temperature for 24 h. The resulting NPs were purified by centrifugation at 11000 rpm for 10 min, followed by washing in 3 mL of a 1 M HCl solution to exchange the $Mn^{2+}$ ions, and three more cycles of washing and centrifugation with ultrapure water.

Synthesis of SeNP-OEG: The functionalization of SeNP with $OEG-NH_2$ was performed following the previous paper by Shi.[2] Typically, 5 mg SeNP was dispersed in 5 mL of Tris buffer (10 mM, pH 8.5). 2 mg of $M-PEG-NH_2$ was added to the reaction, stirred at room temperature overnight, and dialyzed to remove excess free PEG.

Pheomelanin extraction from the covert feathers of a Rhode Island red rooster: We isolated intact melanosomes following the enzymatic (Proteinase-K based) extraction method of Liu et al (2004).[2] Compared to other, harsher methods traditionally employed in melanin extraction (e.g. acid-base extraction), this method retains the integrity of the chemical composition of melanin. Briefly, 10 g of feathers were initially washed by a series of organic solvents, including acetone, dichloromethane, ether, and ultrapure water and cut into 2 mm pieces. Then the feather pieces were treated with DTT, Proteinase-K and papain. After another round of treatment with Proteinase-K, Triton X-100 and Proteinase-K, the pheomelanin was obtained as a red to brown suspension in water and lyophilized overnight for ssNMR. The total amount of pheomelanin obtained was 48 mg.

Solid state $^{13}C$ NMR: Approximately 30 mg of lyophilized sample was packed into a 3.2 mm Bruker rotor. Each 1 D $^{13}C$ cross polarization (CP) was acquired using 36 k scans and a recycle delay of 3s on a 750 MHz Bruker spectrometer at UCSD. The CP contact time was optimized to 2 ms and the $^{1}H$ decoupling was 83 kHz. The spinning speed was 13.5 kHz.

Electron paramagnetic resonance (EPR) of selenomelanin sample: Continuous wave EPR spectra were obtained at X-band (9.5 GHz) fields using a Bruker Elexsys E680 spectrometer equipped with a 4122SHQE resonator. Scans were performed with magnetic field modulation amplitude of 2 G and non-saturating microwave power of 1.544 mW. The results are the average of 32 scans. Samples were contained in quartz tubes with I.D. 1.50 mm and O.D. 1.80 mm. For quantification, 4-amino-TEMPO was dissolved in ultrapure water as a spin standard. EPR spectra were taken of the standard solutions under identical conditions. The EPR spectra were double integrated and then the double integration areas were plotted against the spin concentration. The double integration of the SeNP at 5.4 mg $mL^{-1}$ is 17.3. According to the calibration curve in FIGS. 40A-40E, the radical content is $1.12\times10^{18}$ per gram, which is similar to the polydopamine and poly(L-DOPA) samples reported previously by Dadachova et al.[7]

ICP-OES test of Se or S in the nanoparticles: SNP (or, PNP) and SeNP samples were digested in concentrated trace nitric acid (>69%, Thermo Fisher Scientific, Waltham, MA, USA) at 65° C. for at least 3 hours. Ultrapure $H_2O$ (18.2 MΩ-cm) was added to produce a final solution of 5.0% nitric acid (v/v) in a total sample volume of 6 mL. Quantitative standards consisting of 1000, 500, 250, 125, 62.5, and 31.25 ng/g of S and Se were prepared using a 1000 μg/mL S standard and a 100 μg/mL Se standard (Inorganic Ventures, Christiansburg, VA, USA) in 5.0% nitric acid (v/v) in a total sample volume of 5 mL. Each sample was acquired using a 5 second visible exposure time and 15 second UV exposure time, running 3 replicates. The spectral lines selected for analysis were: S (180.731, 182.034 nm) and Se (196.090, 203.985 nm).

Extinction coefficient measurement: The extinction coefficient of NPs was determined by measuring the UV-Vis spectra of the melanin solutions at different concentrations. At least five different concentrations were used for the extinction coefficient measurement.

XPS spectra of SeNP, SNP and L-DOPA NP: See FIGS. 6A-6E: XPS spectra of the SeNP sample drop-casted on a silicon substrate. 6A: Wide-scan survey spectra. 6B: the Se 3d spectrum. 56.4 eV indicate that there is mostly the C—Se—C structure.[3] 6C: the C1s spectrum. 6D: the O 1s spectrum. 6E: the N 1s spectrum.

FIGS. 31A-E: XPS spectra of the SNP sample drop-casted on a silicon substrate. 31A: Wide-scan survey spectra. 31B: the C1s spectrum. 31C: the O 1s spectrum. 31D: the N 1s spectrum, 31E: the S 2p spectrum. The S spectra confirmed the successful incorporation of sulfur from cysteine in the SNP product.

FIGS. 32A-D: XPS spectra of the L-DOPA NP sample drop-casted on a silicon substrate. 32A: Wide-scan survey spectra. 32B: the C1s spectrum. 32C: the O 1s spectrum. 32D: the N 1s spectrum.

Figure 33A:
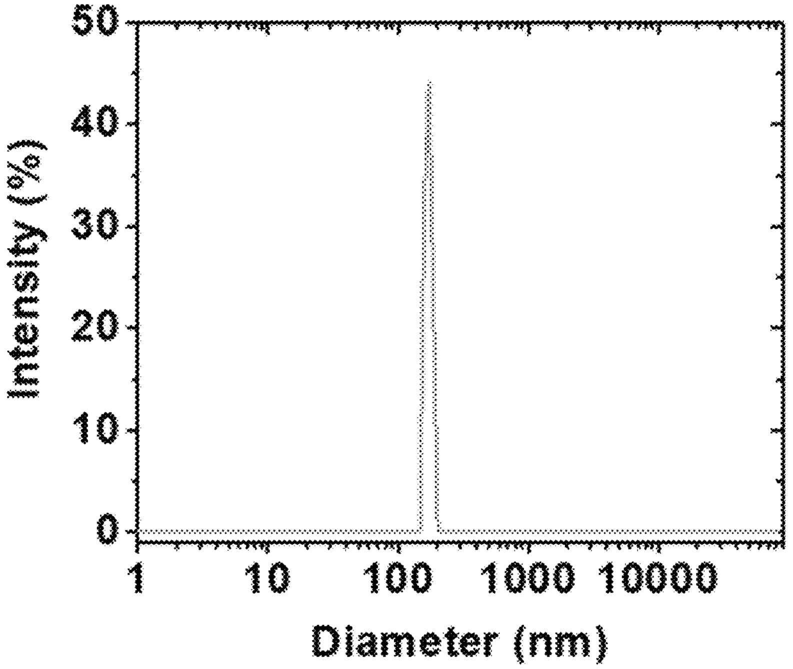
FIGS. 33A-33B. DLS intensity plots of SNP (FIG. 33A) and L-DOPA NP (FIG. 33B) samples.
Figure 33B:
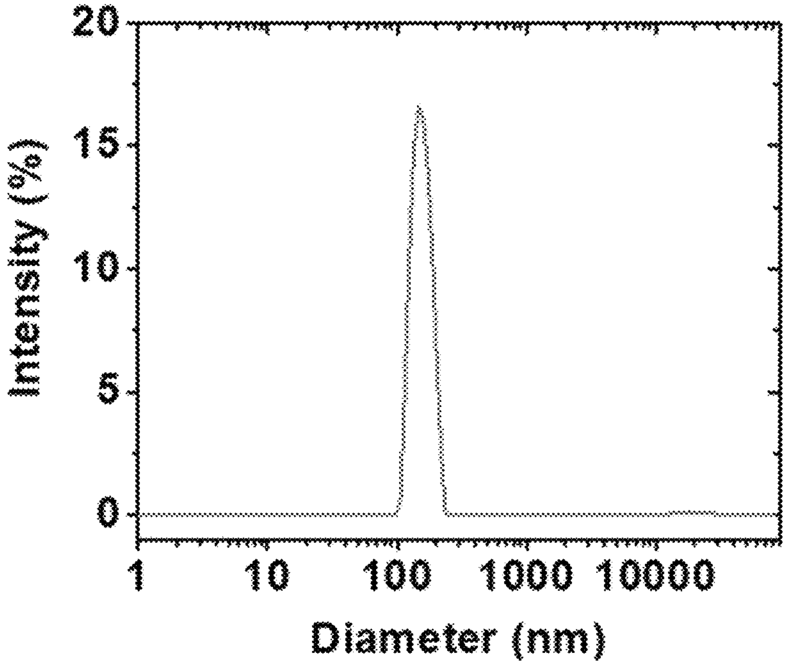

DLS spectra of SeNP, SNP and L-DOPA NP: See FIGS. 33A-C: DLS intensity plots of SeNP (A), SNP (B) and L-DOPA NP (c) samples.

EPR quantification using 4-Amino-TEMPO as a standard: (See FIGS. 40A-E): 4-Amino-TEMPO was dissolved in ultrapure water as spin standard. EPR spectra were taken of the standard solutions under identical conditions. The EPR spectra were double integrated and then the double integration areas were plotted against the spin concentration. The double integration of the SeNP at 5.4 mg/mL is 17.3. According to the calibration curve in D, the radical content is $1.12\times10^{18}$ per gram, which is similar to the polydopamine and poly(L-DOPA) samples reported previously by Dadachova et al.[4]

FIGS. 40A-E: EPR quantification of the radical content in the SeNP. 40A: EPR spectra of 4-Amino-TEMPO standard solution of 500, 100 and 10 μM. 40B: the integration plot of EPR spectra in A. The plots were baseline corrected in origin. 40C: The integration plot of integrated EPR spectra in B. 40D: the calibration curve of double integration area vs spin concentration. 40E: EPR spectra of 5.4 mg/mL SeNP aqueous suspension.

Circular dichroism measurement: CD spectra were measured using a Jasco J-815 spectrometer and each sample was measured from 190 to 300 nm with a slit width of 1 nm, scanning at 1 nm intervals with a 1s integration time. Measurements were taken 3 times at 25° C. under a nitrogen atmosphere and then averaged to give the spectra. See FIGS. 7-8.

FT-IR spectra: See FIG. 9: FT-IR spectra of L-DOPA NP, SeNP and the corresponding starting materials. Dotted lines are the monomers and solid lines are the NP samples. Y axis are the offset transmittance of each sample. Typical absorption bands were observed in SeNP sample at 3600-2400 $cm^{-1}$ (stretching vibration of —OH, —COOH, —NH), 2908 $cm^{-1}$ (stretching vibration of aliphatic —CH), 1715 $cm^{-1}$ (stretching vibration of C═O from —COOH) and 1616 $cm^{-1}$ (stretching vibration of $—NH_2$, bending vibrations of aromatic ring C═C). The main differences of SeNP with L-DOPA NP are the broad peak in 3600-2400 $cm^{-1}$ (peak centered at 3200 $cm^{-1}$ vs L-DOPA NP with two major peak 3383 and 3226 $cm^{-1}$) and weak peak at 2908 $cm^{-1}$, indicating different chemical structures.

Adapted Raper-Mason pathway for selenium pheomelanin: See FIG. 10: Adapted Raper-Mason pathway for the synthetic selenium pheomelanin.[5]

Figure 11:
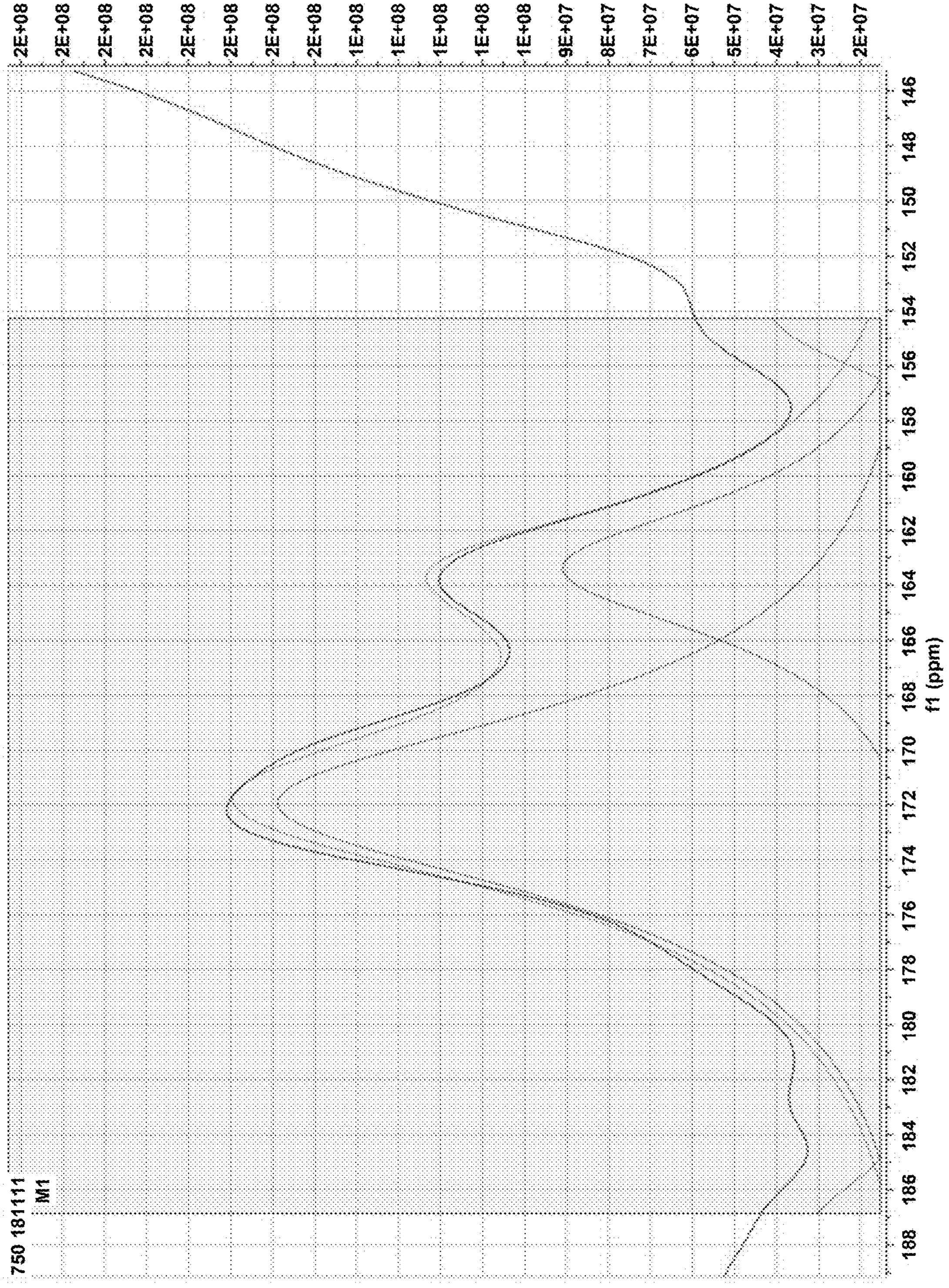
FIG. 11. SS $^{13}C$ NMR spectra integration in the COOH region. The two peaks at 163 ppm (from selenocysteine) and 172 ppm (from L-DOPA) were deconvoluted, and then integrated to get the molar ratio of selenocysteine and L-DOPA.

NMR Integration: See FIG. 11: SS $^{13}C$ NMR spectra integration in the COOH region. The two peaks at 163 ppm (from selenocysteine) and 172 ppm (from L-DOPA) were deconvoluted, and then integrated to get the molar ratio of selenocysteine and L-DOPA.

Characterization of L-DOPA NP: See FIGS. 12A-12B: STEM (A) and SEM (B) of L-DOPA NPs.

Figure 14:
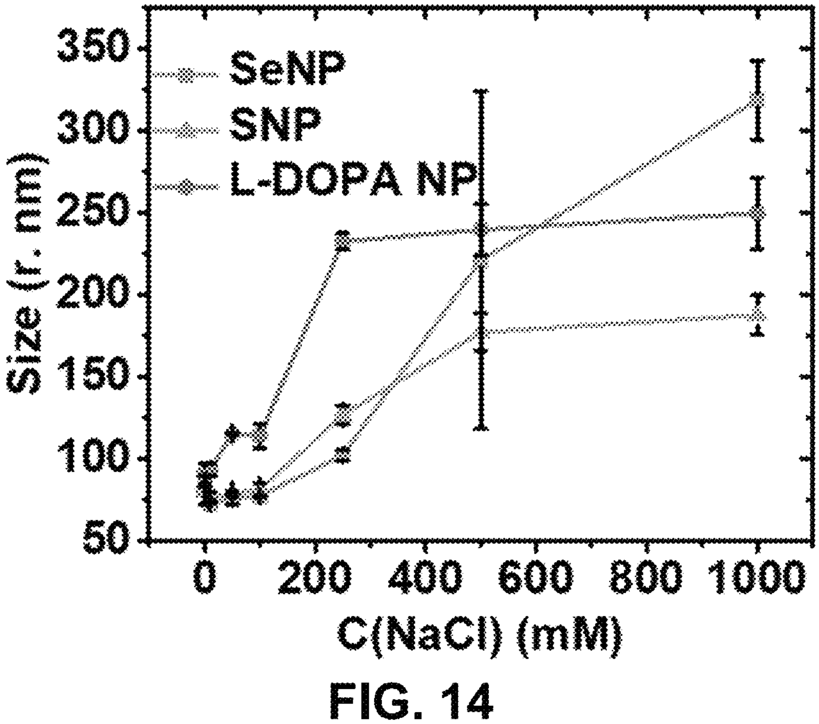
FIG. 14. Hydrodynamic radius change of L-DOPA NP and SeNP by DLS at different NaCl concentrations.

Colloidal stability test: See FIG. 13: Hydrodynamic radius change of L-DOPA NP and SeNP by DLS over 60 days under ambient conditions. See FIG. 14: Hydrodynamic radius change of L-DOPA NP and SeNP by DLS at different NaCl concentrations.

Refractive Index (RI) Measurement:

Each solution was prepared at a concentration of 0.05 mg $mL^{-1}$, 0.1 mg $mL^{-1}$, 0.2 mg $mL^{-1}$, 0.3 mg $mL^{-1}$, 0.4 mg $mL^{-1}$, or 0.5 mg $mL^{-1}$. The real part of the RI of the solution ($n_{eff}$) was measured using a digital refractometer J157 (Rudolph Research Analytical, 589 nm), which was first calibrated using ultrapure water ($n_w$=1.33296) and ethanol (std n=1.36162). Each sample was measured three times and averaged over 20 scans for each step. Both calibration and measurements were performed at 25° C.

Using the Drude model, the effective RI of the solution is given by the following equation: $n_{eff}^2=V_m n_m^2+(1-V_m)\, n_w^2$ Where $V_m$ and $n_m$ are the volume fraction and real part of the RI of particles, respectively, and $n_w$ is the real part of the RI of water. We converted mass concentration into the volume fraction using the reported density of melanin, 1.3 g $cm^{-3}$. $n_m$ is determined by extrapolation of linear fitting of the data points ($n_{eff}^2$ versus $V_m$) at $V_m$=1. See FIGS. 15A-B: A. Refractive index measurement of the SeNP sample. RI=1.3323. B. Optical image of the different nanoparticles solutions at 0.1 mg mL in ultrapure water: polydopamine (PDA), L-DOPA NP, SNP, SeNP.

RT-PCR for expression of the CDKN1a gene: Cells were lysed 3 h post-irradiation. Cell lysis, reverse transcription, and qPCR reactions were performed as per the instructions of the Single Shot SYBR Green kit from BioRad. Briefly, cells were washed with 3×DPBS (Gibco) followed by a 10 min incubation with the cell lysis mastermix consisting of 48 μL cell lysis buffer, 1 μL Proteinase K Solution, and 1 μL DNase Solution per well, prepared in advance on ice. Cell lysate was transferred to a 96 well PCR plate and incubated at 37° C. for 5 minutes followed by 5 minutes at 75° C. on a thermal cycler. Reverse transcription reactions were prepared on ice and included 4 μL iScript Advanced Reaction Mix, 1 μL iScript Advanced Reverse Transcriptase, 9 μL cell lysate, and 6 μL Nuclease-Free Water per well. Complete reaction mixes were incubated in a thermal cycler for 30 minutes at 42° C. followed by inactivation for 5 minutes at 85° C. For the qPCR reaction 1.2 μL SsoAdvanced Universal SYBR Green Supermix and 1.2 μL cDNA diluted 10 times with Nuclease-Free Water were added to a 384 PCR plate using a TTP Labtech mosquito, and 60 nL each of the forward and reverse primers were added to the appropriate wells using a Labcyte Echo 550. The PCR plate was centrifuged and loaded into a BioRad CFX384 instrument and cycled through a 30 second activation at 98° C. followed by amplification using a 15 second denaturation step at 95° C. and 30 second annealing/extension step with a plate read at 60° C. for 40 cycles. Primer efficiency was validated with untreated cell lysates prior to test samples, and non-template controls and non-reverse transcriptase controls were also included for every primer pair. After completion of 40 cycles, samples were allowed to anneal at 50° C. for 1 minute, and melt curves were obtained by performing a 5 second incubation at 0.5° C. intervals from 65° C. to 98° C. Data analysis was performed with CFX Manager software with no nanoparticles and 0 Gy radiation samples as controls.

Cell Studies of Different Nanoparticles.

Figure 34:
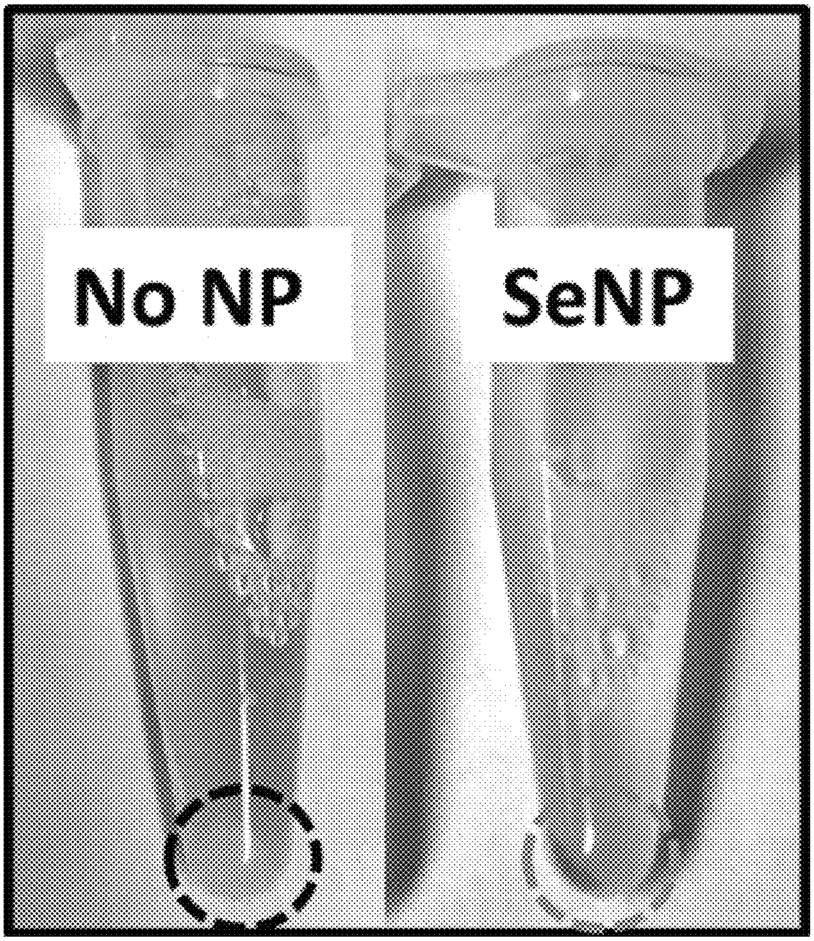
FIG. 34. Cell pellet images of NHEK cells treated with no NP (left), and SeNP (0.004 mg/mL) (right). The dark pellet indicates the uptake of the SeNP in the NHEK cells.

Cytotoxicity in NHEK cells: Primary neonatal epidermal keratinocyte (NHEK) cells were isolated from freshly excised neonatal foreskins and gifted by the Perez-White lab at Northwestern Feinberg School of Medicine. M154 medium supplemented with human keratinocyte growth supplement (HKGS), 10 μg/mL gentamicin, 0.25 μg/mL amphotericin B, and 0.07 mM $CaCl_2$ was used to incubate the cells. Cells were maintained at 37° C. and 5% $CO_2$ with a relative humidity of 95%. NHEK cells were plated in 48-well plates at a density of 5 k per well and then left to seed for 24 h. Subsequently, the cells were treated with NPs for the desired time followed by washing 3 times with PBS. After the incubation period, CellTiter-Blue® at 10% (v/v) in complete media was added to each well and incubated for 2 h to allow the live cells to convert resazurin to fluorescent resorufin. The fluorescent signal was then analyzed with excitation wavelength at 560 nm and emission wavelength at 600 nm by a plate reader. Three replicates were performed for each independent sample. 10% DMSO was used as a positive control and untreated cells in complete medium as a negative control. Viability is reported as a percentage of untreated cells, averaged over three biological repeats. See FIG. 16: Cell viability of NHEK cells after incubation with NPs for 24 h. The viability was determined using the CellTiter-Blue® assay. See FIG. 34: Cell pellet images of NHEK cells treated with no NP (left), and SeNP (0.004 mg/mL) (right). The dark pellet indicates the uptake of the SeNP in the NHEK cells.

Intracellular distribution of NPs in NHEK cells by CLSM: NHEK cells were plated in 4-well, glass bottom dishes at 5 k cells per well and seeded for 24 h before treatment with NP suspensions for 24 h. The cells were stained with 5 μg/mL of WGA conjugated to Alexa Fluor 633 in DPBS for 10 minutes at room temperature, washed with PBS, and returned to complete growth medium containing Hoechst 33342. Cells were imaged live in a humidity-controlled chamber at 37° C., supplemented with 5% $CO_2$. After 10 min incubation at 37° C., the cells were washed and then immersed in the medium. Before the confocal observation, 1 drop of hoechst dye was added to stain the nuclear. Confocal microscope was employed to observe the cell uptake and distribution. WGA 633 scan excitation wavelength: 633 nm. Detection Wavelength: 650-690 nm. Hoechst scan excitation wavelength: 405 nm. Detection Wavelength: 420 nm to 480 nm.

Intracellular distribution of NPs in NHEK cells by STEM: NHEK cells were seeded on 13 mm Thermanox™ coverslips and fixed in 0.1 M sodium phosphate or PIPES buffer with 2.5% glutaraldehyde and 2% paraformaldehyde. The cells were microwaved using a Pelco Biowave and post-fixed with 1% $OsO_4$ in imidazole followed by 1% uranyl acetate. The cells were dehydrated with a series of ethanol and acetone treatments and then permeated with EMBed812 resin in BEEM® capsules. The resin was polymerized by heating to 60° C. for 48 hours. Ultramicrotomy was performed using a Leica EM UC7 Ultramicrotome and the cells sectioned to 60 nm thick. Sections were mounted onto 1-2 mm slotted copper formvar/carbon grids and stained for 20 minutes with 2% uranyl acetate and 7 minutes with Reynolds lead citrate. Images were obtained on a Hitachi HD2300 cFEG STEM with an HAADF detector at 80 kV and an emission current of 57 μA. The images were contrast-inverted to reflect the appearance of standard bright field TEM images.

In the alternative, transmission electron microscopy (TEM) micrographs were obtained on a Hitachi 7700 TEM. TEM samples were prepared by drop casting 10 μL of sample solution in water onto the copper grid (lacey carbon, 300 mesh, from Ted Pella) without further staining.

In the alternative, for STEM of cells: NHEK cells were seeded on 13 mm Thermanox™ coverslips and fixed in 0.1 M sodium phosphate or PIPES buffer with 2.5% glutaraldehyde and 2% paraformaldehyde. The cells were microwaved using a Pelco Biowave and post-fixed with 1% $OSO_4$ in imidazole followed by 1% uranyl acetate. The cells were dehydrated with a series of ethanol and acetone treatments and then permeated with EMBed812 resin in BEEM® capsules. The resin was polymerized by heating to 60° C. for 48 hours. Ultramicrotomy was performed using a Leica EM UC7 Ultramicrotome and the cells sectioned to 80 nm thick. Sections were mounted onto 1-2 mm slotted or 300 mesh copper grids with carbon support and stained for 20 minutes with 2% uranyl acetate. Images were obtained on a Hitachi HD2300 cFEG STEM with an HAADF detector at 80 kV and an emission current of 57 μA. The images were contrast-inverted to reflect the appearance of standard bright field TEM images.

Morphology of NHEK cells after x-ray irradiation: To observe the morphology of cells after ionizing radiation, untreated cells were irradiated using a Radsource RS-2000 x-ray irradiator at a dose rate of 4.446 Gy/min. The cells were then incubated at 37° C. supplemented with 5% $CO_2$ for 1, 2, or 3 days, fixed with 4% paraformaldehyde for 10 minutes, and stained with DAPI (10 min) and WGA conjugated to Alexa Fluor 488. Samples were then washed with DPBS three times and stored under DPBS in 4° C. fridge before imaged by CLSM. WGA 488 scan excitation wavelength: 486 nm. Detection Wavelength: $510^{-550}$ nm. Hoechst scan excitation wavelength: 405 nm. Detection Wavelength: 420 nm to 480 nm. See FIGS. 17A-B: NHEK cell morphology before and after x-ray irradiation. Bright field image overlay with fluorescent channels for WGA (green) and DAPI (blue).

Reactive Oxygen Species (ROS) scavenging in NHEK cells: Cells were treated with 0.8 μM of the ROS probe DCFDA, incubated at 37° C. for 20 min. After that, the loading buffer was removed, and cells were returned to the growth medium. Then, the cells were irradiated by 6 Gy x-ray. A drop of Hoechst was added to 0.5 mL media for the nucleus staining before imaging by CLSM. Live cell imaging was collected on Leica SP5 confocal microscopy with the smart gain at 70% and laser power at 12% for the whole series of imaging. ROS probe scan excitation wavelength: 486 nm. Detection Wavelength: $510^{-550}$ nm. Hoechst scan excitation wavelength: 405 nm. Detection Wavelength: 420 nm to 480 nm.

DPPH Assay for Antioxidant Activity of SeNPs:

DPPH (2,2-Diphenyl-1-(2,4,6-trinitrophenyl) hydrazyl) radical scavenging activity of SeNP was measured according to the procedure by Lee J. K.[67] Briefly, 100 μL of a 0.6 mg/mL suspension of SeNP in ultrapure water was mixed with 1.8 mL of a 0.2 mM DPPH solution in 95% ethanol. The scavenging activity was evaluated by monitoring the absorbance decrease at 516 nm over 20 min. DPPH radical scavenging activity was calculated as I=[1−(Ai−Aj)/Ac]*100%, where Ac is the absorbance of DPPH solution without SeNP, Ai is the absorbance of SeNP mixed with the DPPH solution, and Aj is the absorbance of SeNP without DPPH. See FIG. 18: DPPH assay for antioxidant activity of SeNP (red), SNP (blue) and L-DOPA NP (gray). Error bars represent the standard deviation of triplicate studies.

*Vibrio natriegens* biosynthesis of selenomelanin materials: Melanin producing *V. natriegens* were constructed and cultured according to a published procedure.[6] Marine bacterium *V. natriegens* was engineered to express a heterologous tyrosinase gene and cultured for 24 h in medium containing (1) 2 mM L-DOPA, (2) 2 mM L-DOPA plus 2 mM cysteine, or (3) 2 mM L-DOPA plus 2 mM selenocystine. Melanized bacteria were then incubated with 4 M guanidinium thiocyanate solution at room temperature for 30 min. Cells were washed with deionized water once and hydrolyzed by boiling in 6 M HCl for 30 min. The resulting black material ("melanin ghosts") were washed with deionized water multiple times until the pH increased to 6. Melanin nanoparticles were collected from the culture medium supernatant with a 200 nm filter.

Figure 35A:
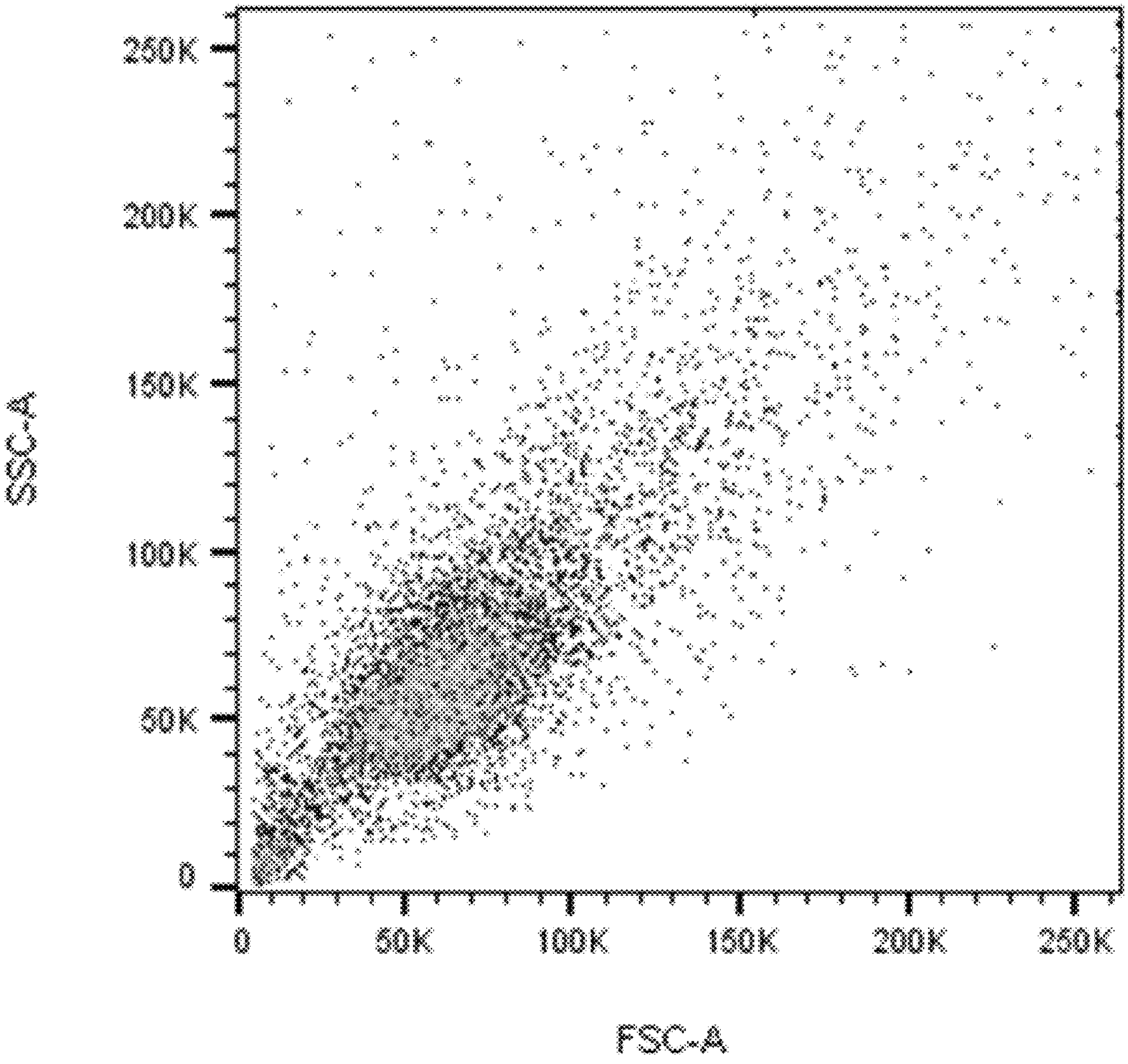
FIGS. 35A-35D. Flow cytometry data analysis workflow using FlowJo software.
Figure 35B:
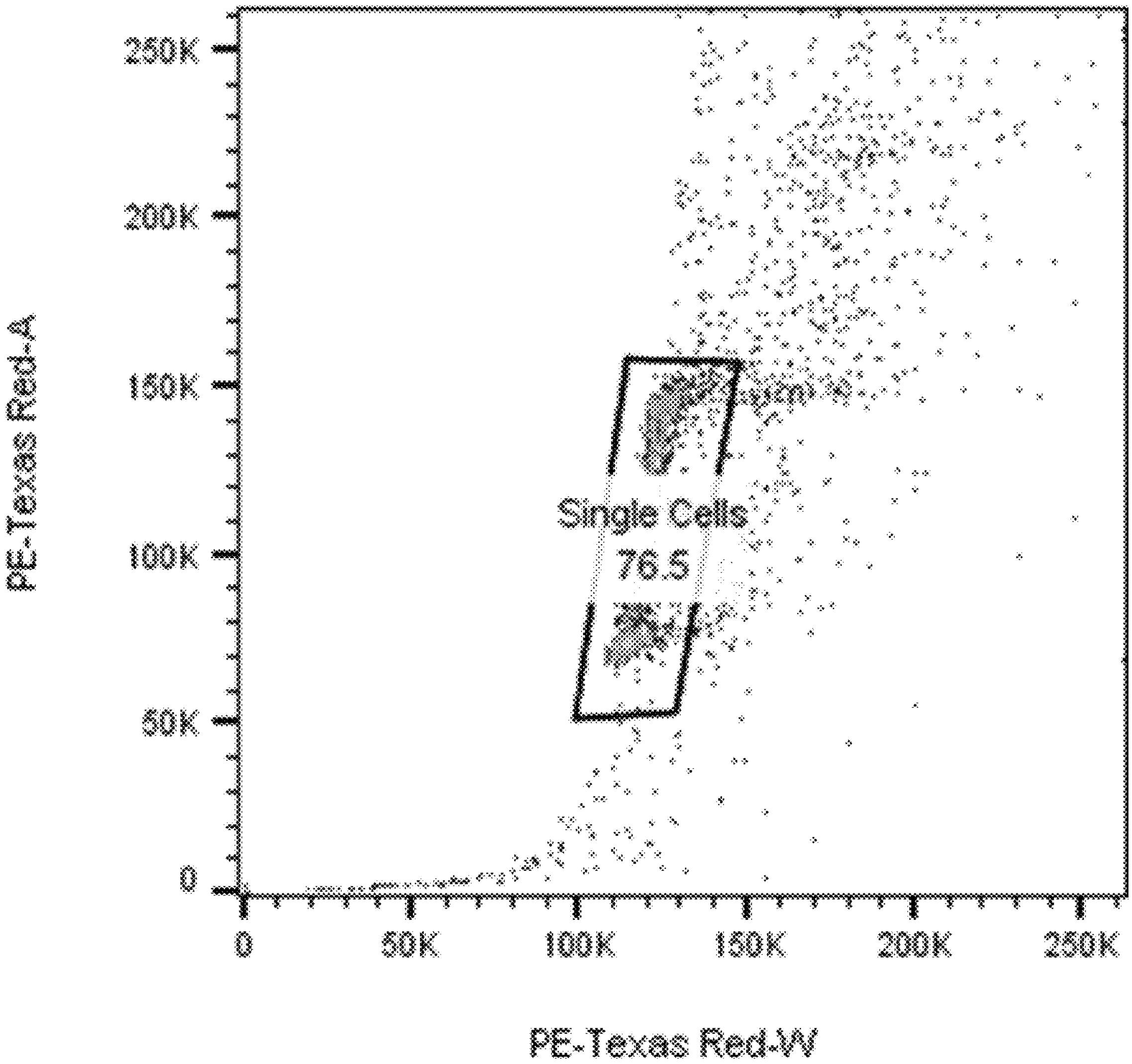
Figure 35C:
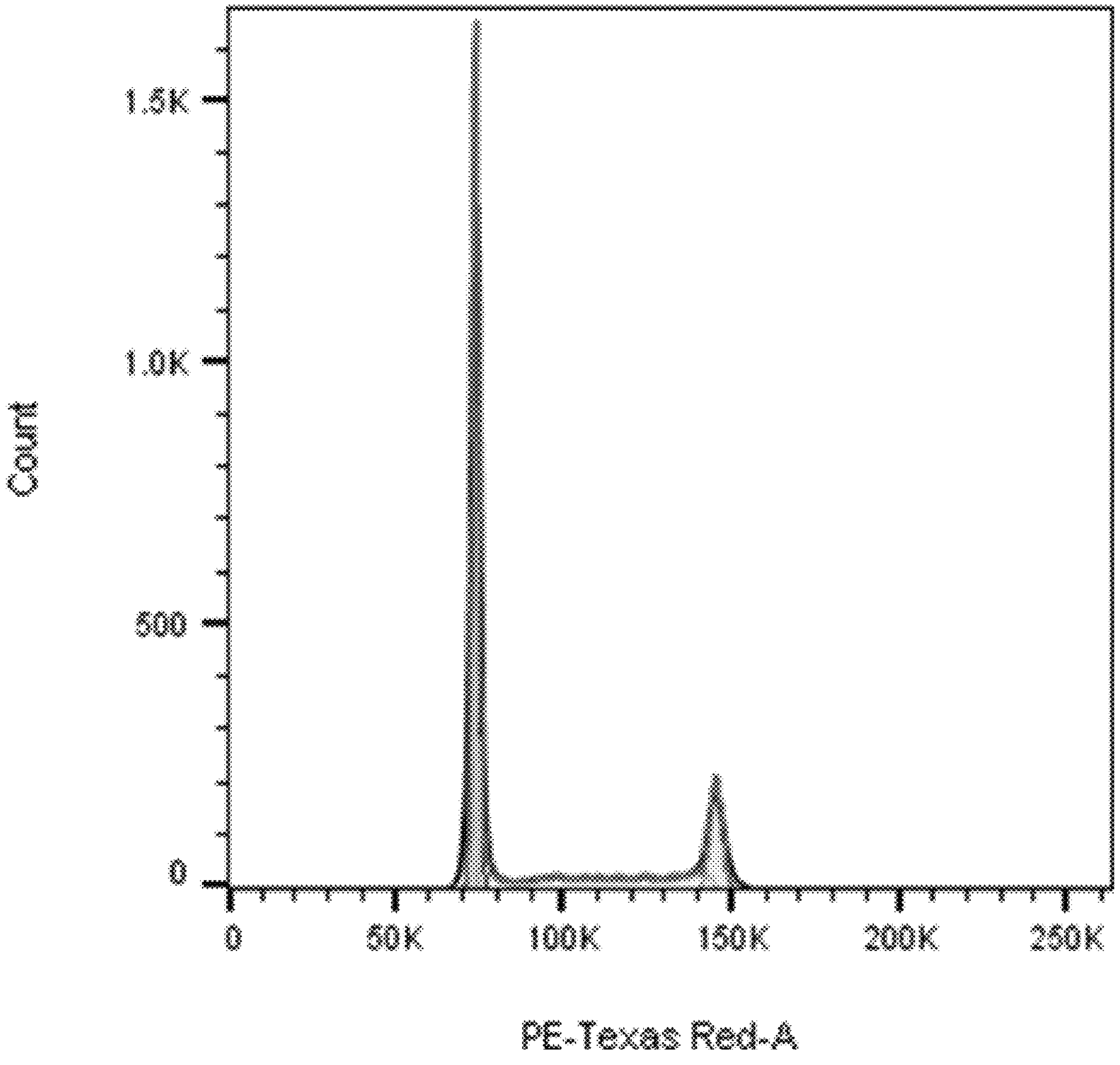
Figure 35D:
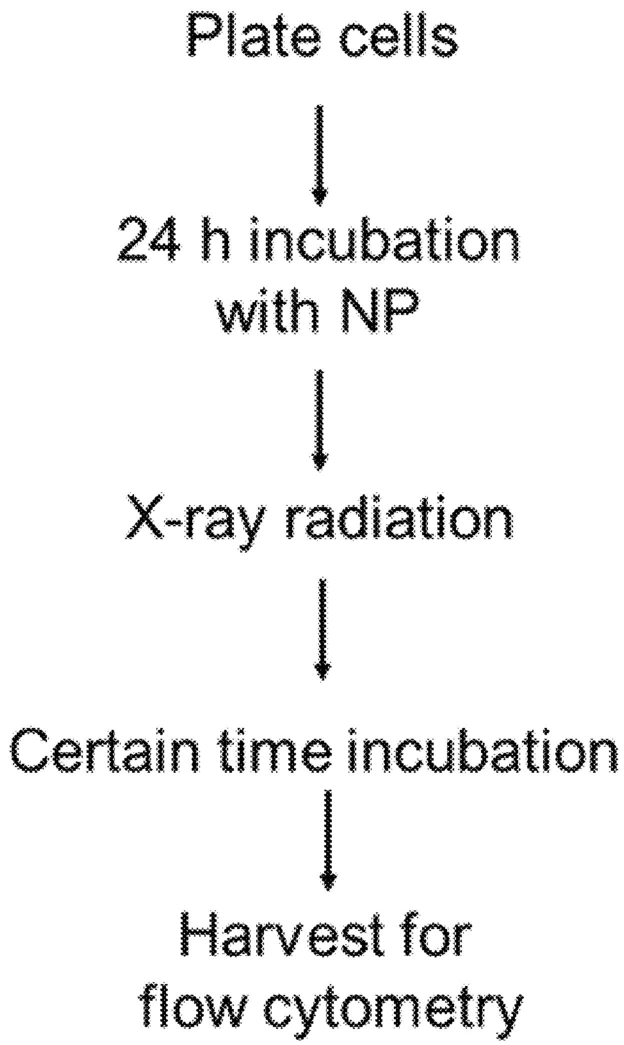
Figure 36A:
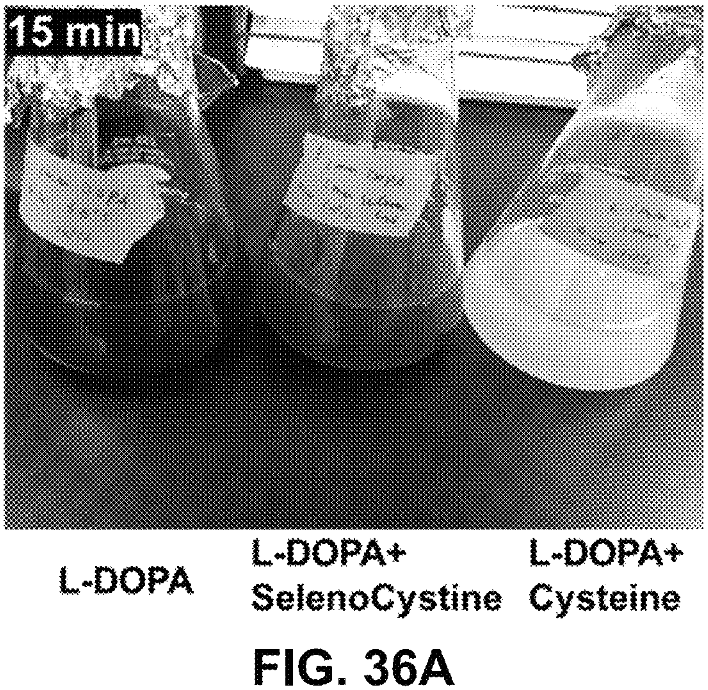
FIG. 36A: Image of the *Vibrio natriegens* culture media after adding the monomers for 15 min.
Figure 36B:
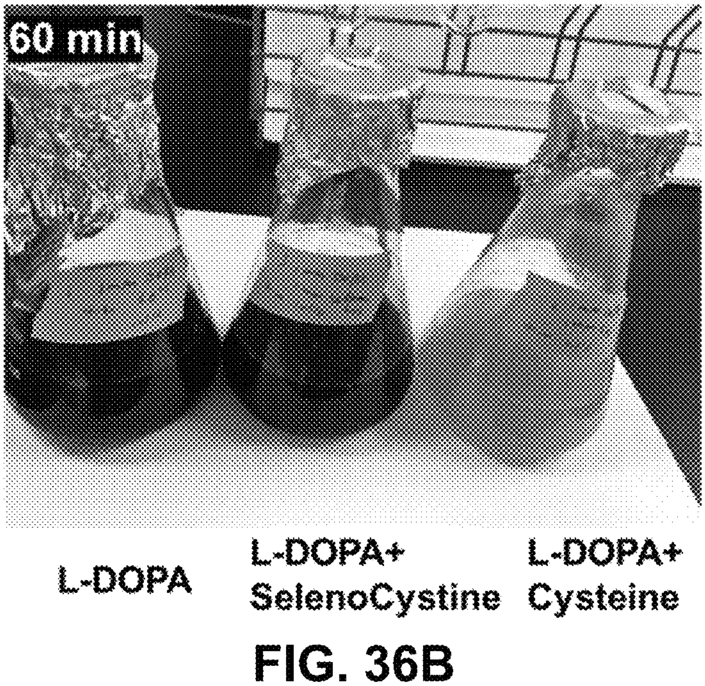
FIG. 36B: Image of the *Vibrio natriegens* culture media after adding the monomers for 60 min FIGS. 37A-37B. XPS spectra of the selenomelanin sample from medium.
Figure 37A:
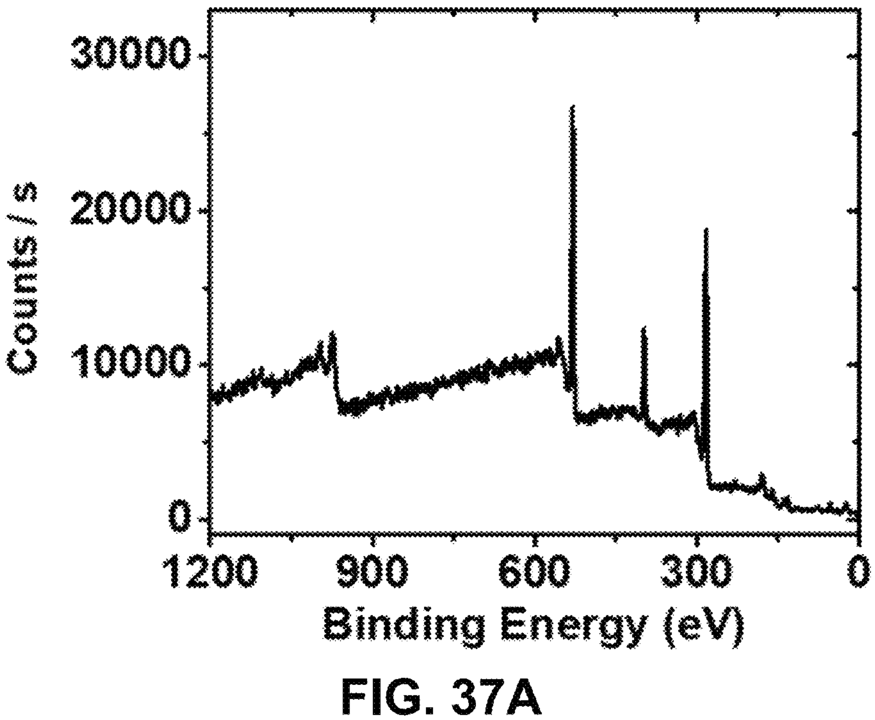
FIG. 37A. Wide-scan survey spectra.
Figure 37B:
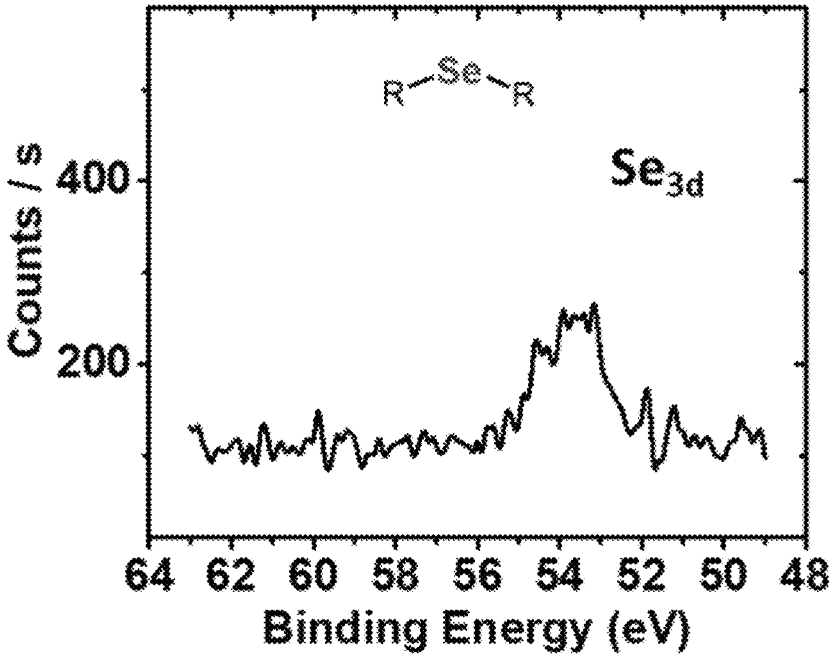
FIG. 37B. the Se 3d spectrum.
Figure 38:
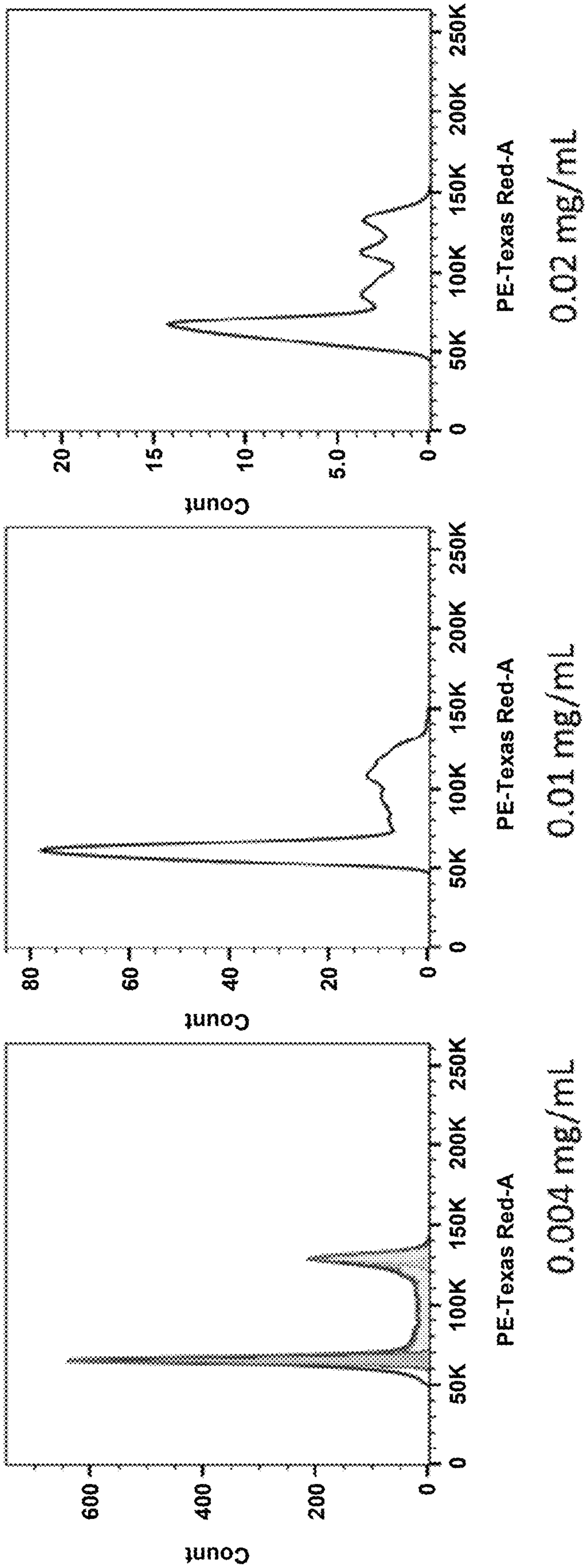
FIG. 38. Cell cycle plots of NHEK treated with different concentrations of selenomelanin ghost. 0.004 mg/mL could result in good cell cycle distribution. While further increasing the concentration to 0.01 and 0.02 g/mL could affect the fluorescence of PI, which affect the result significantly. In this figure, cells were treated with 4 Gy x-ray.
Figure 39:
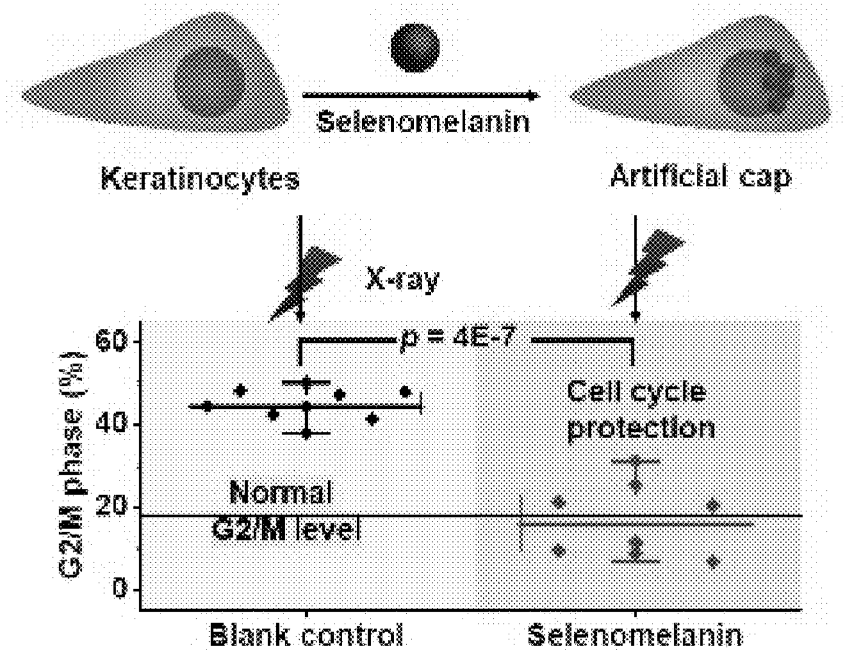
FIG. 39. An illustration of a cell taking up artificial selenomelanin nanoparticles, which results in improved cellular cycle protection when exposed to X-rays.

Cell cycle studies: In a typical data analysis, forward and side scatter were plotted to identify the cells. Gating was used to eliminate the clumps and doublet cells. NHEK cells treated with no NP and no X-ray are shown as examples of the data analysis (FIGS. 35A-C). Cell cycle data was analyzed using FlowJo v 10.6.0 software. All data points shown are the average of at least three independent experiments. Student's two-tailed t-tests were used for the comparison of means of at least three independent experiments, and P<0.01 was considered statistically significant.

Cell cycle studies using propidium iodide (PI) as staining agent: Cell cycle studies were performed according to a protocol by abcam.

NHEK cells were plated at 50 k cells per well in 12-well plates. After incubating for 24 h, nanoparticles of certain concentrations were added to each well for 24 h. Then x-ray radiation was applied at the dose rate of 4.4 Gy/min. The cells were incubated for desired time before the following experiments were done.

1) Harvest the cells with 0.025% trypsin/EDTA solution and wash in 0.5 mL DPBS twice.

2) Fix in cold 70% cold ethanol (0.7 mL). While vortexing, add 70% cold ethanol dropwise to the cell pellet. This should ensure fixation of all cells and minimize clumping.
3) Fix for 30 min at 4° C. fridge.
4) Wash twice in 1 mL PBS to rehydrate the cells. Spin at 850 g in a centrifuge for at least 10 min. Be careful to avoid cell loss when discarding the supernatant especially after spinning out of ethanol.
5) Treat the cells with ribonuclease. Add 50 μl of a 100 μg/ml stock of RNase.
6) Add 200 μl PI (50 μg/ml stock solution with 0.1% triton X to permeabilize the cells) and store in 4° C. overnight.
7) Flow cytometry experiments were carried out in Flow Cytometry Core in Northwestern University. PI has a maximum emission of 605 nm, so the default PE-Texas-red method works well for this experiment. The total number of counts were kept at 10,000 for all the flow experiments.

In a typical data analysis, forward and side scatter were plotted to identify the cells. Then Gate the cells to get rid of the clumps and doublet cells. Here, NHEK cells treated with no NP and no X-ray were shown below as an example for the data analysis. See also FIGS. 35A-D: Flow cytometry data analysis workflow using FlowJo software. A. NHEK cell population. B. Singlet gate using PE-Texas red area against PE-Texas red width plot. C. Histogram of PI counts (Texas Red channel) used for cell cycle analysis in Flow-Jo. D. Experimental timeline.

Figure 19B:
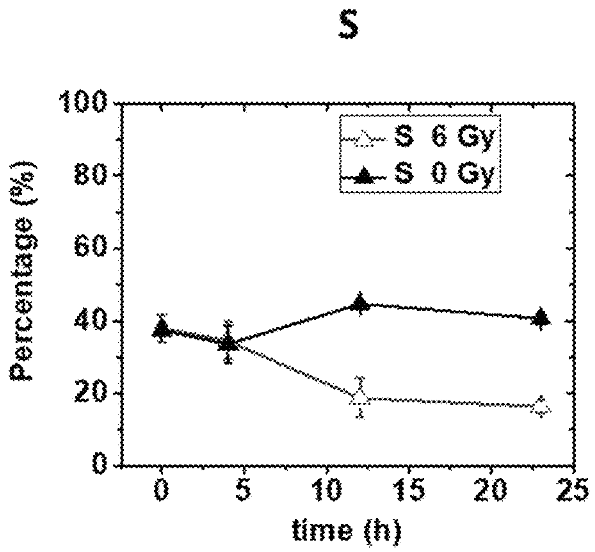
Figure 19C:
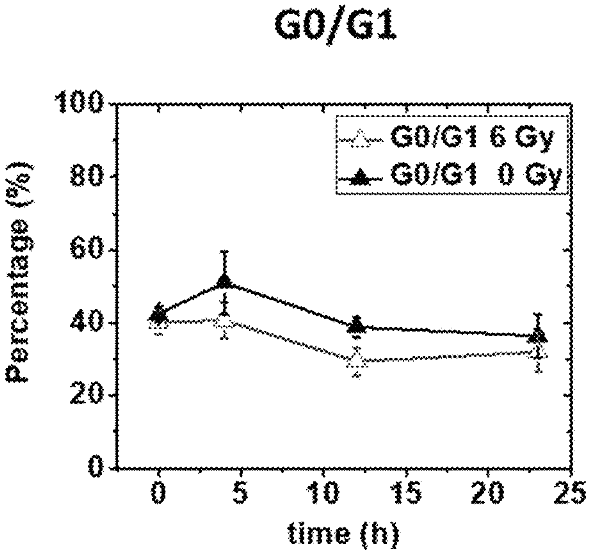
Figure 19D:
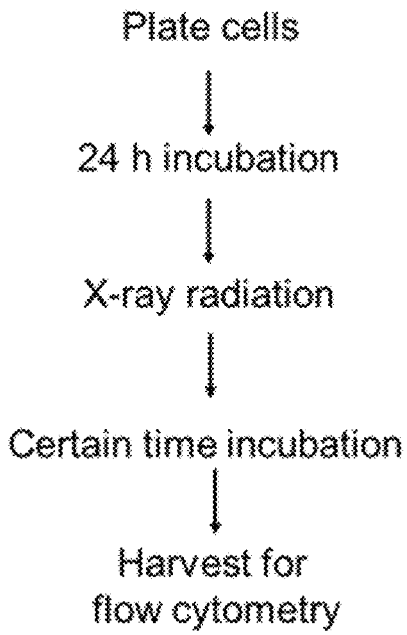

Cell cycle changes over time after 6 Gy x-ray irradiation: NHEK cells were treated with 6 Gy x-ray radiation and then incubated at 370° C. with 5% $CO_2$ for different periods of time. The cells were then harvested, fixed, and stained with PI for flow cytometry. Error bars represent the standard deviation of three independent experiments. See also FIGS. 19A-C: Cell cycle changes of NHEK cells induced by x-ray irradiated. The cell population percentage in different cell cycle phases, G2/M (A), S (B), and G0/G1 (C) were plotted against post-irradiation time.

Figure 20:
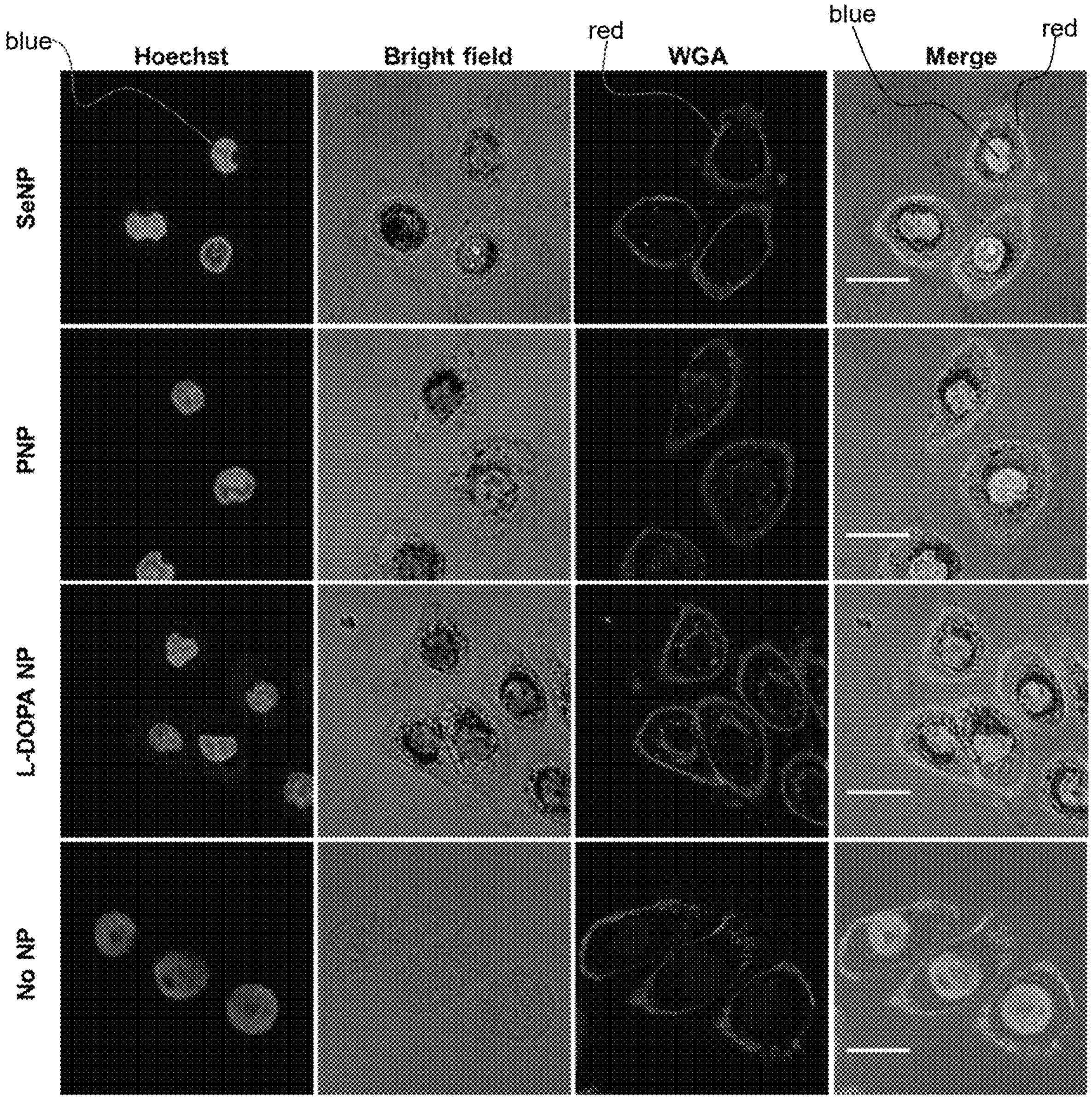
FIG. 20. Single channel confocal microscopy images of NP-treated cells. NHEK cells were incubated with SeNP, SNP, or L-DOPA NP for 24 h and stained with Hoechst 33342 (blue) or WGA 633 (red). Scale bars represent 20 μm.

Confocal microscopy images of different channels corresponding to FIG. 4: See FIG. 20: single channel confocal microscopy images of NP-treated cells. NHEK cells were incubated with SeNP, SNP, or L-DOPA NP for 24 h and stained with Hoechst 33342 (blue) or WGA 633 (red). Scale bars represent 20 μm.

Confocal microscopy images of different channels for FIG. 5: see FIG. 21: Single channel confocal images of cells irradiated by 6 Gy x-ray for FIG. 5. ROS scavenging in NP-treated NHEK cells after 6 Gy x-ray irradiation, stained with Hoechst 33342 (blue) and DCFDA probe (green). Scale bars are 20 μm. See also FIG. 22: Single channel confocal images of non-irradiated cells for FIG. 5. ROS scavenging in NP-treated NHEK cells with no x-ray irradiation, stained with Hoechst 33342 (blue) and DCFDA probe (green). Scale bars are 20 μm.

Viability test after exposure to 6 Gy x-ray irradiation: See FIGS. 23A-F: NHEK cell viability using flow cytometry. After harvesting the cells and washing with DPBS, PI solution (0.5 μL, 1 mg/mL in PBS) was added to each well. Cells were incubated on ice for 15 minutes prior to live cell flow cytometry measurements. Cells were treated with and without SeNP, radiated with 6 Gy or 0 Gy x-ray, and incubated for 24 h. Cells were treated with SeNP (0.004 mg $mL^{-1}$) followed by 0 Gy (A) or 6 Gy (B) x-ray irradiation, or no particles followed by 0 Gy (C) or 6 Gy (D) x-ray irradiation. NHEK cells without PI stain were used as live control (E). Cells fixed with 70% ethanol and stained with PI were used as dead cell control for cell gating (F). See also FIG. 24: NHEK cell viability using flow cytometry. Cells were treated with and without SeNP, followed by 6 Gy or 0 Gy x-ray irradiation and then incubated for 24 h. Red=SeNP. Black=No NP control.

6 Gy x-ray significantly decreased the cell viability of the no NP treated cells (P=0.00015), while SeNP treatment increased the viability of the irradiated cells to approximately the same value as the non-irradiated control group (0 Gy, no NP) (P=0.78). SeNP treatment did not change the viability of non-irradiated cells at this concentration (0.004 mg/mL) (P=0.024), which is consistent with the CellTiter-Blue® viability assay. NS represents P>0.01

Cell cycle distribution plots of cells treated by X-ray radiation: See FIGS. 25A-D: Cell cycle distribution plots of cells treated with different NPs followed by x-ray irradiation with different doses: A. 0 Gy. B. 2 Gy. C. 4 Gy. D. 6 Gy. Red=SeNP. Blue=SNP. Gray=L-DOPA NP. Black=No NP control. Each histogram is offset for better clarity and is representative of three independent experiments.

X-ray attenuation measured by x-ray colorimetry film: See FIGS. 26A-D: X-ray GAFCHROMIC EBT3 film experiments to evaluate the physical shielding of different NPs. The x-ray films were cut into 4 mm×40 mm sections, placed underneath a 2 mL NP suspension (1 mg/mL) in a capless 8 mL scintillation vial, irradiated from above, and subsequently measured in a quartz cuvette using a UV-Vis spectrometer. A. Coloration of EBT3 film after different doses of x-ray irradiation. B. UV-Vis spectra of the corresponding films. C. Absorbance values at 635 nm for several x-ray doses. D. Averaged UV-Vis spectra of the films. Error bars represent the standard deviation of three independent experiments with new films and NP suspensions.

In the alternative, we used dosimetry X-ray film and irradiated using 0-6 Gy. The X-ray dosage was found to be proportional to the absorbance of the film at $\lambda_{max}$ 635 nm ($R^2$=0.98), validating that the film could be used to detect different X-ray dosages. Then, X-rays were impinged through a nanoparticle suspension (2 mL, 1 mg $mL^{-1}$) onto the film.

OEG-coated SeNP synthesis and x-ray protection studies: See FIGS. 27A-D: OEG-coated SeNP were synthesized to investigate how the surface chemistry influences the protection behavior. SeNP-OEG synthesis and characterization by FT-IR (A and B). C. NHEK cells were treated with SeNP-OEG for 24 h, stained with Hoechst 33342 (blue) and WGA 633 (red), and then imaged via confocal laser scanning microscopy. Confocal image false color: red: WGA 633; Blue: Hoechst dye. Scale bar is 20 μm. D. Representative cell cycle distribution determined by flow cytometry. The cells were treated with no NP, SeNP, or SeNP-OEG, and irradiated with 0 Gy, 2 Gy, 4 Gy or 6 Gy x-ray. NS means no statistical difference (P>0.01) compared with no NP control. **P<0.01, as compared with the SeNP treated cells at the same x-ray dose.

Biological synthesis of selenomelanin in *vibrio* natriegen: See FIGS. 36A-D: Color change during the biological synthesis of selenomelanin. A. Image of the *vibrio* natriegen culture media after adding the monomers for 15 min. B. Image of the *Vibrio natriegens* culture media after adding the monomers for 60 min.

Supporting Tables:

TABLE 2

Statistical analysis for graphs on FIG. 24. Student's two-tailed t-tests were performed in Excel with reference to the No NP, 0 Gy control.

| | X-ray | Viability (%) | | Student's T test | |
|---|---|---|---|---|---|
| | dosage | Average | s.d. | P value | Significance |
| SeNP | 0 Gy | 75.6 | 3.6 | 0.024 | NS |
| | 6 Gy | 69.6 | 8.4 | 0.78 | NS |
| No NP | 0 Gy | 68.2 | 0.9 | | |
| | 6 Gy | 53.5 | 1.6 | 0.00015 | ** |

TABLE 3

Figure 5B:
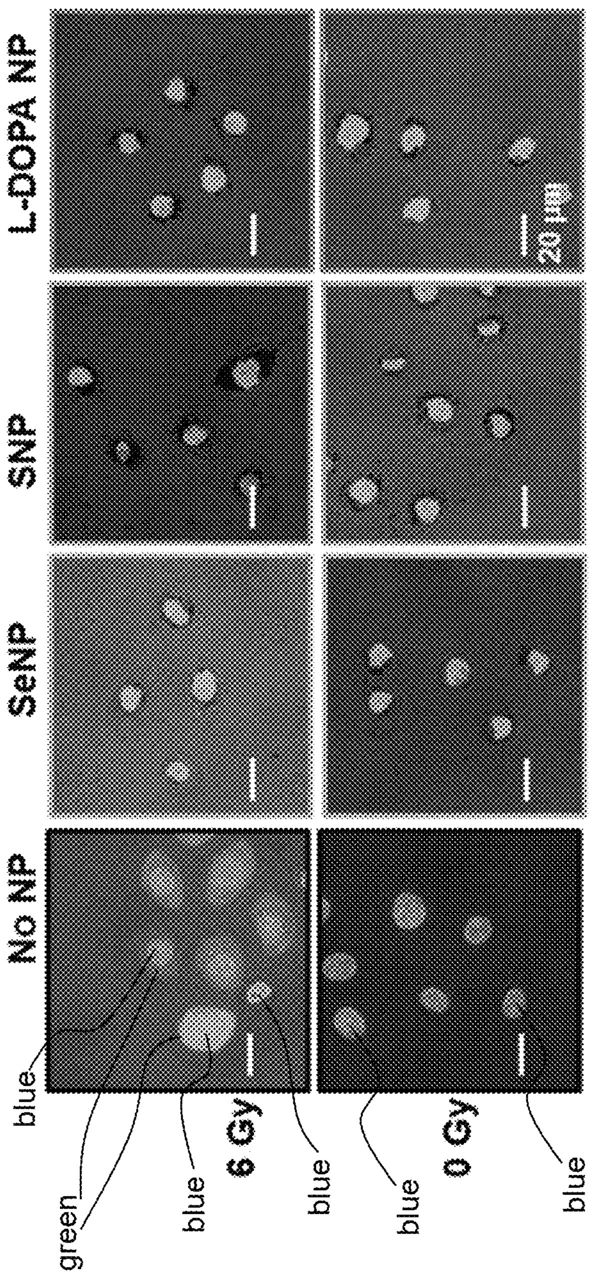
Figure 5C:
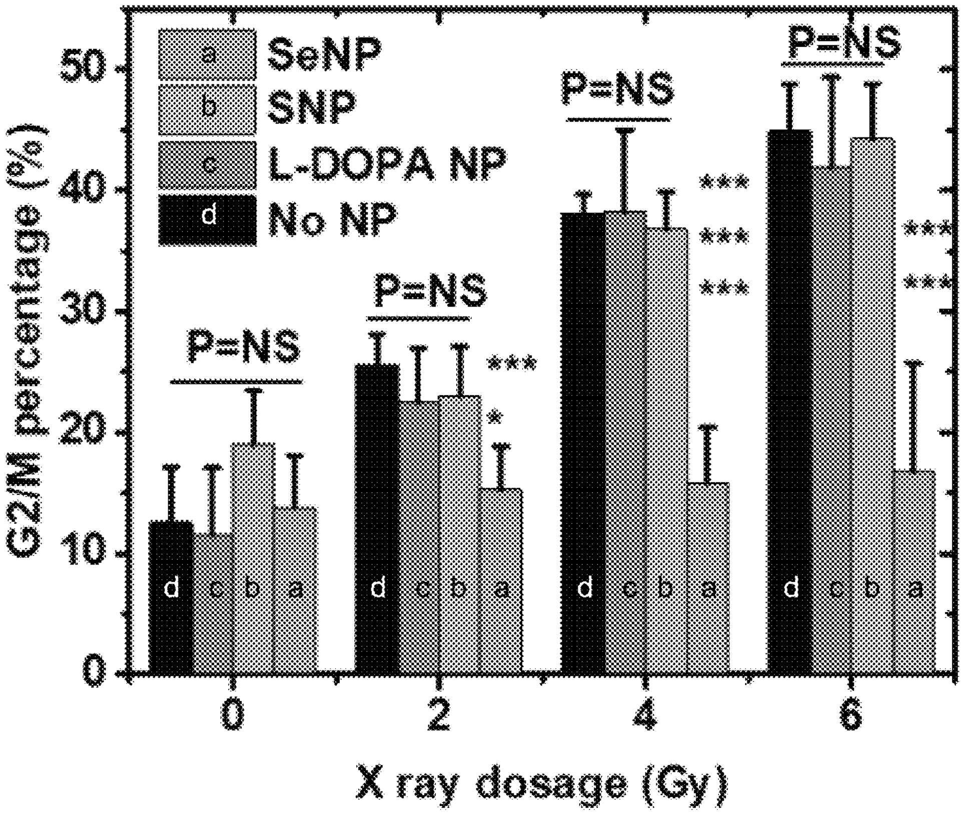
Figure 5D:
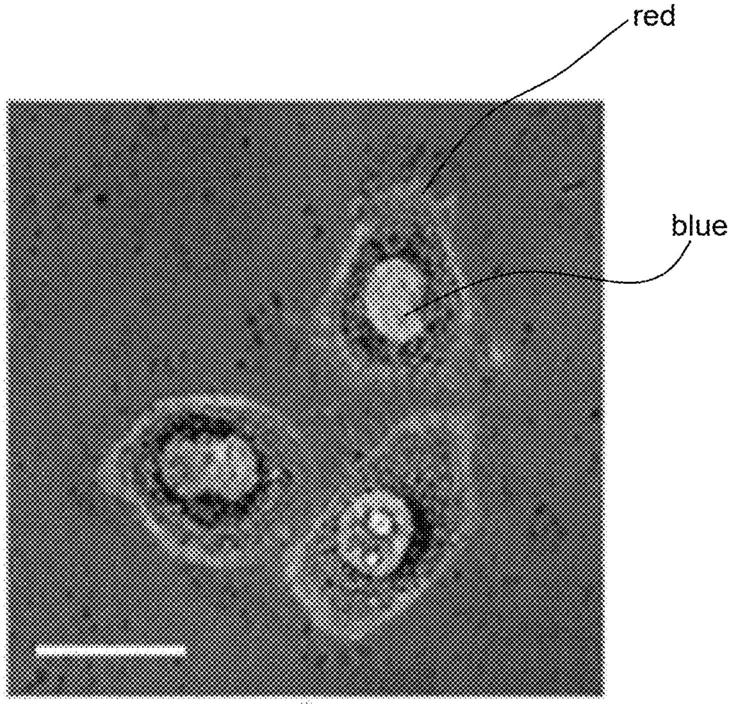
Figure 5I:
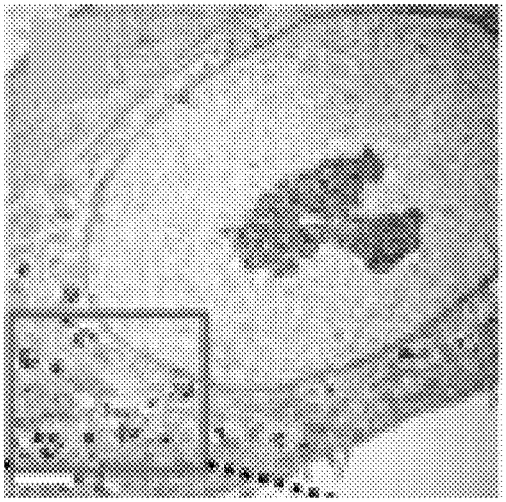
FIG. 5I. Cells treated with SeNP for 24 h, and imaged via STEM (scale bar is 2 μm). The square in the bottom left of FIG. 5I corresponds to the STEM image area of FIG. 5E.
Figure 5E:
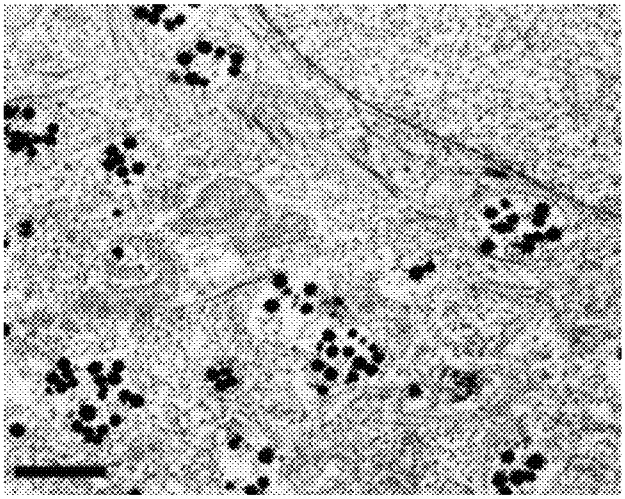
Figure 5F:
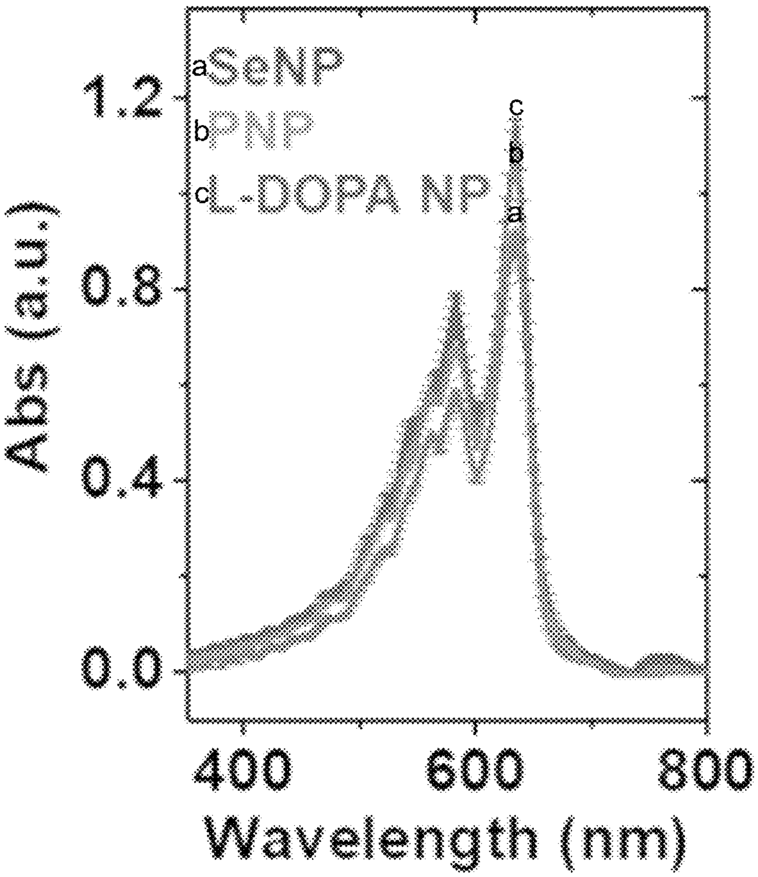
Figure 5G:
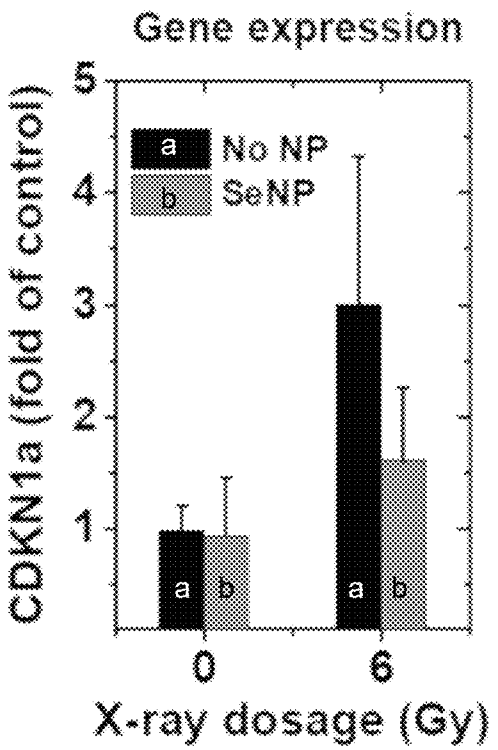
Figure 5H:
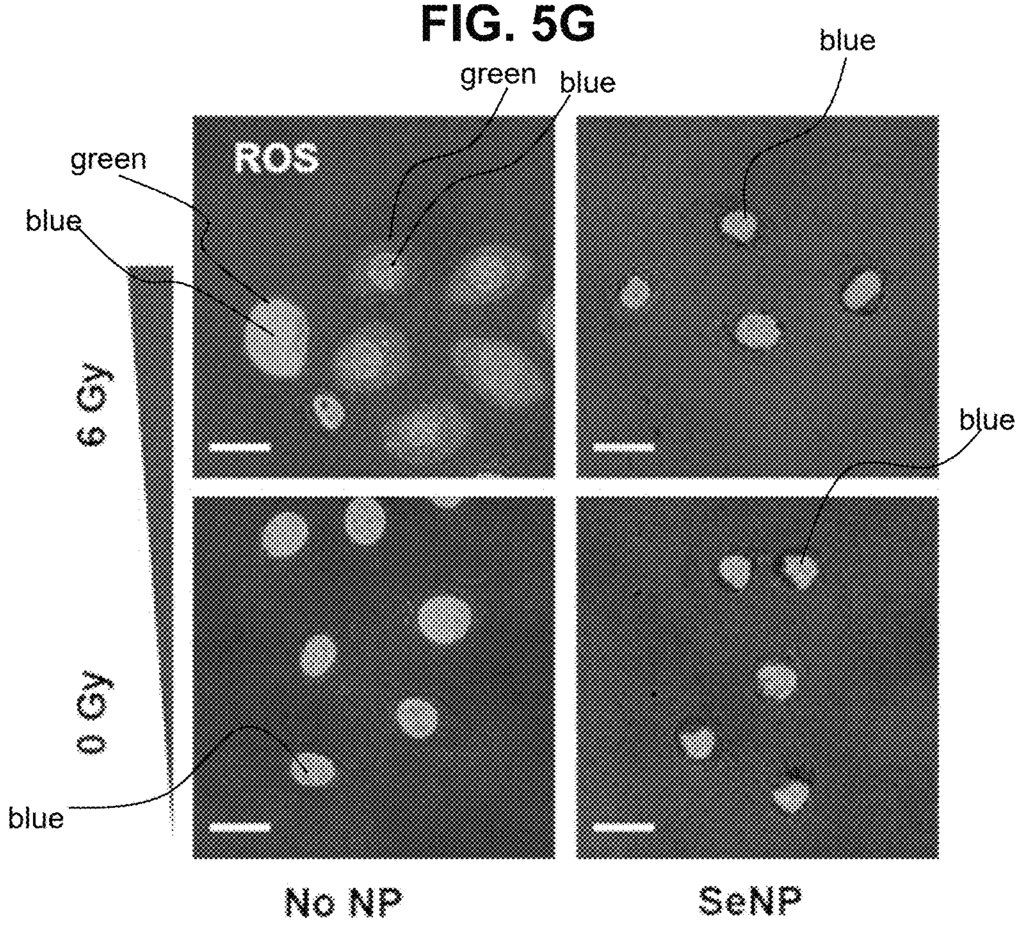

Statistical analysis for graphs in FIGS. 5A-5C of the main text. Cell population percentage in G2/M phase after x-ray irradiation. Student's two-tailed t-tests were performed in Excel.

| | X-ray | G2/M population (%) | | Student's T test | |
|---|---|---|---|---|---|
| | dosage | Average | s.d. | P value | Significance |
| SeNP | 0 Gy | 13.8 | 3.9 | 0.70 | NS |
| | 2 Gy | 15.3 | 3.6 | 0.00037 | *** |
| | 4 Gy | 15.9 | 4.5 | 3.1E−7 | ****** |
| | 6 Gy | 16.8 | 9.0 | 3.0E−5 | **** |
| SNP or PNP | 0 Gy | 17.4 | 4.8 | 0.11 | NS |
| | 2 Gy | 23.0 | 4.0 | 0.33 | NS |
| | 4 Gy | 36.8 | 3.1 | 0.36 | NS |
| | 6 Gy | 44.2 | 4.5 | 0.56 | NS |
| L-DOPA NP | 0 Gy | 11.5 | 5.6 | 0.10 | NS |
| | 2 Gy | 22.5 | 4.5 | 0.28 | NS |
| | 4 Gy | 38.3 | 6.7 | 0.99 | NS |
| | 6 Gy | 41.9 | 7.5 | 0.29 | NS |
| No NP | 0 Gy | 12.7 | 5.4 | | |
| | 2 Gy | 25.2 | 1.4 | | |
| | 4 Gy | 38.4 | 1.9 | | |
| | 6 Gy | 45.8 | 3.8 | | |

P values are generated from t-test results using different NP groups in comparison with the no NP control group treated with the same dose of x-ray.
P < 0.01 was considered statistically significant.

TABLE 4

Statistical analysis for graphs on FIGS. 27A-27D of the SI. Cell population percentage in G2/M phase after X-ray irradiation. Student's t-tests were performed in Excel.

| | X-ray | G2/M population (%) | | Student's T test | |
|---|---|---|---|---|---|
| | dosage | Average | s.d. | P value | Significance |
| SeNP | 0 Gy | 13.8 | 3.9 | 0.08 | NS |
| | 2 Gy | 15.3 | 3.6 | 0.17 | NS |
| | 4 Gy | 15.9 | 4.5 | 0.15 | NS |
| | 6 Gy | 16.8 | 9.0 | 0.0005 | ** |
| SeNP-OEG | 0 Gy | 10.2 | 0.9 | | |
| | 2 Gy | 18.4 | 4.8 | | |
| | 4 Gy | 19.5 | 1.0 | | |
| | 6 Gy | 40.6 | 12.1 | | |

P values are generated from the t-test results using SeNP and SeNP-OEG groups treated with the same dose of x-ray.
P < 0.01 was considered statistically significant.

REFERENCES IN EXAMPLE 2B (1) Pyo, J.; Ju, K. Y.; Lee, J. K. Artificial pheomelanin nanoparticles and their photo-sensitization properties. *J Photochem Photobiol B* 2016, 160, 330-335.

(2) Liu, Y.; Ai, K.; Ji, X.; Askhatova, D.; Du, R.; Lu, L.; Shi, J. Comprehensive Insights into the Multi-Antioxidative Mechanisms of Melanin Nanoparticles and Their Application To Protect Brain from Injury in Ischemic Stroke. *J. Am. Chem. Soc.* 2017, 139, 856-862.

(3) Ma, N.; Li, Y.; Ren, H.; Xu, H.; Li, Z.; Zhang, X. Selenium-containing block copolymers and their oxidation-responsive aggregates. *Polym. Chem.* 2010, 1, 1609-1614.

(4) Schweitzer, A. D.; Howell, R. C.; Jiang, Z.; Bryan, R. A.; Gerfen, G.; Chen, C.-C.; Mah, D.; Cahill, S.; Casadevall, A.; Dadachova, E. Physico-Chemical Evaluation of Rationally Designed Melanins as Novel Nature-Inspired Radioprotectors. *PLOS ONE* 2009, 4, e7229.

(5) Ito, S.; Wakamatsu, K. Chemistry of Mixed Melanogenesis-Pivotal Roles of Dopaquinonet. *Photochem. Photobiol.* 2008, 84, 582-592.

(6) Ju, K. Y.; Lee, Y.; Lee, S.; Park, S. B.; Lee, J. K. Bioinspired Polymerization of Dopamine to Generate Melanin-Like Nanoparticles Having an Excellent Free-Radical-Scavenging Property. *Biomacromolecules* 2011, 12, 625-632.

(7) Zhou, X.; McCallum, N. C.; Hu, Z.; Cao, W.; Gnanasekaran, K.; Feng, Y.; Stoddart, J. F.; Wang, Z.; Gianneschi, N. C. Artificial Allomelanin Nanoparticles. *ACS Nano* 2019, 13, 10980-10990.

EXAMPLE 3: ADDITIONAL DISCUSSION

It is known that working with small molecule selenium compounds is difficult due to many factor include, but not limited to, their having notoriously potent odors to which humans are sensitive at low concentrations, their having redox sensitivity, and their undergoing constant metathesis triggered by visible light. These factors, among others, greatly hampered the study of selenium related materials. Managing or mitigating these factors requires creative solutions and presents a barrier that prevented development of selenium compounds, such as artificial selenomelanin materials.

Sulfur-containing synthetic pheomelanin has been poorly characterized. The understanding of pheomelanin structure is largely a matter of surmise. ssNMR can provide the molecular structure of insoluble materials like melanin but ssNMR was not used for synthetic pheomelanin prior to our disclosure. Limited investigations of natural sulfur-containing pheomelanin had been performed using ssNMR, but natural sulfur-containing pheomelanin includes other components like eumelanin, lipids, and a proteinaceous component.

In addressing certain challenges with selenium compounds, it was determined, herein, that the precursor material selenocystine is more stable toward oxidation than selenocysteine, and could be converted to selenocysteine in situ by adding a reducing agent. Experiments were performed in a fume hood and fresh precursors were used with each synthesis to minimize the odor exposure. Furthermore, it was determined that after the Michael-addition to L-DOPA, the monoselenide compound is less prone to light-induced exchange reaction, and therefore is more stable than selenocysteine and selenocystine. It is noted that experimental design described herein provides methods that mitigate or avoid the challenges to selenomelanin synthesis, and is further reproducible for one of ordinary skill in art if followed correctly.

It is also noted that selenium has many different chemical and biological properties that differ from sulfur although they are in the same group in periodic table of elements. Selenium related chemical bonds have lower band dissociation energy than the sulfur counterpart. Selenium is more prone to oxidation and reduction. In addition, selenol is more nucleophilic than sulfur. Prior to the disclosures herein, it was unknown that selenocysteine would follow the Raper-Mason pathway for the natural pheomelanin synthesis. This is at least because the Raper-Mason pathway has a competition between oxidation and Michael addition. A selenol compound is more active for both reactions. It was therefore unpredictable which is the preferred reaction pathway. This issue of unpredictable reaction pathway is exacerbated by the fact that selenium chemistry is difficult to work with and has a poor reputation due at least to the odor, redox sensitivity, and light sensitivity, which had proven a barrier to development of many selenium-based compounds. Therefore, it was unknown and unpredictable, prior to our disclosures herein, whether selenium could be incorporated in the melanin family of compounds.

Additionally, it should be noted that some literature dealing with selenium introduction to melanin-containing organisms fails to provide evidence, suggestion, or reasonable expectation for formation of selenomelanin materials. For example, a report presenting treatment of zebrafish larvae with selenium compounds showed that selenium preferentially accumulated in melanized cells. However, the report did not report or suggest that the melanin itself acted as a repository for the selenium but rather that proteins in those cells had incorporated the element. In other words, there was no evidence, or even suggestion to one of skill, for the formation of selenomelanin materials or compounds.

Disclosed herein is the first evidence, to our knowledge, that selenium could be incorporated in a pheomelanin in which all the sulfur is effectively replaced with selenium and the resulting selenomelanin has a different radioprotective effect. Selenium metabolism has long been an exciting research topic with much attention from across disciplines, including cancer prevention (Biofactors 14, 153, (2001)), immune function (Science, 285, 1393, (1999)), aging (J. Biol. Chem., 276, 29798, (2001)), and other physiological and pathophysiological processes (Lancet, 356, 233, (2000)). Selenoproteins have long been thought to be responsible for most of the biomedical effects of dietary selenium and are essential to mammals (Science 143, 369, (1964)). In addition, more recent studies include exciting investigations of selenium's role in ferroptotic cell death (Cell Chemical Biology 2020, 27, 409), combined anticancer therapies (Angew. Chem. Int. Ed. 2020, 59, 2700; Adv. Mater. 2020, 32, 1907568) and tissue pigmentation (Metallomics 2016, 8, 305).

In addition to selenomelanin materials being characterized by increased radioprotection and X-ray attenuation compared to their sulfur-based analogues, other characteristics of selenomelanin materials that differ from their sulfur-based analogues include: selenomelanin density is higher than sulfur-pheomelanin; different EPR signal; due to the heavy atom effect, selenomelanin materials should be better photo-sensitizers than their sulfur analogues; and selenomelanins could catalyze the decomposition of peroxides in cells, due to the bio activity of selenium compound, whereas sulfur analogues do not have this effect.

To our knowledge, prior to disclosures herein, it had not been known or demonstrated that sulfur-containing pheomelanin can be up taken by cells, let alone resulting in formation of a supranuclear cap. Selenomelanin introduces an exotic element to the melanin family. In selenomelanins, compared to sulfur-based analogues, chemical structure and surface chemistry are both altered. Typically, surface chemistry does change the intracellular distribution. Formation of a perinuclear cap in cells is complex process that is not fully understood, particularly with respect to melanins, let alone pheomelanins. Therefore, prior to our disclosures herein, it was unpredictable that selenomelanin materials, such as selenomelanin nanoparticles, could be successfully taken up intracellularly by biological cells.

STATEMENTS REGARDING INCORPORATION BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

As used herein and in the appended claims, the singular forms “a”, “an”, and “the” include plural reference unless the context clearly dictates otherwise. Thus, for example, reference to “a cell” includes a plurality of such cells and equivalents thereof known to those skilled in the art. As well, the terms “a” (or “an”), “one or more” and “at least one” can be used interchangeably herein. It is also to be noted that the terms “comprising”, “including”, and “having” can be used interchangeably. The expression “of any of claims XX-YY” (wherein XX and YY refer to claim numbers) is intended to provide a multiple dependent claim in the alternative form, and in some embodiments is interchangeable with the expression “as in any one of claims XX-YY.”

The term “and/or” is used herein, in the description and in the claims, to refer to a single element alone or any combination of elements from the list in which the term and/or appears. In other words, a listing of two or more elements having the term “and/or” is intended to cover embodiments having any of the individual elements alone or having any combination of the listed elements. For example, the phrase “element A and/or element B” is intended to cover embodiments having element A alone, having element B alone, or having both elements A and B taken together. For example, the phrase “element A, element B, and/or element C” is intended to cover embodiments having element A alone, having element B alone, having element C alone, having elements A and B taken together, having elements A and C taken together, having elements B and C taken together, or having elements A, B, and C taken together.

The term “±” refers to an inclusive range of values, such that “X±Y,” wherein each of X and Y is independently a number, refers to an inclusive range of values selected from the range of X−Y to X+Y.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Certain molecules disclosed herein may contain one or more ionizable groups [groups from which a proton can be removed (e.g., —COOH) or added (e.g., amines) or which can be quaternized (e.g., amines)]. All possible ionic forms of such molecules and salts thereof are intended to be included individually in the disclosure herein. With regard to salts of the compounds herein, one of ordinary skill in the art can select from among a wide variety of available counterions those that are appropriate for preparation of salts of this invention for a given application. In specific applications, the selection of a given anion or cation for preparation of a salt may result in increased or decreased solubility of that salt.

Every material, nanoparticle, dispersion, molecule, formulation, combination of components, or method described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. An artificial selenomelanin material comprising:

one or more selenomelanin polymers;

wherein the one or more selenomelanin polymers comprise a plurality of covalently bonded selenomelanin base units; wherein a chemical formula of each of the one or more selenomelanin base units comprises at least one selenium atom; and wherein the artificial selenomelanin material is a plurality of artificial selenomelanin nanoparticles.

2. A nanoparticle dispersion comprising the plurality of artificial selenomelanin nanoparticles of claim 1 being dispersed in a solvent or solvent mixture.

3. The nanoparticle dispersion of claim 2, wherein the solvent or solvent mixture is at least 50% water and/or wherein the artificial selenomelanin nanoparticles in the nanoparticle dispersion are characterized by an absolute value of a zeta potential selected from the range of 15 mV to 50 mV.

4. The nanoparticle dispersion of claim 2, wherein the artificial selenomelanin nanoparticles in the nanoparticle dispersion:

are size-stable at nanoparticle concentrations selected from the range of 0.1 mg/mL to $10^{-4}$ mg/mL with respect to an average size of the nanoparticle at a concentration of 0.1 mg/mL;

are size-stable in the dispersion having a pH of at least 11, with respect to an average size of the nanoparticle in the dispersion having a pH of 7; and/or are size stable when exposed to a concentration of NaCl of 250 mM in the dispersion, with respect to an average size of the nanoparticle in an equivalent dispersion free of NaCl.

5. The artificial selenomelanin material of claim 1, wherein each of said artificial melanin nanoparticles is independently characterized by a sphericity of greater than 0.90.

6. The artificial selenomelanin material of claim 1, wherein each of said artificial melanin nanoparticles are characterized by a polydispersity index less than or equal to 0.15.

7. The artificial selenomelanin material of claim 1, wherein the plurality of artificial melanin nanoparticles are characterized by a peak size selected from the range of 20 nm to 300 nm in diameter and/or the plurality of artificial melanin nanoparticles are purified or isolated and/or characterized by a melanin purity of at least 20%.

8. The artificial selenomelanin material of claim 1, wherein each of at least 90% of the plurality of artificial melanin nanoparticles comprises a selenomelanin polymer having selenomelanin base units comprising a moiety characterized by formula FX1, FX2, FX3A, FX3B, FX4, or a combination of any of these:

(FX1)

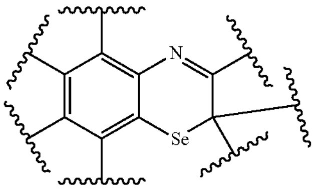

;

(FX2)

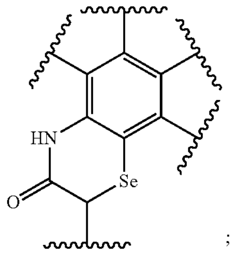

;

(FX3A)

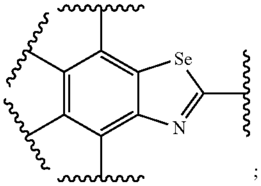

;

-continued (FX3B)

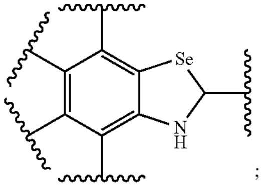

;

(FX4)

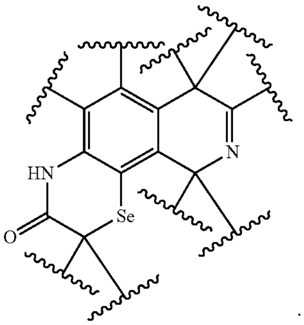

.

9. The artificial selenomelanin material of claim 1 further comprising selenomelanin monomers; wherein each selenomelanin monomer has a chemical formula comprising a selenium atom.

10. The artificial selenomelanin material of claim 9, wherein each of the selenomelanin monomers is an amino acid.

11. The artificial selenomelanin material of claim 10, wherein each of the selenomelanin monomers is a pheomelanin.

12. The artificial selenomelanin material of claim 9, wherein each of the selenomelanin monomers comprises a substituted or unsubstituted benzoselenazine or a derivative thereof, a substituted or unsubstituted benzoselenazole or a derivative thereof, a substituted or unsubstituted 7, 10-dihydro-2H-[1,4]selenazino [3,2-h]isoquinolin-3 (4H)-one or a derivative thereof, a substituted or unsubstituted benzoselenazinone or a derivative thereof, or any combination of these.

13. The artificial selenomelanin material of claim 9, wherein each of the one or more selenomelanin monomers comprises a moiety characterized by formula FX1, FX2, FX3A, FX3B, FX4, or a combination of any of these:

(FX1)

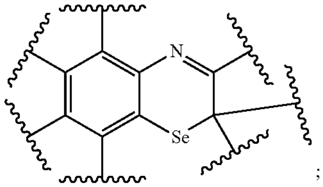

;

(FX2)

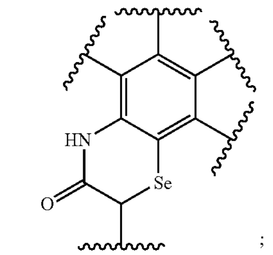

;

-continued (FX3A)

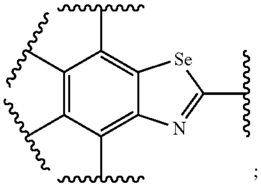

;

(FX3B)

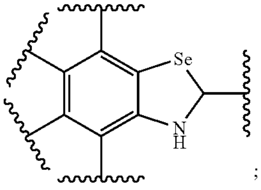

;

(FX4)

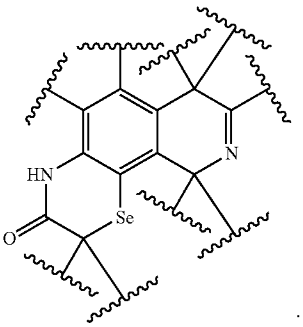

.

14. The artificial selenomelanin material of claim 9, wherein each of the selenomelanin monomers is characterized by formula FX5, FX6, FX7, FX8, FX9, FX10, or FX11:

(FX5)

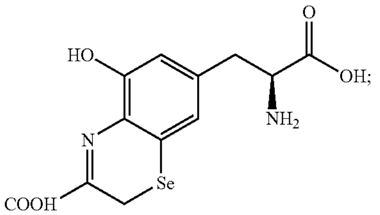

(FX6)

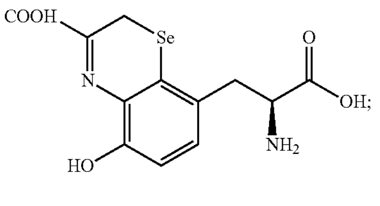

(FX7)

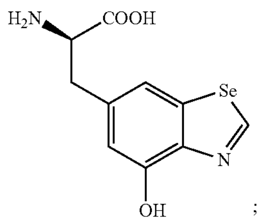

;

-continued
(FX8)
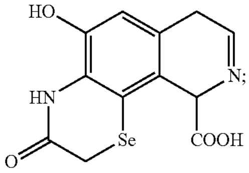
(FX9)
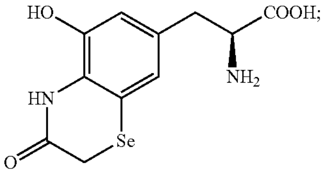
-continued
(FX10)
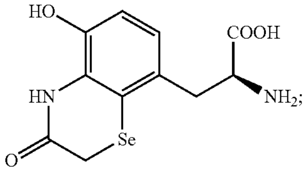
(FX11)
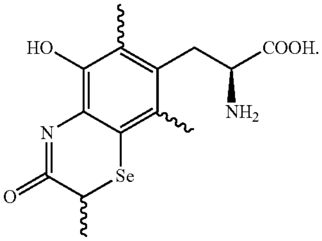
* * * * *